United States Patent
Xu et al.

(10) Patent No.: US 11,653,180 B2
(45) Date of Patent: May 16, 2023

(54) GROUP COMMUNICATIONS METHOD AND SYSTEM, AND DEVICE

(71) Applicant: Huawei Technologies Co., Ltd., Shenzhen (CN)

(72) Inventors: Changchun Xu, Shanghai (CN); Zhongping Chen, Shanghai (CN); Runze Zhou, Shanghai (CN); Yan Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 146 days.

(21) Appl. No.: 17/324,928

(22) Filed: May 19, 2021

(65) Prior Publication Data

US 2021/0274323 A1 Sep. 2, 2021

Related U.S. Application Data

(63) Continuation of application No. PCT/CN2019/119475, filed on Nov. 19, 2019.

(30) Foreign Application Priority Data

Nov. 19, 2018 (CN) .......................... 201811378645.3

(51) Int. Cl.
*H04W 4/00* (2018.01)
*H04W 4/08* (2009.01)
(Continued)

(52) U.S. Cl.
CPC ........... *H04W 4/08* (2013.01); *H04W 40/246* (2013.01); *H04W 76/11* (2018.02); *H04W 76/12* (2018.02)

(58) Field of Classification Search
CPC ..... H04W 4/08; H04W 76/11; H04W 40/246; H04W 76/12; H04W 76/40; H04W 36/0009
See application file for complete search history.

(56) References Cited

U.S. PATENT DOCUMENTS

2011/0286324 A1* 11/2011 Bellagamba ............ H04L 45/22
370/219
2018/0199243 A1 7/2018 Bharatia

FOREIGN PATENT DOCUMENTS

CN 108632787 A 10/2018
EP 3500055 A1 6/2019
(Continued)

OTHER PUBLICATIONS

"3rd Generation Partnership Project; Technical Specification Group Core Network and Terminals; Interface between the Control Plane and the User Plane Nodes; Stage 3 (Release 14)," 3GPP TS 29.244 V14.4.0 , total 163 pages, 3rd Generation Partnership Project, Valbonne, France (Jun. 2018).

(Continued)

*Primary Examiner* — Omoniyi Obayanju
(74) *Attorney, Agent, or Firm* — Leydig, Voit & Mayer, Ltd.

(57) ABSTRACT

A group communications method and system, and a device are provided. The method includes: when a first terminal initiates access to a local area network group, obtaining, by a group management function network element, an identifier of a first user plane network element to be accessed by the first terminal, context information of the local area network group, and a first session port identifier; creating, for the local area network group, a rule group applied to a first session port, and creating or updating, for the local area network group based on the context information, a local area network group forwarding action rule (FAR) applied to the first user plane network element; and sending a first message to a session management network element, for configuring the rule group on the first session port, and configuring the local area network group FAR on the first user plane network element.

20 Claims, 59 Drawing Sheets

(51) Int. Cl.
  *H04W 76/12* (2018.01)
  *H04W 76/11* (2018.01)
  *H04W 40/24* (2009.01)

(56) References Cited

FOREIGN PATENT DOCUMENTS

| | | |
|---|---|---|
| WO | 2018045501 A1 | 3/2018 |
| WO | 2018126981 A1 | 7/2018 |
| WO | 2018137232 A1 | 8/2018 |
| WO | 2018195803 A1 | 11/2018 |

OTHER PUBLICATIONS

"3rd Generation Partnership Project; Technical Specification Group Services and System Aspects; System Architecture for the 5G System; Stage 2 (Release 15)," 3GPP TS 23.501 V15.3.0, pp. 1-226, 3rd Generation Partnership Project, Valbonne, France (Sep. 2018).

"3rd Generation Partnership Project; Technical Specification Group Services and System Aspects; Study on 5GS Enhanced support of Vertical and LAN Services (Release 16)," 3GPP TR 23.734 V0.3.0, pp. 1-97, 3rd Generation Partnership Project, Valbonne, France (Oct. 2018).

"3rd Generation Partnership Project; Technical Specification Group Core Network and Terminals; Interface between the Control Plane and the User Plane Nodes; Stage 3 (Release 15)," 3GPP TS 29.244 V15.3.0, pp. 1-189, 3rd Generation Partnership Project, Valbonne, France (Sep. 2018).

"Solution for KI#4 and KI#5: Basic architecture for supporting dynamic 5G LAN-type service and 5GLAN communication," 3GPP TSG-SA WG2 Meeting #128bis, S2-189054 (email revision 1 of S2-188500), Sophia Antipolis, France, pp. 1-3, 3rd Generation Partnership Project, Valbonne, France (Aug. 20-24, 2018).

"3rd Generation Partnership Project; Technical Specification Group Services and System Aspects; System Architecture for the 5G System; Stage 2 (Release 15)," 3GPP TS 23.501 V15.2.0, pp. 1-217, 3rd Generation Partnership Project, Valbonne, France (Jun. 2018).

* cited by examiner

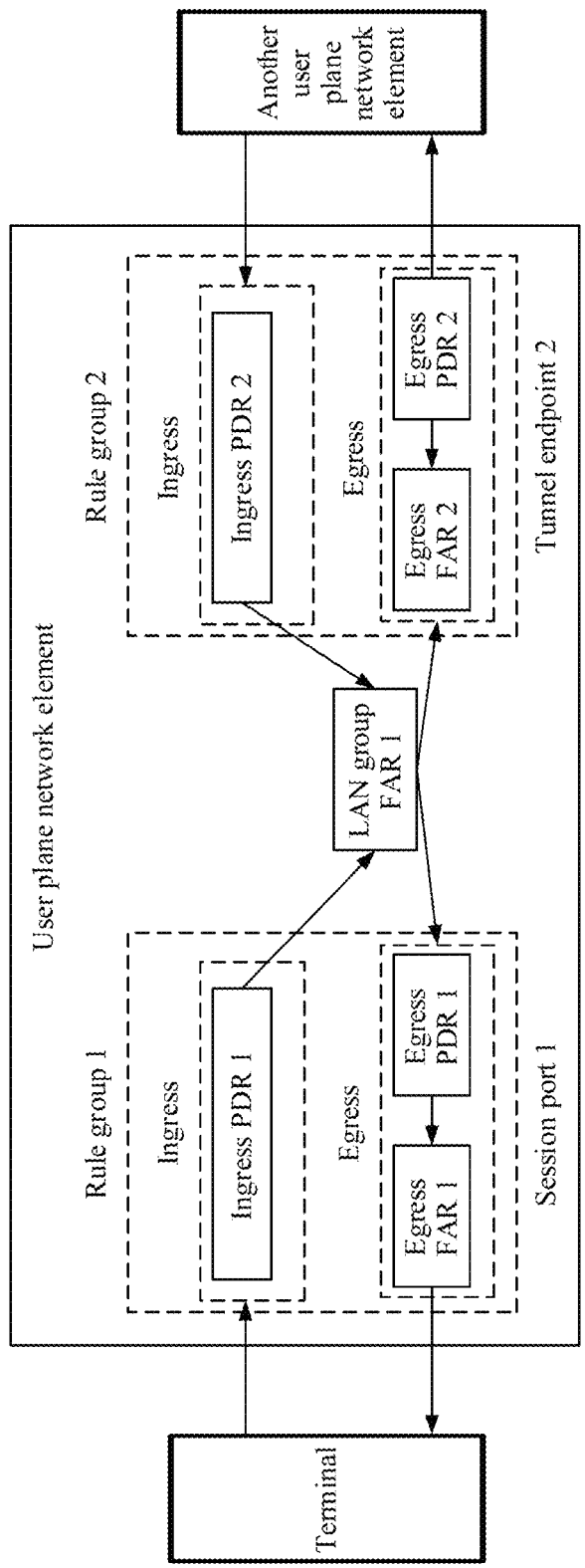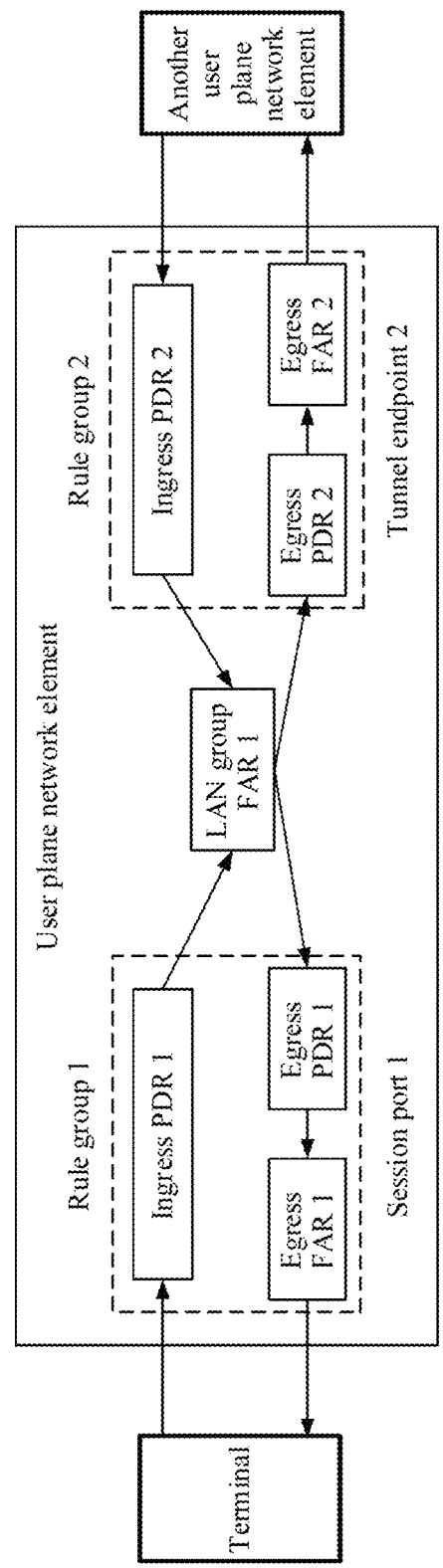
FIG. 7a(1)
FIG. 7a(2)

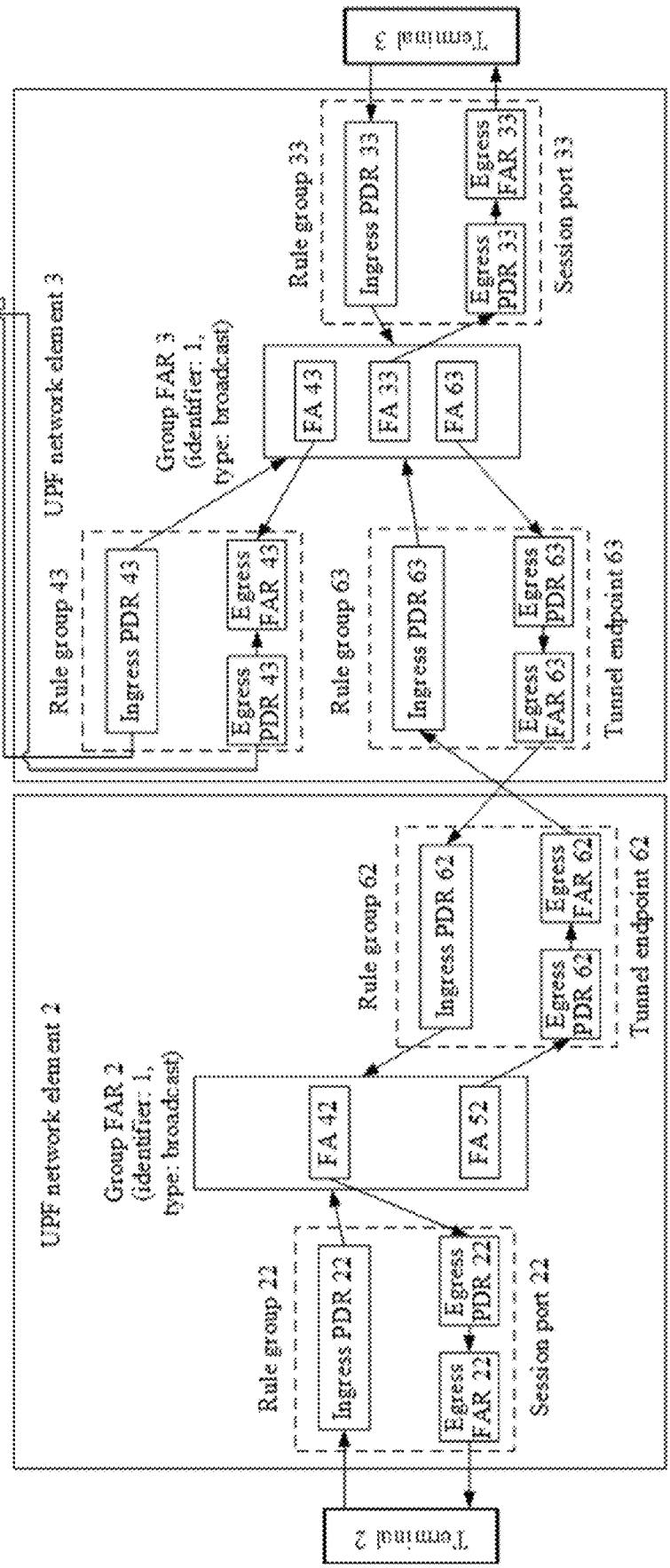

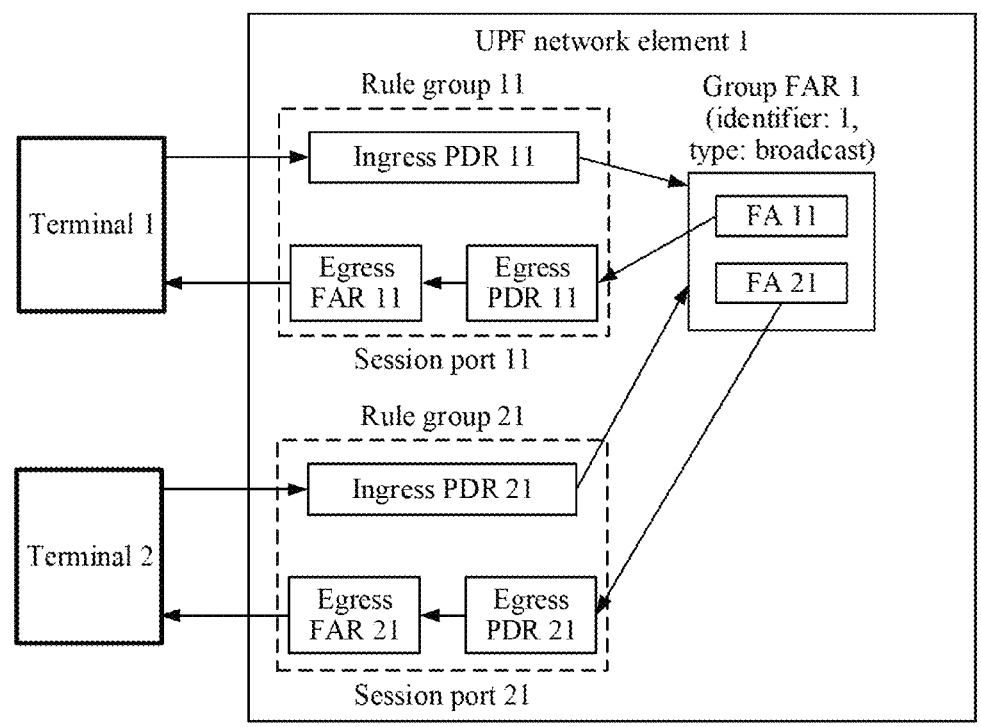
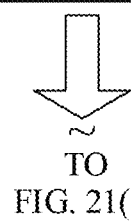
FIG. 21(a)
TO
FIG. 21(b)

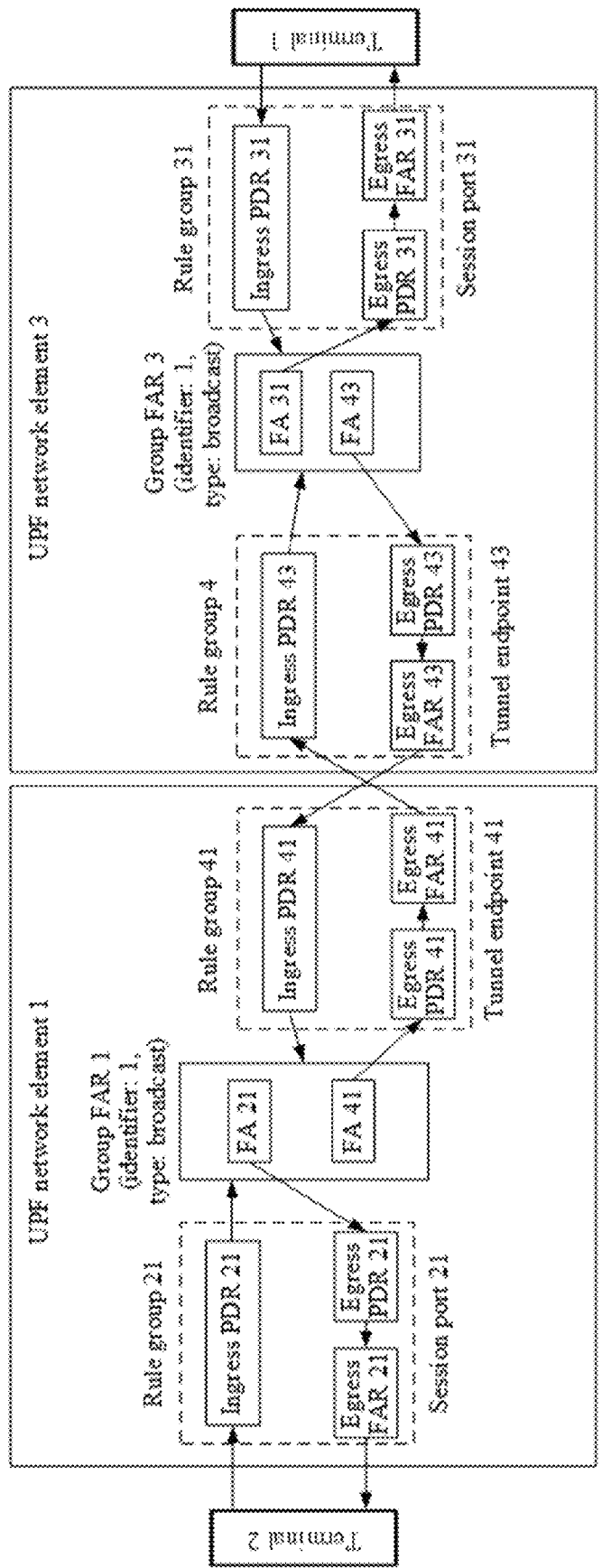

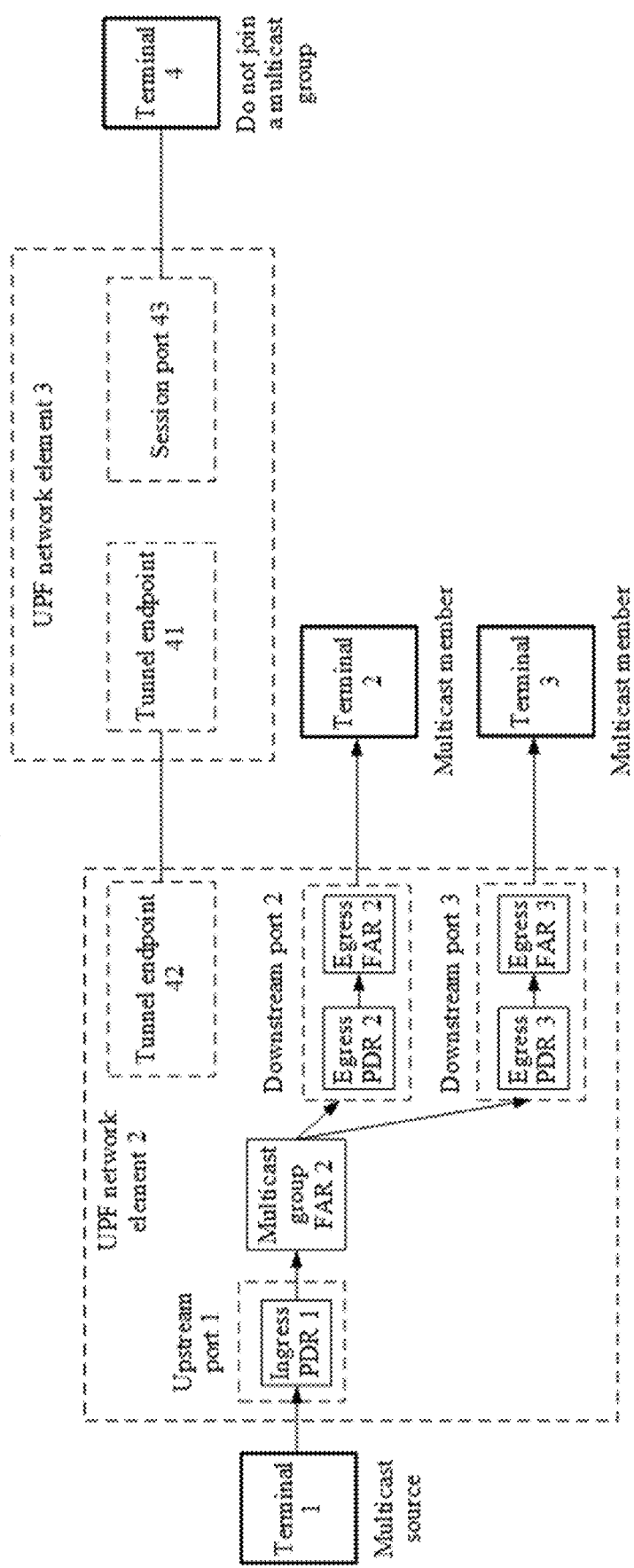

GROUP COMMUNICATIONS METHOD AND SYSTEM, AND DEVICE

CROSS-REFERENCE TO RELATED APPLICATIONS

This application is a continuation of International Patent Application No. PCT/CN2019/119475, filed on Nov. 19, 2019, which claims priority to Chinese Patent Application No. 201811378645.3, filed on Nov. 19, 2018. The disclosures of the aforementioned applications are hereby incorporated by reference in their entireties.

TECHNICAL FIELD

Embodiments of this application relate to the field of communications technologies, and in particular, to a group communications method and system, and a device.

BACKGROUND

A 5th generation (5G) local area network (5GLAN) service is a service provided by a current 5G network, and is mainly used in home communication, enterprise office, factory manufacturing, internet of vehicles, power grid reconstruction, a public security organization, and the like. The 5GLAN service can provide private communication of an internet protocol (IP) type or a non-IP type (for example, an Ethernet type) for two or more terminals in a group. For example, devices in a factory may form a group, and the devices in the group may send an Ethernet data packet to each other. Alternatively, office devices (such as mobile phones, computers, or laptop computers) of employees in a department of an enterprise may form a group to send an IP packet to each other. If two terminals are not in a same group, the two terminals cannot communicate with each other.

For the 5GLAN service, 3rd generation partnership project (3GPP) technical rule (TR) 23.734 proposes that one-to-one communication and one-to-many communication in a 5GLAN needs to be supported. Specifically, to support one-to-one communication and one-to-many communication in the 5GLAN, a 3GPP network is required to support group-based unicast, multicast, and broadcast, support duplication and distribution of multicast and broadcast packets, and support any terminal as a multicast source.

To meet this requirement, 3GPP technical standard (TS) 29.244 defines a manner of packet forwarding on a user plane. An architecture of such packet forwarding is shown in FIG. 1, and a working mechanism is as follows: After receiving a packet from an ingress (for example, an N3 port), a user plane function (UPF) network element determines, based on a 5G user plane protocol identifier (for example, a tunnel endpoint identifier (TEID)) of the packet, a session to which the packet belongs. Then, the UPF network element matches a packet detection rule (PDR) (which may be one or more) in an N4 session context of the session with characteristic information of the packet, to find a PDR that matches the characteristic information. The PDR specifies a forwarding action rule (FAR), a quality of service (QoS) enforcement rule (QoS enforcement rule, QER), and a usage reporting rule (URR) that correspond to the packet. Further, the UPF network element may drop the packet, forward the packet, buffer the packet, notify a control plane of the packet, duplicate the packet, or the like according to the FAR. The UPF network element may perform a QoS operation on the packet according to the QER. The UPF network element may report usage of the packet according to the URR. Finally, the UPF network element sends the packet through an egress (for example, an N6 port). In a process in which the UPF network element forwards the packet according to the FAR, a critical action includes specifying an egress identifier and an egress action. The egress action may include, for example, outer header creation, transport level marking, a forwarding policy, or header enrichment.

However, if the foregoing solution is applied to group communication, because the foregoing solution needs to specify the egress identifier and the egress action at the ingress, and the ingress is bound to a terminal, each time a terminal member is added to or deleted from a 5GLAN group, a PDR, an FAR, and the like that are used to forward a packet to the new terminal member need to be added to or deleted from the ingress of the UPF network element accessed by all existing terminal members in the 5GLAN group. Further, when there are a relatively large number of terminal members in the 5GLAN group, configuration workload caused by a change in a quantity of terminal members is greatly increased.

SUMMARY

Embodiments of this application provide a group communications method and system, and a device, so that when there are a relatively large number of terminal members in a group, configuration workload caused by a change in a quantity of terminal members can be greatly reduced.

To achieve the foregoing objective, the following technical solutions are used in the embodiments of this application.

According to a first aspect, a group communications method is provided. The method includes: When a first terminal initiates access to a local area network group, a group management function network element obtains an identifier of a first user plane network element to be accessed by the first terminal, context information of the local area network group, and a first session port identifier, where the context information includes an identifier list of user plane network elements accessed by a terminal that has currently accessed the local area network group in a terminal member list corresponding to the local area network group, and the first session port identifier is an identifier of a first session port that is on the first user plane network element and that is used by the first terminal for access. The group management function network element creates, for the local area network group, a rule group applied to the first session port, and the group management function network element creates or updates, for the local area network group based on the context information, a local area network group forwarding action rule (FAR) applied to the first user plane network element, where the rule group includes an ingress packet detection rule PDR, an egress PDR, and an egress FAR; the egress PDR includes an identifier of the egress FAR, and the ingress PDR includes an identifier of the local area network group FAR; the ingress PDR is used to identify a broadcast packet belonging to the local area network group, and the local area network group FAR is used to duplicate the broadcast packet and then forward the broadcast packet to a specified egress; and the egress PDR is used to identify a type of the broadcast packet, and the egress FAR is used to perform outer header creation and transport level marking on the broadcast packet and then send the broadcast packet through a corresponding port. The group management function network element sends a first message to a session management network element, where the first message is used to configure the rule group on the first session port on the first user plane network element, and configure or update the local area network group FAR on the first user plane network element. Based on this solution, when a terminal in the local area network group accesses a network, only a local area network group FAR on an associated user plane network element needs to be adjusted (created or updated), and an ingress PDR, an egress PDR, and an egress FAR that are on the associated user plane network element and that correspond to the terminal member need to be adjusted (created or updated), but an ingress PDR, an egress PDR, and an egress FAR that correspond to another terminal member in the local area network group remain unchanged. Therefore, when a relatively large number of terminal members belonging to the local area network group access the network, a problem that configuration workload caused by a change in a quantity of terminal members is greatly increased can be avoided, and the configuration workload caused by the change in the quantity of terminal members can be greatly reduced.

In a possible design, the method further includes: When the identifier list includes an identifier of a second user plane network element, and the identifier of the first user plane network element is not in the identifier list, the group management function network element obtains a first tunnel endpoint identifier and a second tunnel endpoint identifier, where the first tunnel endpoint identifier is an identifier of a first tunnel endpoint of a first tunnel on the first user plane network element, the second tunnel endpoint identifier is an identifier of a second tunnel endpoint of the first tunnel on the second user plane network element, and the first tunnel is a tunnel between the first user plane network element and the second user plane network element. The group management function network element creates, for the local area network group, the rule group applied to the first tunnel endpoint, the group management function network element creates, for the local area network group, the rule group applied to the second tunnel endpoint, and the group management function network element updates the local area network group FAR applied to the second user plane network element, where correspondingly, the first message is further used to configure the rule group on the first tunnel endpoint, configure the rule group on the second tunnel endpoint, and update the local area network group FAR on the second user plane network element. Based on this solution, group communication across user plane network elements can be implemented.

In a possible design, the method further includes: When the first terminal is updated from accessing the first user plane network element to accessing a third user plane network element in the local area network group, the group management function network element obtains a third session port identifier, where the third session port identifier is an identifier of a third session port that is on the third user plane network element and that is used by the first terminal for access. The group management function network element creates, for the local area network group, a rule group applied to the third session port, and the group management function network element creates or updates, based on the context information, the local area network group FAR applied to the third user plane network element. The group management function network element sends a third message to the session management network element, where the third message is used to configure the rule group on the third session port, configure or update the local area network group FAR on the third user plane network element, delete the rule group on the first session port, and delete or update the local area network group FAR applied to the first user plane network element; and an updated local area network group FAR applied to the first user plane network element is obtained by the group management function network element by updating, based on the context information, the local area network group FAR applied to the first user plane network element. Based on this solution, when a terminal member that belongs to the local area network group and that has accessed a network moves in the local area network group, only a local area network group FAR on an associated UPF network element needs to be adjusted (created, updated, or deleted), and an ingress PDR, an egress PDR, and an egress FAR that are on the associated user plane network element and that correspond to the terminal member need to be adjusted (created, updated, or deleted), but an ingress PDR, an egress PDR, and an egress FAR that correspond to another terminal member that belongs to the local area network group and that has accessed the network remain unchanged. Therefore, when a relatively large number of terminal members belonging to the local area network group access the network, a problem that configuration workload caused by a change in a quantity of terminal members is greatly increased can be avoided, and the configuration workload caused by the change in the quantity of terminal members can be greatly reduced.

In a possible design, the method further includes: When the identifier list includes an identifier of a fourth user plane network element, and no terminal other than the first terminal in the terminal member list corresponding to the local area network group accesses the first user plane network element, the group management function network element updates the local area network group FAR applied to the fourth user plane network element, where correspondingly, the third message is further used to delete a second tunnel between the first user plane network element and the fourth user plane network element, delete the rule group on a third tunnel endpoint on the first user plane network element, delete the rule group on a fourth tunnel endpoint on the fourth user plane network element, and update the local area network group FAR applied to the fourth user plane network element; and the third tunnel endpoint is a tunnel endpoint of the second tunnel on the first user plane network element, and the fourth tunnel endpoint is a tunnel endpoint of the second tunnel on the fourth user plane network element. Based on this solution, group communication across user plane network elements can be implemented.

In a possible design, the method further includes: When the identifier list includes the identifier of the fourth user plane network element, and an identifier of the third user plane network element is not in the identifier list, the group management function network element obtains a fifth tunnel endpoint identifier and a sixth tunnel endpoint identifier, where the fifth tunnel endpoint identifier is an identifier of a fifth tunnel endpoint of a third tunnel on the third user plane network element, the sixth tunnel endpoint identifier is an identifier of a sixth tunnel endpoint of the third tunnel on the fourth user plane network element, and the third tunnel is a tunnel between the third user plane network element and the fourth user plane network element. The group management function network element creates, for the local area network group, the rule group applied to the fifth tunnel endpoint, the group management function network element creates, for the local area network group, the rule group applied to the sixth tunnel endpoint, and the group management function network element updates the local area network group FAR applied to the fourth user plane network element, where correspondingly, the third message is further used to configure the rule group on the fifth tunnel endpoint, configure the rule group on the sixth tunnel endpoint, and update the local area network group FAR on the fourth user plane network element. Based on this solution, group communication across user plane network elements can be implemented.

In a possible design, the method further includes: When the first terminal is about to leave the local area network group, the group management function network element sends a fifth message to the session management network element, where the fifth message is used to delete the rule group applied to the first session port, and delete or update the local area network group FAR applied to the first user plane network element; and an updated local area network group FAR applied to the first user plane network element is obtained by the group management function network element by updating, based on the context information, the local area network group FAR applied to the first user plane network element. Based on this solution, when a terminal member in the local area network group is disconnected from a network, only a local area network group FAR on an associated user plane network element needs to be adjusted (updated or deleted), and an ingress PDR, an egress PDR, and an egress FAR that are on the associated user plane network element and that correspond to the terminal member need to be adjusted (updated or deleted), but an ingress PDR, an egress PDR, and an egress FAR that correspond to another member in the local area network group remain unchanged. Therefore, when a relatively large number of terminal members belonging to the local area network group access the network, a problem that configuration workload caused by a change in a quantity of terminal members is greatly increased can be avoided, and the configuration workload caused by the change in the quantity of terminal members can be greatly reduced.

In a possible design, the method further includes: When the identifier list includes an identifier of a fifth user plane network element, and no terminal other than the first terminal in the terminal member list corresponding to the local area network group accesses the first user plane network element, the group management function network element updates the local area network group FAR applied to the fifth user plane network element, where correspondingly, the fifth message is further used to delete a fourth tunnel between the first user plane network element and the fifth user plane network element, delete the rule group on a seventh tunnel endpoint on the first user plane network element, delete the rule group on an eighth tunnel endpoint on the fifth user plane network element, and update the local area network group FAR applied to the fifth user plane network element; and the seventh tunnel endpoint is a tunnel endpoint of the fourth tunnel on the first user plane network element, and the eighth tunnel endpoint is a tunnel endpoint of the fourth tunnel on the fifth user plane network element. Based on this solution, group communication across user plane network elements can be implemented.

According to a second aspect, a group communications method is provided. The method includes: When a first terminal initiates access to a local area network group, a first user plane network element receives a first message from a session management network element, where the first message includes a first session port identifier, a rule group applied to a first session port corresponding to the first session port identifier, and a created or updated local area network group forwarding action rule FAR applied to the first user plane network element; the first session port identifier is an identifier of the first session port that is on the first user plane network element and that is used by the first terminal for access; the rule group includes an ingress packet detection rule PDR, an egress PDR, and an egress FAR; the egress PDR includes an identifier of the egress FAR, and the ingress PDR includes an identifier of the local area network group FAR; the ingress PDR is used to identify a broadcast packet belonging to the local area network group, and the local area network group FAR is used to duplicate the broadcast packet and then forward the broadcast packet to a specified egress; and the egress PDR is used to identify a type of the broadcast packet, and the egress FAR is used to perform outer header creation and transport level marking on the broadcast packet and then send the broadcast packet through a corresponding port. The first user plane network element creates the first session port based on the first session port identifier, and configures the rule group on the first session port. The first user plane network element creates the local area network group FAR on the first user plane network element based on the created local area network group FAR applied to the first user plane network element; or the first user plane network element updates the local area network group FAR on the first user plane network element based on the updated local area network group FAR applied to the first user plane network element. For technical effects of any one of the second aspect or the following possible implementations of the second aspect, refer to the technical effects of the first aspect. Details are not described herein again.

In a possible design, the first message further includes a first tunnel endpoint identifier and the rule group applied to a first tunnel endpoint corresponding to the first tunnel endpoint identifier; the first tunnel endpoint identifier is an identifier of the first tunnel endpoint of a first tunnel on the first user plane network element, and the first tunnel is a tunnel between the first user plane network element and a second user plane network element; and the method further includes: The first user plane network element creates the first tunnel endpoint based on the first tunnel endpoint identifier, and configures the rule group on the first tunnel endpoint.

In a possible design, the method further includes: When the first terminal is no longer served by the first user plane network element, the first user plane network element receives a second message from the session management network element, where the second message includes the first session port identifier, and the second message includes the identifier of the local area network group FAR applied to the first user plane network element or the updated local area network group FAR applied to the first user plane network element. The first user plane network element deletes, based on the first session port identifier, the first session port and the rule group applied to the first session port. The first user plane network element deletes, based on the identifier of the local area network group FAR applied to the first user plane network element, the local area network group FAR applied to the first user plane network element; or the first user plane network element updates the local area network group FAR on the first user plane network element based on the updated local area network group FAR applied to the first user plane network element.

In a possible design, the second message further includes the first tunnel endpoint identifier; the first tunnel endpoint identifier is the identifier of the first tunnel endpoint of the first tunnel on the first user plane network element, and the first tunnel is the tunnel between the first user plane network element and the second user plane network element; and the method further includes: The first user plane network element deletes, based on the first tunnel endpoint identifier, the first tunnel endpoint and the rule group applied to the first tunnel endpoint.

According to a third aspect, a group communications method is provided. The method includes: When a first terminal initiates access to a local area network group, a session management network element receives a first message from a group management function network element, where the first message includes an identifier of a first user plane network element, a first session port identifier corresponding to the identifier of the first user plane network element, a rule group applied to a first session port corresponding to the first session port identifier, and a created or updated local area network group forwarding action rule FAR applied to the first user plane network element; the first session port is a session port that is on the first user plane network element and that is used by the first terminal for access; the rule group includes an ingress packet detection rule PDR, an egress PDR, and an egress FAR; the egress PDR includes an identifier of the egress FAR, and the ingress PDR includes an identifier of the local area network group FAR; the ingress PDR is used to identify a broadcast packet belonging to the local area network group, and the local area network group FAR is used to duplicate the broadcast packet and then forward the broadcast packet to a specified egress; and the egress PDR is used to identify a type of the broadcast packet, and the egress FAR is used to perform outer header creation and transport level marking on the broadcast packet and then send the broadcast packet through a corresponding port. The session management network element sends a second message to the first user plane network element based on the identifier of the first user plane network element, where the second message includes the first session port identifier, the rule group on the first session port, and the created or updated local area network group FAR applied to the first user plane network element. For technical effects of any one of the third aspect or the following possible implementations of the third aspect, refer to the technical effects of the first aspect. Details are not described herein again.

In a possible design, the first message further includes a first tunnel endpoint identifier corresponding to the identifier of the first user plane network element, the rule group applied to a first tunnel endpoint corresponding to the first tunnel endpoint identifier, an identifier of a second user plane network element, a second tunnel endpoint identifier corresponding to the identifier of the second user plane network element, the rule group applied to a second tunnel endpoint corresponding to the second tunnel endpoint identifier, and an updated local area network group FAR applied to the second user plane network element; and the first tunnel endpoint is a tunnel endpoint of a first tunnel on the first user plane network element, the second tunnel endpoint is a tunnel endpoint of the first tunnel on the second user plane network element, and the first tunnel is a tunnel between the first user plane network element and the second user plane network element. Correspondingly, the first message further includes the first tunnel endpoint identifier and the rule group on the first tunnel endpoint; and the method further includes: The session management network element sends a third message to the second user plane network element based on the identifier of the second user plane network element, where the third message includes the second tunnel endpoint identifier, the rule group on the second tunnel endpoint, and the updated local area network group FAR applied to the second user plane network element.

In a possible design, the method further includes: When the first terminal is updated from accessing the first user plane network element to accessing a third user plane network element in the local area network group, by the session management network element receives a fourth message from the group management function network element, where the fourth message includes the identifier of the first user plane network element and the first session port identifier corresponding to the identifier of the first user plane network element, the fourth message includes the identifier of the local area network group FAR applied to the first user plane network element or the updated local area network group FAR applied to the first user plane network element, and the fourth message includes an identifier of the third user plane network element, a third session port identifier corresponding to the identifier of the third user plane network element, the rule group applied to a third session port corresponding to the third session port identifier, and a created or updated local area network group FAR applied to the third user plane network element; and the third session port is a session port that is on the third user plane network element and that is used by the first terminal for access. The session management network element sends a fifth message to the first user plane network element based on the identifier of the first user plane network element, where the fifth message includes the first session port identifier, and the fifth message includes the identifier of the local area network group FAR applied to the first user plane network element or the updated local area network group FAR applied to the first user plane network element. The session management network element sends a sixth message to the third user plane network element based on the identifier of the third user plane network element, where the sixth message includes the third session port identifier, the rule group on the third session port, and the created or updated local area network group FAR applied to the third user plane network element.

In a possible design, the method further comprises: The fourth message further includes a third tunnel endpoint identifier corresponding to the identifier of the first user plane network element, an identifier of a fourth user plane network element, a fourth tunnel endpoint identifier corresponding to the identifier of the fourth user plane network element, and an updated local area network group FAR applied to the fourth user plane network element; and the third tunnel endpoint identifier is a tunnel endpoint identifier of a second tunnel on the first user plane network element, and the fourth tunnel endpoint identifier is a tunnel endpoint identifier of the second tunnel on the fourth user plane network element. Correspondingly, the fifth message further includes the third tunnel endpoint identifier; and the method further includes: The session management network element sends a seventh message to the fourth user plane network element based on the identifier of the fourth user plane network element, where the seventh message includes the fourth tunnel endpoint identifier and the updated local area network group FAR applied to the fourth user plane network element.

In a possible design, the fourth message further includes a fifth tunnel endpoint identifier corresponding to the identifier of the third user plane network element and the rule group applied to a fifth tunnel endpoint corresponding to the fifth tunnel endpoint identifier, and the fourth message further includes the identifier of the fourth user plane network element, a sixth tunnel endpoint identifier corresponding to the identifier of the fourth user plane network element, the rule group applied to a sixth tunnel endpoint corresponding to the sixth tunnel endpoint identifier, and the updated local area network group FAR applied to the fourth user plane network element; and the fifth tunnel endpoint is a tunnel endpoint of a third tunnel on the third user plane network element, the sixth tunnel endpoint is a tunnel endpoint of the third tunnel on the fourth user plane network element, and the third tunnel is a tunnel between the third user plane network element and the fourth user plane network element. Correspondingly, the sixth message further includes the fifth tunnel endpoint identifier and the rule group on the fifth tunnel endpoint; and the method further includes: The session management network element sends an eighth message to the fourth user plane network element based on the identifier of the fourth user plane network element, where the eighth message includes the sixth tunnel endpoint identifier, the rule group on the sixth tunnel endpoint, and the updated local area network group FAR applied to the fourth user plane network element.

In a possible design, the method further includes: When the first terminal is about to leave the local area network group, the session management network element receives a ninth message from the group management function network element, where the ninth message includes the identifier of the first user plane network element and the first session port identifier corresponding to the identifier of the first user plane network element, and the ninth message includes the identifier of the local area network group FAR applied to the first user plane network element or the updated local area network group FAR applied to the first user plane network element. The session management network element sends a tenth message to the first user plane network element based on the identifier of the first user plane network element, where the tenth message includes the first session port identifier, and the fifth message includes the identifier of the local area network group FAR applied to the first user plane network element or the updated local area network group FAR applied to the first user plane network element.

In a possible design, the ninth message further includes a seventh tunnel endpoint identifier corresponding to the identifier of the first user plane network element, an identifier of a fifth user plane network element, an eighth tunnel endpoint identifier corresponding to the identifier of the fifth user plane network element, and an updated local area network group FAR applied to the fifth user plane network element; and the seventh tunnel endpoint identifier is a tunnel endpoint identifier of a fourth tunnel on the first user plane network element, the eighth tunnel endpoint identifier is a tunnel endpoint identifier of the fourth tunnel on the fourth user plane network element, and the fourth tunnel is a tunnel between the first user plane network element and the fifth user plane network element. Correspondingly, the tenth message further includes the seventh tunnel endpoint identifier; and the method further includes: The sending module is further configured to send an eleventh message to the fifth user plane network element based on the identifier of the fifth user plane network element, where the eleventh message includes the eighth tunnel endpoint identifier and the updated local area network group FAR applied to the fifth user plane network element.

According to a fourth aspect, a group communications method is provided. The method includes: When a first terminal joins a multicast group, a group management function network element obtains an identifier of a first user plane network element accessed by the first terminal and a first session port identifier, where the first session port identifier is an identifier of a first session port that is on the first user plane network element and that is used by the first terminal for access. The group management function network element creates, for the multicast group, an egress PDR and an egress FAR that are applied to the first session port, and the group management function network element creates or updates, for the multicast group, a multicast group FAR applied to the first user plane network element, where the multicast group FAR is used to duplicate a multicast packet belonging to the multicast group and then forward the multicast packet to a specified egress; and the egress PDR is used to identify a type of the multicast packet, and the egress FAR is used to perform outer header creation and transport level marking on the multicast packet and then send the multicast packet through a corresponding port. The group management function network element sends a first message to a session management network element, where the first message is used to configure the egress PDR and the egress FAR on the first session port, and configure or update the multicast group FAR on the first user plane network element. Based on this solution, when a multicast member joins the multicast group, only a multicast group FAR on an associated user plane network element needs to be adjusted (updated or created), and an ingress PDR, an egress PDR, and an egress FAR that are on the associated UPF network element and that correspond to the multicast member need to be adjusted (created) or an egress PDR and an egress FAR that are on the associated UPF network element and that correspond to the multicast member need to be adjusted (created), but an ingress PDR, an egress PDR, and an egress FAR that correspond to another multicast member in the multicast group remain unchanged. Therefore, when there are a relatively large number of multicast members in the multicast group, a problem that configuration workload caused by a change in a quantity of multicast members is greatly increased can be avoided, and the configuration workload caused by the change in the quantity of multicast members can be greatly reduced.

According to a fifth aspect, a group communications method is provided. The method includes: A first user plane network element receives a first message from a session management network element, where the first message includes a first session port identifier, an egress PDR and an egress FAR that are applied to a first session port corresponding to the first session port identifier, and a created or updated multicast group forwarding action rule FAR applied to the first user plane network element, where the first session port identifier is an identifier of the first session port that is on the first user plane network element and that is used by the first terminal for access; the multicast group FAR is used to duplicate a multicast packet belonging to the multicast group and then forward the multicast packet to a specified egress; and the egress PDR is used to identify a type of the multicast packet, and the egress FAR is used to perform outer header and transport level marking on the multicast packet and then send the multicast packet through a corresponding port. The first user plane network element configures the egress PDR and the egress FAR on the first session port based on the first session port identifier. The first user plane network element creates the multicast group FAR on the first user plane network element based on the created multicast group FAR applied to the first user plane network element; or the first user plane network element updates the multicast group FAR on the first user plane network element based on the updated multicast group FAR applied to the first user plane network element. For technical effects of the fifth aspect, refer to the technical effects of the fourth aspect. Details are not described herein again.

According to a sixth aspect, a group communications method is provided. The method includes: When a first terminal joins a multicast group, a session management network element receives a first message from a group management function network element, where the first message includes an identifier of a first user plane network element accessed by the first terminal, a first session port identifier corresponding to the identifier of the first user plane network element, an egress PDR and an egress FAR that are applied to a first session port corresponding to the first session port identifier, and a created or updated multicast group forwarding action rule FAR applied to the first user plane network element. The session management network element sends, to the first user plane network element based on the identifier of the first user plane network element, the first session port identifier, the egress PDR and the egress FAR that are on the first session port, and the created or updated multicast group FAR applied to the first user plane network element. For technical effects of the sixth aspect, refer to the technical effects of the fourth aspect. Details are not described herein again.

According to a seventh aspect, a group management function network element is provided. The group management function network element has a function of implementing the method according to the first aspect or the fourth aspect. The function may be implemented by hardware, or may be implemented by hardware executing corresponding software. The hardware or the software includes one or more modules corresponding to the function.

According to an eighth aspect, a group management function network element is provided, and includes a processor and a memory. The memory is configured to store computer execution instructions, and when the group management function network element runs, the processor executes the computer execution instructions stored in the memory, to enable the group management function network element to perform the group communications method according to any one of the possible designs of the first aspect or the fourth aspect.

According to a ninth aspect, a group management function network element is provided, and includes a processor. The processor is configured to: after being coupled to a memory and reading instructions in the memory, perform the group communications method according to any one of the possible designs of the first aspect or the fourth aspect according to the instructions.

According to a tenth aspect, a computer readable storage medium is provided. The computer readable storage medium stores instructions, and when the instructions are run on a computer, the computer is enabled to perform the group communications method according to any one of the possible designs of the first aspect or the fourth aspect.

According to an eleventh aspect, a computer program product including instructions is provided. When the computer program product runs on a computer, the computer is enabled to perform the group communications method according to any one of the possible designs of the first aspect or the fourth aspect.

According to a twelfth aspect, an apparatus (for example, the apparatus may be a chip system) is provided. The apparatus includes a processor, configured to support a group management function network element in implementing the function in the first aspect or the fourth aspect, for example, creating, for the local area network group, the rule group applied to the first session port. In a possible design, the apparatus further includes a memory. The memory is configured to store program instructions and data that are necessary for the group management function network element. When the apparatus is the chip system, the apparatus may include a chip, or may include a chip and another discrete component.

For technical effects brought by any design of the seventh aspect to the twelfth aspect, refer to the technical effects brought by the different designs of the first aspect or the third aspect. Details are not described herein again.

According to a thirteenth aspect, a first user plane network element is provided. The first user plane network element has a function of implementing the method according to the second aspect or the fifth aspect. The function may be implemented by hardware, or may be implemented by hardware executing corresponding software. The hardware or the software includes one or more modules corresponding to the function.

According to a fourteenth aspect, a first user plane network element is provided, and includes a processor and a memory. The memory is configured to store computer execution instructions, and when the first user plane network element runs, the processor executes the computer execution instructions stored in the memory, to enable the first user plane network element to perform the group communications method according to any one of the possible designs of the second aspect or the fifth aspect.

According to a fifteenth aspect, a first user plane network element is provided, and includes a processor. The processor is configured to: after being coupled to a memory and reading instructions in the memory, perform the group communications method according to any one of the possible designs of the second aspect or the fifth aspect according to the instructions.

According to a sixteenth aspect, a computer readable storage medium is provided. The computer readable storage medium stores instructions, and when the instructions are run on a computer, the computer is enabled to perform the group communications method according to any one of the possible designs of the second aspect or the fifth aspect.

According to a seventeenth aspect, a computer program product including instructions is provided. When the computer program product runs on a computer, the computer is enabled to perform the group communications method according to any one of the possible designs of the second aspect or the fifth aspect.

According to an eighteenth aspect, an apparatus (for example, the apparatus may be a chip system) is provided. The apparatus includes a processor, configured to support a first user plane network element in implementing the function in the second aspect or the fifth aspect, for example, creating the first session port based on the first session port identifier, and configuring the rule group on the first session port. In a possible design, the apparatus further includes a memory. The memory is configured to store program instructions and data that are necessary for the first user plane network element. When the apparatus is the chip system, the apparatus may include a chip, or may include a chip and another discrete component.

For technical effects brought by any design of the thirteenth aspect to the eighteenth aspect, refer to the technical effects brought by the different designs of the second aspect or the third aspect. Details are not described herein again.

According to a nineteenth aspect, a session management network element is provided. The session management network element has a function of implementing the method according to the third aspect or the sixth aspect. The function may be implemented by hardware, or may be implemented by hardware executing corresponding software. The hardware or the software includes one or more modules corresponding to the function.

According to a twentieth aspect, a session management network element is provided, and includes a processor and a memory. The memory is configured to store computer execution instructions, and when the session management network element runs, the processor executes the computer execution instructions stored in the memory, to enable the session management network element to perform the group communications method according to any one of the possible designs of the third aspect or the sixth aspect.

According to a twenty-first aspect, a session management network element is provided, and includes a processor. The processor is configured to: after being coupled to a memory and reading instructions in the memory, perform the group communications method according to any one of the possible designs of the third aspect or the sixth aspect according to the instructions.

According to a twenty-second aspect, a computer readable storage medium is provided. The computer readable storage medium stores instructions, and when the instructions are run on a computer, the computer is enabled to perform the group communications method according to any one of the possible designs of the third aspect or the sixth aspect.

According to a twenty-third aspect, a computer program product including instructions is provided. When the computer program product runs on a computer, the computer is enabled to perform the group communications method according to any one of the possible designs of the third aspect or the sixth aspect.

According to a twenty-fourth aspect, an apparatus (for example, the apparatus may be a chip system) is provided. The apparatus includes a processor, configured to support a session management network element in implementing the function in the third aspect or the sixth aspect, for example, determining the first user plane network element based on the identifier of the first user plane network element. In a possible design, the apparatus further includes a memory. The memory is configured to store program instructions and data that are necessary for the session management network element. When the apparatus is the chip system, the apparatus may include a chip, or may include a chip and another discrete component.

For technical effects brought by any design of the nineteenth aspect to the twenty-fourth aspect, refer to the technical effects brought by the different designs of the third aspect or the third aspect. Details are not described herein again.

According to a twenty-fifth aspect, a group communications system is provided. The group communications system includes a group management function network element, a session management function network element, and a first user plane network element. The group management function network element is configured to perform the steps performed by the group management function network element in the first aspect or the fourth aspect or in the solutions provided in the embodiments of this application. The first user plane network element is configured to perform the steps performed by the first user plane network element in the second aspect or the fifth aspect or in the solutions provided in the embodiments of this application. The session management network element is configured to perform the steps performed by the session management network element in the third aspect or the sixth aspect or in the solutions provided in the embodiments of this application.

These aspects or other aspects of this application are clearer and comprehensible in descriptions in the following embodiments.

BRIEF DESCRIPTION OF DRAWINGS

FIG. 7a(1) and FIG. 7a(2) are a schematic diagram of a rule group according to an embodiment of this application;

FIG. 19(a)-1, FIG. 19(a)-2, and FIG. 19(b) are a schematic configuration diagram 6 of a UPF network element in a broadcast scenario according to an embodiment of this application;

FIG. 21(a) and FIG. 21(b) are a schematic configuration diagram 8 of a UPF network element in a broadcast scenario according to an embodiment of this application;

FIG. 36(a) and FIG. 36(b) are a schematic configuration diagram 7 of a UPF network element in a multicast scenario according to an embodiment of this application;

DESCRIPTION OF EMBODIMENTS

For ease of understanding of technical solutions in the embodiments of this application, the following first briefly describes technologies related to this application.

1. Broadcast

Broadcast is a one-to-all communication mode. On a network, a LAN (for example, which may be a 5GLAN) corresponds to a broadcast domain. Terminals subscribed to the LAN may form a LAN group, and the terminals subscribed to the LAN may be referred to as terminal members in the LAN group. In other words, a terminal joins a LAN group (may join one or more LAN groups) in a subscription process. For a related implementation, refer to an existing solution. Details are not described herein. After terminal members in the LAN group are connected to a network (that is, a user plane connection is established, a typical network access manner is that a terminal initiates a packet data unit (PDU) session establishment request, and descriptions are provided in the following embodiments by using an example in which the network access manner is that the terminal initiates the PDU session establishment request), it may be considered that the terminal members have accessed the network, and the terminal members that have accessed the network may communicate with each other. For specific implementation, refer to the following embodiments of this application. Details are not described herein.

Figure 1:
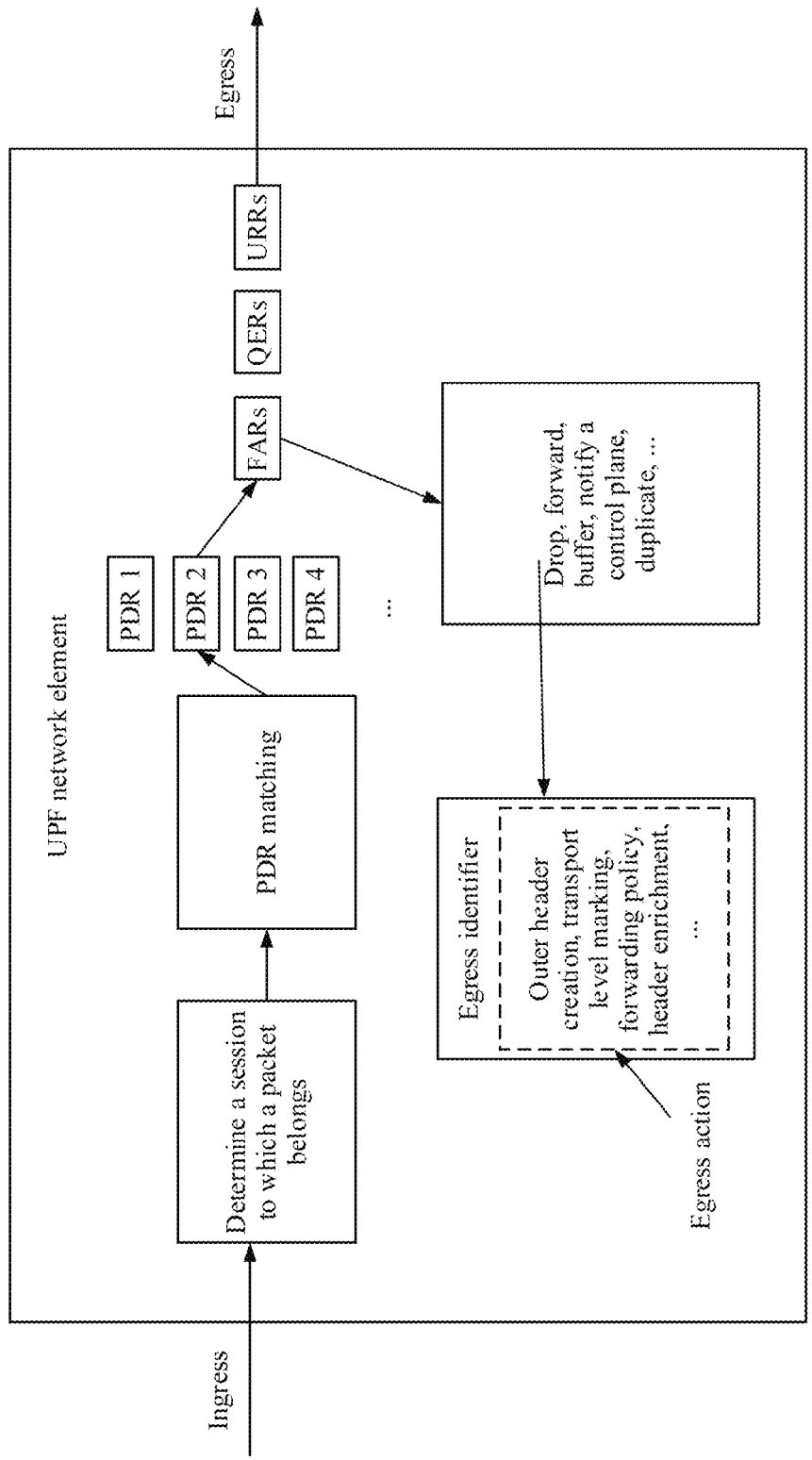
FIG. 1 is a schematic flowchart of packet forwarding on a user plane defined in 3GPP TS29.244 in the conventional technology.
Figure 2A:
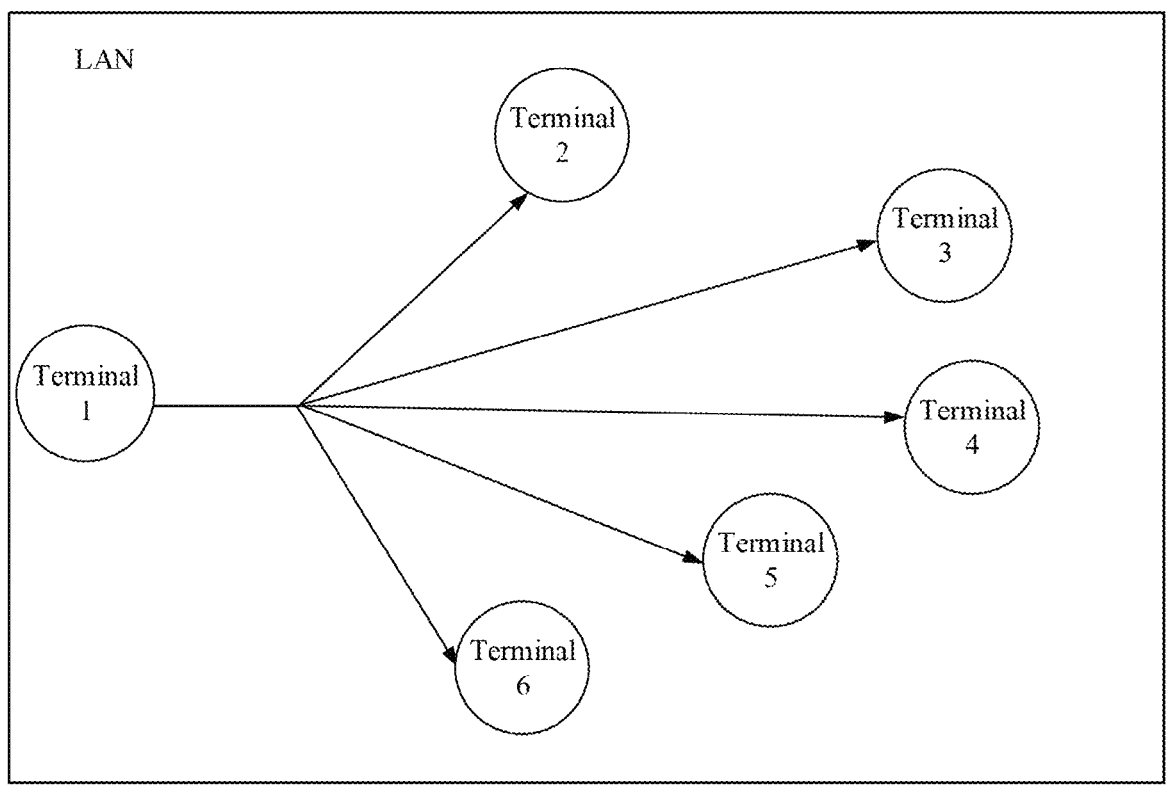
FIG. 2a is a schematic communication diagram in a broadcast scenario according to an embodiment of this application.

Any terminal that belongs to the LAN group and that has accessed the network may be used as a broadcast source to send a broadcast packet, and may also be used as a broadcast member to receive a broadcast packet. For example, it is assumed that the terminal members that belong to the LAN group and that have accessed the network include a terminal 1, a terminal 2, a terminal 3, a terminal 4, a terminal 5, and a terminal 6. For example, the terminal 1 is used as a broadcast source. In this case, a corresponding schematic communication diagram may be shown in FIG. 2a. To be specific, a broadcast packet sent by the terminal 1 may be separately transmitted to the terminal 2, the terminal 3, the terminal 4, the terminal 5, and the terminal 6 in the LAN group.

A broadcast address in the embodiments of this application may be that a destination IP address is all 1s, for example, 255.255.255.255. Alternatively, a broadcast address in the embodiments of this application may be that a destination media access control (MAC) address is all 1s, for example, 255.255.255.255. For details, refer to a definition of an existing broadcast address. The details are not described herein.

2. Multicast

In the embodiments of this application, one multicast source and a plurality of multicast members may form one multicast group (which may also be briefly referred to as a multicast group). A source that sends an IP packet with a multicast group address as a destination address is referred to as the multicast source, and a multicast user that receives multicast data is referred to as the multicast member. In other words, multicast has a direction from the multicast source to the multicast member. An angle between the multicast source and the multicast member is unchangeable.

Figure 2B:
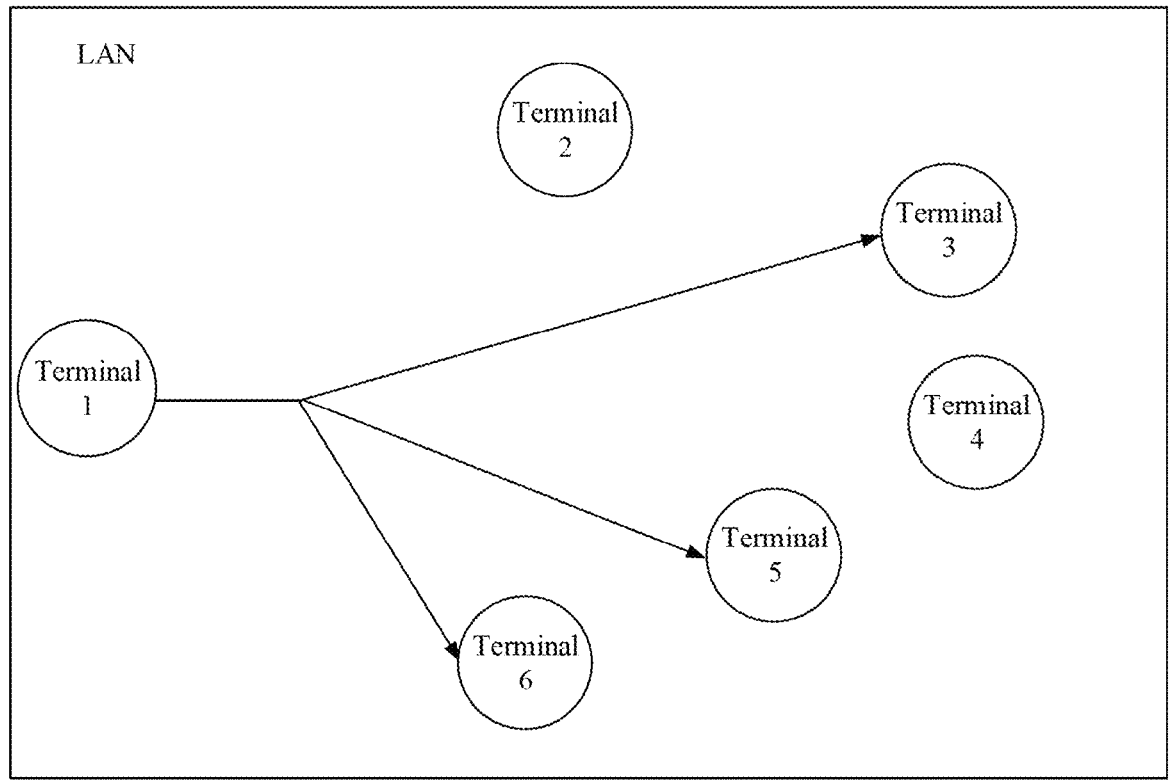
FIG. 2b is a schematic communication diagram in a multicast scenario according to an embodiment of this application.

Otherwise, the multicast source and the multicast member belong to different multicast groups. For example, it is assumed that the terminal members in the LAN group include a terminal 1, a terminal 2, a terminal 3, a terminal 4, a terminal 5, and a terminal 6. For example, the terminal 1 is used as a multicast source, and the terminal 3, the terminal 5, and the terminal 6 are used as multicast members to form a multicast group. In this case, a corresponding schematic communication diagram may be shown in FIG. 2b. To be specific, a multicast packet sent by the terminal 1 may be separately transmitted to the terminal 2, the terminal 5, and the terminal 6 in the multicast group.

In the embodiments of this application, the multicast source is determined at an application layer of an open system interconnection (OSI) model. If a terminal needs to receive multicast data, the terminal may explicitly send an internet group management protocol (IGMP) join message to a network, and the network forwards, to the terminal only after recording that the terminal joins a multicast group, the multicast data sent by the multicast source. In other words, the multicast member dynamically joins the multicast group. For a specific join process, refer to the following method embodiments. Details are not described herein.

A multicast address in the embodiments of this application may be a multicast IP version 4 (IPv4) address assigned by the internet assigned numbers authority (the internet assigned numbers authority, IANA), and is in a range of 224.0.0.0 to 239.255.255.255. Alternatively, a multicast address in the embodiments of this application may be a multicast MAC address in which a last bit in the most significant 48 bits in 48 bits is always 1. Alternatively, a multicast address in the embodiments of this application may be another address. For details, refer to a definition of an existing multicast address. The details are not described herein.

3. Group

The group in the embodiments of this application may include the LAN group and the multicast group. Unified descriptions are provided herein, and details are not described below.

4. Session Port and Tunnel Endpoint on a User Plane Network Element

In the embodiments of this application, the session port on the user plane network element is a logical port, and may be specifically a core network tunnel endpoint established by the user plane network element based on a session port identifier allocated by a session management network element or the user plane network element when a terminal establishes a PDU session, or may be understood as an anchor for a PDU session of a terminal on a core network side. A function of the session port is to anchor the terminal on the user plane network element (namely, connect a terminal), to receive, through the session port, a packet sent by the terminal, and send a packet to the terminal through the session port. For example, the session port identifier herein may be a TEID.

Figure 3A:
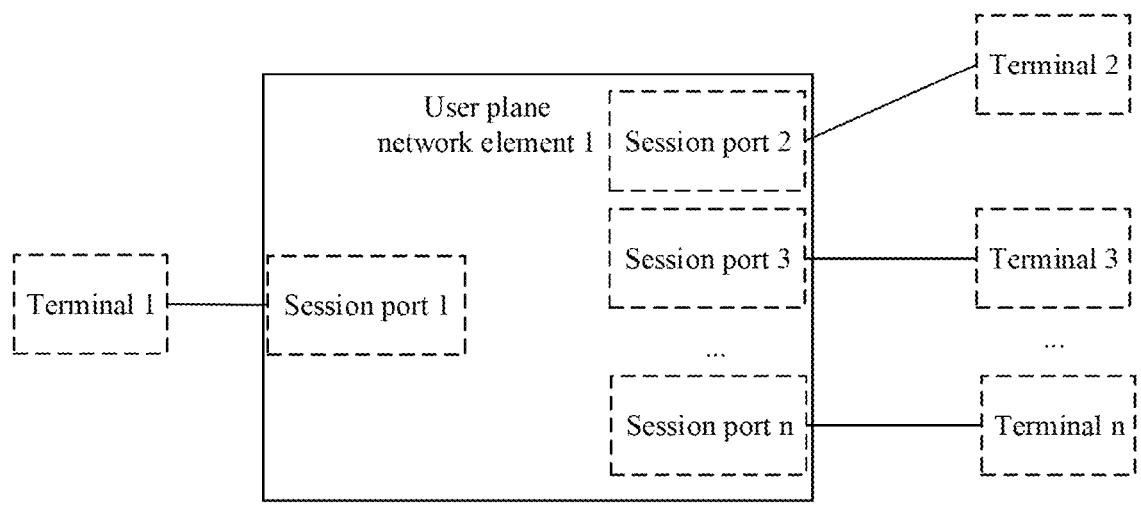
FIG. 3a is a schematic diagram 1 of distribution of session ports or tunnel endpoints according to an embodiment of this application.

For example, as shown in FIG. 3a, when a terminal 1 establishes a PDU session, assuming that a user plane network element accessed by the terminal 1 is a user plane network element 1, the user plane network element 1 may establish a session port 1 based on a session port identifier 1 allocated by the session management network element or the user plane network element 1. Alternatively, when a terminal 2 establishes a PDU session, assuming that a user plane network element accessed by the terminal 2 is a user plane network element 1, the user plane network element 1 may establish a session port 2 based on a session port identifier 2 allocated by the session management network element or the user plane network element 1. Alternatively, when a terminal 3 establishes a PDU session, assuming that a user plane network element accessed by the terminal 3 is a user plane network element 1, the user plane network element 1 may establish a session port 3 based on a session port identifier 3 allocated by the session management network element or the user plane network element 1. Alternatively, when a terminal n establishes a PDU session, assuming that a user plane network element accessed by the terminal n is a user plane network element 1, the user plane network element 1 may establish a session port n based on a session port identifier n allocated by the session management network element or the user plane network element 1, and the like.

In the embodiments of this application, the tunnel endpoint on the user plane network element is a logical port, and may be a tunnel endpoint at a LAN group granularity. Specifically, when a terminal in a LAN group establishes a PDU session, after a first tunnel is established between a user plane network element accessed by the terminal and a user plane network element accessed by another terminal in the LAN group, the user plane network element accessed by the terminal and the user plane network element accessed by the another terminal in the group create the tunnel endpoint respectively based on a first tunnel endpoint identifier and a second tunnel endpoint identifier that are allocated by the session management network element. The first tunnel endpoint identifier is an identifier of a tunnel endpoint of the first tunnel on the side of the user plane network element accessed by the terminal, and the second tunnel endpoint identifier is an identifier of a tunnel endpoint of the first tunnel on the side of the user plane network element accessed by the another terminal in the group. A function of the tunnel endpoint is to receive a packet that belongs to the LAN group and that is from the connected user plane network element through the tunnel endpoint, and send a packet belonging to the LAN group to the connected user plane network element through the tunnel endpoint. For example, the first tunnel endpoint identifier herein may be a TEID 1, and the second tunnel endpoint identifier herein may be a TEID 2.

Figure 3B:
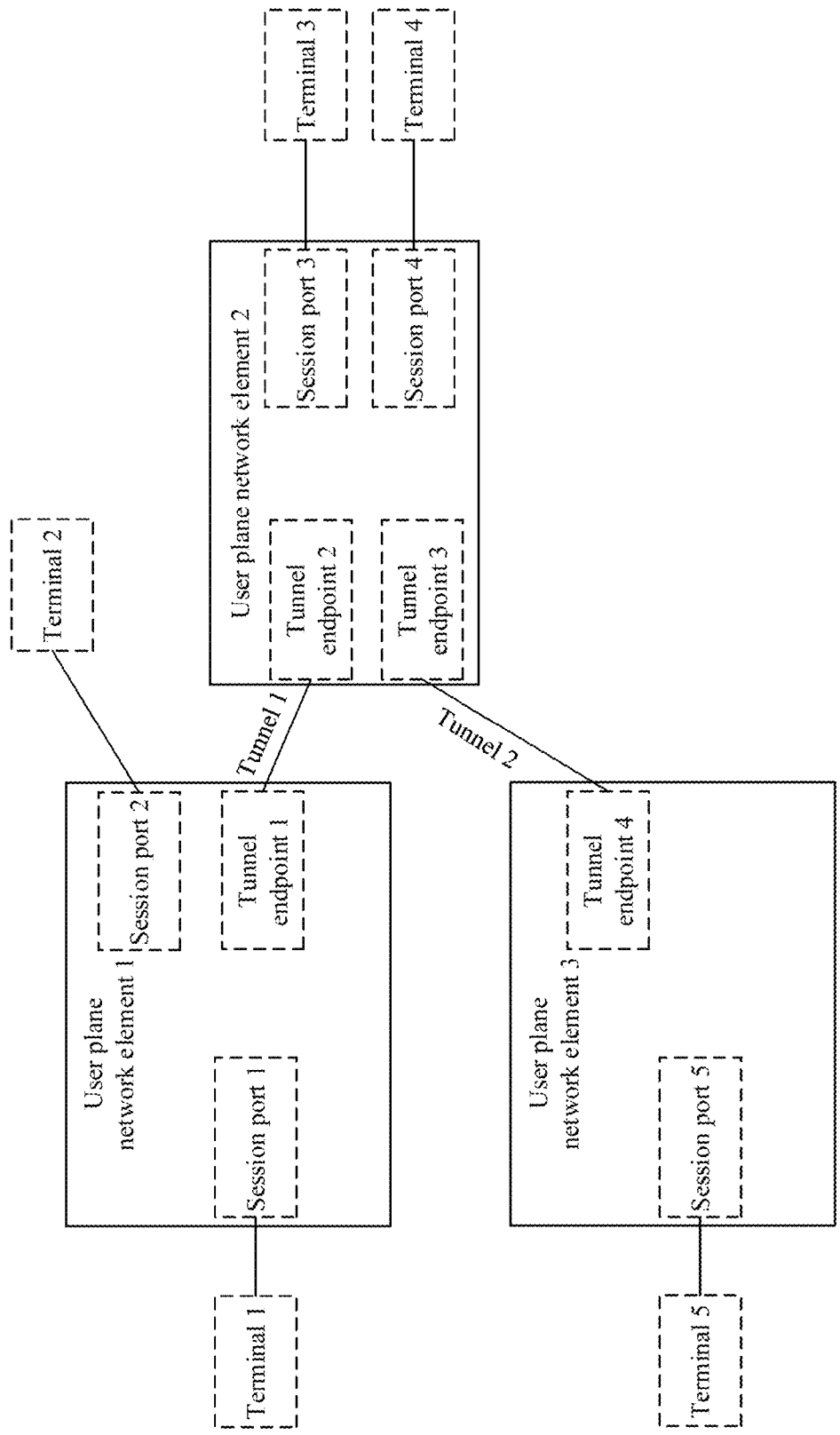
FIG. 3b is a schematic diagram 2 of distribution of session ports or tunnel endpoints according to an embodiment of this application.

For example, as shown in FIG. 3b, it is assumed that terminals in a LAN group access a network in a sequence of a terminal 3, a terminal 4, a terminal 1, a terminal 2, and a terminal 5. In this case, when the terminal 3 establishes a PDU session, assuming that a user plane network element accessed by the terminal 3 is a user plane network element 2, the user plane network element 2 may establish a session port 3 based on a session port identifier 3 allocated by the session management network element or the user plane network element 2. When the terminal 4 establishes a PDU session, assuming that a user plane network element accessed by the terminal 4 is the user plane network element 2, the user plane network element 2 may establish a session port 4 based on a session port identifier 4 allocated by the session management network element or the user plane network element 2. When the terminal 1 establishes a PDU session, assuming that a user plane network element accessed by the terminal 1 is a user plane network element 1, the user plane network element 1 may establish a session port 1 based on a session port identifier 1 allocated by the session management network element or the user plane network element 1. In addition, because the terminal 3 and the terminal 4 in the LAN group have accessed the user plane network element 2, the session management network element needs to initiate establishment of a tunnel 1 between the user plane network element 1 and the user plane network element 2. Further, the user plane network element 1 may establish a tunnel endpoint 1 based on a tunnel endpoint identifier 1 that corresponds to the tunnel 1 on the side of the user plane network element 1 and that is allocated by the session management network element, and the user plane network element 2 may establish a tunnel endpoint 2 based on a tunnel endpoint identifier 2 that corresponds to the tunnel 1 on the side of the user plane network element 2 and that is allocated by the session management network element. When the terminal 2 establishes a PDU session, assuming that a user plane network element accessed by the terminal 2 is the user plane network element 1, although the terminal 3 and the terminal 4 in the LAN group have accessed the user plane network element 2, because the terminal 1 has established the tunnel endpoint 1 on the user plane network element 1 and established the tunnel endpoint 2 on the user plane network element 2 when establishing the PDU session, the terminal 1 may receive or send a broadcast packet belonging to the LAN group or a multicast packet belonging to a multicast group in the LAN group through the tunnel endpoint 1 and the tunnel endpoint 2. In this case, the user plane network element 1 only needs to establish a session port 2 based on a session port identifier 2 allocated by the session management network element or the user plane network element 1. When the terminal 5 establishes a PDU session, assuming that a user plane network element accessed by the terminal 5 is a user plane network element 3, the user plane network element 3 may establish a session port 5 based on a session port identifier 5 allocated by the session management network element or the user plane network element 3. In addition, because the terminal 3 and the terminal 4 in the LAN group have accessed the user plane network element 2, and the terminal 1 and the terminal 2 in the LAN group have accessed the user plane network element 1, the session management network element needs to initiate establishment of a tunnel 2 between the user plane network element 3 and the user plane network element 2. Further, the user plane network element 3 may establish a tunnel endpoint 4 based on a tunnel endpoint identifier 4 that corresponds to the tunnel 2 on the side of the user plane network element 3 and that is allocated by the session management network element, and the user plane network element 2 may establish a tunnel endpoint 3 based on a tunnel endpoint identifier 3 that corresponds to the tunnel 2 on the side of the user plane network element 2 and that is allocated by the session management network element.

It should be noted that descriptions are provided herein by using an example in which the tunnel 2 is established between the user plane network element 2 and the user plane network element 3 when the terminal 5 establishes the PDU session. Certainly, when establishing the PDU session, the terminal 5 may alternatively establish a tunnel 3 between the user plane network element 1 and the user plane network element 3. To prevent a broadcast storm, the tunnel 2 and the tunnel 3 do not need to be established at the same time. For example, after the tunnel 2 is established, a packet sent by the terminal 1 may be forwarded to the user plane network element 3 by using the user plane network element 2, so that the packet can be sent to the terminal 5. Unified descriptions are provided herein, and details are not described below.

5. Member Port on a User Plane Network Element

In the embodiments of this application, the member port on the user plane network element is a port set of a group on the user plane network element, and includes at least one of the session port or the tunnel endpoint. The member ports have a same function and role. For a LAN group, all ports that can be used to receive or send a broadcast packet belonging to the LAN group and that are on a user plane network element are member ports. For a multicast group, all ports that are used to send a multicast packet belonging to the multicast group and that are on a user plane network element are member ports. A terminal or a user plane network element connected to the member port may be referred to as a member.

For example, assuming that all terminals in a group access a same user plane network element, a member port of the group on the user plane network element includes only a session port of the group, but does not include a tunnel endpoint of the group. For example, as shown in FIG. 3a, it is assumed that a group includes a total of n terminals: a terminal 1, a terminal 2, a terminal 3, . . . , and a terminal n; and the n terminals are all connected to a user plane network element 1. In this case, in a broadcast scenario, because any terminal may be used as a broadcast source, and may also be used as a broadcast member, member ports on the user plane network element 1 include a total of n member ports: a session port 1, a session port 2, a session port 3, . . . , and a session port n, and members for the user plane network element 1 include a total of n members: the terminal 1, the terminal 2, the terminal 3, . . . , and the terminal n. Alternatively, in a multicast scenario, because multicast has a direction from a multicast source to a multicast member, assuming that the terminal 1 is the multicast source, member ports on the user plane network element 1 include a total of (n−1) member ports: a session port 2, a session port 3, . . . , and a session port n, and members for the user plane network element 1 include a total of (n−1) members: the terminal 2, the terminal 3, . . . , and the terminal n.

Alternatively, as shown in FIG. 3b, it is assumed that a LAN group includes a total of five terminals: a terminal 1, a terminal 2, a terminal 3, a terminal 4, and a terminal 5; and the terminal 1 and the terminal 2 access a user plane network element 1, the terminal 3 and the terminal 4 access a user plane network element 2, and the terminal 5 accesses a user plane network element 3. In this case, in a broadcast scenario, because any terminal may be used as a broadcast source, and may also be used as a broadcast member, member ports on the user plane network element 1 include a total of three member ports: a session port 1, a session port 2, and a tunnel endpoint 1, and members for the user plane network element 1 include a total of three members: the terminal 1, the terminal 2, and the user plane network element 2; member ports on the user plane network element 2 include a total of four member ports: a tunnel endpoint 2, a tunnel endpoint 3, a session port 3, and a session port 4, and members for the user plane network element 2 include a total of four members: the user plane network element 1, the user plane network element 3, the terminal 3, and the terminal 4; and member ports on the user plane network element 3 include a total of two member ports: a tunnel endpoint 4 and a session port 5, and members for the user plane network element 3 include a total of two members: the user plane network element 2 and the terminal 5.

Alternatively, as shown in FIG. 3b, it is assumed that a multicast group includes a terminal 1, a terminal 2, and a terminal 5, the terminal 1 is used as a multicast source, and the terminal 2 and the terminal 5 are used as multicast members. In this case, in a multicast scenario, because multicast has a direction from the multicast source to the multicast member, member ports on the user plane network element 1 include a total of two member ports: a session port 2 and a tunnel endpoint 1, and members for the user plane network element 1 include a total of two members: the terminal 2 and the user plane network element 2; member ports on the user plane network element 2 include a total of three member ports: a tunnel endpoint 3, a session port 3, and a session port 4, and members for the user plane network element 2 include a total of three members: the user plane network element 3, the terminal 3, and the terminal 4; and a member port on the user plane network element 3 includes a total of one member port: a session port 5, and a member for the user plane network element 3 includes a total of one member: the terminal 5.

In conclusion, in the embodiments of this application, on a user plane network element, a quantity of member ports of a LAN group is equal to a sum of all session ports and all tunnel endpoints that are on the user plane network element and that correspond to the LAN group, and a quantity of member ports of a multicast group is equal to a quantity of all ports that are on the user plane network element, that correspond to the multicast group, and that are used to send a multicast packet belonging to the multicast group.

6. Ingress and Egress

In the embodiments of this application, the ingress is a port used to receive a packet on the user plane network element, and the egress is a port used to send a packet on the user plane network element. The ingress and the egress are in two directions of a same logical port. The logical port herein may be the session port or the tunnel endpoint. In addition, it can be learned from the definition of the member port that in a multicast scenario, the egress herein is also a member port. Unified descriptions are provided herein, and details are not described below.

For example, in a broadcast scenario, the user plane network element 1 in FIG. 3b is used as an example. In this case, the ingress may be the session port 1, and the egress may be the session port 2 and the tunnel endpoint 1. Alternatively, the ingress may be the session port 2, and the egress may be the session port 1 and the tunnel endpoint 1. Alternatively, the ingress may be the tunnel endpoint 1, and the egress may be the session port 1 and the session port 2. In other words, in the broadcast scenario, a port may be used as both the ingress and the egress.

Alternatively, in a multicast scenario, it is assumed that the terminal 1 is a multicast source, and the terminal 2 and the terminal 5 are used as multicast members. The user plane network element 1 in FIG. 3b is used as an example. In this case, the ingress may be the session port 1, and the egress may be the session port 2 and the tunnel endpoint 1. Alternatively, the user plane network element 2 in FIG. 3b is used as an example. In this case, the ingress may be the tunnel endpoint 2, and the egress may be the tunnel endpoint 3. Alternatively, the user plane network element 3 in FIG. 3b is used as an example. In this case, the ingress may be the tunnel endpoint 4, and the egress may be the session port 5.

Figure 4:
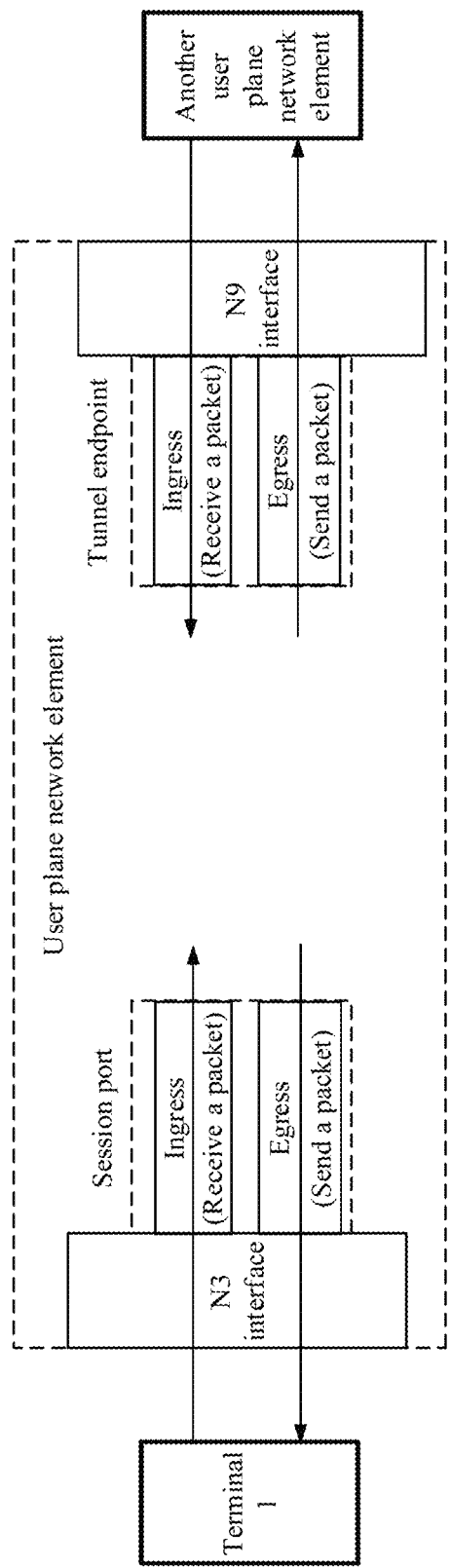
FIG. 4 is a schematic diagram of an ingress and an egress according to an embodiment of this application.

It should be noted that an ingress and an egress are separately shown merely for ease of description in FIG. 4. Certainly, the ingress and the egress may correspond to a same physical interface, or may correspond to different physical interfaces. This is not specifically limited in the embodiments of this application. A similar case is provided in the following embodiments. Unified descriptions are provided herein, and details are not described below.

7. Upstream Port and Downstream Port

The upstream port and the downstream port in the embodiments of this application are introduced to facilitate description in a group communication scenario. In a multicast scenario, the upstream port may correspond to the foregoing ingress, and is directly or indirectly connected to a multicast source; and the downstream port may correspond to the foregoing egress, and is directly or indirectly connected to a multicast member. Unified descriptions are provided herein, and details are not described below.

The following describes the technical solutions in the embodiments of this application with reference to the accompanying drawings in the embodiments of this application. In the descriptions in this application, "/" represents an "or" relationship between associated objects unless otherwise specified. For example, A/B may represent A or B. The term "and/or" in this application indicates only an association relationship for describing the associated objects and indicates that three relationships may exist. For example, A and/or B may indicate the following three cases: Only A exists, both A and B exist, and only B exists, where A and B may be singular or plural. In addition, unless otherwise specified, "a plurality of" in the descriptions in this application means two or more. "At least one of the following" or a similar expression thereof refers to any combination of these items, including any combination of singular items or plural items. For example, at least one of a, b, or c may indicate: a, b, c, a and b, a and c, b and c, or a, b, and c, where a, b, and c may be singular or plural. In addition, for convenience of clear descriptions of the technical solutions in the embodiments of this application, in the embodiments of this application, terms such as "first" and "second" are used to distinguish between same items or similar items whose functions and purposes are basically the same. A person skilled in the art may understand that the terms such as "first" and "second" do not limit a quantity or an execution sequence, and the terms such as "first" and "second" do not indicate a definite difference.

In addition, a network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that with evolution of the network architecture and emergence of a new service scenario, the technical solutions provided in the embodiments of this application are also applicable to similar technical problems.

A main idea of a group communications method and system, and a device that are provided in the embodiments of this application is first provided.

Figure 5:
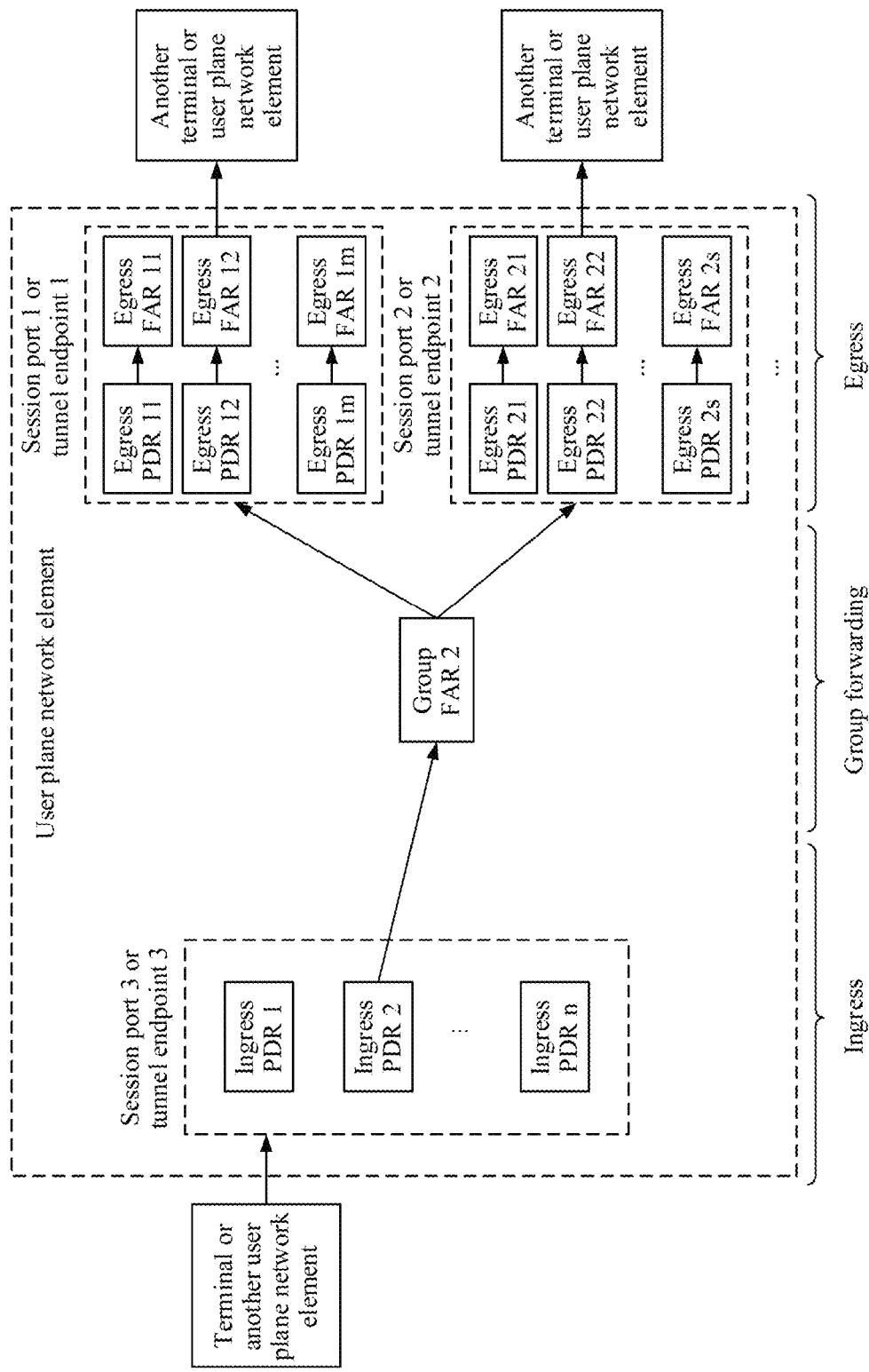
FIG. 5 is a schematic diagram 1 of a conceptual architecture of a group communications method according to an embodiment of this application.

FIG. 5 is a schematic framework diagram of a main idea of a group communications method and system, and a device according to an embodiment of this application. In this embodiment of this application, an ingress function on a user plane network element is simplified, and a group forwarding function and an egress function are added to the user plane network element.

The ingress function on the user plane network element includes: identifying, by using an ingress PDR applied to a session port or a tunnel endpoint, a broadcast packet or a multicast packet that belongs to a group. For example, in FIG. 5, ingress PDRs applied to a session port 3 or a tunnel endpoint 3 include an ingress PDR 1, an ingress PDR 2, . . . , and an ingress PDR n. A broadcast packet belonging to a group 1 may be identified by using an ingress PDR 1, a broadcast packet belonging to a group 2 may be identified by using an ingress PDR 2, a multicast packet belonging to the group 2 may be identified by using an ingress PDR n, and the like. A function of identifying, by using the ingress PDR, a broadcast packet or a multicast packet that belongs to a group is described in detail in subsequent embodiments. Details are not described herein.

The group forwarding function on the user plane network element is implemented by using a group FAR. The ingress PDR includes an identifier of a group FAR of a corresponding group. In other words, the ingress PDR points to the group FAR of the corresponding group. As shown in FIG. 5, the ingress PDR 2 points to a group FAR 2. The group FAR in this embodiment of this application includes the following fields:

(1) Field of an identifier of the group FAR, where the identifier of the group FAR may be, for example, a group identifier, and the group identifier may be, for example, a virtual local area network (virtual LAN, VLAN) identifier or a multicast group identifier.

(2) Field of a group type, where the group type may be, for example, broadcast or multicast.

Figure 6:
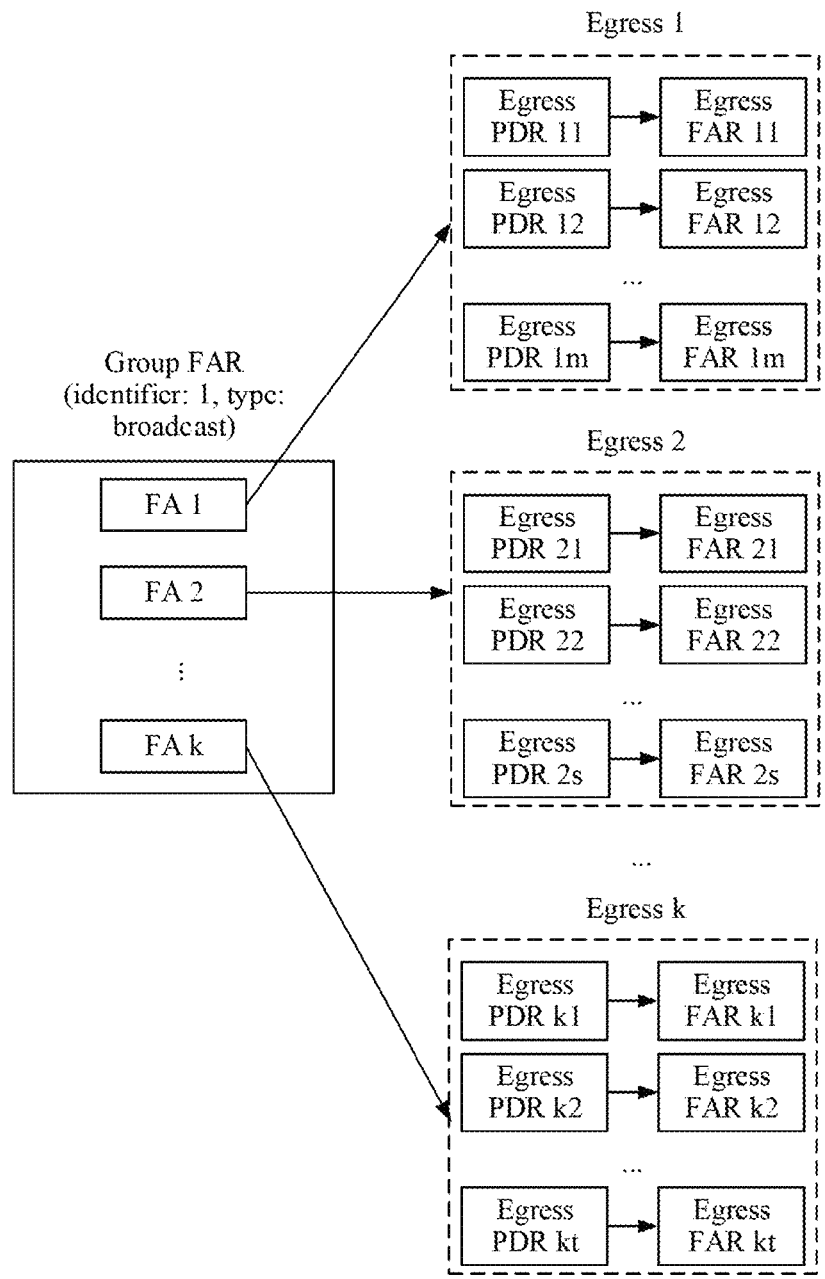
FIG. 6 is a schematic diagram of a group FAR according to an embodiment of this application.

(3) Field of a forwarding action bucket (forwarding action buckets), where the forwarding action bucket herein may be understood as a set of forwarding actions (forwarding action rule, FA). For example, as shown in FIG. 6, an identifier of the group FAR is 1, and the group FAR whose type is broadcast may include an FA 1, an FA 2, . . . , and an FA m, where m is a positive integer. A quantity of FAs in a group FAR of a group is the same as a quantity of egresses of the group on a user plane network element on which the group FAR is located. As shown in FIG. 6, m FAs in the group FAR correspond to m egresses, which are respectively an egress 1, an egress 2, . . . , and an egress m. A main function of each FA is to specify a corresponding egress, namely, an egress through which a packet is sent.

It should be noted that the plurality of FAs in the group FAR in FIG. 6 that are obtained after the FAR rule is decomposed are merely an example for ease of understanding. In an implementation process, the group FAR rule may not need to be decomposed to separately correspond to the FAs in FIG. 6. Unified descriptions are provided herein, and details are not described below.

In the embodiments of this application, processing logic of the group FAR is: duplicating a packet into a plurality of packets with a quantity the same as the quantity of egresses of the group on the user plane network element on which the group FAR is located, and then forwarding the packets to egresses, namely, all member ports, specified according to the group FAR. Certainly, if the group FAR includes the plurality of FAs, the processing logic of the group FAR is: duplicating the packet into a plurality of packets with a quantity the same as the quantity of FAs, where each FA is used to process one duplicate of the packet. A processing result includes forwarding the packet to an egress specified based on the FA. In a process of forwarding the packet by using the group FAR, if it is found that the egress specified according to the group FAR is an ingress for the packet (in other words, a port used to receive the packet and a port used to send the packet are a same port, for example, have a same port identifier), the packet is discarded by default, to avoid a broadcast storm. In conclusion, the group FAR may be used to implement group-related broadcast and multicast communication.

The egress function on the user plane network element is implemented by using an egress PDR and an egress FAR that are applied to a session port or a tunnel endpoint. The egress PDR includes an identifier of the egress FAR. In other words, the egress PDR points to the egress FAR. As shown in FIG. 5 or FIG. 6, an egress PDR 11 points to an egress FAR 11, an egress PDR 12 points to an egress FAR 12, and the like. Details are not described one by one herein. The egress PDR is used to identify a type of a packet, for example, identify a priority of the packet based on a differentiated services code point (DSCP) field in an IP packet or an 802.1p bit in an Ethernet frame. A specific implementation is described in detail in the following method embodiments. Details are not described herein. The type of the packet may be, for example, classified based on a service priority corresponding to the packet. For example, there are a total of eight service priorities: a first service priority, a second service priority, . . . , and an eighth service priority. In this case, an egress PDR 1 may be used to identify a packet with the first service priority, an egress PDR 2 may be used to identify a packet with the second service priority, and an egress PDR 3 may be used to identify a packet with the third service priority. The egress FAR is used to perform outer header creation and transport level marking on the packet and then forward the packet through a port on which the egress PDR is located. For example, when the port on which the egress PDR is located is a session port, a general packet radio service (GPRS) tunneling protocol (GPRS tunneling protocol, GTP) header may be added to the packet; and after a tunnel endpoint identifier (TEID) and a quality of service (QoS) flow identifier (QoS flow identity, QFI) are set in the GTP header, the packet is sent to a terminal in the group through the session port on which the egress PDR is located. Alternatively, when the port on which the egress PDR is located is a tunnel endpoint, a tunnel header may be added to the packet; and after a tunnel endpoint identifier and a QoS identifier are set in the tunnel header, the packet is sent to another user plane network element through the tunnel endpoint on which the egress PDR is located, or the like. This is not specifically limited in this embodiment of this application.

It should be noted that in the embodiment shown in FIG. 5, an example in which the packet matches an egress PDR 12 at a session port 1 or a tunnel endpoint 1, and matches an egress PDR 22 at a session port 2 or a tunnel endpoint 2 is used for illustration. Therefore, the packet is sent to another terminal or user plane network element separately by using an egress FAR 12 indicated by the egress PDR 12 and an egress FAR 22 indicated by the egress PDR 22.

It should be noted that in the embodiment shown in FIG. 5, descriptions are provided merely by using an example in which a packet is sent by a terminal or a user plane network element. Certainly, in a broadcast scenario, like the terminal or the user plane network element connected to the ingress PDR in FIG. 5, the terminal or the user plane network element connected to the egress FAR in FIG. 5 may also include the ingress function, the group forwarding function, and the egress function on a user plane network element that is connected to the terminal or the user plane network element connected to the egress FAR. For details, refer to the foregoing descriptions. The details are not described one by one herein again.

Based on the foregoing main idea, when a terminal member in a group changes (for example, a terminal member in a LAN group accesses a network, a multicast member joins a multicast group, a terminal member in a LAN group is disconnected from a network, a multicast member leaves a multicast group, a terminal member that belongs to a LAN group and that has accessed a network moves, or a multicast member in a multicast group moves), only a group FAR of the group on an associated user plane network element needs to be adjusted (created, updated, or deleted), and an egress PDR and an egress FAR that are associated with the terminal member and that are on the associated user plane network element or an ingress PDR, an egress PDR, and an egress FAR that are associated with the terminal member need to be adjusted (created, updated, or deleted), and an ingress PDR, an egress PDR, and an egress FAR that are associated with another terminal member in the group remain unchanged. For a specific implementation solution, refer to the following method embodiments. Details are not described herein. In this way, when there are a relatively large number of terminal members in the group, a problem that configuration workload caused by a change in a quantity of terminal members is greatly increased can be avoided, and the configuration workload caused by the change in the quantity of terminal members can be greatly reduced.

Then, brief descriptions of a rule group in the following embodiments of this application are provided.

The rule group in the embodiments of this application is applicable to a scenario in which group communication is broadcast (that is, a group is a LAN group).

As described above, because any terminal that belongs to the LAN group and that has accessed a network may be used as a broadcast source and may also be used as a broadcast member, a rule group that includes an ingress PDR, an egress PDR, and an egress FAR is configured on each member port of the LAN group on the user plane network element. As shown in FIG. 7a(1), a rule group 1 that includes an ingress PDR 1, an egress PDR 1, and an egress FAR 1 is configured on a session port 1, and a rule group 2 that includes an ingress PDR 2, an egress PDR 2, and an egress FAR 2 is configured on a tunnel endpoint 2. As described in FIG. 5, the ingress PDR belongs to an ingress, and the egress PDR and the egress FAR belong to an egress. Therefore, each member port of the LAN group on the user plane network element can be used to receive or send a packet. For related descriptions of the ingress PDR, the egress PDR, and the egress FAR, refer to the foregoing embodiment. Details are not described herein again. A specific manner of configuring LAN group information (including the rule group and the LAN group FAR) on a user plane network element and a manner of forwarding a broadcast packet belonging to a LAN group are described in detail in the following method embodiments. Details are not described herein.

It should be noted that in the embodiments of this application, if there are a plurality of member ports of the group on a user plane network element, an ingress PDR included in each member port points to a group FAR of the group on the user plane network element. In FIG. 7a(1), the ingress PDR 1 on the session port 1 and the ingress PDR 2 on the tunnel endpoint 2 point to a same LAN group FAR 1. The ingress PDR 1 is used to identify a broadcast packet that is from a terminal and that belongs to the LAN group, and the ingress PDR 2 is used to identify a broadcast packet that is from a user plane network element and that belongs to the LAN group. Unified descriptions are provided herein, and details are not described below.

It should be noted that FIG. 7a(1) provides only an example of a rule group applied to a session port on the user plane network element and a rule group applied to a tunnel endpoint on the user plane network element. Certainly, because different terminals may access one user plane network element, and each terminal may correspond to one or more sessions, there may be a plurality of session ports or a plurality of tunnel endpoints one user plane network element. In addition, because one terminal may access different groups, each session port may be configured with a plurality of rule groups 1, and a plurality of rule groups 2 may be configured on each tunnel endpoint. For example, a plurality of ingress PDRs are configured on the session port 3 or the tunnel endpoint 3 in FIG. 5, and the plurality of ingress PDRs respectively belong to the plurality of rule groups 1. Unified descriptions are provided herein, and details are not described below.

It should be noted that for example, as shown in FIG. 7a(2), to simplify the accompanying drawings, an egress and an ingress are not shown through dashed lines in a rule group in the accompanying drawings. It may be understood that an arrow pointing to an ingress PDR 1 actually represents an ingress location at which the ingress PDR 1 is located, an arrow pointing to an ingress PDR 2 actually represents an ingress location at which the ingress PDR 2 is located, an arrow pointing to an egress PDR 1 actually represents an egress location at which the egress PDR 1 is located, and an arrow pointing to an egress PDR 2 actually represents an egress location at which the egress PDR 2 is located. The ingress herein may be configured with a plurality of ingress PDRs, and a corresponding ingress PDR can be determined only after matching is performed (that is, the ingress PDR identifies a broadcast packet or a multicast packet that belongs to a group). Similarly, the egress may be configured with a plurality of egress PDRs, and a corresponding ingress PDR can be determined only after matching is performed (that is, the egress PDR is used to identify the type of the packet). Unified descriptions are provided herein, and details are not described below.

Then, brief descriptions of a multicast forwarding tree are provided in the following embodiments of this application.

The multicast forwarding tree in the embodiments of this application is applicable to a scenario in which group communication is multicast (that is, a group is a multicast group).

Figure 7B:
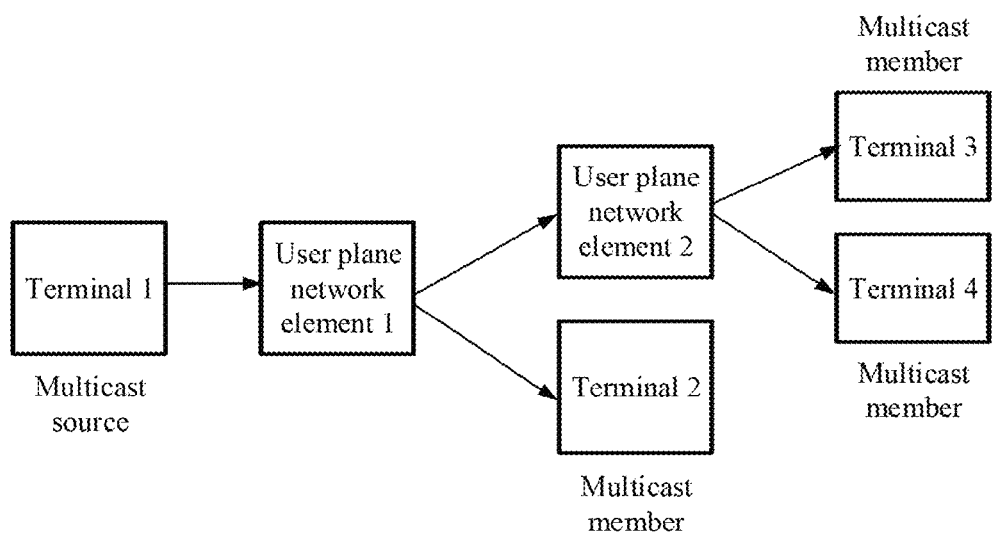
FIG. 7b is a schematic structural diagram of a multicast forwarding tree according to an embodiment of this application.

FIG. 7b is a schematic structural diagram of a multicast forwarding tree according to an embodiment of this application. The multicast forwarding tree includes a multicast source, (one or more) multicast members, and (one or more) user plane network elements between the multicast source and the multicast member. For example, in FIG. 7b, the multicast source may be, for example, a terminal 1. The multicast members may be, for example, a terminal 2, a terminal 3, and a terminal 4. The user plane network element between the terminal 1 and the terminal 2 may be, for example, a user plane network element 1, the user plane network elements between the terminal 1 and the terminal 3 are, for example, the user plane network element 1 and a user plane network element 2 in sequence from an upstream direction to a downstream direction, and the user plane network elements between the terminal 1 and the terminal 4 are, for example, the user plane network element 1 and the user plane network element 2 in sequence from the upstream direction to the downstream direction. The upstream direction herein is a direction at which the multicast source is located, and the downstream direction is a direction at which the multicast member is located. For example, the user plane network element 1 may be considered as an upstream user plane network element of the user plane network element 2. The user plane network element 2 may be considered as a downstream user plane network element of the user plane network element 1. Unified descriptions are provided herein, and details are not described below.

In addition, with reference to the definitions of the upstream direction and the downstream direction, in FIG. 7b, the terminal 1 may be used as an upstream member of the user plane network element 1, the user plane network element 1 is used as an upstream member of the user plane network element 2 and the terminal 2, and the user plane network element 2 may be used as an upstream member of the terminal 3 and the terminal 4. On the contrary, the terminal 3 and the terminal 4 may be used as downstream members of the user plane network element 2, the user plane network element 2 and the terminal 2 may be used as downstream members of the user plane network element 1, and the user plane network element 1 may be used as a downstream member of the terminal 1. Unified descriptions are provided herein, and details are not described below.

Figure 7C:
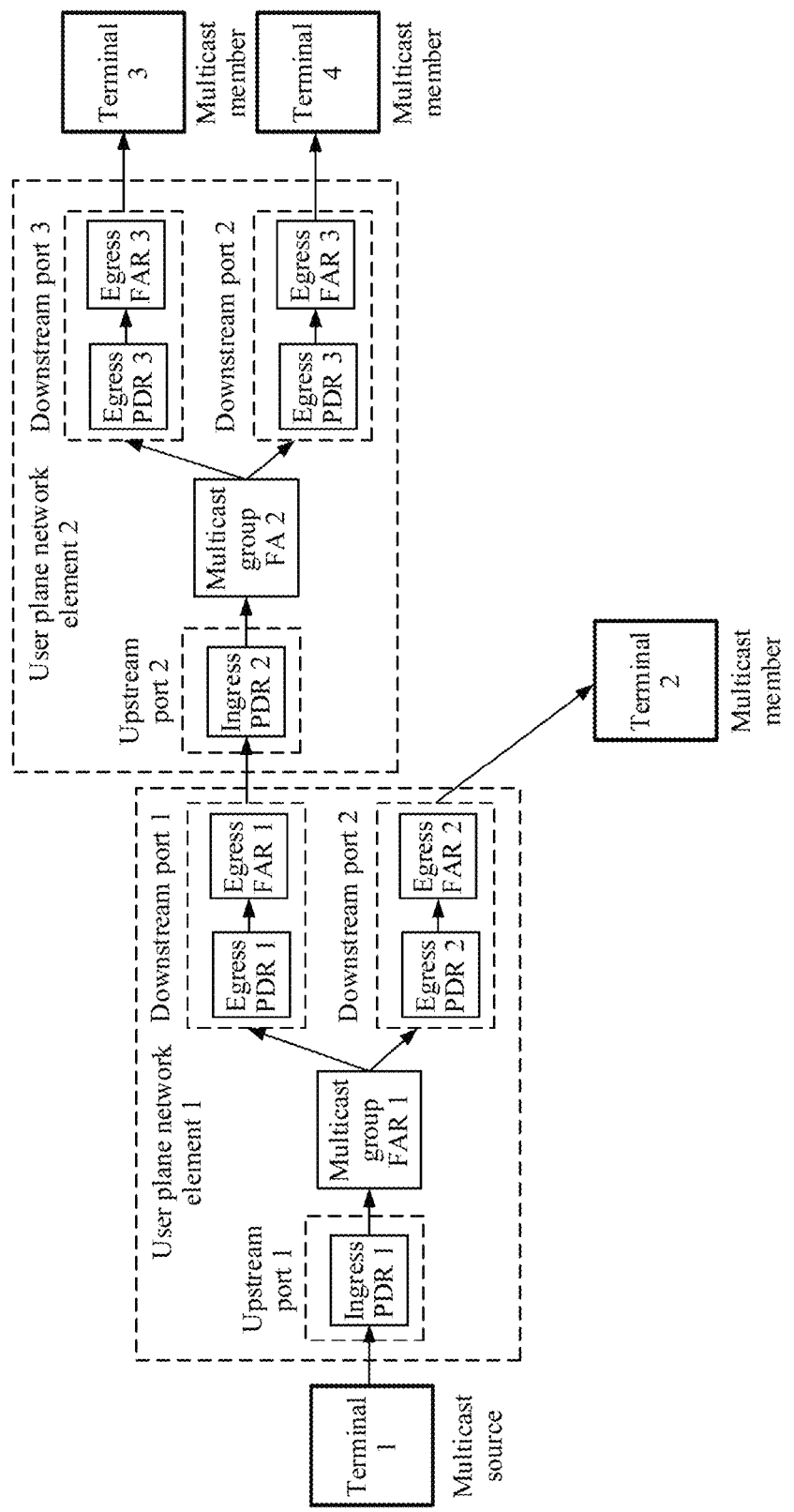
FIG. 7c is a schematic configuration diagram 1 of a UPF network element in a multicast scenario according to an embodiment of this application.

As described above, multicast has a direction from the multicast source to the multicast member. Therefore, as shown in FIG. 7c, for the user plane network element 1 and the user plane network element 2 in FIG. 7b, a multicast group FAR needs to be configured on each user plane network element, an ingress PDR needs to be configured on an upstream port on each user plane network element, and an egress PDR and an egress FAR need to be configured on a downstream port on each user plane network element. To be specific, a multicast group FAR 1 and a multicast group FAR 2 are respectively configured on the user plane network element 1 and the user plane network element 2; an ingress PDR 1 is configured on an upstream port 1 on the user plane network element 1, an egress PDR 1 and an egress FAR 1 are configured on a downstream port 1 on the user plane network element 1, and an egress PDR 2 and an egress FAR 2 are configured on a downstream port 2 on the user plane network element 1; and an ingress PDR 2 is configured on an upstream port 2 on the user plane network element 2, an egress PDR 3 and an egress FAR 3 are configured on a downstream port 3 on the user plane network element 2, and an egress PDR 4 and an egress FAR 4 are configured on a downstream port 4 on the user plane network element 2. For related descriptions of the ingress PDR, the egress PDR, and the egress FAR, refer to the foregoing embodiments. Details are not described herein again. A specific manner of configuring multicast group information on a user plane network element and a manner of forwarding a multicast packet belonging to a multicast group are described in detail in the following method embodiments. Details are not described herein.

Figure 8:
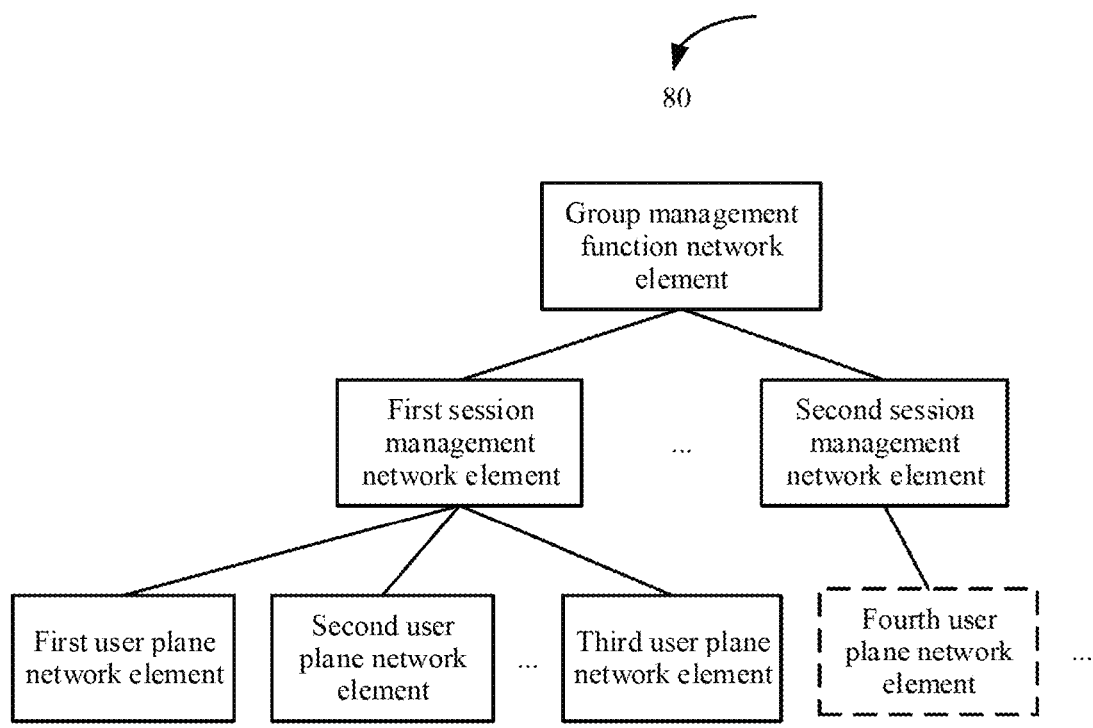
FIG. 8 is a schematic architectural diagram of a group communications system according to an embodiment of this application.

FIG. 8 shows a group communications system 80 according to an embodiment of this application. The group communications system 80 includes a group management function network element, one or more session management network elements (for example, a first session management network element and a second session management network element in FIG. 8) connected to the group management function network element, and one or more user plane network elements connected to each session management network element (for example, a first user plane network element, a second user plane network element, and a third user plane network element that are connected to the first session management network element, and a fourth user plane network element connected to the second session management network element in FIG. 8).

The group management function network element is configured to: when a terminal member in a group changes (for example, a terminal member in a LAN group accesses a network, a multicast member joins a multicast group, a terminal member in a LAN group is disconnected from a network, a multicast member leaves a multicast group, a terminal member that belongs to a LAN group and that has accessed a network moves, or a multicast member in a multicast group moves), adjust (create, update, or delete), by using an associated session management network element, a group FAR of the group on an associated user plane network element, and adjust (create, update, or delete), by using the associated session management network element, an egress PDR and an egress FAR that are associated with the terminal member and that are on the associated user plane network element, or an ingress PDR, an egress PDR, and an egress FAR that are associated with the terminal member and that are on the associated user plane network element. Further, during group communication, the group management function network element may implement multicast or broadcast communication by using the ingress PDR, the egress PDR, the egress FAR, and the group FAR on the user plane network element. For a specific implementation solution, refer to the following method embodiments. Details are not described herein.

Based on the foregoing group communications system, when there are a relatively large number of terminal members in the group, a problem that configuration workload caused by a change in a quantity of terminal members is greatly increased can be avoided, and the configuration workload caused by the change in the quantity of terminal members can be greatly reduced.

Optionally, the group communications system shown in FIG. 8 may be applied to a current 5G network or another future network. This is not specifically limited in this embodiment of this application.

Figure 9:
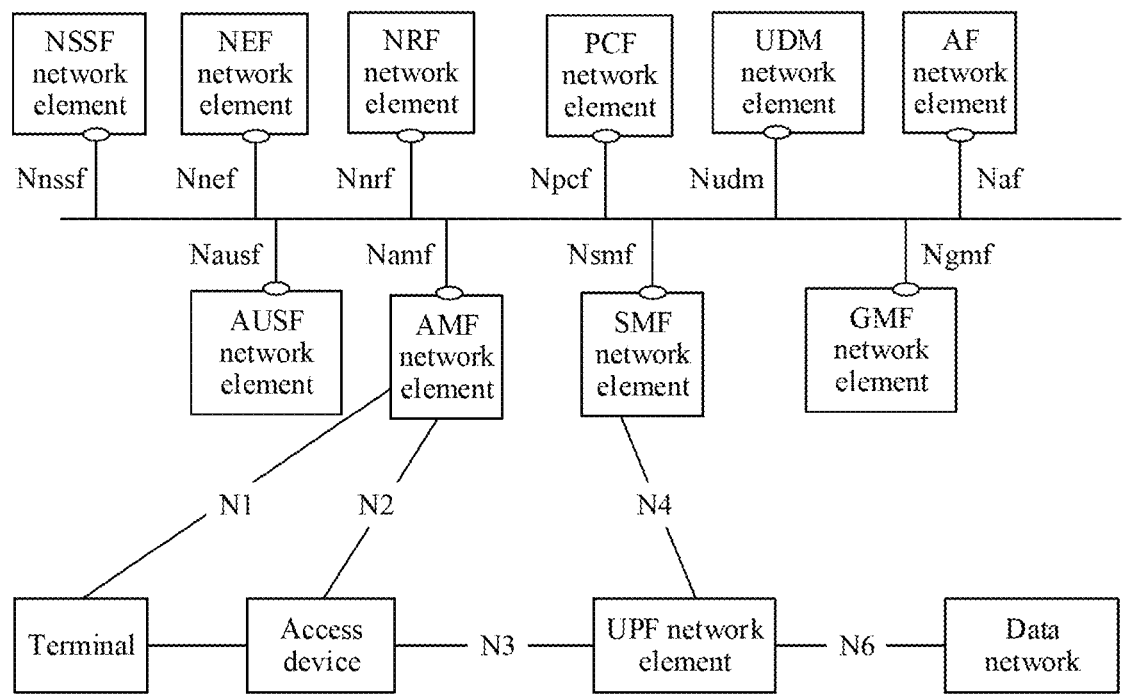
FIG. 9 is a schematic diagram of a 5G network architecture according to an embodiment of this application.

For example, as shown in FIG. 9, if the group communications system shown in FIG. 8 is applied to the current 5G network, a network element or an entity corresponding to the group management function network element in FIG. 8 may be a group management function (GMF) network element in the 5G network architecture; a network element or an entity corresponding to the session management network element (for example, the first session management network element or the second session management network element) in FIG. 8 may be a session management function (SMF) network element in the 5G network architecture; and a network element or an entity corresponding to the user plane network element (for example, the first user plane network element, the second user plane network element, the third user plane network element, or the fourth user plane network element) in FIG. 8 may be a UPF network element in the 5G network architecture. The foregoing local area network may be a 5GLAN. Optionally, from a perspective of expression, in this embodiment of this application, the 5GLAN may also be referred to as a LAN, a LAN-type service, a LAN-virtual network (VN), a 5GLAN-type service, a 5GLAN-VN, a 5GLAN group, a LAN group, or the like. A name of the 5GLAN is not specifically limited in this embodiment of this application.

The GMF network element may be a newly added network element in the 5G network architecture, and a function of the GMF network element is to manage a 5GLAN group, for example, dynamically create, modify, or delete a group based on a request of a terminal. In addition, the GMF network element may further have a function of managing a user plane path, a function of setting a user plane forwarding rule, a function of implementing inter-group isolation, and the like. Certainly, the function of managing a user plane path and the function of implementing inter-group isolation may alternatively be implemented by a newly added path management function (PMF) network element. This is not specifically limited in this embodiment of this application. In this embodiment of this application, descriptions are provided by using an example in which the GMF network element may further have the function of managing a user plane path, the function of implementing inter-group isolation, and the like.

In addition, as shown in FIG. 9, the current 5G network may further include an access device, an access and mobility management function (core access and mobility management function, AMF) network element, a user plane function UPF) network element, an authentication server function (AUSF) network element, a network slice selection function (NSSF) network element, a network exposure function (NEF) network element, a network repository function (network exposure function Repository Function, NRF) network element, a policy control function (PCF) network element, a unified data management (UDM) network element, an application function (AF) network element, and the like. This is not specifically limited in this embodiment of this application.

As shown in FIG. 9, the terminal accesses the 5G network by using the access device, and the terminal communicates with the AMF network element through a next generation (N) 1 interface (N1 for short). The access device communicates with the AMF network element through an N2 interface (N2 for short). The access device communicates with the UPF network element through an N3 interface (N3 for short). The SMF network element communicates with the UPF network element through an N4 interface (N4 for short). The UPF network element accesses a data network through an N6 interface (N6 for short). In addition, control plane network elements such as the AUSF network element, the AMF network element, the SMF network element, the NSSF network element, the NEF network element, the NRF network element, the PCF network element, the UDM network element, or the AF network element shown in FIG. 9 may alternatively interact with each other through a service-based interface. For example, a service-based interface exhibited by the AUSF network element may be Nausf; a service-based interface exhibited by the AMF network element may be Namf; a service-based interface exhibited by the SMF network element may be Nsmf; a service-based interface exhibited by the NSSF network element may be Nnssf; a service-based interface exhibited by the NEF network element may be Nnef; a service-based interface exhibited by the NRF network element may be Nnrf; a service-based interface exhibited by the PCF network element may be Npcf; a service-based interface exhibited by the UDM network element may be Nudm; and a service-based interface exhibited by the AF network element may be Naf. For related descriptions, refer to a diagram of a 5G system architecture in the standard TS 23.501. Details are not described herein. In addition, a service-based interface exhibited by a LAN controller may be Nlan.

It should be noted that in the 5G network architecture shown in FIG. 9, only one network element is shown as an example. In actual 5G network deployment, a plurality of network elements may be deployed. For example, a plurality of SMF network elements or a plurality of UPF network elements may be deployed in the 5G network. Different SMF network elements may communicate with each other through an N16 interface (N16 for short), or communicate with each other through forwarding by the AMF network element. An interface between the AMF network element and the SMF network element is an N11 interface (N11 for short), and an interface between AMF network elements is N14 (N14 for short). Different UPF network elements may communicate with each other through an N9 interface (N9 for short) or an Nx interface (Nx for short). For example, the first session management network element may correspond to an SMF network element 1, the second session management network element may correspond to an SMF network element 2, and the SMF network element 1 and the SMF network element 2 may communicate with each other through N16, or communicate with each other through forwarding by the AMF network element. Alternatively, for example, the first user plane network element may correspond to a UPF network element 1, the second user plane network element may correspond to a UPF network element 2, and the UPF network element 1 and the UPF network element 2 may communicate with each other through N9 or Nx.

Figure 10:
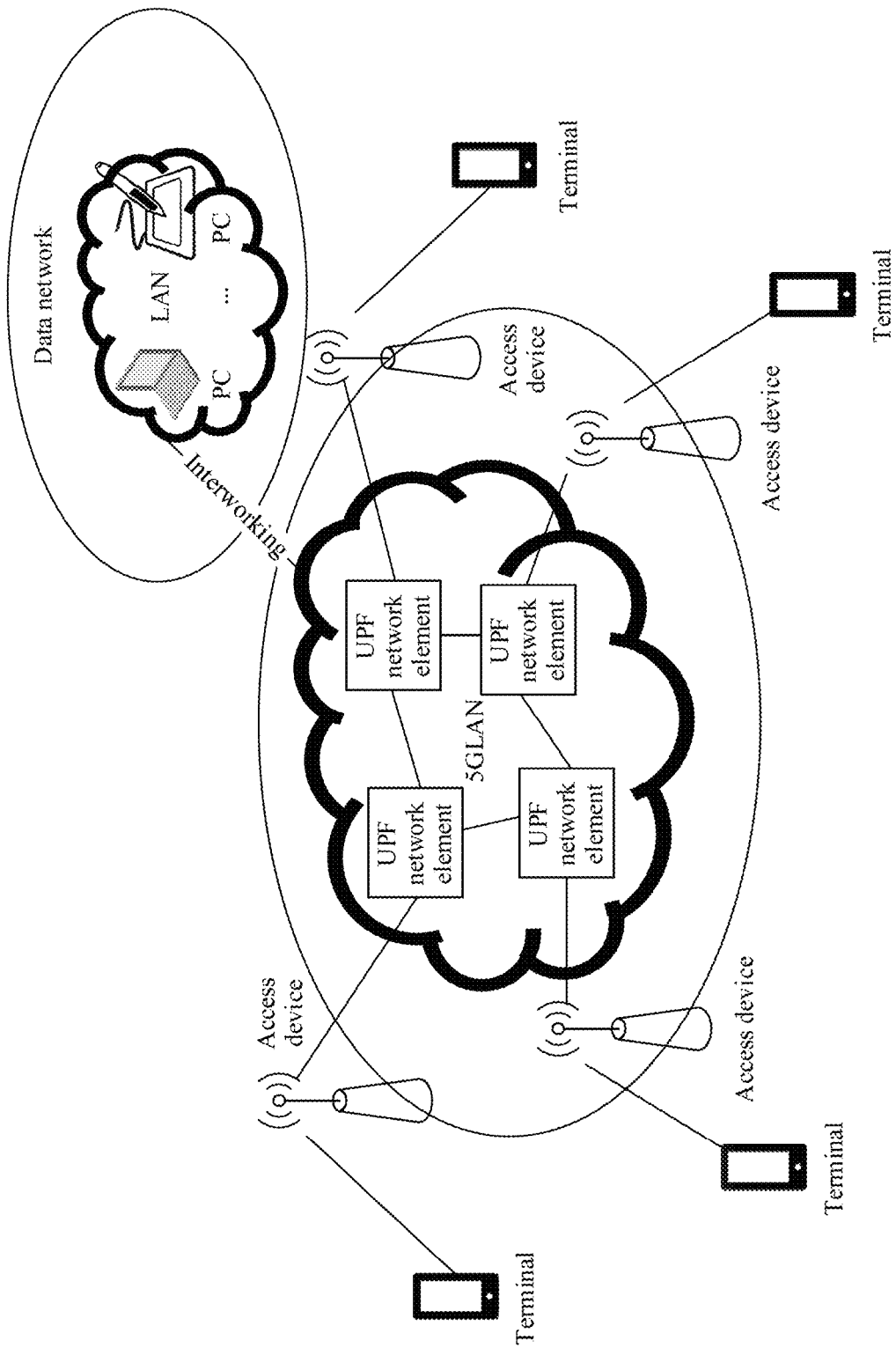
FIG. 10 is a schematic diagram of a user plane architecture of an existing 5GLAN service.

FIG. 10 is a schematic diagram of a user plane architecture of an existing 5GLAN service. A terminal establishes a session with a UPF network element that provides a 5GLAN service, to access the UPF network element that provides the 5GLAN service. As described above, the UPF network element that provides the 5GLAN service may communicate with an existing LAN in a data network through N6, for example, communicate with a personal computer (PC) in the LAN. Alternatively, the UPF network element that provides the 5GLAN service may associate sessions of different terminals through an internal connection between UPF network elements, to implement private communication. This is not specifically limited in the embodiments of this application.

Optionally, the terminal in the embodiments of this application may be a device such as a handheld device, a vehicle-mounted device, a wearable device, and a computing device that have a wireless communication function, or another processing device connected to a wireless modem. The terminal may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, user equipment (UE), a mobile station (MS), a terminal device, relay user equipment, or the like. The relay user equipment may be, for example, a 5G residential gateway (RG). For ease of description, in this application, the devices mentioned above are collectively referred to as the terminal.

Optionally, an access device (including the first access device or the second access device) in the embodiments of this application is a device that accesses a core network, for example, may be a base station, a broadband network gateway (BNG), an aggregation switch, or a non-3rd generation partnership project (3rd generation partnership project, 3GPP) access device. There may be base stations in various forms, for example, a macro base station, a micro base station (also referred to as a small cell), a relay station, and an access point.

Optionally, the group management function network element, the session management network element (for example, the first session management network element or the second session management network element), or the user plane network element (for example, the first user plane network element, the second user plane network element, the third user plane network element, or the fourth user plane network element) in FIG. 8 in the embodiments of this application may be implemented by one device, or may be jointly implemented by a plurality of devices, or may be implemented by one functional module in one device. This is not specifically limited in the embodiments of this application. It may be understood that the foregoing functions may be network elements in a hardware device, or may be software functions running on dedicated hardware, or may be virtualization functions instantiated on a platform (for example, a cloud platform).

Figure 11:
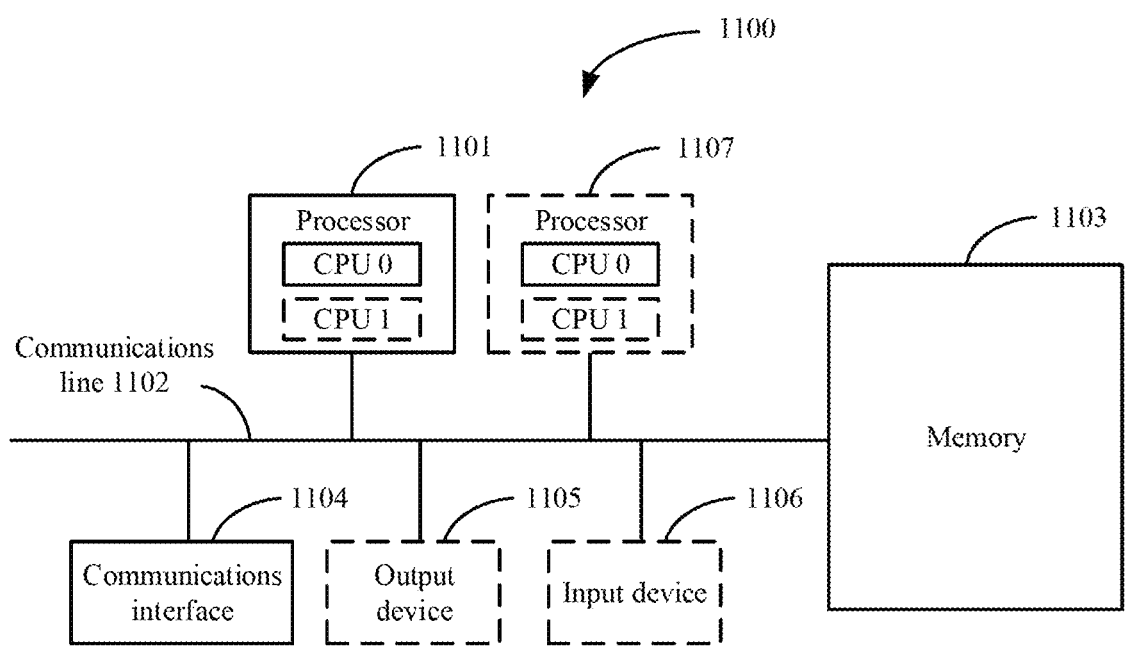
FIG. 11 is a schematic structural diagram of a communications device according to an embodiment of this application.

For example, the group management function network element, the session management network element, or the user plane network element in FIG. 8 in the embodiments of this application may be implemented by using a communications device in FIG. 11. FIG. 11 is a schematic diagram of a hardware structure of a communications device according to an embodiment of this application. The communications device 1100 includes a processor 1101, a communications line 1102, a memory 1103, and at least one communications interface (descriptions are provided in FIG. 11 merely by using an example in which the communications device 1100 includes a communications interface 1104).

The processor 1101 may be a general-purpose central processing unit (CPU), a microprocessor, an application-specific integrated circuit (ASIC), or one or more integrated circuits configured to control program execution of the solutions of this application.

The communications line 1102 may include a channel for transmitting information between the foregoing components.

The communications interface 1104 is any apparatus such as a transceiver, and is configured to communicate with another device or a communications network such as the Ethernet, a radio access network (RAN), or a wireless local area network (WLAN).

The memory 1103 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory 1103 is not limited thereto. The memory may exist independently, and be connected to the processor through the communications line 1102. Alternatively, the memory may be integrated into the processor.

The memory 1103 is configured to store computer execution instructions for executing the solutions of this application, and the processor 1101 controls execution of the computer execution instructions. The processor 1101 is configured to execute the computer execution instructions stored in the memory 1103, to implement a local area network communications method provided in the following embodiments of this application.

Optionally, the computer execution instructions in this embodiment of this application may also be referred to as application program code. This is not specifically limited in this embodiment of this application.

In a specific implementation, in an embodiment, the processor 1101 may include one or more CPUs, for example, a CPU 0 and a CPU 1 in FIG. 11.

In a specific implementation, in an embodiment, the communications device 1100 may include a plurality of processors, for example, the processor 1101 and a processor 1107 in FIG. 11. Each of the processors may be a single-core processor (single-CPU) or a multi-core processor (multi-CPU). The processor herein may be one or more devices, circuits, and/or processing cores configured to process data (for example, a computer program instruction).

In a specific implementation, in an embodiment, the communications device 1100 may further include an output device 1105 and an input device 1106. The output device 1105 communicates with the processor 1101, and may display information in a plurality of manners. For example, the output device 1105 may be a liquid crystal display (LCD), a light emitting diode (LED) display device, a cathode ray tube (CRT) display device, or a projector. The input device 1106 communicates with the processor 1101, and may receive input of a user in a plurality of manners. For example, the input device 1106 may be a mouse, a keyboard, a touchscreen device, or a sensing device.

The communications device 1100 may be a general-purpose device or a dedicated device. In a specific implementation, the communications device 1100 may be a desktop computer, a portable computer, a network server, a personal digital assistant (PDA), a mobile phone, a tablet computer, a wireless terminal device, an embedded device, or a device with a structure similar to that in FIG. 11. A type of the communications device 1100 is not limited in this embodiment of this application.

The following describes, in detail with reference to FIG. 1 to FIG. 11, a group communications method provided in the embodiments of this application.

It should be noted that in the following embodiments of this application, names of messages between network elements, names of parameters in messages, or the like are merely examples, and may be other names in a specific implementation. This is not specifically limited in the embodiments of this application.

Figure 12A:
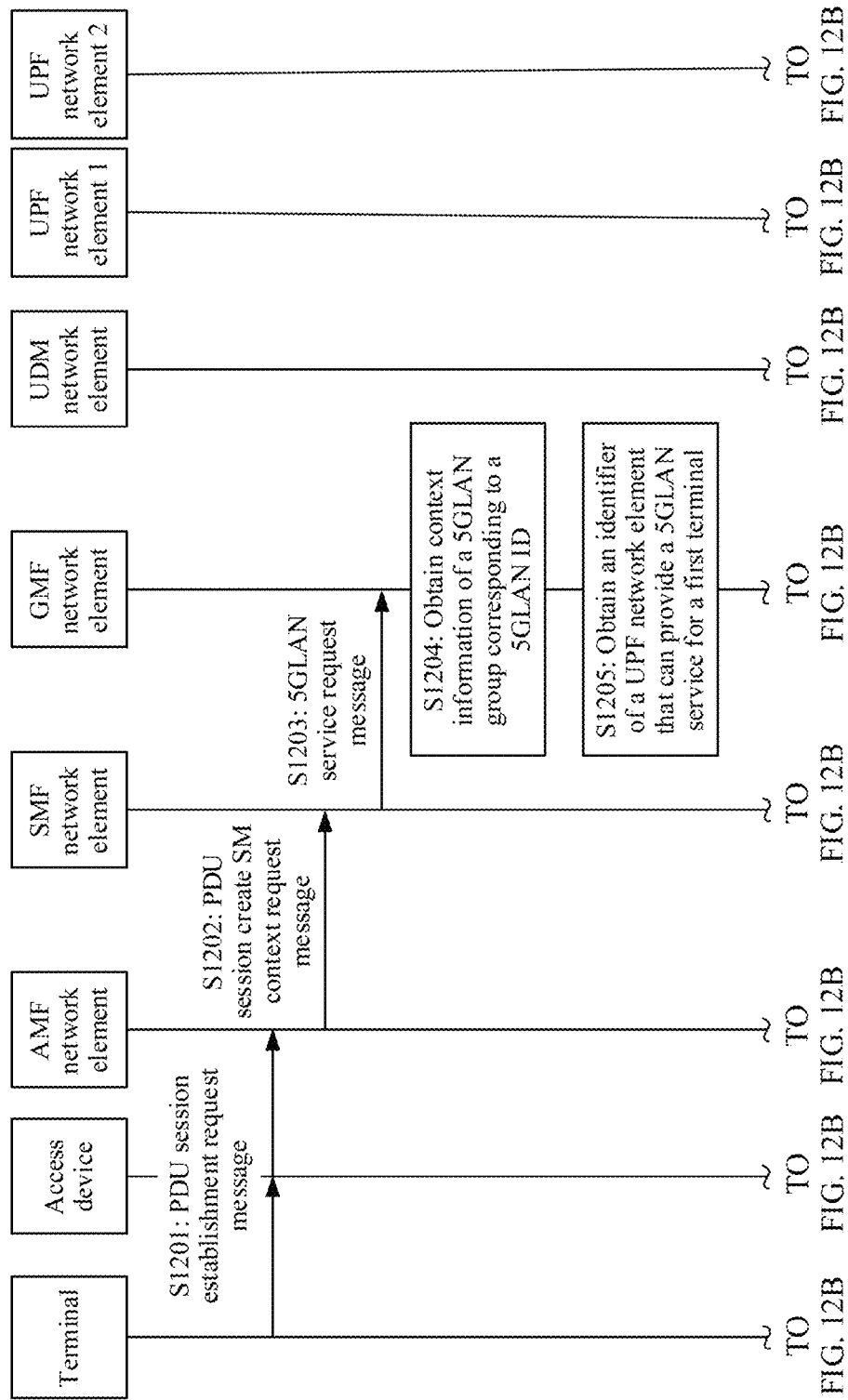
FIG. 12A, FIG. 12B, and FIG. 12C are a schematic flowchart 1 of a group communications method according to an embodiment of this application.
Figure 12B:
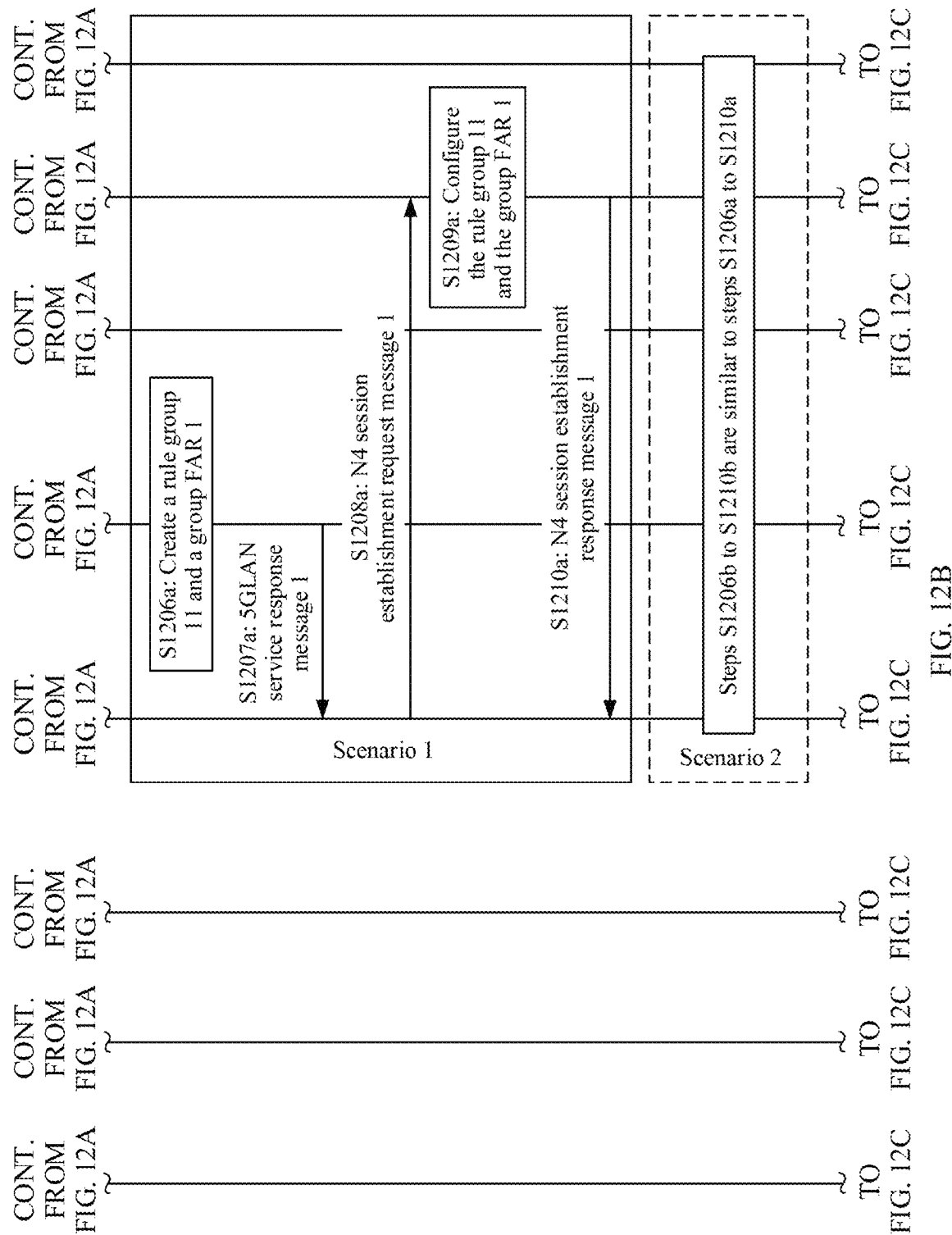
Figure 12C:
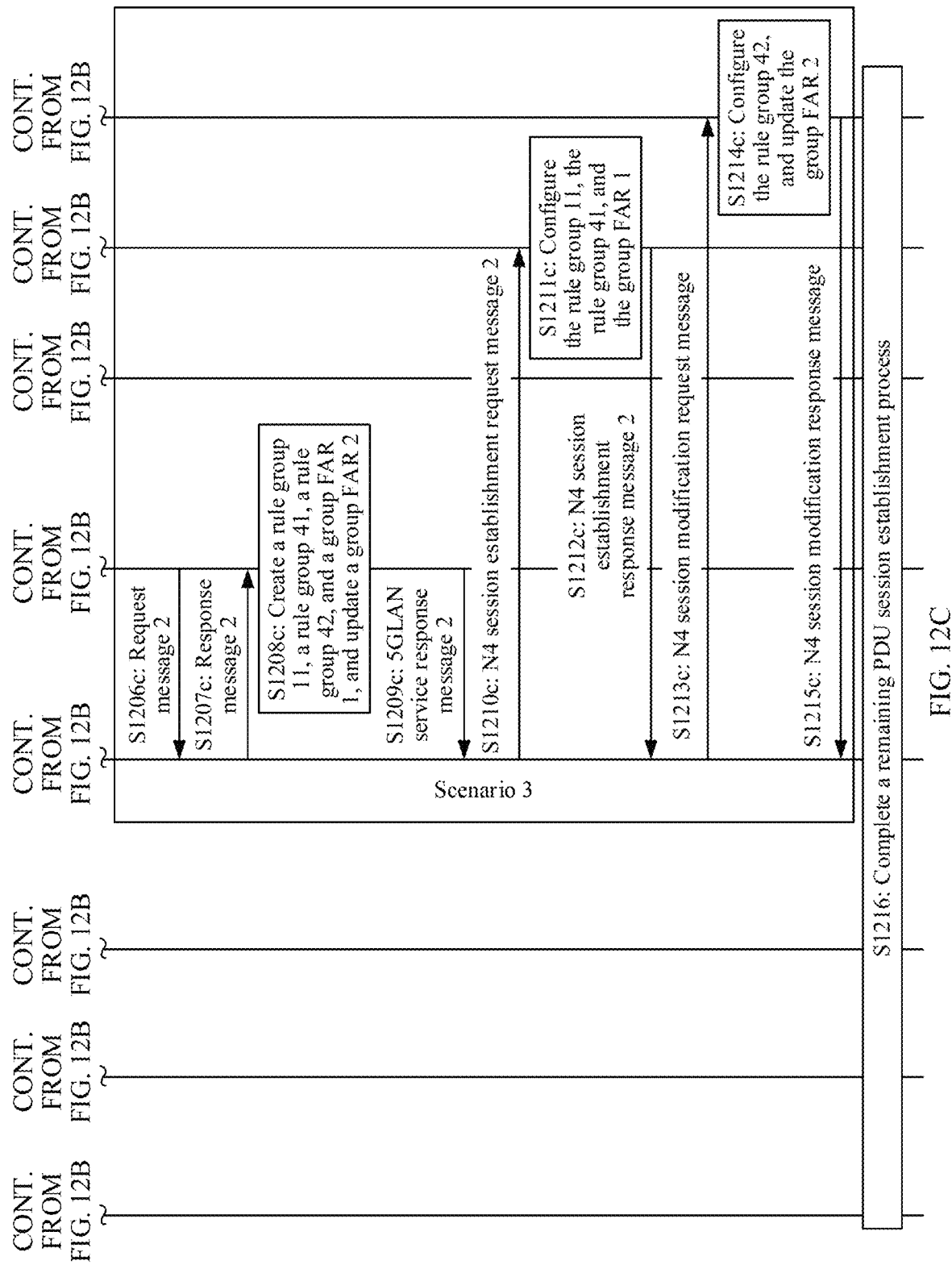

First, a scenario in which the group communications system shown in FIG. 8 is applied to the 5G network shown in FIG. 9 is used as an example. In this scenario, the group management function network element is the GMF network element, the session management network element is the SMF network element, and the user plane network element is the UPF network element (for example, the first user plane network element is a UPF network element 1, and the second user plane network element is a UPF network element 2); and the terminal member in the 5GLAN group accesses the network. FIG. 12A, FIG. 12B, and FIG. 12C show a group communications method according to an embodiment of this application. The group communications method includes the following steps.

S1201: A first terminal sends a PDU session establishment request message to an AMF network element by using an access device. Correspondingly, the AMF network element receives the PDU session establishment request message from the first terminal. The PDU session establishment request message is used to request to establish a first session (which may also be referred to as a first PDU session, briefly referred to as the first session below).

The PDU session establishment request message includes an identifier of the first terminal and a 5GLAN ID. The 5GLAN ID is an identifier of a 5GLAN group, and is used to indicate the first terminal to access the 5GLAN group.

Optionally, in this embodiment of this application, the identifier of the first terminal may be, for example, a subscription permanent identifier (SUPI) or a generic public subscription identifier (generic public subscription identity, GPSI) of the first terminal. This is not specifically limited in this embodiment of this application. The descriptions are also similarly applicable to another terminal in another embodiment in a broadcast scenario in this application. For example, an identifier of the following terminal 2 may be an SUPI or a GPSI of the terminal 2. Unified descriptions are provided herein, and details are not described below.

Optionally, the PDU session establishment request message may further carry a session identifier of the first session. For details, refer to an existing implementation. This is not specifically limited in this embodiment of this application. In this embodiment of this application, descriptions are provided by using an example in which the PDU session establishment request message does not carry the session identifier of the first session.

S1202: After selecting an SMF network element for the first terminal, the AMF network element sends a PDU session create session management (SM) context (PDU session create SM context) request message to the SMF network element. Correspondingly, the SMF network element receives the PDU session create SM context request message from the AMF network element.

The PDU session create SM context request message includes the identifier of the first terminal and the 5GLAN ID.

S1203: The SMF network element learns, based on the 5GLAN ID, that the first terminal needs to access the 5GLAN group, and further sends a 5GLAN service request message to a GMF network element. Correspondingly, the GMF network element receives the 5GLAN service request message from the SMF network element.

The 5GLAN service request message includes the identifier of the first terminal and the 5GLAN ID, and is used by the first terminal to request to access the 5GLAN group corresponding to the 5GLAN ID.

S1204: The GMF network element learns, based on the 5GLAN service request message, that the first terminal requests to access the 5GLAN group corresponding to the 5GLAN ID, and further obtains context information of the 5GLAN group corresponding to the 5GLAN ID.

Optionally, the GMF network element may determine, based on subscription information stored locally or stored by another network element (for example, a UDM) in a core network, whether the first terminal has permission to access the 5GLAN group corresponding to the 5GLAN ID. When determining that the first terminal does not have permission to access the 5GLAN group corresponding to the 5GLAN ID, the GMF network element may directly reject the 5GLAN service request message.

Optionally, in this embodiment of this application, that the GMF network element obtains context information of the 5GLAN group corresponding to the 5GLAN ID may be: For example, the GMF network element creates the context information of the 5GLAN group corresponding to the 5GLAN ID, or reads the context information that is of the 5GLAN group corresponding to the 5GLAN ID and that is stored on the GMF network element. For example, when the first terminal is the 1$^{st}$ terminal that accesses the 5GLAN group, the GMF network element needs to create, based on 5GLAN subscription information that corresponds to the 5GLAN ID and that is obtained from the UDM network element or stored on the GMF network element, the context information of the 5GLAN group corresponding to the 5GLAN ID. Alternatively, for example, when the first terminal requests to access the 5GLAN group corresponding to the 5GLAN ID, if another terminal has accessed the 5GLAN group, the GMF network element may read the context information that is of the 5GLAN group corresponding to the 5GLAN ID and that is stored on the GMF network element.

Optionally, in this embodiment of this application, the context information of the 5GLAN group may include an identifier of a terminal that has currently accessed the 5GLAN group and that is in a terminal member list corresponding to the 5GLAN group, an identifier of a UPF network element accessed by the terminal that has accessed the 5GLAN group, and a session port identifier of each terminal on the accessed user plane network element.

The terminal member list corresponding to the 5GLAN group includes one or more terminals that subscribe to the 5GLAN group. For example, assuming that the identifier of the 5GLAN group is a 5GLAN ID 1, the terminal member list corresponding to the 5GLAN group may be shown in Table 1, and includes identifiers that are of a plurality of terminals and that correspond to the 5GLAN ID 1.

TABLE 1

| 5GLAN ID | Identifier of a terminal |
|---|---|
| 5GLAN ID 1 | Identifier of a terminal 1 |
| | Identifier of a terminal 2 |
| | Identifier of a terminal 3 |
| | ... |
| | Identifier of a terminal n |

It should be noted that Table 1 is merely an example table storage form, and there may be another table storage form or a non-table storage form. For example, as shown in Table 2, identifiers of terminals and identifiers of 5GLAN groups are stored in a one-to-one correspondence. A storage form of the correspondence is not specifically limited in this embodiment of this application. The descriptions are applicable to all embodiments of this application. Unified descriptions are provided herein, and details are not described below.

TABLE 2

| 5GLAN ID | Identifier of a terminal |
|---|---|
| 5GLAN ID 1 | Identifier of a terminal 1 |
| 5GLAN ID 1 | Identifier of a terminal 2 |
| 5GLAN ID 1 | Identifier of a terminal 3 |
| 5GLAN ID 1 | ... |
| 5GLAN ID 1 | Identifier of a terminal n |

It should be noted that in this embodiment of this application, the terminal that is in the terminal member list corresponding to the 5GLAN group and has accessed the 5GLAN group may be considered as a terminal that belongs to the 5GLAN group and has accessed a network, and a terminal that is in the terminal member list corresponding to the 5GLAN group but does not access the 5GLAN group may be considered as a terminal that belongs to the 5GLAN group but does not access the network (or referred to as a terminal that is disconnected from the network). The descriptions are applicable to all embodiments of this application. Unified descriptions are provided herein, and details are not described below.

In addition, it should be noted that in this embodiment of this application, network access may also be understood as getting online, and network disconnection may also be understood as getting offline. This is not specifically limited in this embodiment of this application.

For example, assuming that the terminal 5 in Table 1 or Table 2 has accessed the network before the first terminal accesses the network, the context information of the 5GLAN group may be shown in Table 3. Alternatively, assuming that the terminal 5 and the terminal 2 in Table 1 or Table 2 have accessed the network before the first terminal accesses the network, the context information of the 5GLAN group may be shown in Table 4. Table 3 or Table 4 includes an identifier of a terminal that has accessed the 5GLAN group, an identifier of a UPF network element accessed by the terminal that has accessed the 5GLAN group, and a session port identifier of each terminal on the accessed user plane network element.

TABLE 3

| 5GLAN ID | Identifier of a terminal that has accessed a network | Identifier of a selected UPF network element | Session port identifier |
|---|---|---|---|
| 5GLAN ID 1 | Identifier of a terminal 5 | Identifier of a UPF network element 1 | Session port identifier 51 |

TABLE 4

| 5GLAN ID | Identifier of a terminal that has accessed a network | Identifier of a selected UPF network element | Session identifier |
|---|---|---|---|
| 5GLAN ID 1 | Identifier of a terminal 5 | Identifier of a UPF network element 2 | Session port identifier 52 |
|  | Identifier of a terminal 2 | Identifier of the UPF network element 2 | Session port identifier 22 |

Certainly, in this embodiment of this application, if the first terminal is the 1st terminal that is in the terminal member list corresponding to the 5GLAN group and that requests to access the 5GLAN group, in other words, no terminal in the terminal member list corresponding to the 5GLAN group accesses the network before the first terminal accesses the network, the GMF network element does not have the context information of the 5GLAN group. Unified descriptions are provided herein, and details are not described below.

Optionally, in this embodiment of this application, the context information of the 5GLAN group may further include a member list on a UPF network element accessed by the terminal that has accessed the network and a member port identifier corresponding to each member. A member for the UPF network element may be a terminal that accesses the UPF network element, or may be another UPF network element selected by a terminal that has accessed the network. This is not specifically limited in this embodiment of this application. For example, assuming that the identifier of the 5GLAN group is a 5GLAN ID 1, a correspondence between the identifier of the 5GLAN group, an identifier of a UPF network element accessed by a terminal that has accessed a network, a member list on the UPF network element, and a member port identifier corresponding to each member may be shown in Table 5.

TABLE 5

| 5GLAN ID | Identifier of a UPF network element | Member identifier | Member port identifier |
|---|---|---|---|
| 5GLAN ID 1 | Identifier of a UPF network element 1 | Identifier of a terminal 5 | Session port identifier 5 |
|  |  | Identifier of a terminal 2 | Session port identifier 2 |
|  |  | Identifier of a UPF network element 2 | Tunnel endpoint identifier 1 |
|  | Identifier of the UPF network element 2 | Identifier of the UPF network element 1 | Tunnel endpoint identifier 2 |
|  |  | Identifier of a terminal 3 | Session port identifier 3 |

In addition, optionally, in this embodiment of this application, the context information of the 5GLAN group may further include other information, for example, a QoS requirement. This is not specifically limited in this embodiment of this application.

It should be noted that in this embodiment of this application, the UPF network element accessed by the terminal may also be understood as an anchor UPF network element used when the terminal creates a PDU session, and the terminal communicates with another network element (or UE) by using the anchor UPF network element. In this embodiment of this application, the UPF network element accessed by the terminal may be specifically a UPF network element that provides a 5GLAN service for the terminal. The descriptions are applicable to all embodiments of this application. Unified descriptions are provided herein, and details are not described below.

S1205: The GMF network element obtains an identifier of a UPF network element that can provide a 5GLAN service for the first terminal. Herein, it is assumed that the UPF network element is a UPF network element 1.

Optionally, in a possible implementation, the GMF network element may request, from the SMF network element, the identifier of the UPF network element that can provide the 5GLAN service for the first terminal. For example, the GMF network element sends a request message 1 to the SMF network element, where the request message 1 includes the identifier of the first terminal and the context information of the 5GLAN group, and the request message 1 is used to request a session port identifier of the first session and the identifier of the UPF network element that can provide the 5GLAN service for the first terminal. Optionally, the request message 1 may further include an identifier of a UPF network element that the GMF network element advises the SMF network element to select. In this way, after receiving the request message 1 from the GMF network element, the SMF network element can allocate a session port identifier 11 to the first session based on the identifier of the first terminal, and select the UPF network element for the first terminal based on the context information of the 5GLAN group (optionally, or based on the identifier of the UPF network element that the GMF network element advises the SMF network element to select). Herein, assuming that the UPF network element accessed by the first terminal is the UPF network element 1, the SMF network element may send a response message 1 to the GMF network element, where the response message 1 includes the identifier of the first terminal, the identifier of the UPF network element 1, and the session port identifier 11. In this way, the GMF network element can obtain the identifier of the UPF network element 1 selected by the SMF network element for the first terminal, and the session port identifier 11 allocated by the SMF network element to the first session of the first terminal. The session port identifier 11 herein may be, for example, a TEID 1.

Optionally, in this embodiment of this application, the SMF network element may alternatively allocate a session identifier (for example, a PDU session ID) to the first session. For details, refer to an existing implementation. Details are not described herein.

For example, if the first terminal is the Pt terminal that is in the terminal member list corresponding to the 5GLAN group and that requests to access the 5GLAN group, the SMF network element may select a UPF network element based on the conventional technology, and determine the selected UPF network element as the UPF network element that can provide the 5GLAN service for the first terminal. For example, the SMF network element may use a method in section 6.3.3 in the existing standard TS23.501 V15.2.0 to select, for the first terminal, the UPF network element that provides the 5GLAN service.

Alternatively, for example, if the context information of the 5GLAN group includes an identifier of a UPF network element selected by another terminal that is in the terminal member list corresponding to the 5GLAN group and that has accessed the network, the SMF network element may determine that a UPF network element that is in UPF network elements that can provide the 5GLAN service but is temporarily not accessed by another terminal member in the 5GLAN group is the UPF network element that can provide the 5GLAN service for the first terminal; or the SMF network element may determine that a UPF network element that is accessed by another terminal member in the 5GLAN group but has a relatively small quantity of connected terminal members is the UPF network element that can provide the 5GLAN service for the first terminal. Certainly, the SMF may alternatively use the conventional technology with reference to the identifier information of the UPF network element selected by the another terminal that is in the terminal member list corresponding to the 5GLAN group and that has accessed the network, to select, for the first terminal, the UPF network element that provides the 5GLAN service. This is not specifically limited in this embodiment of this application.

Alternatively, optionally, in another possible implementation, the GMF network element may independently select, for the first terminal, the UPF network element that provides the 5GLAN service. In this case, the GMF network element may temporarily allocate a session port identifier to the first session. Subsequently, after completing user plane session establishment and group forwarding rule installation, the SMF network element notifies the GMF network element, and then the GMF network element updates the session port identifier that is of the first session and that is in the context information of the 5GLAN group. This is not specifically limited in this embodiment of this application.

Certainly, the foregoing embodiment provides only several example manners in which the GMF network element obtains the identifier of the UPF network element that can provide the 5GLAN service for the first terminal. Alternatively, the GMF network element may obtain, in another manner, the identifier of the UPF network element that can provide the 5GLAN service for the first terminal. This is not specifically limited in this embodiment of this application.

In addition, in the following embodiments of this application, descriptions are all provided by using an example scenario in which the SMF network element selects, for the first terminal, the UPF network element that provides the 5GLAN service. Unified descriptions are provided herein, and details are not described below.

After obtaining the session port identifier 11 and the identifier of the UPF network element 1, the GMF network element may update the context information that is of the 5GLAN group and that is stored on the GMF network element before the first terminal accesses the network, or establish the context information of the 5GLAN group on the GMF network element. For example, assuming that the first terminal is the terminal 1, if the first terminal is the 1$^{st}$ terminal that is in the terminal member list corresponding to the 5GLAN group and that requests to access the 5GLAN group, context information that is of the 5GLAN group and that is established on the GMF network element after the first terminal accesses the network may be, for example, shown in Table 6. Alternatively, assuming that the first terminal is the terminal 1, and the context information that is of the 5GLAN group and that is stored on the GMF network element before the first terminal accesses the network is shown in Table 3, context information that is of the 5GLAN group and that is obtained through updating after the first terminal accesses the network may be shown in Table 7. Alternatively, assuming that the first terminal is the terminal 1, and the context information that is of the 5GLAN group and that is stored on the GMF network element before the first terminal accesses the network is shown in Table 4, context information that is of the 5GLAN group and that is obtained through updating after the first terminal accesses the network may be shown in Table 8.

TABLE 6

| 5GLAN ID | Identifier of a terminal that has accessed a network | Identifier of a selected UPF network element | Session identifier |
| --- | --- | --- | --- |
| 5GLAN ID 1 | Identifier of a terminal 1 | Identifier of a UPF network element 1 | Session port identifier 11 |

TABLE 7

| 5GLAN ID | Identifier of a terminal that has accessed a network | Identifier of a selected UPF network element | Session identifier |
| --- | --- | --- | --- |
| 5GLAN ID 1 | Identifier of a terminal 1 | Identifier of a UPF network element 1 | Session port identifier 11 |
| | Identifier of a terminal 5 | Identifier of the UPF network element 1 | Session port identifier 51 |

TABLE 8

| 5GLAN ID | Identifier of a terminal that has accessed a network | Identifier of a selected UPF network element | Session identifier |
| --- | --- | --- | --- |
| 5GLAN ID 1 | Identifier of a terminal 5 | Identifier of a UPF network element 2 | Session port identifier 52 |
| | Identifier of a terminal 2 | Identifier of the UPF network element 2 | Session port identifier 22 |
| | Identifier of a terminal 1 | Identifier of a UPF network element 1 | Session port identifier 11 |

The following continues to describe, in three scenarios, the group communications method provided in this embodiment of this application.

It should be noted that for related descriptions of a rule group (for example, a rule group 11 or a rule group 12) and a 5GLAN group FAR (for example, a group FAR 1 or a group FAR 2) in the following embodiments, refer to the descriptions in the foregoing embodiments. Details are not described herein again. "11" and "12" in the rule group 11 and the rule group 12 are merely intended to differentiate between rule groups applied to different member ports, and "1" and "2" in the group FAR 1 and the group FAR 2 are merely intended to differentiate between 5GLAN group FARs applied to different UPF network elements. Alternatively, "first", "second", and the like may be used for the differentiation. This is not specifically limited in this embodiment of this application. The descriptions are applicable to all the following embodiments. Unified descriptions are provided herein, and details are not described below.

In a scenario 1, the GMF network element determines that the first terminal is the 1st terminal that is in the terminal member list corresponding to the 5GLAN group and that requests to access the 5GLAN group. In this case, the group communications method provided in this embodiment of this application further includes steps S1206a to S1210a.

S1206a: The GMF network element creates, for the 5GLAN group, a rule group 11 applied to a session port 11 on the UPF network element 1, and the GMF network element creates, for the 5GLAN group, a 5GLAN group FAR applied to the UPF network element 1, where the 5GLAN group FAR is denoted as a group FAR 1.

The rule group 11 includes an ingress PDR 11, an egress PDR 11, and an egress FAR 11.

Optionally, the group FAR 1 herein may include an FA 11, and the FA 11 is used to duplicate a received broadcast packet belonging to the 5GLAN group and then send the broadcast packet to the session port 11.

S1207a: The GMF network element sends a 5GLAN service response message 1 to the SMF network element. Correspondingly, the SMF network element receives the 5GLAN service response message 1 from the GMF network element. The 5GLAN service response message 1 includes the identifier of the UPF network element 1, and the session port identifier 11, the rule group 11, and the group FAR 1 that correspond to the identifier of the UPF network element 1.

Optionally, in this embodiment of this application, the identifier of the UPF network element (for example, the UPF network element 1, the UPF network element 2, or a UPF network element 3) may be, for example, an IP address of the UPF network element. This is not specifically limited in this embodiment of this application. The descriptions are also applicable to UPF network elements in all the embodiments of this application. Unified descriptions are provided herein, and details are not described below.

S1208a: The SMF network element sends an N4 session establishment request message 1 to the corresponding UPF network element 1 based on the identifier that is of the UPF network element 1 and that is in the 5GLAN service response message 1. Correspondingly, the UPF network element 1 receives the N4 session establishment request message 1 from the SMF network element.

The N4 session establishment request message 1 includes configuration information 1, and the configuration information 1 includes the session port identifier 11, the rule group 11, and the group FAR 1.

S1209a: The UPF network element 1 establishes the first session, configures the rule group 11 on the session port 11 on the UPF network element 1 based on the session port identifier 11 and the rule group 11 in the configuration information 1, and configures the group FAR 1 on the UPF network element 1 based on the group FAR 1 in the configuration information 1.

In this embodiment of this application, that the UPF network element 1 establishes the first session includes: creating the session port 11 based on the session port identifier 11. For related descriptions, refer to the descriptions in the foregoing embodiments. Details are not described herein again.

Figure 13:
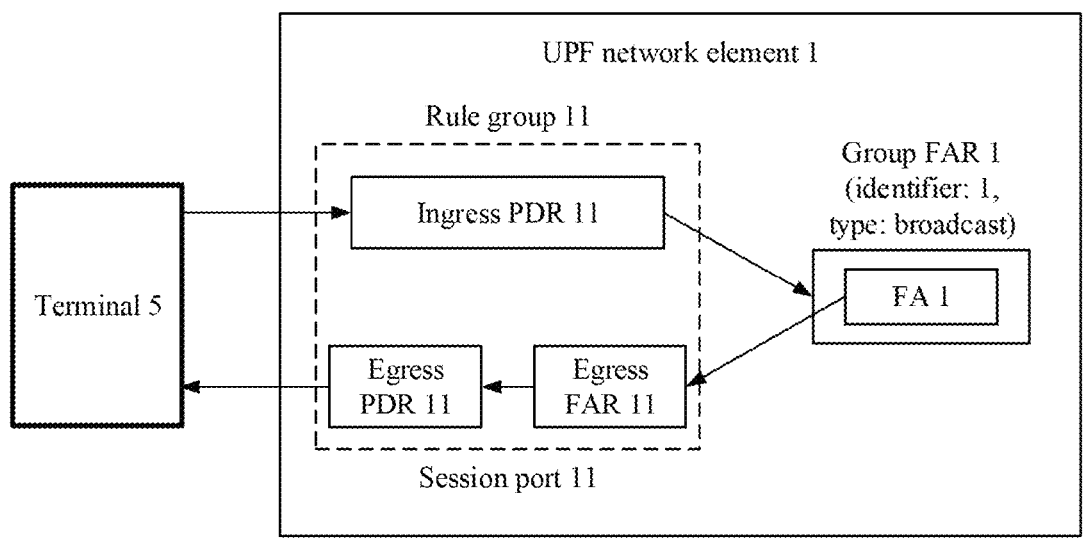
FIG. 13 is a schematic configuration diagram 1 of a UPF network element in a broadcast scenario according to an embodiment of this application.

For example, assuming that the first terminal is the terminal 1, and an identifier of the group FAR 1 is 1, based on the foregoing procedure, after the first terminal accesses the network, a schematic configuration diagram of a 5GLAN group on a UPF network element 1 may be shown in FIG. 13.

S1210a: The UPF network element 1 sends an N4 session establishment response message 1 to the SMF network element. Correspondingly, the SMF network element receives the N4 session establishment response message 1 from the UPF network element 1.

The N4 session establishment response message 1 is used to notify that N4 session establishment and rule installation are complete.

Alternatively, in a scenario 2, the GMF network element determines that another terminal member has joined the 5GLAN group, and the UPF network element selected by the SMF network element for the first terminal is the same as a UPF network element selected by the another terminal member that has accessed the 5GLAN group (for example, the context information of the 5GLAN group is shown in Table 3). In this case, the group communications method provided in this embodiment of this application further includes steps S1206b to S1210b.

Steps S1206b to S1210b are similar to steps S1206a to S1210a. For example, a difference lies in that in steps S1206a to S1210a, the 5GLAN group FAR applied to the UPF network element 1 is created, but in steps S1206b to S1210b, the 5GLAN group FAR applied to the UPF network element 1 is updated. For other related descriptions, refer to steps S1206a to S1210a. Details are not described herein again.

Figure 14A:
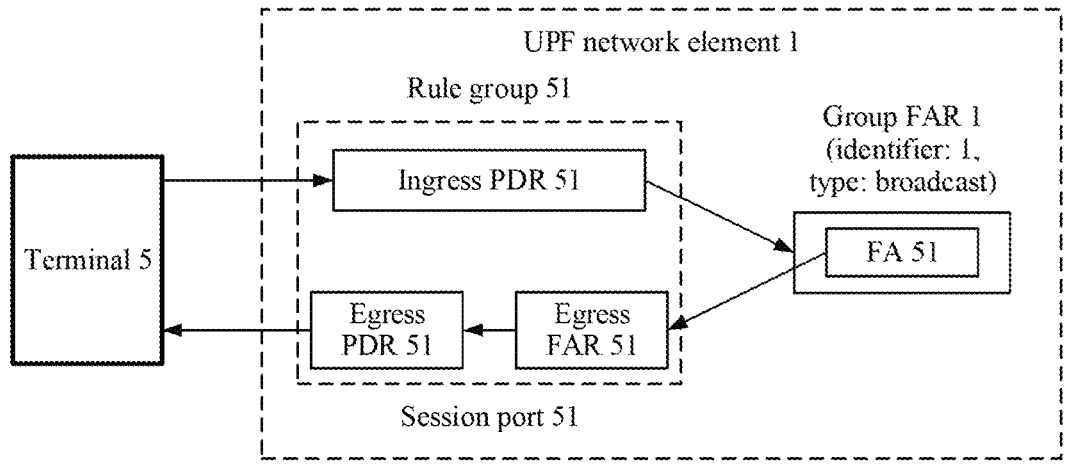
FIG. 14(a) and FIG. 14(b) are a schematic configuration diagram 2 of a UPF network element in a broadcast scenario according to an embodiment of this application.

For example, it is assumed that the context information that is of the 5GLAN group and that is stored on the GMF network element before the first terminal accesses the network is shown in Table 3. A network access manner for the terminal 5 in Table 3 is similar to for the terminal 1 in steps S1206a to S1210a. A rule group 51 is configured on a session port 51 on the UPF network element 1, and a group FAR 1 is configured on the UPF network element 1. The group FAR 1 includes an FA 51, and the rule group 51 includes an ingress PDR 51, an egress PDR 51, and an egress FAR 51. To be specific, a schematic configuration diagram for a 5GLAN group on a UPF network element 1 is shown in FIG. 14(a). The FA 51 is used to duplicate a received broadcast packet belonging to the 5GLAN group corresponding to the 5GLAN ID and then send the broadcast packet to the session port 51.

Figure 14B:
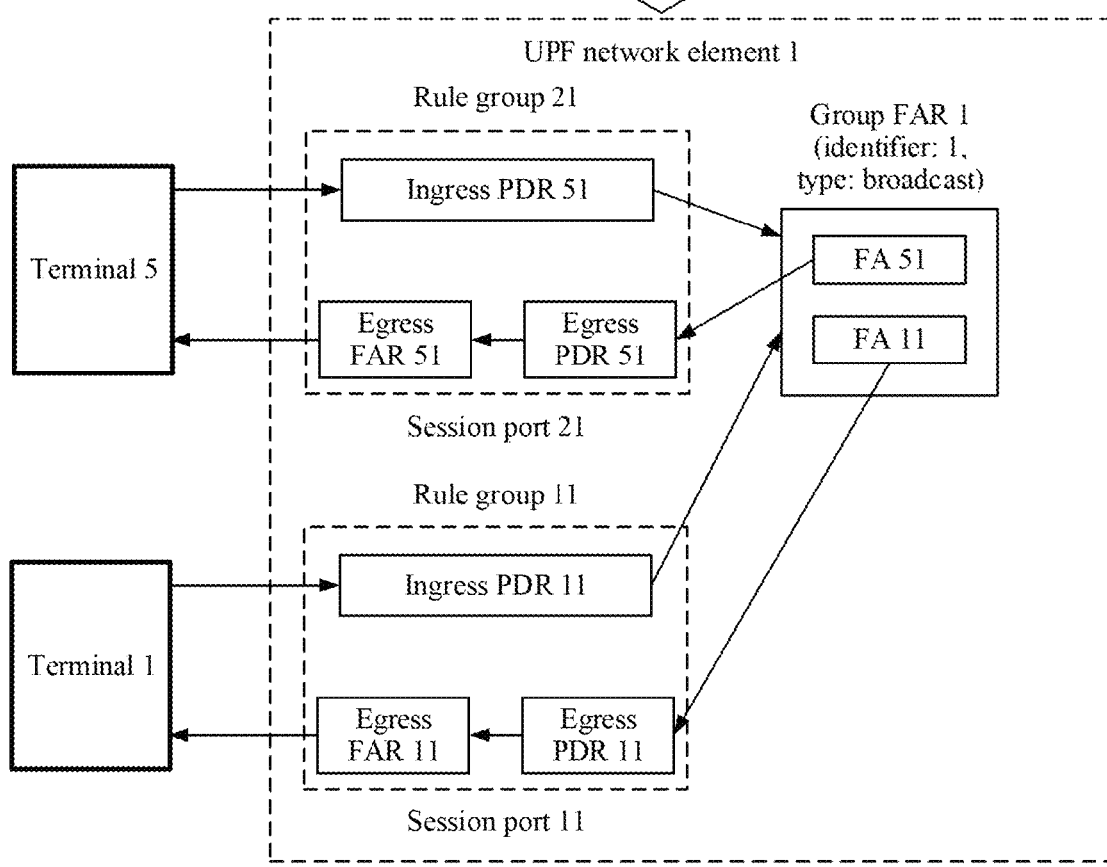

In this case, assuming that the first terminal is the terminal 1, and an identifier of the group FAR 1 is 1, based on the foregoing procedure, after the terminal 1 accesses the network, a schematic configuration diagram for a 5GLAN group on a UPF network element 1 may be shown in FIG. 14 (b).

Alternatively, in a scenario 3, the GMF network element determines that another terminal member has joined the 5GLAN group, and the SMF network element selects, for the first terminal, a UPF network element that is not accessed by the another terminal member in the 5GLAN group (for example, the context information of the 5GLAN group is shown in Table 4). In this case, it indicates that the 5GLAN group may be associated with a plurality of UPF network elements, and the group communications method provided in this embodiment of this application further includes steps S1209c to S1218c.

S1206c: The GMF network element sends a request message 2 to the SMF network element. Correspondingly, the SMF network element receives the request message 2 from the GMF network element. The request message 2 is used to request to establish a first tunnel between the UPF network element 1 and the UPF 2. The first tunnel is used to transmit communication data between group members in the 5GLAN group.

S1207c: The SMF network element sends a response message 2 to the GMF network element. Correspondingly, the GMF network element receives the response message 2 from the SMF network element.

The response message 2 includes a tunnel endpoint identifier 41 and a tunnel endpoint identifier 42. A tunnel endpoint 41 herein is a port that is on the side of the UPF network element 1 and that is of the first tunnel between the UPF network element 1 and the UPF network element 2. A tunnel endpoint 42 herein is a port that is on the side of the UPF network element 2 and that is of the first tunnel between the UPF network element 1 and the UPF network element 2. For example, the tunnel endpoint identifier 41 may be, for example, a TEID 41, and the tunnel endpoint identifier 42 may be, for example, a TEID 42. It should be noted that the tunnel endpoint identifier may be allocated by the SMF network element, or may be allocated by the corresponding UPF network element (for example, the UPF network element 1 allocates the tunnel endpoint identifier 41 to the port of the first tunnel on the side of the UPF network element 1, and the UPF network element 2 allocates the tunnel endpoint identifier 42 to the port of the first tunnel on the side of the UPF network element 2). This is not limited in this embodiment of this application.

S1208c: The GMF network element creates, for the 5GLAN group, a rule group 11 applied to a session port 11 on the UPF network element 1. The GMF network element creates, for the 5GLAN group, a 5GLAN group FAR applied to the UPF network element 1, where the 5GLAN group FAR is denoted as a group FAR 1. The GMF network element creates, for the 5GLAN group, a rule group 41 applied to the tunnel endpoint 41 on the UPF network element 1. The GMF network element creates, for the 5GLAN group, a rule group 42 applied to the tunnel endpoint 42 on the UPF network element 2. The GMF network element updates, for the 5GLAN group, a 5GLAN group FAR applied to the UPF network element 2, where the 5GLAN group FAR is denoted as a group FAR 2.

Optionally, the group FAR 1 herein may include an FA 11 and an FA 41. The FA 11 is used to duplicate a received broadcast packet belonging to the 5GLAN group corresponding to the 5GLAN ID and then send the broadcast packet to the session port 11. The FA 41 is used to duplicate a received broadcast packet belonging to the 5GLAN group corresponding to the 5GLAN ID and then send the broadcast packet to the tunnel endpoint 41.

Optionally, the group FAR 2 herein may include an FA 42, and the FA 42 is used to duplicate a received broadcast packet belonging to the 5GLAN group corresponding to the 5GLAN ID and then send the broadcast packet to the tunnel endpoint 42.

S1209c: The GMF network element sends a 5GLAN service response message 2 to the SMF network element. Correspondingly, the SMF network element receives the 5GLAN service response message 2 from the GMF network element. The 5GLAN service response message 2 includes the identifier of the UPF network element 1, the group FAR 1, the session port identifier 11, the rule group 11, the tunnel endpoint identifier 41, and the rule group 41 that correspond to the identifier of the UPF network element 1, the identifier of the UPF network element 2, and the updated group FAR 2, the tunnel endpoint identifier 42, and the rule group 42 that correspond to the identifier of the UPF network element 2.

S1210c: The SMF network element sends an N4 session establishment request message 2 to the corresponding UPF network element 1 based on the identifier that is of the UPF network element 1 and that is in the 5GLAN service response message 2. Correspondingly, the UPF network element 1 receives the N4 session establishment request message 2 from the SMF network element.

The N4 session establishment request message 2 includes configuration information 2, and the configuration information 2 includes the group FAR 1, the session port identifier 11, the rule group 11, the tunnel endpoint identifier 41, and the rule group 41.

S1211c: The UPF network element 1 establishes the first session and the first tunnel, configures the rule group 11 on the session port 11 on the UPF network element 1 based on the session port identifier 11 and the rule group 11 in the configuration information 2, configures the group FAR 1 on the UPF network element 1 based on the group FAR 1 in the configuration information 2, and configures the rule group 41 on the tunnel endpoint 41 on the UPF network element 1 based on the tunnel endpoint identifier 41 and the rule group 41 in the configuration information 2.

In this embodiment of this application, that the UPF network element 1 establishes the first session may include, for example, creating the session port 11 based on the session port identifier 11; and that the UPF network element 1 establishes the first tunnel may include, for example, creating the tunnel endpoint 41 based on the tunnel endpoint identifier 41. For related descriptions, refer to the descriptions in the foregoing embodiments. Details are not described herein again.

S1212c: The UPF network element 1 sends an N4 session establishment response message 2 to the SMF network element. Correspondingly, the SMF network element receives the N4 session establishment response message 2 from the UPF network element 1.

The N4 session establishment response message 2 is used to notify that N4 session establishment and rule installation are complete.

S1213c: The SMF network element sends an N4 session modification request message to the corresponding UPF network element 2 based on the identifier that is of the UPF network element 2 and that is in the 5GLAN service response message 2. Correspondingly, the UPF network element 1 receives the N4 session modification request message from the SMF network element.

The N4 session modification request message includes configuration information 3, and the configuration information 3 includes the updated group FAR 2, the tunnel endpoint identifier 42, and the rule group 42.

S1214c: The UPF network element 2 establishes the first tunnel with the UPF network element 1, configures the rule group 42 on the tunnel endpoint 42 on the UPF network element 2 based on the tunnel endpoint identifier 42 and the rule group 42 in the configuration information 3, and updates the group FAR 2 on the UPF network element 2 based on the updated group FAR 2 in the configuration information 3.

In this embodiment of this application, that the UPF network element 2 establishes the first tunnel may include, for example, creating the tunnel endpoint 42 based on the tunnel endpoint identifier 42. For related descriptions, refer to the descriptions in the foregoing embodiments. Details are not described herein again.

S1215c: The UPF network element 2 sends an N4 session modification response message to the SMF network element. Correspondingly, the SMF network element receives the N4 session modification response message from the UPF network element 2.

The N4 session modification response message is used to notify that N4 session modification and rule installation are complete.

It should be noted that there is no necessary execution sequence between step S1213c and step S1210c. Step S1213c may be performed before or after step S1210c, or steps S1213c and 51210c may be performed simultaneously. This is not specifically limited in this embodiment.

Figure 15A:
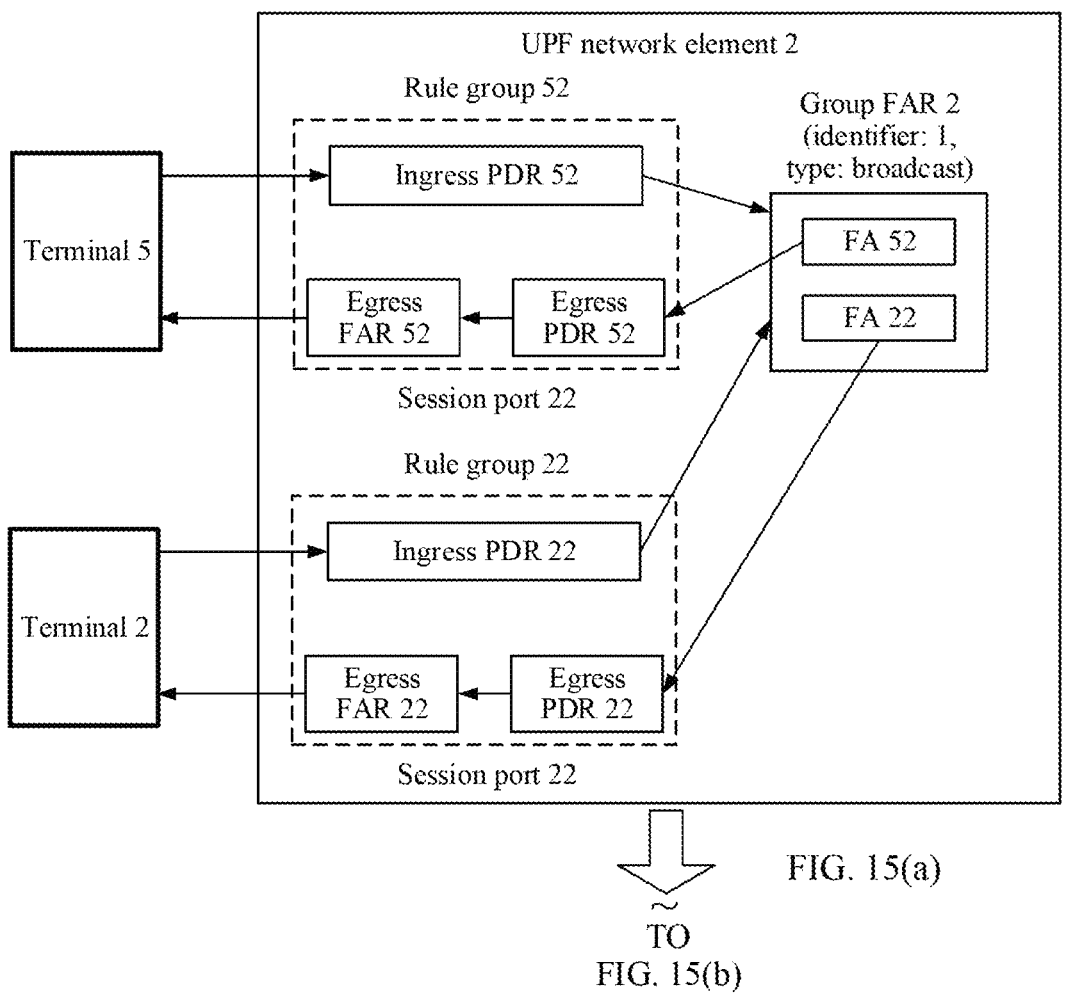
FIG. 15(a) and FIG. 15(b) are a schematic configuration diagram 3 of a UPF network element in a broadcast scenario according to an embodiment of this application.

For example, it is assumed that the context information that is of the 5GLAN group and that is stored on the GMF network element before the first terminal accesses the network is shown in Table 4. Network access manners for the terminal 5 and the terminal 2 in Table 4 are similar to those for the terminal 2 and the terminal 5 in steps S1206b to S1210b. A rule group 22 is configured on a session port 22 on the UPF network element 2, a rule group 52 is configured on a session port 52 on the UPF network element 2, and a group FAR 2 is configured on the UPF network element 2. The group FAR 2 includes an FA 4 and an FA 5, the rule group 22 includes an ingress PDR 22, an egress PDR 22, and an egress FAR 22, and the rule group 52 includes an ingress PDR 52, an egress PDR 52, and an egress FAR 52. To be specific, a schematic configuration diagram for a 5GLAN group on a UPF network element 2 is shown in FIG. 15(a). The FA 52 is used to duplicate a received broadcast packet belonging to the 5GLAN group corresponding to the 5GLAN ID and then send the broadcast packet to the session port 52. The FA 22 is used to duplicate a received broadcast packet belonging to the 5GLAN group corresponding to the 5GLAN ID and then send the broadcast packet to the session port 22.

Figure 15B:
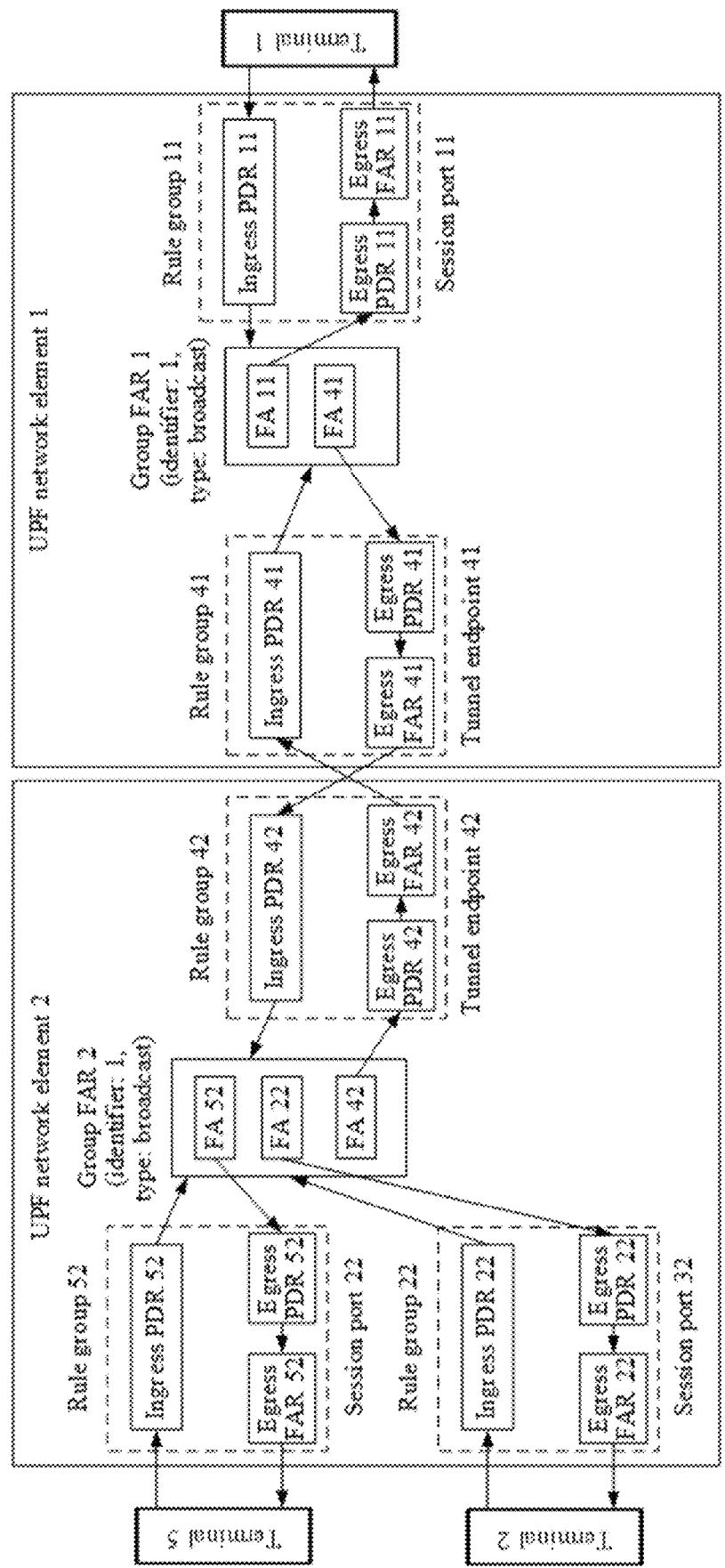

In this case, assuming that the first terminal is the terminal 1, and an identifier of the group FAR 1 is 1, based on the foregoing procedure, after the terminal 1 accesses the network, the identifier of the group FAR 1 is 1, and a schematic configuration diagram for 5GLAN groups on a UPF network element 1 and a UPF network element 2 may be shown in FIG. 15 (b).

Optionally, in this embodiment of this application, if the UPF network element 1 allocates a session port identifier 111 to the first session, there are two solutions in which the session port identifier 111 allocated by the UPF network element 1 is consistent with the session port identifier 11 allocated by the SMF network element to the first session.

In one solution, the UPF network element 1 maintains a correspondence between the session port identifier 111 allocated by the UPF network element 1 to the first session and the session port identifier 11 allocated by the SMF network element to the first session.

In the other solution, the UPF network element 1 updates a correspondence between the session port identifier 11 and the rule group 11 that are configured on the UPF network element 1 to a correspondence between the session port identifier 111 and the rule group 11, and the UPF network element 1 sends, to the SMF network element (for example, by using the N4 session establishment response message 1 in step S1210a or the N4 session establishment response message 2 in step S1212c), the session port identifier 111 allocated by the UPF network element 1 to the first session, so that the SMF network element deletes the session port identifier 11 allocated by the SMF network element to the first session, and uses the session port identifier 111 allocated by the UPF network element 1 to the first session. In addition, the SMF network element initiates an update request to the GMF network element, where the update request includes the session port identifier 111, so that the GMF network element can update the session port identifier 11 corresponding to the first session to the session port identifier 111.

S1216: Complete a remaining PDU session establishment process.

According to the group communications method, when a terminal in the 5GLAN group accesses the network, only a 5GLAN group FAR on an associated UPF network element needs to be adjusted (created or updated), and an ingress PDR, an egress PDR, and an egress FAR that are on the associated UPF network element and that correspond to the terminal member need to be adjusted (created or updated), but an ingress PDR, an egress PDR, and an egress FAR that correspond to another terminal member in the 5GLAN group remain unchanged. Therefore, when a relatively large number of terminal members belonging to the 5GLAN group access the network, a problem that configuration workload caused by a change in a quantity of terminal members is greatly increased can be avoided, and the configuration workload caused by the change in the quantity of terminal members can be greatly reduced.

The actions of the GMF network element, the SMF network element, the UPF network element 1, or the UPF network element 2 in steps S1201 to S1216 may be performed by the processor 1101 in the communications device 1100 shown in FIG. 11 by invoking the application program code stored in the memory 1103. This is not limited in this embodiment.

Figure 16:
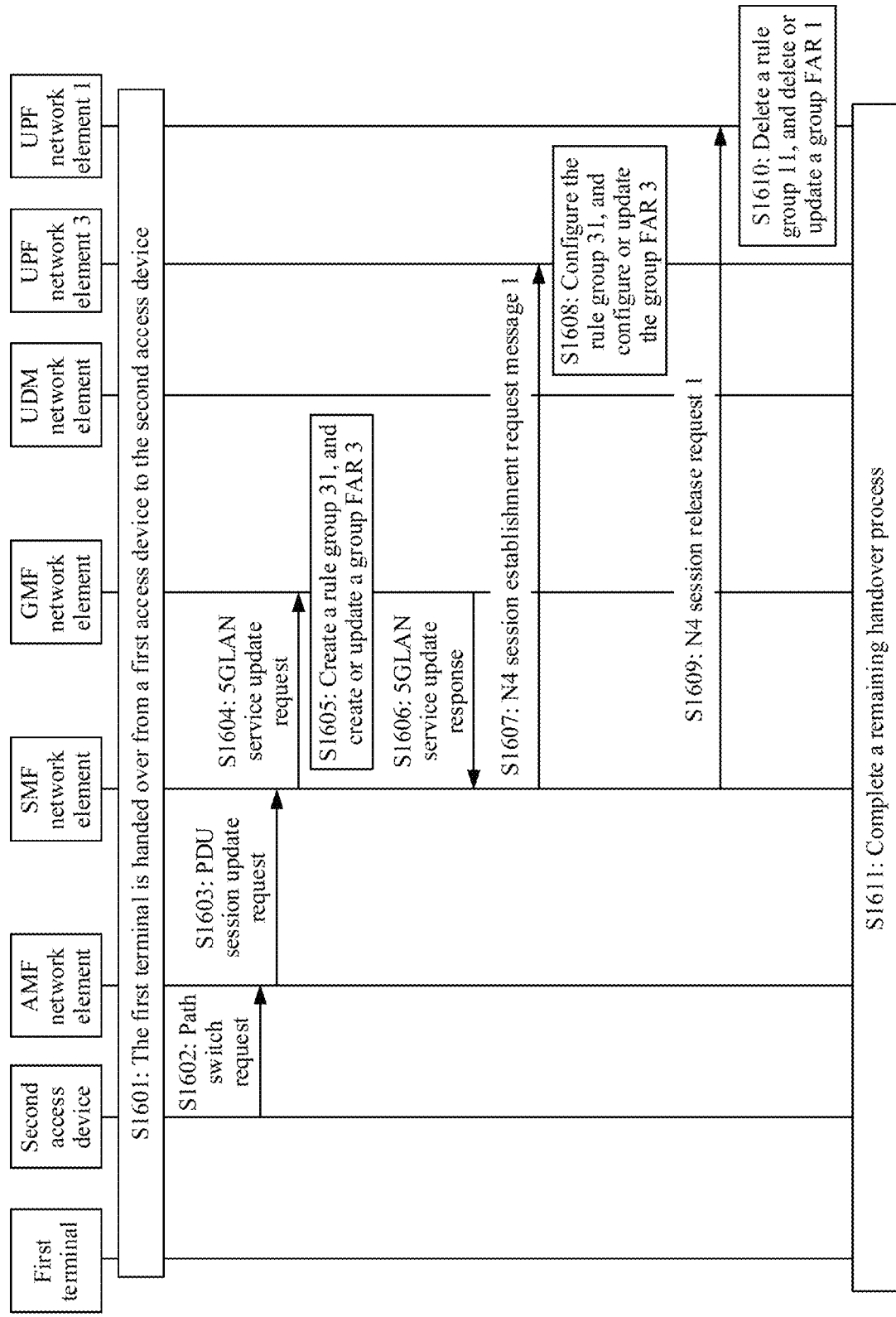
FIG. 16 is a schematic flowchart 2 of a group communications method according to an embodiment of this application.

Alternatively, scenarios in which the group communications system shown in FIG. 8 is applied to the 5G network shown in FIG. 9; the group management function network element is a GMF network element, the session management network element is an SMF network element, and the user plane network element is a UPF network element (for example, the first user plane network element is a UPF network element 1, the second user plane network element is a UPF network element 2, and the third user plane network element is a UPF network element 3); and the terminal member that belongs to the 5GLAN group and that has accessed the network moves are used as examples. FIG. 16 shows a group communications method according to an embodiment of this application. The group communications method includes the following steps.

Prerequisites: A first terminal has accessed the UPF network element 1, and a configuration for a 5GLAN group is created on the UPF network element 1 and includes a group FAR 1 and a related rule group; or a configuration for a 5GLAN group may be created on another UPF network element in the 5GLAN group and includes a related group FAR and a related rule group. For an establishment method, refer to the embodiment shown in FIG. 12A, FIG. 12B, and FIG. 12C. Details are not described herein again. The UPF network element 1 is connected to the UPF network element 2.

S1601: A first terminal is handed over from a first access device to a second access device.

S1602: The second access device sends a path switch request to an AMF network element. Correspondingly, the AMF network element receives the path switch request from the second access device.

Optionally, the path switch request may alternatively be replaced with a handover announcement. This is not specifically limited in this embodiment of this application.

S1603: The AMF network element sends a PDU session update request to an SMF network element. Correspondingly, the SMF network element receives the PDU session update request from the AMF network element.

Optionally, the PDU session update request may alternatively be replaced with a PDU session SM context update request (PDU session SM context update request). This is not specifically limited in this embodiment of this application.

For specific implementation of steps S1601 to S1603, refer to an existing implementation. Details are not described herein.

S1604: The SMF network element determines, based on the PDU session update request, to update a UPF network element, for example, to change a UPF network element that serves the first terminal from a UPF network element 1 to a UPF network element 3. In addition, if the SMF network element determines that the first terminal initiates 5GLAN group communication, the SMF network element sends a 5GLAN service update request to a GMF network element. Correspondingly, the GMF network element receives the 5GLAN service update request from the SMF network element.

The 5GLAN service update request includes an identifier of the first terminal, an identifier of the UPF network element 3 (namely, a target UPF network element), and a session port identifier 11 of a first session.

Optionally, the 5GLAN service update request may further include an identifier of the UPF network element 1 (namely, a source UPF network element).

51605: If the GMF network element learns, based on the 5GLAN service update request, that the UPF network element that serves the first terminal is changed from the UPF network element 1 to the UPF network element 3, the GMF network element creates, for the 5GLAN group, a rule group 31 applied to a session port 31 on the UPF network element 3, and creates or updates, for the 5GLAN group based on context information of the 5GLAN group, a 5GLAN group FAR applied to the UPF network element 3, where the 5GLAN group FAR is denoted as a group FAR 3. The created or updated group FAR 3 includes a rule used to duplicate a received broadcast packet belonging to the 5GLAN group and then send the broadcast packet to the session port 31 on the UPF network element 3.

Optionally, in this embodiment of this application, when the GMF network element determines, based on the context information that is of the 5GLAN group and that is stored on the GMF network element, that another terminal in a terminal member list corresponding to the 5GLAN group accesses the UPF network element 1, the GMF network element further updates, for the 5GLAN group, a group FAR 1 applied to the UPF network element 1. A rule that is in the updated group FAR 1 and that is used to duplicate a received broadcast packet belonging to the 5GLAN group and then send the broadcast packet to a session port 11 on the UPF network element 1 is deleted.

For related descriptions of the context information of the 5GLAN group, refer to the embodiment shown in FIG. 12A, FIG. 12B, and FIG. 12C. Details are not described herein again.

S1606: The GMF network element sends a 5GLAN service update response to the SMF network element. Correspondingly, the SMF network element receives the 5GLAN service update response from the GMF network element.

The 5GLAN service update response includes an identifier of the UPF network element 3, and the group FAR 3, a session port identifier 31, and the rule group 31 that correspond to the identifier of the UPF network element 3, and is used to configure the rule group 31 on the session port 31 on the UPF network element 3, and configure or update the group FAR 3 on the UPF network element 3. In addition, the 5GLAN service update response includes an identifier of the UPF network element 1 and the session port identifier 11 corresponding to the identifier of the UPF network element 1, and is used to delete the session port 11 on the UPF network element 1 and a rule group 11 on the session port 11. Optionally, the 5GLAN service update response may include an identifier of the rule group 11. This is not specifically limited in this embodiment of this application.

In addition, when the GMF network element determines, based on the context information that is of the 5GLAN group and that is stored on the GMF network element, that no other terminal in the terminal member list corresponding to the 5GLAN group accesses the UPF network element 1, the 5GLAN service update response further includes an identifier that is of the group FAR 1 and that corresponds to the identifier of the UPF network element 1, and is used to delete the group FAR 1 on the UPF network element 1. Alternatively, when the GMF network element determines, based on the context information that is of the 5GLAN group and that is stored on the GMF network element, that another terminal in the terminal member list corresponding to the 5GLAN group accesses the UPF network element 1, the 5GLAN service update response further includes the updated group FAR 1 corresponding to the identifier of the UPF network element 1, and is used to update the group FAR 1 on the UPF network element 1.

S1607: The SMF network element sends an N4 session establishment request message 1 to the corresponding UPF network element 3 based on the identifier that is of the UPF network element 3 and that is in the 5GLAN service update response. Correspondingly, the UPF network element 3 receives the N4 session establishment request message 1 from the SMF network element.

The N4 session establishment request message 1 includes configuration information, and the configuration information includes the group FAR 3, the session port identifier 31, and the rule group 31 that correspond to the identifier of the UPF network element 3.

S1608: The UPF network element 3 establishes a first session, configures the rule group 31 on the session port 31 on the UPF network element 3 based on the session port identifier 31 and the rule group 31 in the configuration information in step S1607, and configures or updates the group FAR 3 on the UPF network element 3 based on the group FAR 3 in the configuration information in step S1607.

In this embodiment of this application, that the UPF network element 3 establishes a first session includes: creating the session port 31 based on the session port identifier 31. For related descriptions, refer to the descriptions in the foregoing embodiments. Details are not described herein again.

S1609: The SMF network element sends an N4 session release request 1 to the corresponding UPF network element 1 based on the identifier that is of the UPF network element 1 and that is in the 5GLAN service update response. Correspondingly, the UPF network element 1 receives the N4 session release request 1 from the SMF network element.

When another terminal currently accesses the UPF network element 1, the N4 session release request 1 includes an indication information 1, and the indication information 1 includes the session port identifier 11 and the updated group FAR 1 that correspond to the identifier of the UPF network element 1.

Alternatively, when no other terminal currently accesses the UPF network element 1, the N4 session release request 1 includes indication information 2, and the indication information 2 includes the session port identifier 11 and the identifier of the group FAR 1 that correspond to the identifier of the UPF network element 1. Optionally, the N4 session release request 1 may include the identifier of the rule group 11. This is not specifically limited in this embodiment of this application.

S1610: The UPF network element 1 releases the first session, and deletes the session port 11 on the UPF network element 1 and the rule group 11 on the session port 11 based on the session port identifier 11 in the indication information 1 or the indication information 2. In addition, the UPF network element 1 updates the group FAR 1 on the UPF network element 1 based on the updated group FAR 1 in the indication information 1, or the UPF network element 1 deletes the group FAR 1 on the UPF network element 1 based on the identifier that is of the group FAR 1 and that is in the indication information 2.

In this embodiment of this application, that the UPF network element 1 releases the first session includes: deleting the session port 11 based on the session port identifier 11.

Figure 17A:
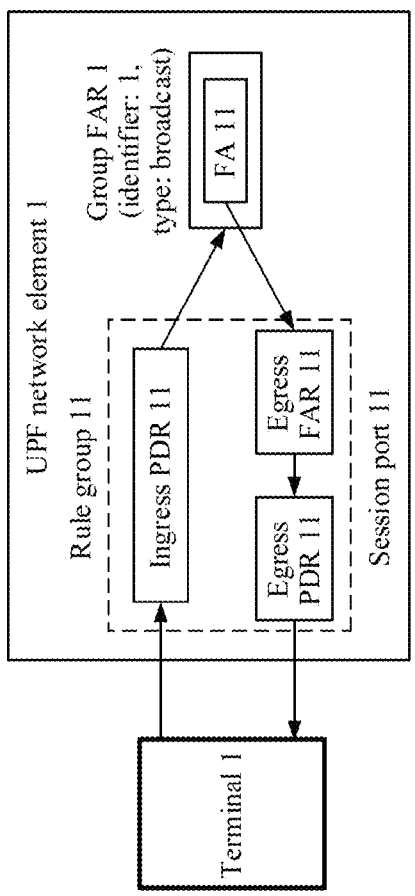
FIG. 17(a) and FIG. 17(b) are a schematic configuration diagram 4 of a UPF network element in a broadcast scenario according to an embodiment of this application.
Figure 17B:
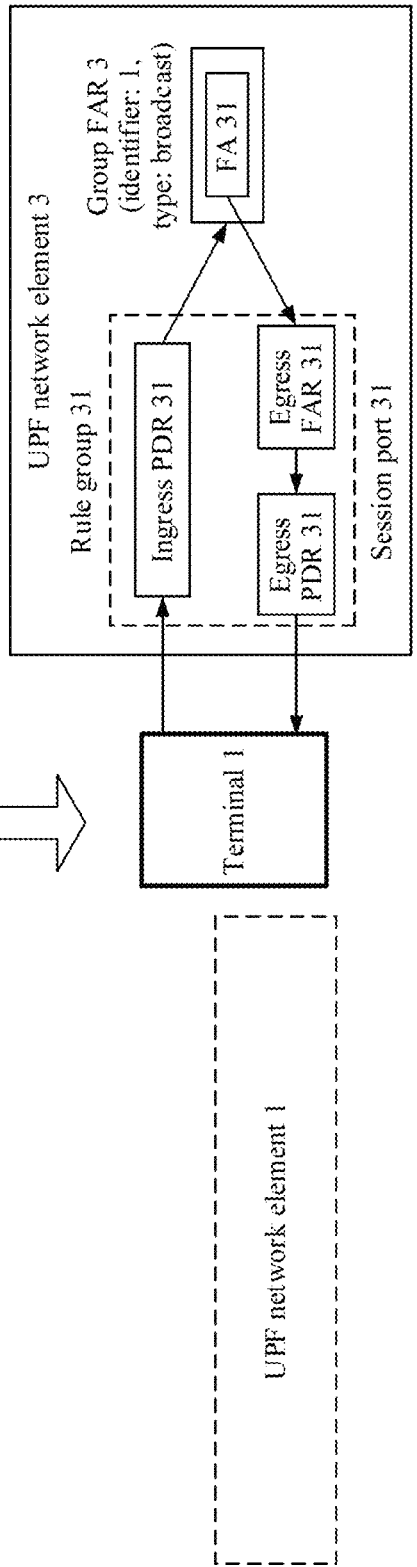

For example, assuming that the first terminal is a terminal 1, before the first terminal moves in a 5GLAN group, a schematic configuration diagram of a 5GLAN group on a UPF network element 1 may be shown in FIG. 17(*a*). A rule group 11 is configured on a session port 11 on the UPF network element 1, and a group FAR 1 is configured on the UPF network element 1. The rule group 11 includes an ingress PDR 11, an egress PDR 11, and an egress FAR 11. The group FAR 1 includes an FA 11. The FA 11 is used to duplicate a received broadcast packet belonging to a 5GLAN group corresponding to a 5GLAN ID and then send the broadcast packet to the session port 11. In this case, based on the foregoing procedure, after the first terminal moves in the 5GLAN group, a schematic configuration diagram of 5GLAN groups on the UPF network element 1 and a UPF network element 3 may be shown in FIG. 17(*b*).

It should be noted that related descriptions of the schematic configuration diagram of the 5GLAN group on the UPF network element selected by a terminal member that belongs to the 5GLAN group and that has accessed a network before the first terminal moves in the 5GLAN group are merely provided herein. Before the first terminal moves in the 5GLAN group or before the first terminal is disconnected from a network (that is, releases a first session of the first terminal) in the following embodiment shown in FIG. 23A and FIG. 23B, for subsequent descriptions of a similar schematic configuration diagram of the 5GLAN group on the UPF network element, reference may be made to the descriptions herein. Unified descriptions are provided herein, and details are not described below.

Figure 18A:
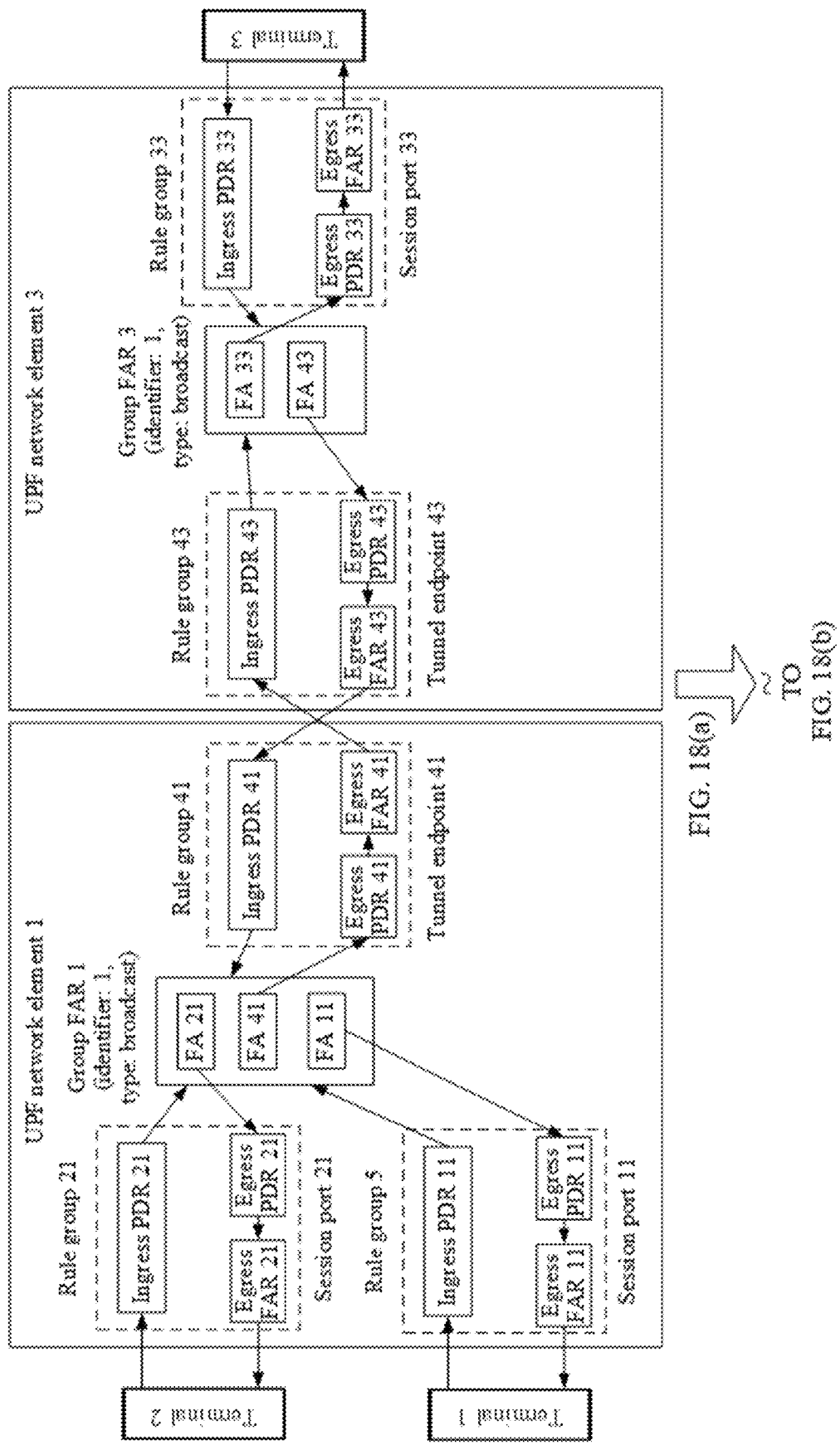
FIG. 18(a) and FIG. 18(b) are a schematic configuration diagram 5 of a UPF network element in a broadcast scenario according to an embodiment of this application.
Figure 18B:
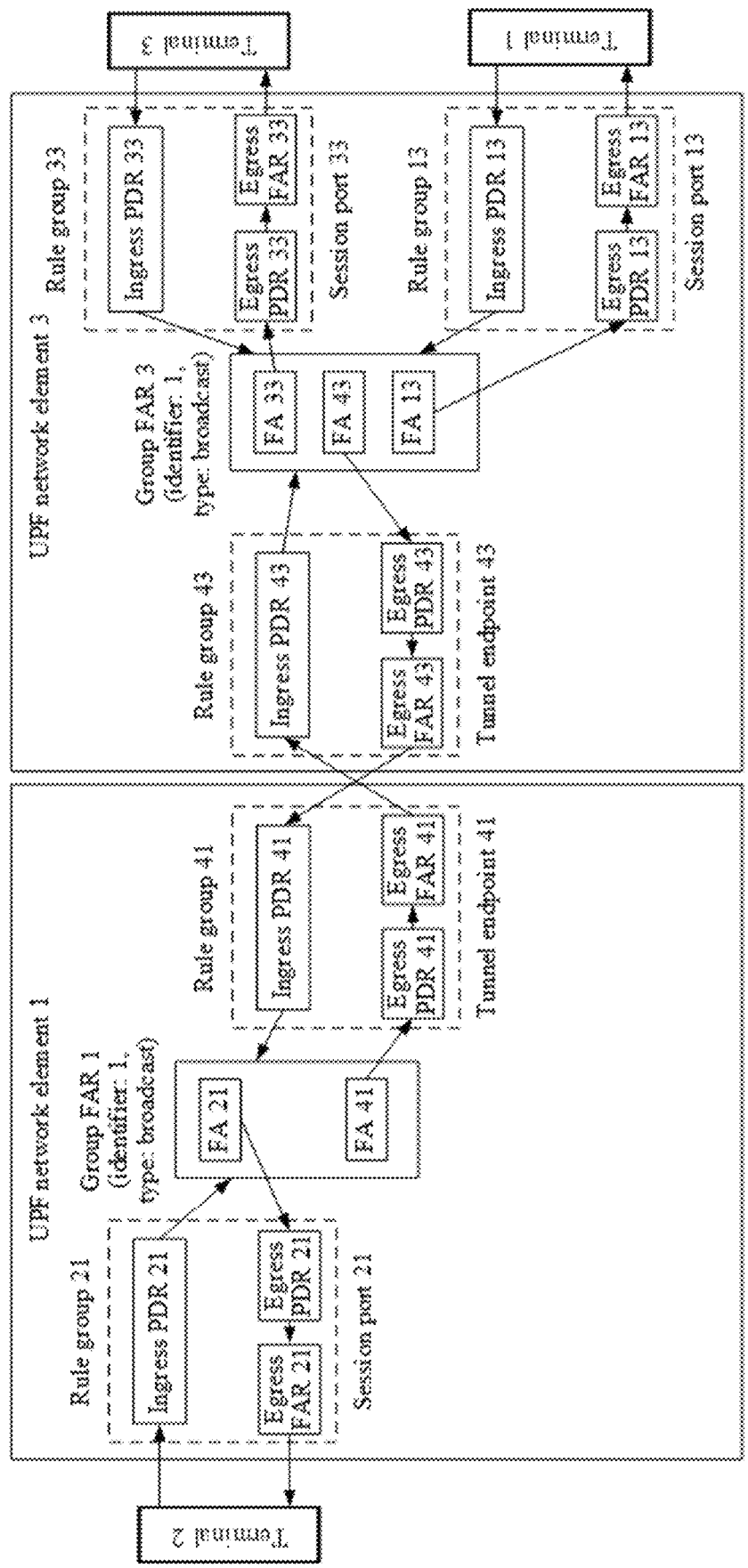

Alternatively, for example, assuming that the first terminal is a terminal 1, before the first terminal moves in a 5GLAN group, a schematic configuration diagram of a 5GLAN group on a UPF network element 1 may be shown in FIG. 18(*a*). In this case, based on the foregoing procedure, after the first terminal moves in the 5GLAN group, a schematic configuration diagram of 5GLAN groups on the UPF network element 1 and a UPF network element 3 may be shown in FIG. 18(*b*).

Optionally, in this embodiment of this application, when no other terminal currently accesses the UPF network element 1, but an identifier of a UPF network element selected by a terminal that is in a terminal member list corresponding to the 5GLAN group and that has currently accessed a network includes an identifier of another UPF network element different from the UPF network element 1, if the UPF network element that serves the first terminal is updated from the UPF network element 1 to the UPF network element 3, the GMF network element further needs to indicate, by using the SMF network element, the UPF network element 1 and the another UPF network element to delete a corresponding tunnel endpoint of the 5GLAN group and a rule group on the tunnel endpoint, delete a group FAR applied to the UPF network element 1, and update a group FAR applied to the another UPF network element. An implementation is similar to that in steps S1609 and S1610. Details are not described herein again.

Figures 1, 19A:
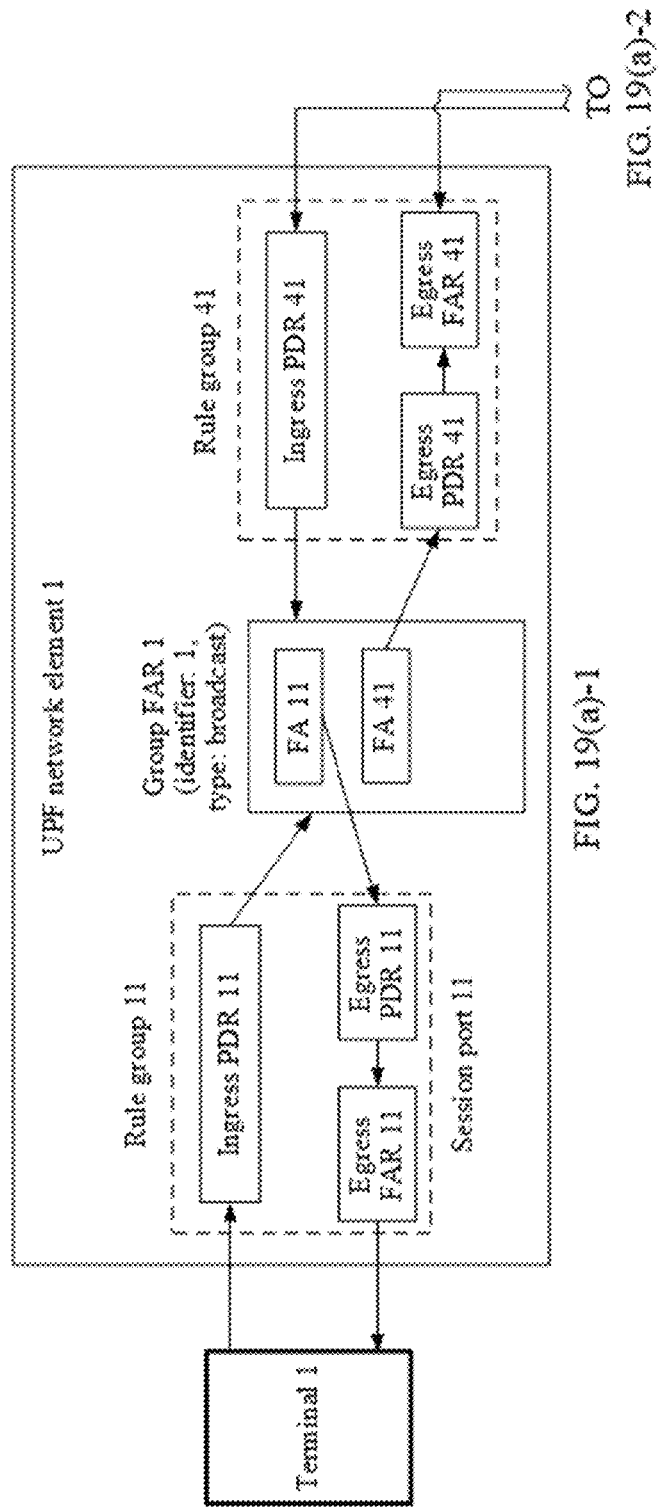
Figure 19B:
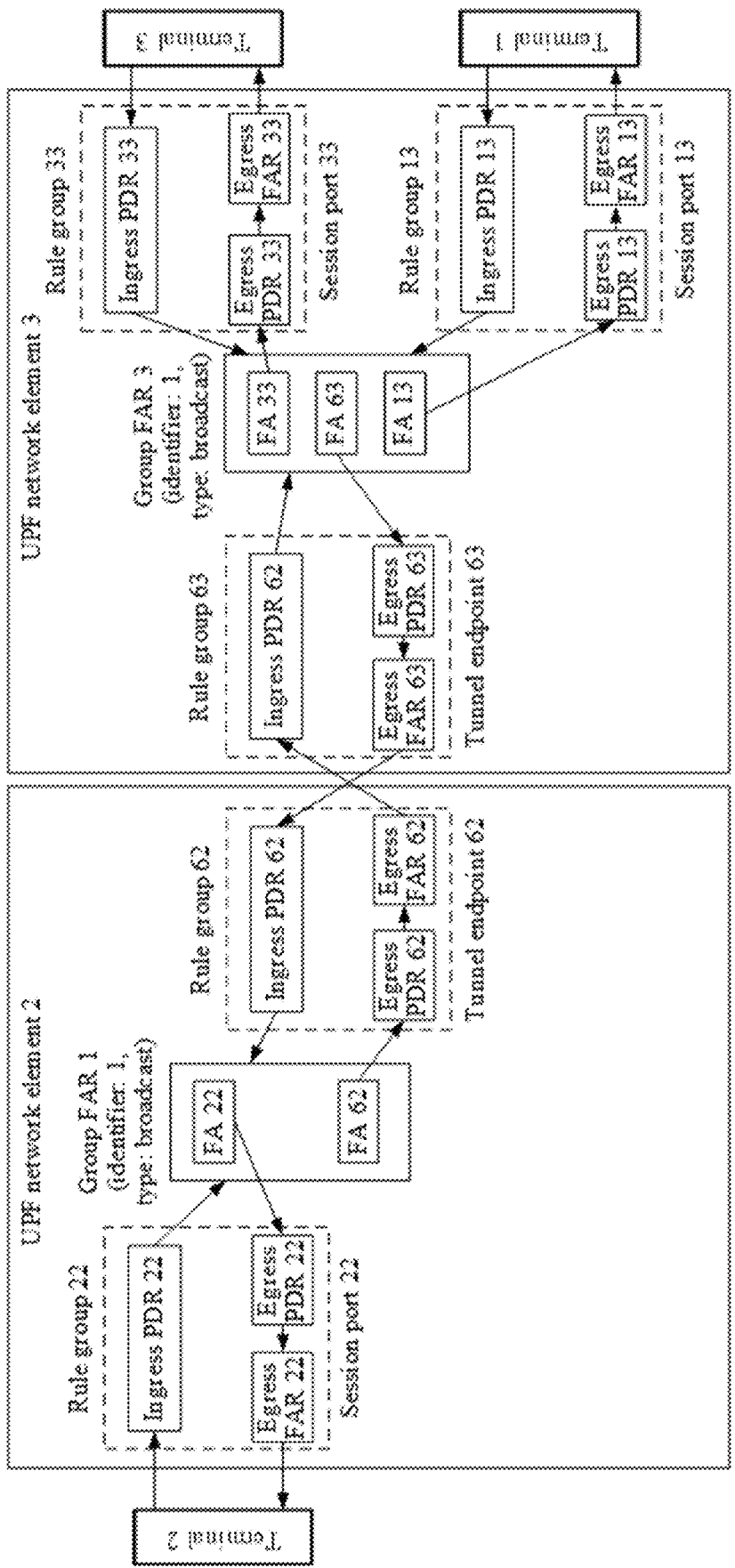

For example, assuming that the first terminal is a terminal 1, before the first terminal moves in a 5GLAN group, when identifiers of UPF network elements selected by a terminal that is in a terminal member list corresponding to the 5GLAN group and that has currently accessed a network include an identifier of a UPF network element 1, an identifier of a UPF network element 2, and an identifier of a UPF network element 3, a schematic configuration diagram of 5GLAN groups on the UPF network element 1, the UPF network element 2, and the UPF network element 3 is shown in FIG. 19(*a*)-1 and FIG. 19(*a*)-2. In this case, based on the foregoing procedure, after the first terminal moves in the 5GLAN group, a schematic configuration diagram of a 5GLAN group on each UPF network element is shown in FIG. 19(*b*). It can be learned that both a rule group 41 on a tunnel endpoint 41 and a rule group 43 on a tunnel endpoint 43 that correspond to a tunnel between the UPF network element 1 and the UPF network element 3 are deleted, and a group FAR 3 on the UPF network element 3 is also updated. An FA 43 in the group FAR 3 is deleted, and the FA 43 is used to duplicate a received broadcast packet belonging to the 5GLAN group and then send the broadcast packet to the tunnel endpoint 43 on the UPF network element 3. In addition, there is no configuration for the 5GLAN group on the UPF network element 1 temporarily, and therefore details are not shown in FIG. 19(*b*).

Figure 20A:
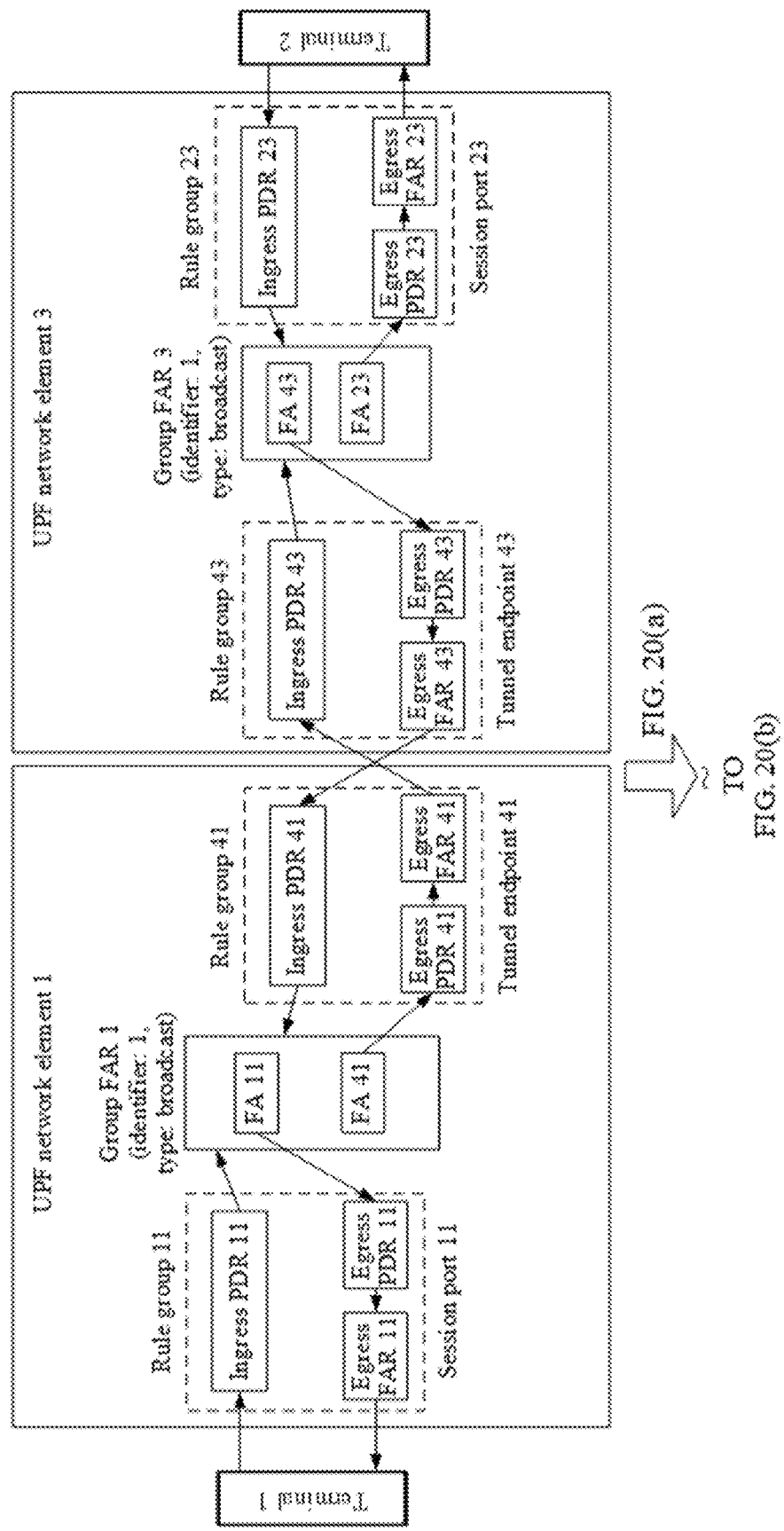
FIG. 20(a) and FIG. 20(b) are a schematic configuration diagram 7 of a UPF network element in a broadcast scenario according to an embodiment of this application.
Figure 20B:
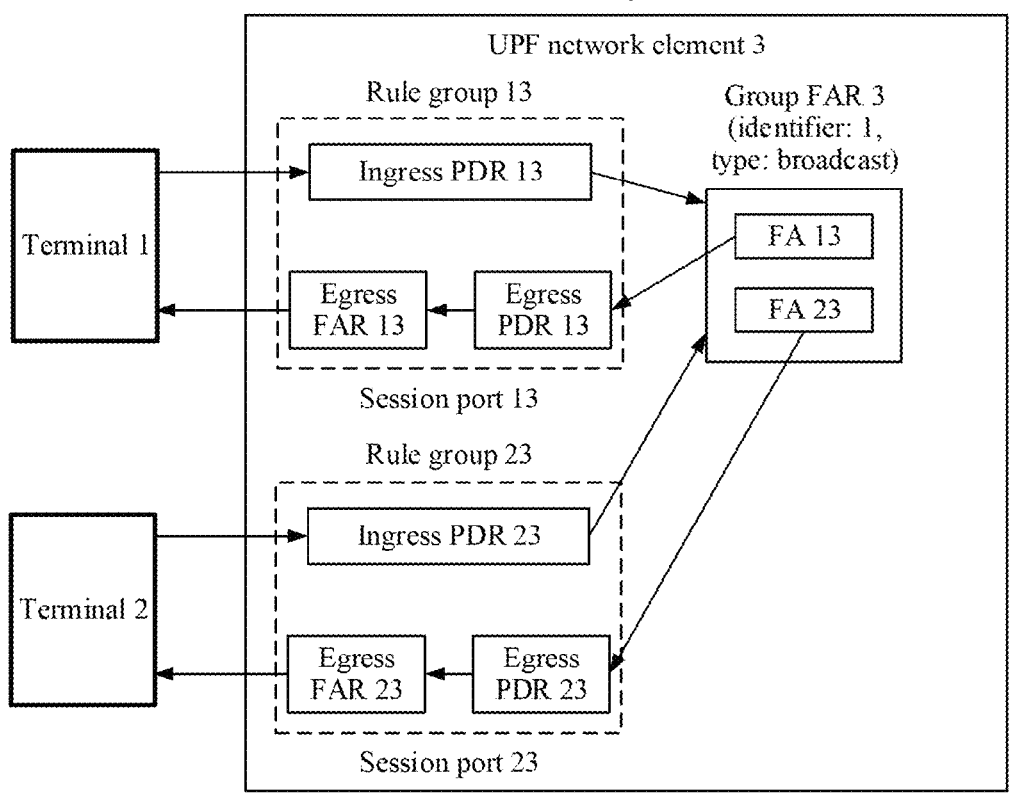

Alternatively, for example, assuming that the first terminal is a terminal 1, before the first terminal moves in a 5GLAN group, when identifiers of UPF network elements selected by a terminal that is in a terminal member list corresponding to the 5GLAN group and that has currently accessed a network include an identifier of a UPF network element 1 and an identifier of a UPF network element 3, a schematic configuration diagram of 5GLAN groups on the UPF network element 1 and the UPF network element 3 is shown in FIG. 20(*a*). In this case, based on the foregoing procedure, after the first terminal moves in the 5GLAN group, a schematic configuration diagram of a 5GLAN group on each UPF network element is shown in FIG. 20(*b*). It can be learned that both a rule group 41 on a tunnel endpoint 41 and a rule group 43 on a tunnel endpoint 43 that correspond to a tunnel between the UPF network element 1 and the UPF network element 3 are deleted, and a group FAR 3 on the UPF network element 3 is also updated. An FA 43 in the group FAR 3 is deleted, and the FA 43 is used to duplicate a received broadcast packet belonging to the 5GLAN group and then send the broadcast packet to the tunnel endpoint 43 on the UPF network element 3. In addition, there is no configuration for the 5GLAN group on the UPF network element 1 temporarily, and therefore details are not shown in FIG. 20(*b*).

Optionally, in this embodiment of this application, when an identifier of a UPF network element selected by a terminal that is in a terminal member list corresponding to the 5GLAN group and that has currently accessed a network does not include the UPF network element 3, if the UPF network element that serves the first terminal is updated from the UPF network element 1 to the UPF network element 3, the GMF network element further needs to request the SMF network element to establish a tunnel between the UPF network element 3 and another UPF network element, and after receiving a tunnel endpoint identifier from the SMF network element, configures, by using the SMF network element, rule groups applied to tunnel endpoints on the UPF network element 3 and the another UPF network element, creates a group FAR 3 applied to the UPF network element 3, and updates a group FAR applied to the another UPF network element. The another UPF network element herein may be, for example, the UPF network element 1, or the UPF network element other than the UPF network element 1 in the identifier of the UPF network element selected by the terminal that is in the terminal member list corresponding to the 5GLAN group and that has currently accessed the network. An implementation is similar to that in steps S1607 and S1608. Details are not described herein again.

For example, assuming that the first terminal is a terminal 1, before the first terminal moves in a 5GLAN group, when an identifier of a UPF network element selected by a terminal that is in a terminal member list corresponding to the 5GLAN group and that has currently accessed a network includes only an identifier of a UPF network element 1, a schematic configuration diagram of a 5GLAN group on the UPF network element 1 is shown in FIG. 21(*a*). In this case, based on the foregoing procedure, after the first terminal moves in the 5GLAN group, a schematic configuration diagram of a 5GLAN group on each UPF network element is shown in FIG. 21(*b*). It can be learned that a rule group 41 that is on a tunnel endpoint 41 and that corresponds to a tunnel between the UPF network element 1 and the UPF network element 3 is configured on the UPF network element 1, and a rule group 43 that is on a tunnel endpoint 43 and that corresponds to the tunnel between the UPF network element 1 and the UPF network element 3 is configured on the UPF network element 3. A group FAR 3 is configured on the UPF network element 3, and a group FAR 1 on the UPF network element 1 is also updated. An FA 41 is newly added to the group FAR 1, and the FA 41 is used to duplicate a received broadcast packet belonging to the 5GLAN group and then send the broadcast packet to the tunnel endpoint 41 on the UPF network element 1.

Figure 22A:
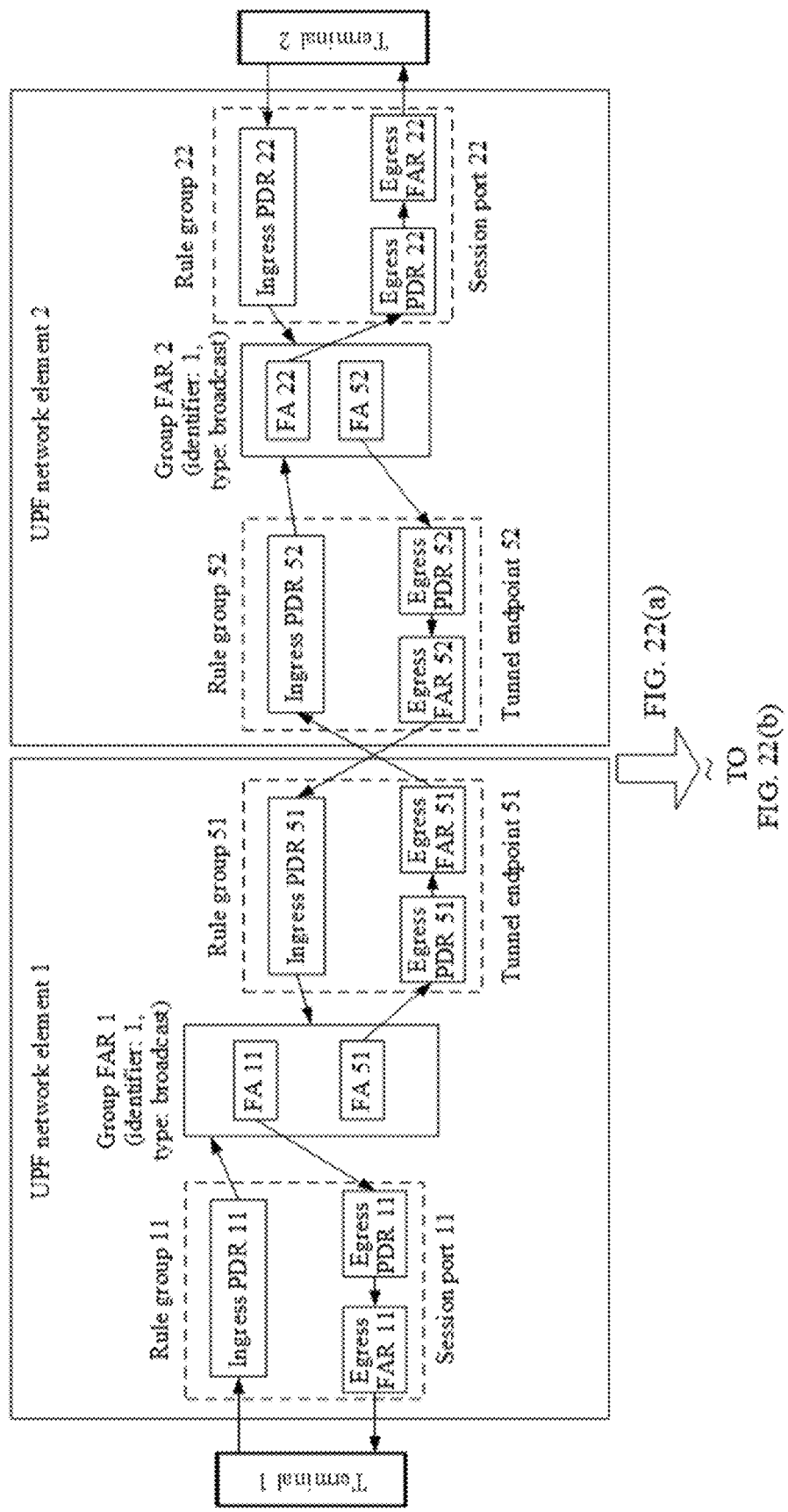
FIG. 22(a) and FIG. 22(b) are a schematic configuration diagram 9 of a UPF network element in a broadcast scenario according to an embodiment of this application.
Figure 22B:
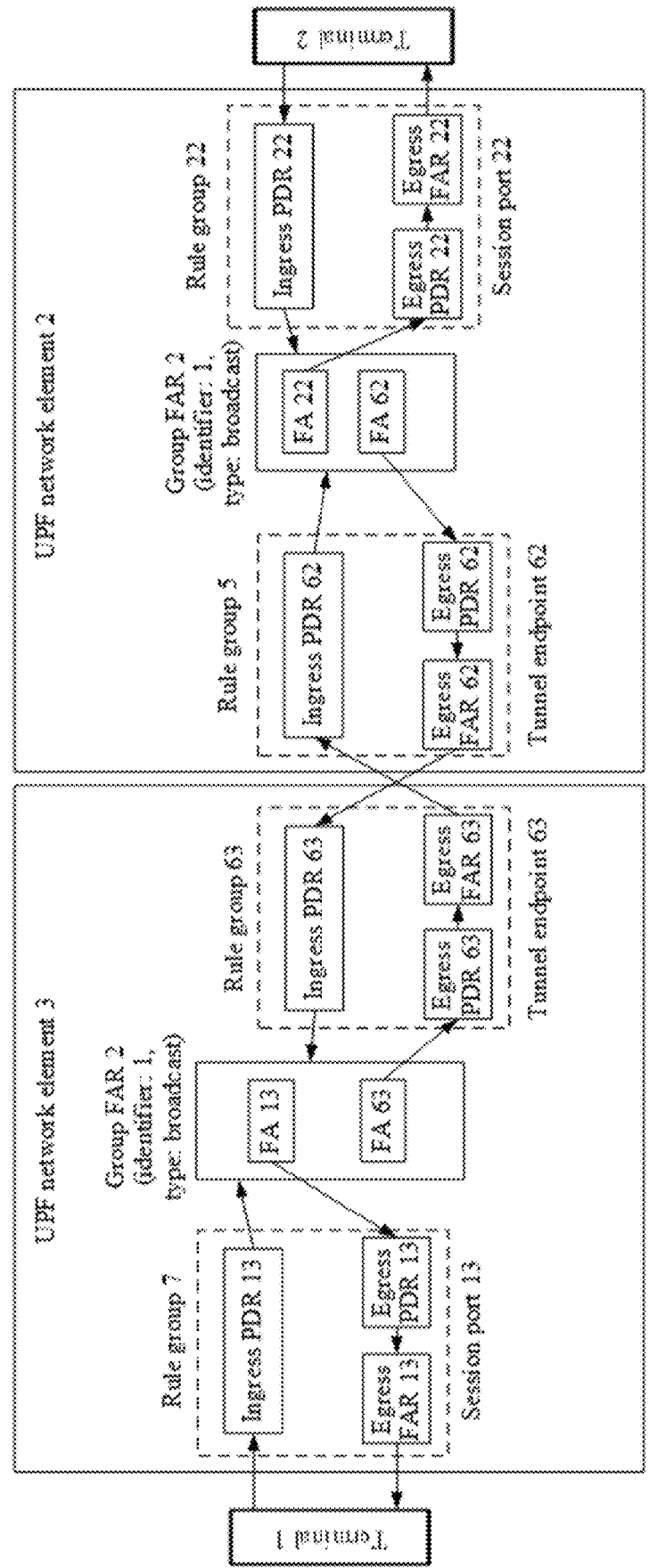

Alternatively, for example, assuming that the first terminal is a terminal 1, before the first terminal moves in a 5GLAN group, when identifiers of UPF network elements selected by a terminal that is in a terminal member list corresponding to the 5GLAN group and that has currently accessed a network include an identifier of a UPF network element 1 and an identifier of a UPF network element 2, a schematic configuration diagram of 5GLAN groups on the UPF network element 1 and the UPF network element 2 is shown in FIG. 22(*a*). In this case, based on the foregoing procedure, after the first terminal moves in the 5GLAN group, a schematic configuration diagram of a 5GLAN group on each UPF network element is shown in FIG. 22(*b*). It can be learned that a rule group 62 that is on a tunnel endpoint 62 and that corresponds to a tunnel between the UPF network element 2 and the UPF network element 3 is configured on the UPF network element 2, and a rule group 63 that is on a tunnel endpoint 63 and that corresponds to the tunnel between the UPF network element 2 and the UPF network element 3 is configured on the UPF network element 3. A group FAR 3 is configured on the UPF network element 3, and a group FAR 2 on the UPF network element 2 is also updated. An FA 62 is newly added to the group FAR 2, and the FA 62 is used to duplicate a received broadcast packet belonging to the 5GLAN group and then send the broadcast packet to the tunnel endpoint 62 on the UPF network element 2. In addition, in the embodiment shown in FIG. 22(*a*) and FIG. 22(*b*), after the first terminal moves, when no other terminal currently accesses the UPF network element 1, a rule group 51 on a tunnel endpoint 51 and a rule group 52 on a tunnel endpoint 52 that correspond to a tunnel between the UPF network element 1 and the UPF network element 2 need to be deleted, and an FA 52 in a group FAR 2 is deleted, where the FA 52 is used to duplicate a received broadcast packet belonging to the 5GLAN group and then send the broadcast packet to the tunnel endpoint 52 on the UPF network element 2. For related implementation, refer to the foregoing embodiment. Details are not described herein again.

S1611: Complete a remaining handover process.

According to the group communications method, when a terminal member that belongs to the 5GLAN group and that has accessed a network moves in the 5GLAN group, only a 5GLAN group FAR on an associated UPF network element needs to be adjusted (created, updated, or deleted), and an ingress PDR, an egress PDR, and an egress FAR that are on the associated UPF network element and that correspond to the terminal member need to be adjusted (created, updated, or deleted), but an ingress PDR, an egress PDR, and an egress FAR that correspond to another terminal member that belongs to the 5GLAN group and that has accessed the network remain unchanged. Therefore, when a relatively large number of terminal members belonging to the 5GLAN group access the network, a problem that configuration workload caused by a change in a quantity of terminal members is greatly increased can be avoided, and the configuration workload caused by the change in the quantity of terminal members can be greatly reduced.

The actions of the GMF network element, the SMF network element, the UPF network element 1, or the UPF network element 3 in steps S1601 to S1611 may be performed by the processor 1101 in the communications device 1100 shown in FIG. 11 by invoking the application program code stored in the memory 1103. This is not limited in this embodiment.

Figure 23A:
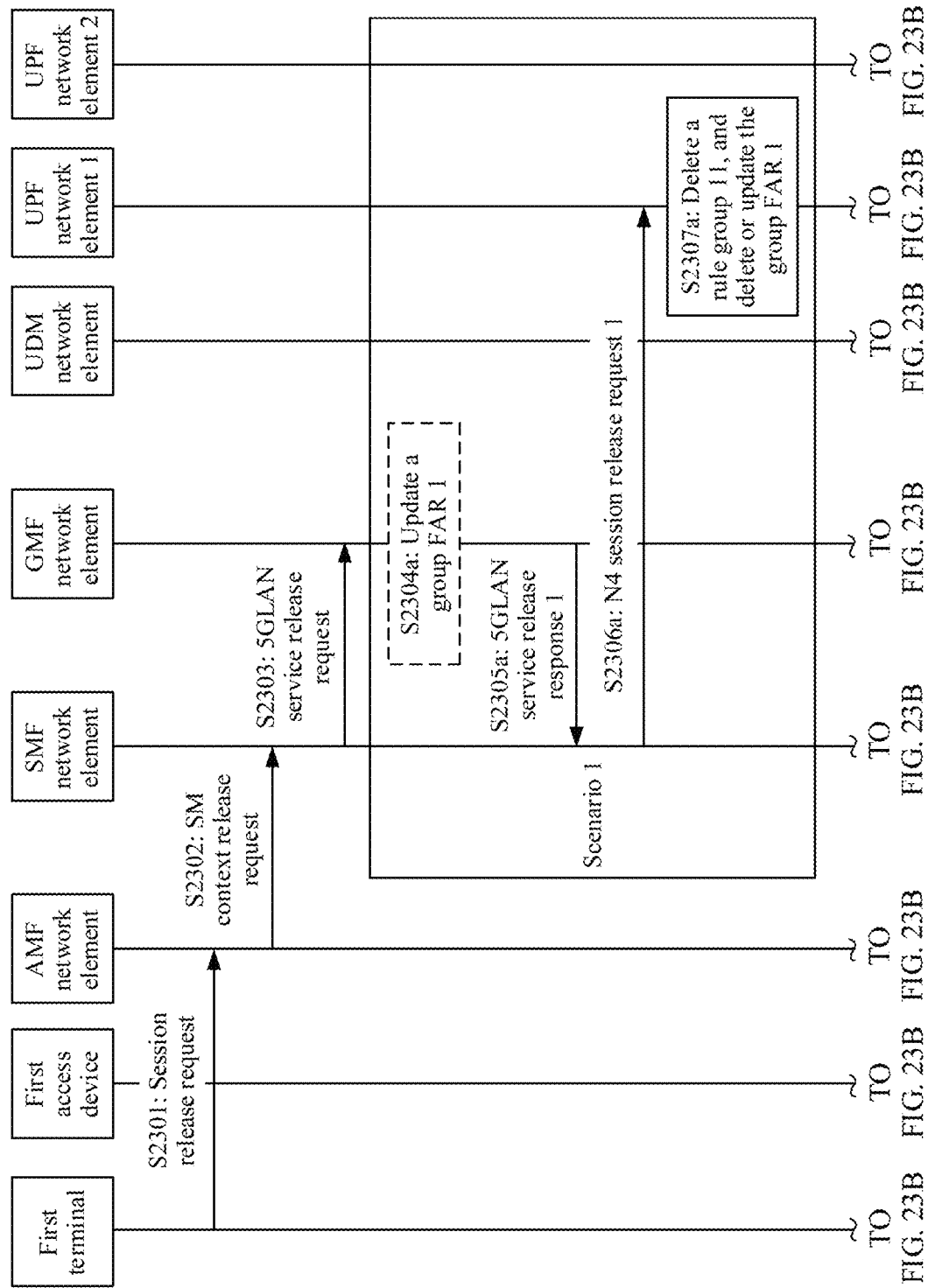
FIG. 23A and FIG. 23B are a schematic flowchart 3 of a group communications method according to an embodiment of this application.
Figure 23B:
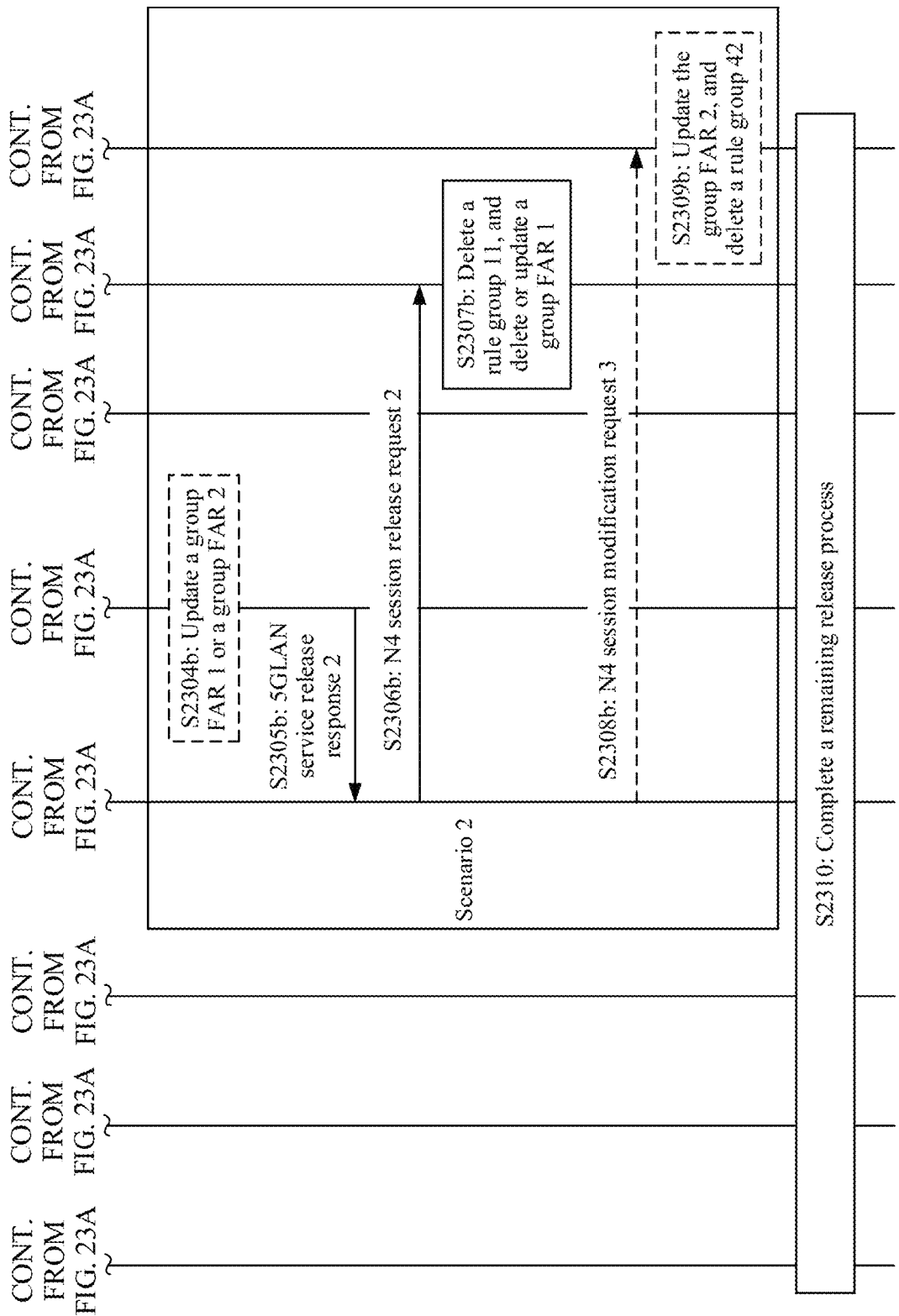

Alternatively, scenarios in which the group communications system shown in FIG. 8 is applied to the 5G network shown in FIG. 9; the group management function network element is a GMF network element, the session management network element is an SMF network element, and the user plane network element is a UPF network element (for example, the first user plane network element is a UPF network element 1, the second user plane network element is a UPF network element 2, and the third user plane network element is a UPF network element 3); and the terminal member in the 5GLAN group is disconnected from the network are used as examples. FIG. 23A and FIG. 23B show a group communications method according to an embodiment of this application. The group communications method includes the following steps.

Prerequisites: A first terminal has accessed the UPF network element 1, and a configuration for a 5GLAN group is created on the UPF network element 1 and includes a group FAR 1 and a related rule group; or a configuration for a 5GLAN group may be created on another UPF network element in the 5GLAN group and includes a related group FAR and a related rule group. For an establishment method, refer to the embodiment shown in FIG. 12 FIG. 12A, FIG. 12B, and FIG. 12C. Details are not described herein again. The UPF network element 1 is connected to the UPF network element 2.

S2301: A first terminal sends a session release request to an AMF network element. Correspondingly, the AMF network element receives the session release request from the first terminal.

S2302: The AMF network element sends an SM context update request to an SMF network element. Correspondingly, the SMF network element receives the SM context update request from the AMF network element.

Optionally, the SM context update request may alternatively be replaced with a PDU session update request. This is not specifically limited in this embodiment of this application.

For specific implementation of steps S2301 and S2302, refer to an existing implementation. Details are not described herein.

S2303: If the SMF network element determines that the first terminal initiates 5GLAN group communication, the SMF network element sends a 5GLAN service release request to a GMF network element. Correspondingly, the GMF network element receives the 5GLAN service release request from the SMF network element.

The 5GLAN service release request is used to indicate to release a first session of the first terminal.

In a possible implementation, the 5GLAN service release request has a function of indicating to release a session. In this case, the 5GLAN service release request may include an identifier of the first terminal. Alternatively, in a possible implementation, the 5GLAN service release request includes indication information and an identifier of the first terminal, and the indication information is used to indicate to release a session.

Optionally, the 5GLAN service release request may further include an identifier of a UPF network element 1 accessed by the first terminal when the first terminal accesses a network. This is not specifically limited in this embodiment of this application.

The GMF network element learns, based on the 5GLAN service release request, that the first terminal is to release the first session, and may further perform a related operation. The following continues to describe, in two scenarios, the group communications method provided in this embodiment of this application.

In a scenario 1, when the GMF network element determines, based on context information that is of a 5GLAN group and that is stored on the GMF network element, that no other terminal in a terminal member list corresponding to the 5GLAN group accesses another UPF network element, the group communications method provided in this embodiment of this application further includes steps S2304a to S2307a.

S2304a: Optionally, when the GMF network element determines, based on the context information that is of the 5GLAN group and that is stored on the GMF network element, that another terminal in the terminal member list corresponding to the 5GLAN group accesses the UPF network element 1, the GMF network element further updates, for the 5GLAN group, a group FAR 1 applied to the UPF network element 1. A rule that is in the updated group FAR 1 and that is used to duplicate a received broadcast packet belonging to the 5GLAN group and then send the broadcast packet to a session port 11 on the UPF network element 1 is deleted.

For related descriptions of the context information of the 5GLAN group, refer to the embodiment shown in FIG. 12A, FIG. 12B, and FIG. 12C. Details are not described herein again.

S2305a: The GMF network element sends a 5GLAN service release response 1 to the SMF network element. Correspondingly, the SMF network element receives the 5GLAN service release response 1 from the GMF network element.

The 5GLAN service release response 1 includes an identifier of the UPF network element 1 and a session port identifier 11 corresponding to the identifier of the UPF network element 1, and is used to delete the session port 11 on the UPF network element 1 and a rule group 11 on the session port 11. Optionally, the 5GLAN service release response 1 may include an identifier of the rule group 11. This is not specifically limited in this embodiment of this application.

In addition, when the GMF network element determines, based on the context information that is of the 5GLAN group and that is stored on the GMF network element, that no other terminal in the terminal member list corresponding to the 5GLAN group accesses the UPF network element 1, the 5GLAN service release response 1 further includes an identifier that is of the group FAR 1 and that corresponds to the identifier of the UPF network element 1, and is used to delete the group FAR 1 on the UPF network element 1. Alternatively, when the GMF network element determines, based on the context information that is of the 5GLAN group and that is stored on the GMF network element, that another terminal in the terminal member list corresponding to the 5GLAN group accesses the UPF network element 1, the 5GLAN service release response 1 further includes the updated group FAR 1 corresponding to the identifier of the UPF network element 1, and is used to update the group FAR 1 on the UPF network element 1.

S2306a: The SMF network element sends an N4 session release request 1 to the corresponding UPF network element 1 based on the identifier that is of the UPF network element 1 and that is in the 5GLAN service release response 1. Correspondingly, the UPF network element 1 receives the N4 session release request 1 from the SMF network element.

When another terminal currently accesses the UPF network element 1, the N4 session release request 1 includes an indication information 1, and the indication information 1 includes the session port identifier 11 and the updated group FAR 1 that correspond to the identifier of the UPF network element 1.

Alternatively, when no other terminal currently accesses the UPF network element 1, the N4 session release request 1 includes indication information 2, and the indication information 2 includes the session port identifier 11 and the identifier of the group FAR 1 that correspond to the identifier of the UPF network element 1.

Optionally, the N4 session release request 1 may include the identifier of the rule group 11. This is not specifically limited in this embodiment of this application.

S2307a: The UPF network element 1 releases the first session, and deletes the session port 11 on the UPF network element 1 and the rule group 11 on the session port 11 based on the session port identifier 11 in the indication information 1 or the indication information 2 and the identifier of the rule group 11. In addition, the UPF network element 1 updates the group FAR 1 on the UPF network element 1 based on the updated group FAR 1 in the indication information 1, or the UPF network element 1 deletes the group FAR 1 on the UPF network element 1 based on the identifier that is of the group FAR 1 and that is in the indication information 2.

In this embodiment of this application, that the UPF network element 1 releases the first session includes: deleting the session port 11 based on the session port identifier 11.

Figure 24A:
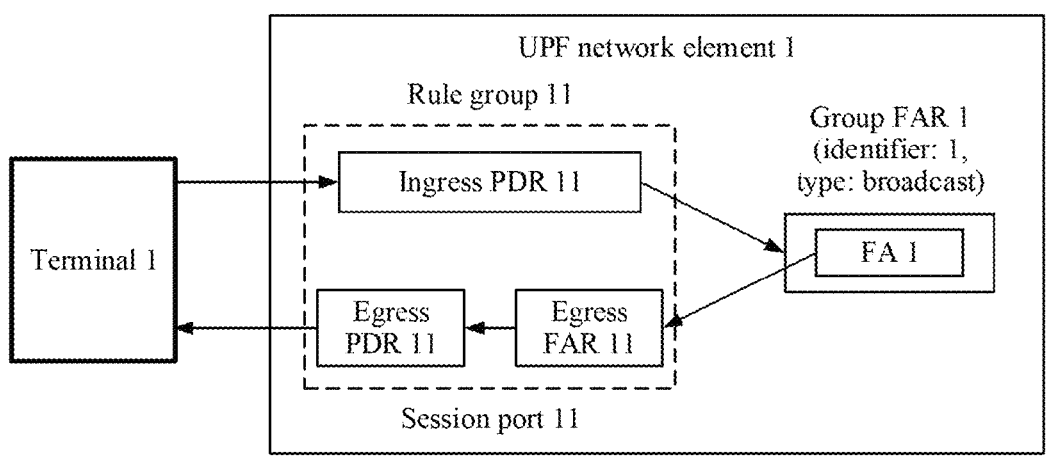
FIG. 24(a) and FIG. 24(b) are a schematic configuration diagram 10 of a UPF network element in a broadcast scenario according to an embodiment of this application.
Figure 24B:
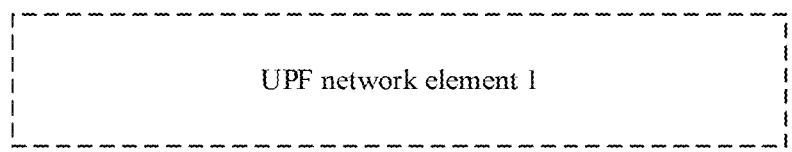

For example, assuming that the first terminal is a terminal 1, before the first terminal is disconnected from a network, a schematic configuration diagram of a 5GLAN group on a UPF network element 1 may be shown in FIG. 24(a). In this case, based on the foregoing procedure, after the first terminal is disconnected from the network, a schematic configuration diagram of the 5GLAN group on the UPF network element 1 may be shown in FIG. 24(b). In other words, there is no configuration information for the 5GLAN group on the UPF network element 1 temporarily.

Figure 25A:
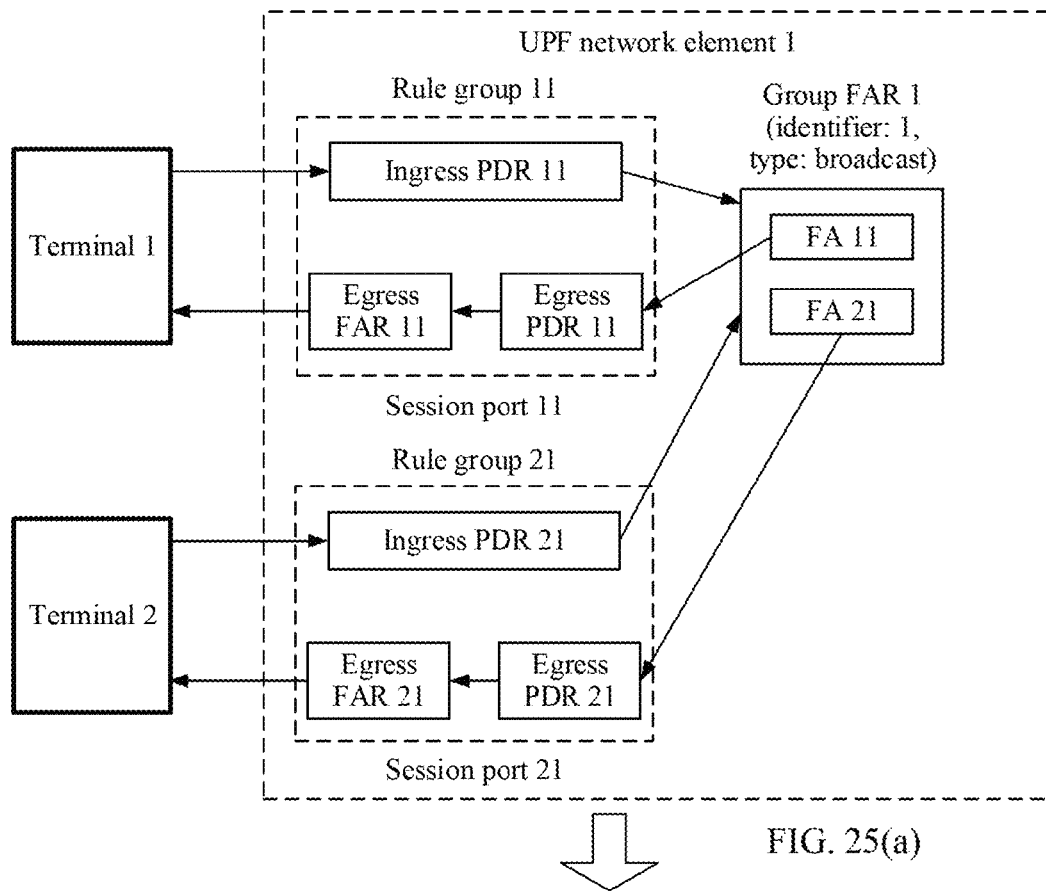
FIG. 25(a) and FIG. 25(b) are a schematic configuration diagram 11 of a UPF network element in a broadcast scenario according to an embodiment of this application.
Figure 25B:
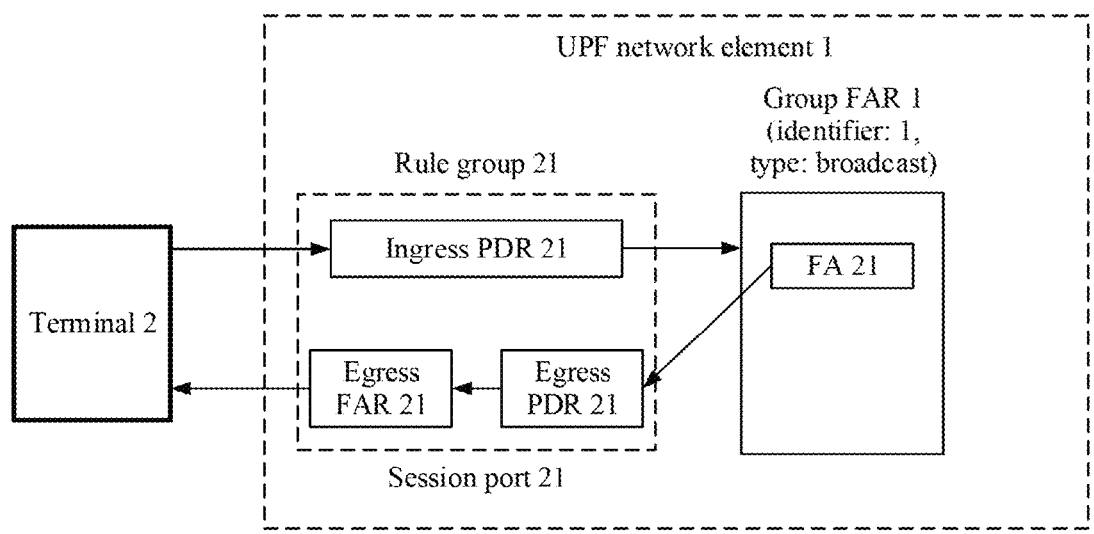

Alternatively, for example, assuming that the first terminal is a terminal 1, before the first terminal is disconnected from a network, a schematic configuration diagram of a 5GLAN group on a UPF network element 1 may be shown in FIG. 25(a). In this case, based on the foregoing procedure, after the first terminal is disconnected from the network, a schematic configuration diagram of the 5GLAN group on the UPF network element 1 may be shown in FIG. 25(b).

Alternatively, in a scenario 2, when the GMF network element determines, based on context information that is of a 5GLAN group and that is stored on the GMF network element, that another terminal in a terminal member list corresponding to the 5GLAN group accesses another UPF network element, assuming that the another terminal accesses a UPF network element 2 herein, the group communications method provided in this embodiment of this application further includes steps S2304b to S2309b.

S2304b: Optionally, when the GMF network element determines, based on the context information that is of the 5GLAN group and that is stored on the GMF network element, that another terminal in the terminal member list corresponding to the 5GLAN group accesses the UPF network element 1, the GMF network element further updates, for the 5GLAN group, a group FAR 1 applied to the UPF network element 1. A rule that is in the updated group FAR 1 and that is used to duplicate a received broadcast packet belonging to the 5GLAN group and then send the broadcast packet to a session port 11 on the UPF network element 1 is deleted.

Optionally, when the GMF network element determines, based on the context information that is of the 5GLAN group and that is stored on the GMF network element, that no other terminal in the terminal member list corresponding to the 5GLAN group accesses the UPF network element 1, the GMF network element further updates, for the 5GLAN group, a group FAR 2 applied to the UPF network element 2. A rule that is in the updated group FAR 2 and that is used to duplicate a received broadcast packet belonging to the 5GLAN group and then send the broadcast packet to a tunnel endpoint 42 is deleted.

The tunnel endpoint 42 is a tunnel endpoint that is on a side of the UPF network element 2 and that is of a first tunnel between the UPF network element 1 and the UPF network element 2.

S2305b: The GMF network element sends a 5GLAN service release response 2 to the SMF network element. Correspondingly, the SMF network element receives the 5GLAN service release response 2 from the GMF network element.

The 5GLAN service release response 2 includes an identifier of the UPF network element 1 and a session port identifier 11 corresponding to the identifier of the UPF network element 1, and is used to delete the session port 11 on the UPF network element 1 and a rule group 11 on the session port 11. Optionally, the 5GLAN service release response 2 may include an identifier of the rule group 11. This is not specifically limited in this embodiment of this application.

In addition, when the GMF network element determines, based on the context information that is of the 5GLAN group and that is stored on the GMF network element, that another terminal in the terminal member list corresponding to the 5GLAN group accesses the UPF network element 1, the 5GLAN service release response 2 further includes the updated group FAR 1 corresponding to the identifier of the UPF network element 1, and is used to update the group FAR 1 on the UPF network element 1.

Alternatively, when the GMF network element determines, based on the context information that is of the 5GLAN group and that is stored on the GMF network element, that no other terminal in the terminal member list corresponding to the 5GLAN group accesses the UPF network element 1, the 5GLAN service release response 2 further includes an identifier that is of the group FAR 1 and that corresponds to the identifier of the UPF network element 1, and is used to delete the group FAR 1 on the UPF network element 1. The 5GLAN service release response 2 further includes an identifier that is of a tunnel endpoint 41 and that corresponds to the identifier of the UPF network element 1, and is used to delete the tunnel endpoint 41 on the UPF network element 1 and a rule group 41 on the tunnel endpoint 41. The 5GLAN service release response 2 further includes an identifier that is of a tunnel endpoint 42 and that corresponds to an identifier of the UPF network element 2, and is used to delete the tunnel endpoint 42 on the UPF network element 2 and a rule group 42 on the tunnel endpoint 42. Optionally, the 5GLAN service release response 2 may include an identifier of the rule group 41 and an identifier of the rule group 42. This is not specifically limited in this embodiment of this application.

S2306b: The SMF network element sends an N4 session release request 2 to the corresponding UPF network element 1 based on the identifier that is of the UPF network element 1 and that is in the 5GLAN service release response 2. Correspondingly, the UPF network element 1 receives the N4 session release request 2 from the SMF network element.

When another terminal currently accesses the UPF network element 1, the N4 session release request 2 includes indication information 3, and the indication information 3 includes the session port identifier 11 and the updated group FAR 1 that correspond to the identifier of the UPF network element 1. Optionally, the N4 session release request 2 may include the identifier of the rule group 11. This is not specifically limited in this embodiment of this application.

Alternatively, when no other terminal currently accesses the UPF network element 1, the N4 session release request 2 includes an indication information 4, and the indication information 4 includes the session port identifier 11, the identifier of the tunnel endpoint 41, and the identifier of the group FAR 1 that correspond to the identifier of the UPF network element 1. Optionally, the N4 session release request 2 may include the identifier of the rule group 11 and the identifier of the rule group 41. This is not specifically limited in this embodiment of this application.

S2307b: The UPF network element 1 releases the first session, and deletes the session port 11 on the UPF network element 1 and the rule group 11 on the session port 11 based on the session port identifier 11. In addition, the UPF network element 1 deletes, based on the identifier of the group FAR 1, the group FAR 1 applied to the UPF network element 1, or the UPF network element 1 updates, based on the updated group FAR 1, the group FAR 1 applied to the UPF network element 1.

Optionally, when no other terminal currently accesses the UPF network element 1, the UPF network element 1 may further delete the tunnel endpoint 41 and the rule group 41 on the tunnel endpoint 41 based on the identifier of the tunnel endpoint 41.

S2308b: Optionally, when no other terminal currently accesses the UPF network element 1, the SMF network element sends an N4 session modification request 3 to the corresponding UPF network element 2 based on the identifier that is of the UPF network element 2 and that is in the 5GLAN service release response 2. Correspondingly, the UPF network element 2 receives the N4 session modification request 3 from the SMF network element.

The N4 session modification request 3 includes indication information 5, and the indication information 5 includes the updated group FAR 2 corresponding to the identifier of the UPF network element 2, and is used to update the group FAR 2 applied to the UPF network element 2.

In addition, the indication information 5 further includes the identifier that is of the tunnel endpoint 42 and that corresponds to the identifier of the UPF network element 2, and is used to delete the tunnel endpoint 42 on the UPF network element 2 and the rule group 42 on the tunnel endpoint 42.

S2309b: Optionally, the UPF network element 2 updates, based on the updated group FAR 2, the group FAR 2 applied to the UPF network element 2, and the UPF network element 2 deletes the tunnel endpoint 42 on the UPF network element 2 and the rule group 42 on the tunnel endpoint 42 based on the identifier of the tunnel endpoint 42.

Figure 26A:
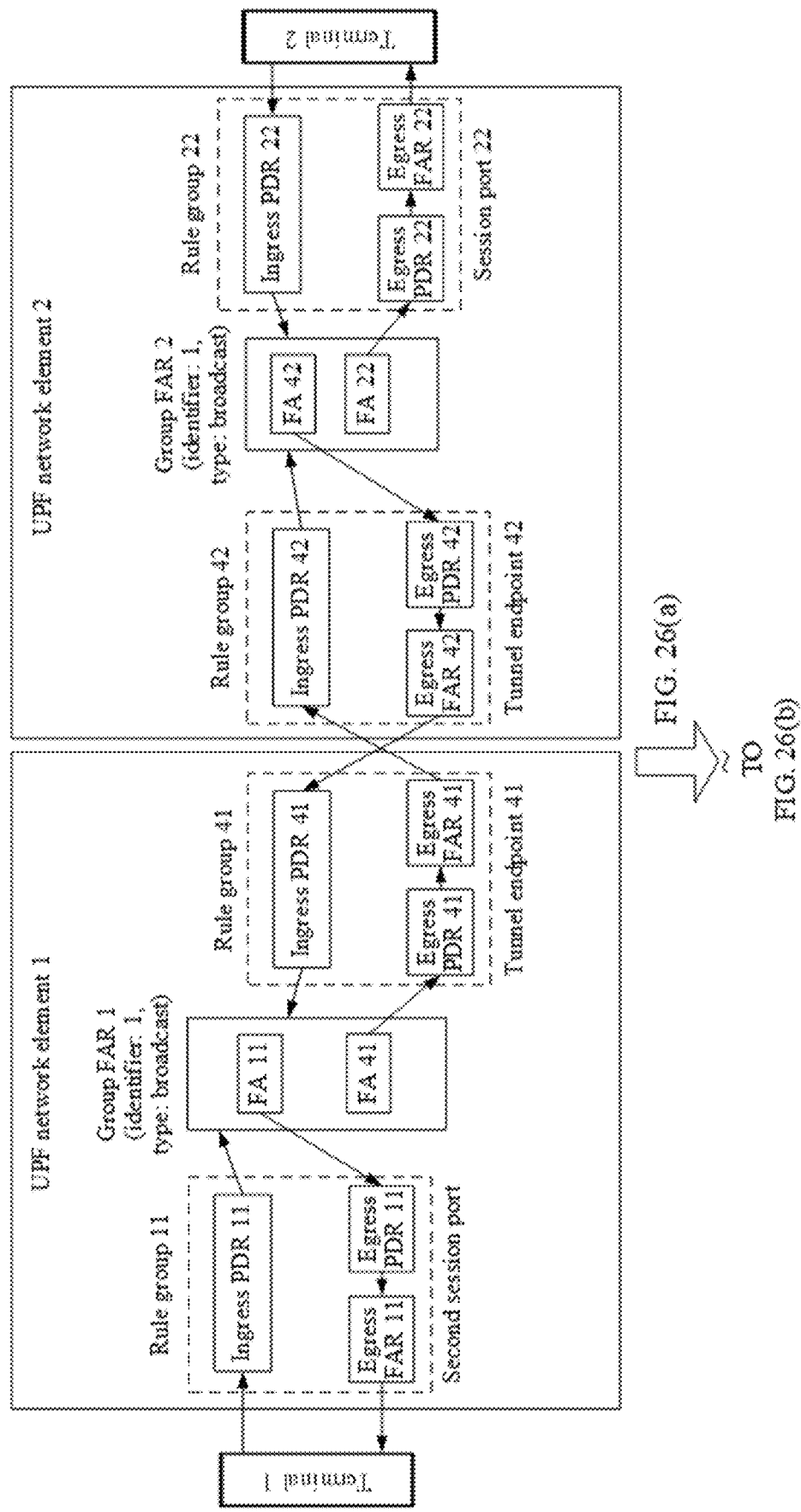
FIG. 26(a) and FIG. 26(b) are a schematic configuration diagram 12 of a UPF network element in a broadcast scenario according to an embodiment of this application.
Figure 26B:
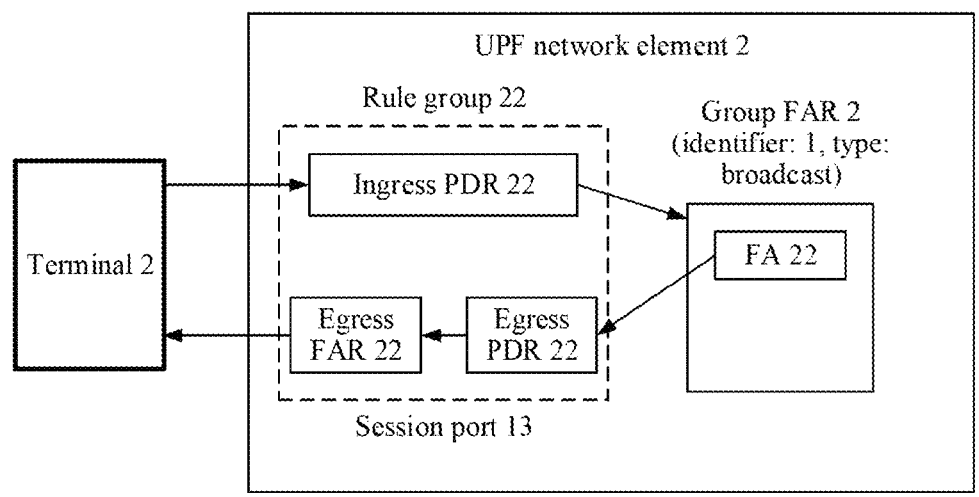

For example, assuming that the first terminal is a terminal 1, before the first terminal is disconnected from a network, a schematic configuration diagram of a 5GLAN group on a UPF network element 1 may be shown in FIG. 26(*a*). In this case, based on the foregoing procedure, after the first terminal is disconnected from the network, a schematic configuration diagram of the 5GLAN group on the UPF network element 1 may be shown in FIG. 26(*b*). It can be learned that both a rule group 41 on a tunnel endpoint 41 and a rule group 43 on a tunnel endpoint 43 that correspond to a tunnel between the UPF network element 1 and the UPF network element 3 are deleted, and a group FAR 3 on the UPF network element 3 is also updated. An FA 43 in the group FAR 3 is deleted, and the FA 43 is used to duplicate a received broadcast packet belonging to the 5GLAN group and then send the broadcast packet to the tunnel endpoint 43 on the UPF network element 3. In addition, there is no configuration for the 5GLAN group on the UPF network element 1 temporarily, and therefore details are not shown in FIG. 26(*b*).

Figure 27A:
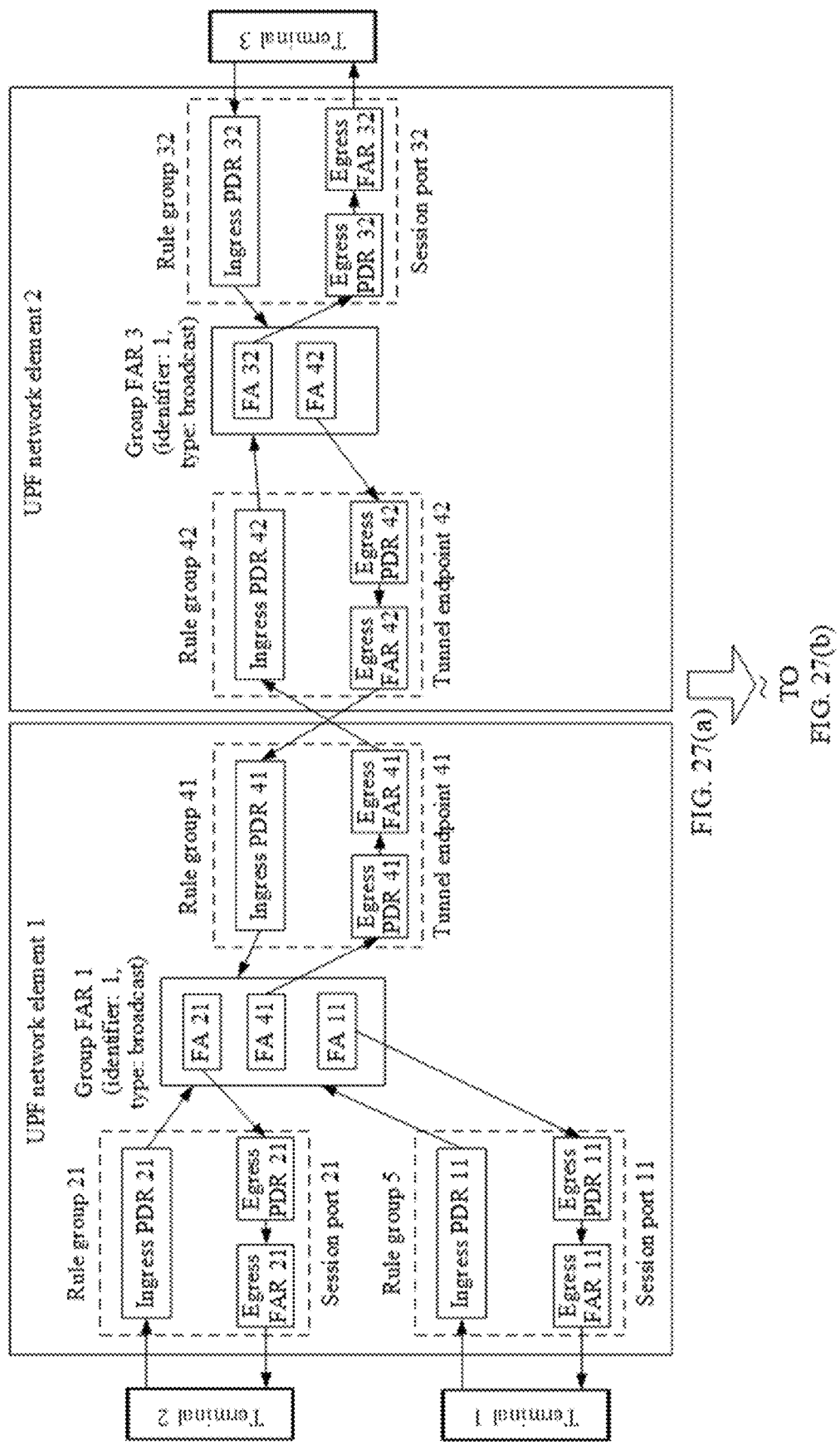
FIG. 27(a) and FIG. 27(b) are a schematic configuration diagram 13 of a UPF network element in a broadcast scenario according to an embodiment of this application.
Figure 27B:
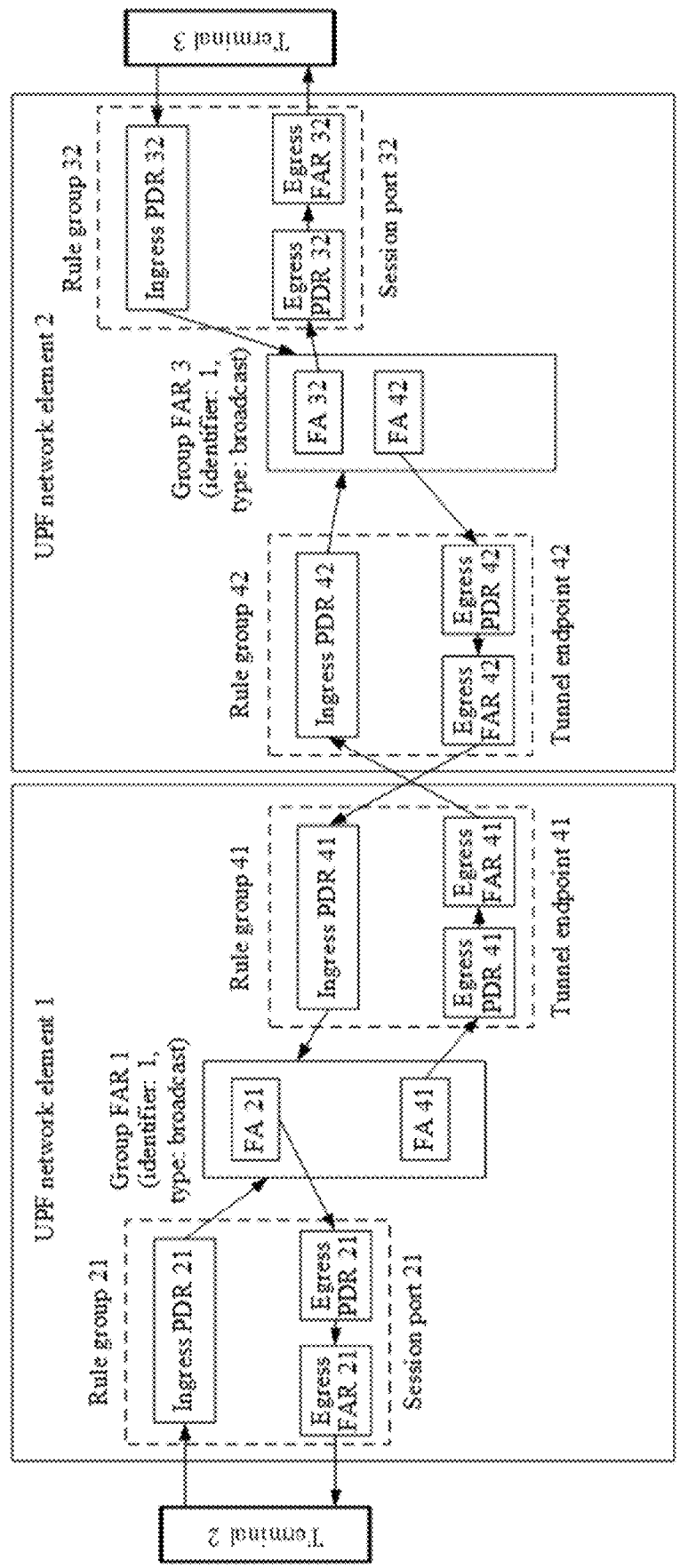

Alternatively, for example, assuming that the first terminal is a terminal 1, before the first terminal is disconnected from a network, a schematic configuration diagram of a 5GLAN group on a UPF network element 1 may be shown in FIG. 27(*a*). In this case, based on the foregoing procedure, after the first terminal is disconnected from the network, a schematic configuration diagram of the 5GLAN group on the UPF network element 1 may be shown in FIG. 27(*b*).

S2310: Complete a remaining release process.

According to the group communications method, when a terminal member in the 5GLAN group is disconnected from a network, only a 5GLAN group FAR on an associated UPF network element needs to be adjusted (updated or deleted), and an ingress PDR, an egress PDR, and an egress FAR that are on the associated UPF network element and that correspond to the terminal member need to be adjusted (updated or deleted), but an ingress PDR, an egress PDR, and an egress FAR that correspond to another member in the 5GLAN group remain unchanged. Therefore, when a relatively large number of terminal members belonging to the 5GLAN group access the network, a problem that configuration workload caused by a change in a quantity of terminal members is greatly increased can be avoided, and the configuration workload caused by the change in the quantity of terminal members can be greatly reduced.

The actions of the GMF network element, the SMF network element, the UPF network element 1, or the UPF network element 2 in steps S2301 to S2310 may be performed by the processor 1101 in the communications device 1100 shown in FIG. 11 by invoking the application program code stored in the memory 1103. This is not limited in this embodiment.

FIG. 12A, FIG. 12B, and FIG. 12C to FIG. 27(*a*) and FIG. 27(*b*) separately provide examples of corresponding group communications methods when a terminal member in the 5GLAN group changes (for example, a terminal member accesses a network, a terminal member is disconnected from a network, or a terminal member that has accessed a network moves) in a broadcast scenario, and descriptions are provided mainly by using a control plane configuration as an example. The following describes how a user plane network element forwards a group broadcast packet.

Figure 28:
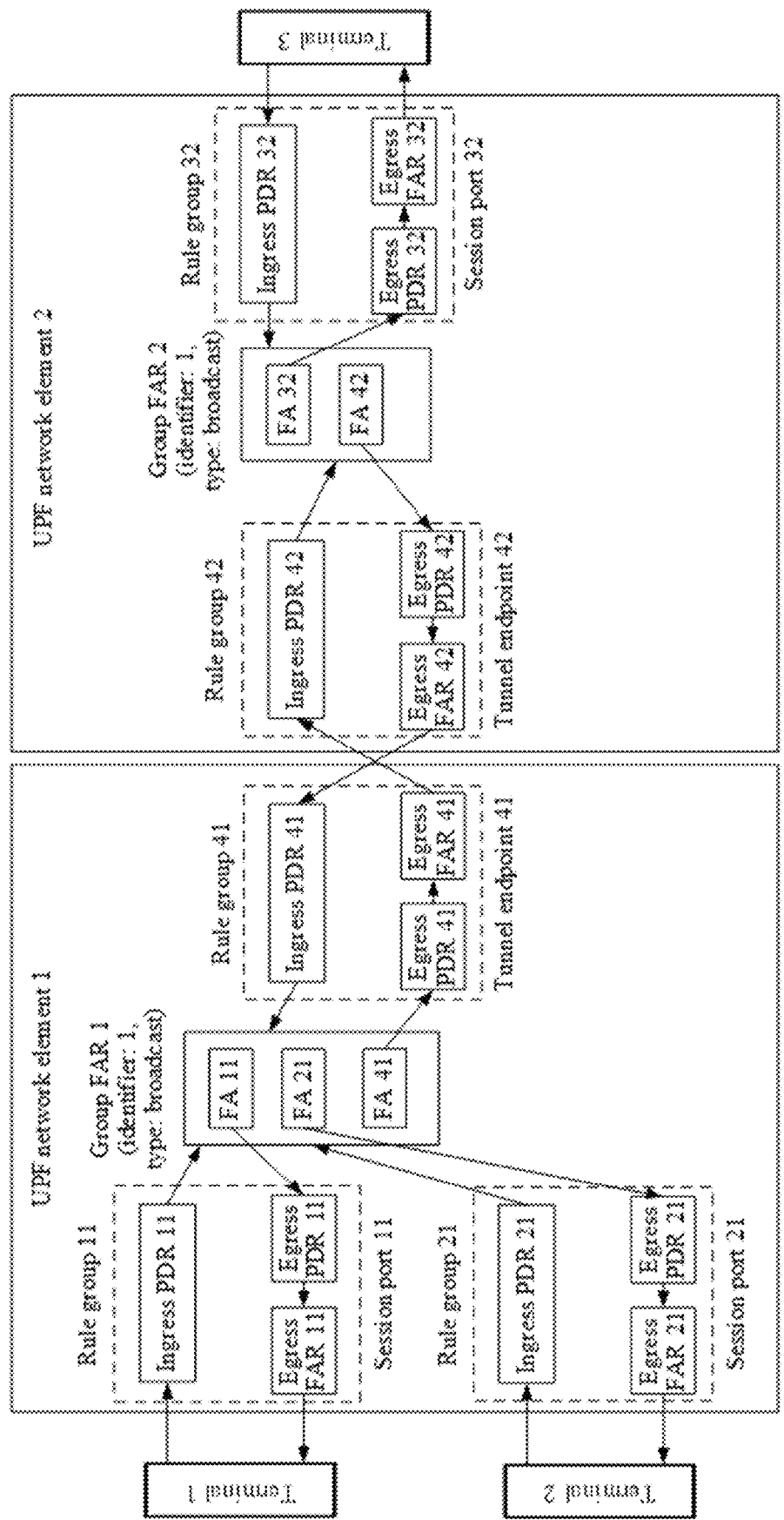
FIG. 28 is a schematic diagram of packet forwarding in a broadcast scenario according to an embodiment of this application.

Assuming that a terminal 1, a terminal 2, and a terminal 3 in a 5GLAN group 1 whose identifier is 1 have currently accessed a network, where the terminal 1 and the terminal 2 access a UPF network element 1, and the terminal 3 accesses a UPF network element 2, a schematic configuration diagram of 5GLAN groups on a UPF network element 1 and a UPF network element 2 is shown in FIG. 28. For configuration descriptions of the 5GLAN groups on the UPF network element 1 and the UPF network element 2, refer to the configuration descriptions of the 5GLAN groups in the embodiment shown in FIG. 17(*a*) and FIG. 17(*b*). Details are not described herein again. If an example in which a terminal 1 sends a packet 1 is used for description, a method for forwarding the group broadcast packet by the UPF network element includes the following steps.

Step 1: The terminal 1 sends the packet 1 to the UPF network element 1 by using a 5G user plane protocol (that is, through forwarding by an access device). Herein, it is assumed that a destination address of the packet 1 is all 1s (indicating that the packet 1 is a broadcast packet), and a source address is an address of the terminal 1.

Step 2: After receiving the packet 1 from the terminal 1, the UPF network element 1 may determine, based on a 5G user plane protocol identifier (for example, a TEID) of the packet 1, a session port corresponding to the packet 1. Herein, it is assumed that the session port corresponding to the packet 1 is a session port 11. In this case, the UPF network element 1 may match an ingress PDR (which may be one or more) applied to a rule group 11 on the session port 11 with characteristic information of the packet 1, to find the ingress PDR that matches the characteristic information.

In this embodiment of this application, a method for identifying a packet by using the ingress PDR may be, for example, identifying, based on the 5G user plane protocol identifier, that the packet belongs to a 5GLAN group, and identifying, based on a broadcast packet identification rule, that the packet is the broadcast packet.

Optionally, the 5G user plane protocol identifier herein may be, for example, a TEID or a TEID+a QFI. This is not specifically limited in this embodiment of this application.

Optionally, when the packet 1 is an IP packet, the broadcast packet identification rule may be, for example, that a destination IP address is all 1s. Alternatively, when the packet 1 is an Ethernet frame, the broadcast packet identification rule may be, for example, that a destination MAC address is all 1s. This is not specifically limited in this embodiment of this application.

For example, herein, assuming that the 5G user plane protocol identifier of the packet 1 is that the TEID is equal to 0x005b8433 and the QFI is equal to 3, a destination IP of the packet 1 is equal to 255.255.255.255, and a function of an ingress PDR 11 is to identify a broadcast packet belonging to the 5GLAN group 1, the ingress PDR that is found by the UPF network element 1 and that matches the characteristic information is the ingress PDR 11.

Step 3: The UPF network element 1 finds a corresponding 5GLAN group FAR based on an identifier that is of the 5GLAN group and that is included in an ingress PDR 1, and processes the packet 1 of the terminal 1 by using the 5GLAN group FAR. Specifically, the UPF network element 1 duplicates the packet into a plurality of duplicates having the same quantity as member ports based on the total quantity of member ports corresponding to the 5GLAN group 1 on the UPF network element 1 for processing, and then forwards the packet to an egress specified by the 5GLAN group FAR. For example, in FIG. 28, the UPF network element 1 may find, based on the identifier 1 that is of the 5GLAN group and that is included in the ingress PDR 1, that the corresponding 5GLAN group FAR is a group FAR 1, and process the packet 1 of the terminal 1 by using the group FAR 1. In FIG. 28, it is assumed that the group FAR 1 includes three FAs: an FA 11, an FA 21, and an FA 41. The FA 11 is used to forward the packet 1 to an egress of the session port 11, the FA 21 is used to forward the packet 1 to an egress of a session port 21, and the FA 41 is used to forward the packet 1 to an egress of a tunnel endpoint 41. Because the egress of the session port 11 is an ingress of the packet 1, the packet forwarded to the egress of the session port 11 is discarded.

Step 4: The UPF network element 1 further processes the packet 1 based on an egress PDR and an egress FAR (which may be a plurality of groups of egress PDRs and egress FARs) on the session port 21, and the UPF network element 1 further processes the packet 1 based on an egress PDR and an egress FAR (which may be a plurality of groups of egress PDRs and egress FARs) on the tunnel endpoint 41. A manner in which the UPF network element 1 processes the packet 1 based on the egress PDR and the egress FAR on the session port 21 is similar to a manner in which the UPF network element 1 further processes the packet 1 based on the egress PDR and the egress FAR on the tunnel endpoint 41. Descriptions are provided herein by using the manner in which the UPF network element 1 processes the packet 1 based on the egress PDR and the egress FAR on the session port 21 as an example.

The UPF network element 1 may match the egress PDR on the session port 21 with type information of the packet 1, to find the egress PDR that matches the type information. For example, a priority of the packet 1 is identified based on a differentiated services code point (DSCP) field of the IP packet or an 802.1p bit of the Ethernet frame. Herein, assuming that the priority of the packet 1 is a first priority, and the egress PDR 11 on the session port 21 is used to identify a packet with the first priority, the egress PDR that is found by the UPF network element 1 and that matches the type information is the egress PDR 11.

Step 5: The UPF network element 1 finds the corresponding egress FAR 11 based on an identifier that is of the egress FAR 11 and that is included in the egress PDR 11, performs outer header creation and transport layer marking on the packet 1 by using the egress FAR 11, and then forwards the packet 1 through the session port 11, so that the terminal 2 can receive the packet 1. For a manner in which the egress FAR 11 is used to perform outer header creation and transport level marking on the packet, refer to the embodiment shown in FIG. 5. Details are not described herein again.

Similarly, a processing manner in which the UPF network element 2 receives the packet 1 is similar to a processing manner in which the UPF network element 1 receives the packet 1. A difference lies in that after receiving the packet 1 from the UPF network element 1, the UPF network element 2 may determine, based on a tunnel header of the packet 1 and a tunnel endpoint identifier that is set in the tunnel header, a tunnel endpoint corresponding to the packet 1. Herein, it is assumed that the tunnel endpoint corresponding to the packet 1 is a tunnel endpoint 42. For other related descriptions, refer to the foregoing packet forwarding processing procedure of the UPF network element 1. Details are not described herein again.

It should be noted that in this embodiment of this application, a control plane configuration procedure and a procedure in which the user plane network element forwards the group broadcast packet in the foregoing broadcast scenario may be decoupled. To be specific, based on the control plane configuration procedure in the foregoing broadcast scenario in this embodiment of this application, there may also be another procedure in which the user plane network element forwards the group broadcast packet. Alternatively, based on the procedure in which the user plane network element forwards the group broadcast packet in the foregoing broadcast scenario in this embodiment of this application, there may also be another control plane configuration procedure. This is not specifically limited in this embodiment of this application.

It should be noted that in this embodiment of this application, the control plane configuration procedure in the foregoing broadcast scenario is described by using an example in which different UPF network elements are managed by a same SMF network element. Certainly, different UPF network elements may alternatively be managed by different SMF network elements. In this case, the GMF network element needs to separately send the foregoing 5GLAN service response message, the foregoing 5GLAN service update response, the foregoing 5GLAN release response, or the like to the different SMF network elements, and send, to the UPF network element managed by the SMF network element and by using the corresponding SMF network element, a message sent by the SMF network element to the UPF network element in the foregoing control plane configuration procedure. This scenario is not described in detail in this embodiment of this application. In addition, the descriptions are also applicable to the following multicast scenario. Unified descriptions are provided herein, and details are not described below.

The following uses a multicast scenario as an example to provide a group communications method provided in an embodiment of this application.

Scenarios in which the group communications system shown in FIG. 8 is applied to the 5G network shown in FIG. 9; the group management function network element is a GMF network element, the session management network element is an SMF network element (for example, the first session management network element is an SMF 1 network element, and the second session management network element is an SMF 2 network element), and the user plane network element is a UPF network element (for example, the first user plane network element is a UPF network element 1, and the second user plane network element is a UPF network element 2); and the multicast member joins the multicast group are first used as examples. In this case, in the scenario in which the multicast member joins the multicast group, there may be the following two cases (for example, a to-be-joined multicast member is a first terminal).

Case 1: A UPF network element (assumed to be the UPF network element 1) accessed by the first terminal has another multicast member or a multicast source in the multicast group.

Step 1: Modify a multicast group FAR 1 on the UPF network element 1, and add a rule pointing to a downstream port of the multicast member.

Step 2: Configure an egress PDR and an egress FAR that are applied to the downstream port of the multicast member on the UPF network element 1.

Case 2: A UPF network element (assumed to be the UPF network element 1) accessed by the first terminal has no other multicast member or no multicast source in the multicast group.

Step 1: Configure a multicast group FAR 1 applied to the UPF network element 1, and configure an egress PDR and an egress FAR that are applied to a downstream port of the multicast member on the UPF network element 1, where the multicast group FAR 1 includes a rule pointing to the downstream port of the multicast member.

Step 2: Configure an ingress PDR applied to an upstream port of the multicast member on the UPF network element 1.

Step 3: Update a multicast group FAR on an upstream UPF network element of the UPF network element 1, and add a rule pointing to a downstream port associated with the multicast member; and configure an egress PDR and an egress FAR that are applied to the downstream port associated with the multicast member on the upstream UPF network element of the UPF network element 1.

Step 4: If the upstream UPF network element of the UPF network element 1 has no other multicast member or no multicast source in the multicast group, cyclically perform steps similar to step 2 and step 3 (a difference lies in that UPF network elements are different), until an upstream UPF network element has another multicast member or a multicast source in the multicast group or until a multicast source accesses a UPF network element (which may be considered as a target UPF network element). If the target UPF network element has another multicast member in the multicast group, the target UPF network element ends the process after performing a step similar to step 3 (a difference lies in that the UPF network elements are different). Alternatively, if the target UPF network element is the UPF network element accessed by the multicast source, the UPF network element further needs to end the process after performing steps similar to step 2 and step 3 (a difference lies in that the UPF network elements are different).

Figure 29:
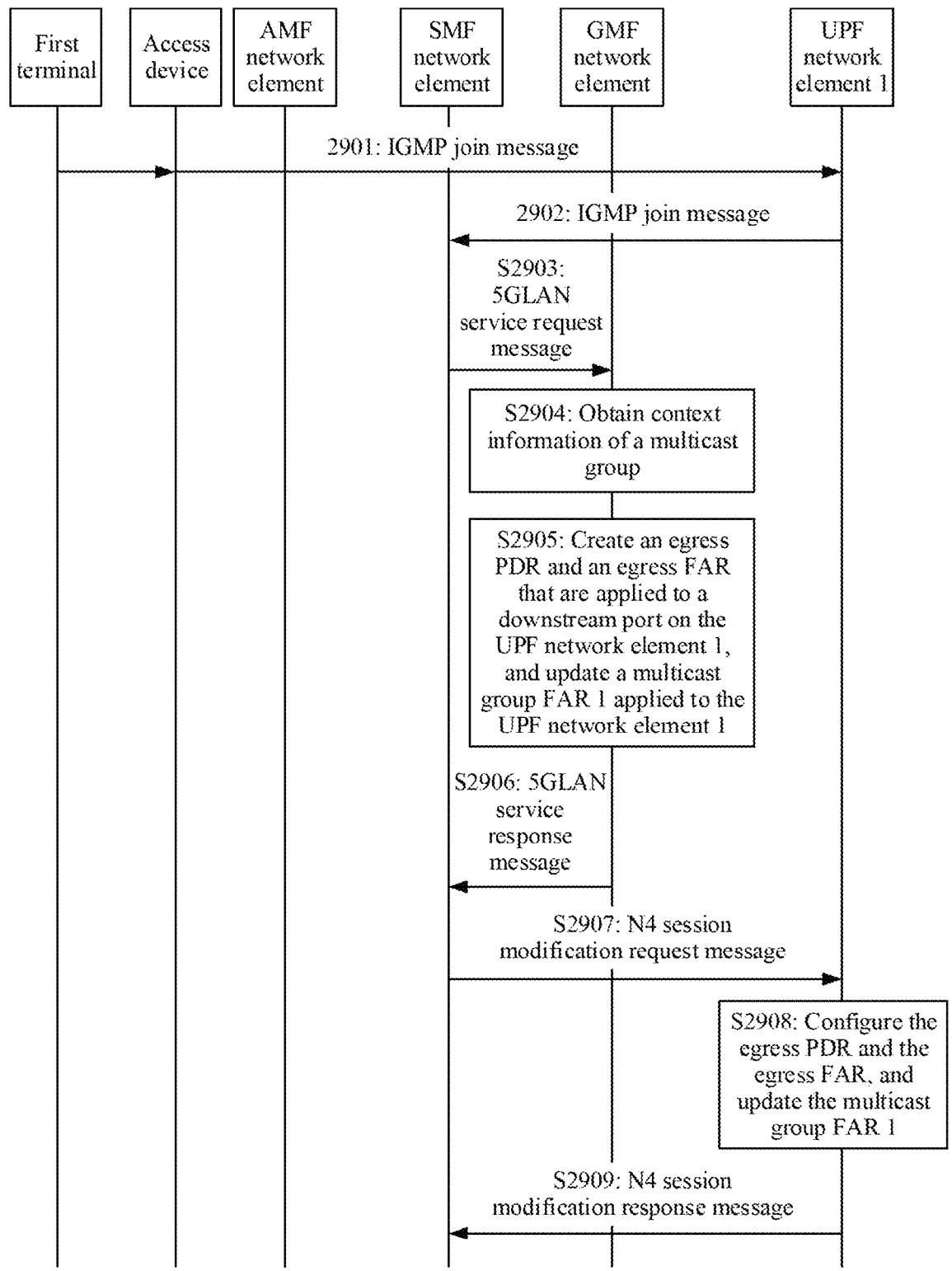
FIG. 29 is a schematic flowchart 4 of a group communications method according to an embodiment of this application.

The following provides a group communications method provided in an embodiment of this application in a scenario in which a multicast member joins a multicast group. As shown in FIG. 29, the group communications method includes the following steps.

Prerequisites: A first terminal has accessed the UPF network element 1, and a configuration for a 5GLAN group is created on the UPF network element 1. For an establishment method, refer to the embodiment shown in FIG. 12A, FIG. 12B, and FIG. 12C. Details are not described herein again. In addition, the configuration for the 5GLAN group may also be created on the UPF network element 2. For an establishment method, refer to the embodiment shown in FIG. 12A, FIG. 12B, and FIG. 12C. Details are not described herein again. The UPF network element 1 is connected to the UPF network element 2.

S2901: A first terminal sends an internet group management protocol (IGMP) join message to a UPF network element 1 by using an access device. Correspondingly, the UPF network element 1 receives the IGMP join message from the first terminal.

The IGMP join message includes an address (which may also be briefly referred to as a multicast address) of a multicast group.

Optionally, the IGMP join message may further include an address of a multicast source.

It should be noted that in this embodiment of this application, the first terminal sends the IGMP join message to the UPF network element 1 only as a multicast member, but the multicast source or a member that is not in the multicast group does not send the IGMP join message to the UPF network element 1. Unified descriptions are provided herein, and details are not described below.

For a manner in which the first terminal obtains the address of the multicast source and the address of the multicast group, refer to an existing implementation. Details are not described herein.

S2902: The UPF network element 1 identifies the IGMP join message, and further sends the IGMP join message to a connected SMF network element. Correspondingly, the SMF network element receives the IGMP join message from the UPF network element 1.

In this embodiment of this application, the IGMP join message may be carried in an N4 interface message sent by the UPF network element 1 to the SMF network element and sent to the SMF network element. This is not specifically limited in this embodiment of this application.

S2903: The SMF network element identifies the IGMP join message, and further sends a 5GLAN service request message to a GMF network element. Correspondingly, the GMF network element receives the 5GLAN service request message from the SMF network element.

The 5GLAN service request message carries the IGMP join message, an identifier of the first terminal, an identifier of the UPF network element 1, and a session port identifier 11.

Optionally, in this embodiment of this application, the identifier of the first terminal may be, for example, an address of the first terminal. The address of the first terminal may be, for example, an IP address of the first terminal or an IP address of the first terminal. This is not specifically limited in this embodiment of this application. The descriptions are also similarly applicable to another terminal in another embodiment in a multicast scenario in this application. For example, an identifier of the following terminal 3 may be an address of the terminal 3, and the address may be, for example, an IP address or a MAC address. Unified descriptions are provided herein, and details are not described below.

S2904: After parsing the IGMP join message, the GMF network element obtains the address of the multicast source and the address of the multicast group, and the GMF network element may further obtain context information of the multicast group based on the address of the multicast group (or based on the address of the multicast source).

That the GMF network element obtains context information of the multicast group may be, for example, establishing the context information of the multicast group, or reading the context information that is of the multicast group and that is stored on the GMF network element. For example, when the first terminal is the $1^{st}$ multicast member that accesses the multicast group, the GMF network element needs to establish the context information of the multicast group. Alternatively, when the first terminal is not the $1^{st}$ multicast member that accesses the multicast group, the GMF network element may read the context information that is of the multicast group and that is stored on the GMF network element.

Optionally, in this embodiment of this application, the context information of the multicast group may include information about a multicast forwarding tree, for example, include an identifier of a multicast source, an identifier of a multicast member, and an identifier of a UPF network element (which may be one or more) between a multicast source and each multicast member. For related descriptions of the multicast forwarding tree, refer to the descriptions in the foregoing embodiments. Details are not described herein again.

Figure 30:
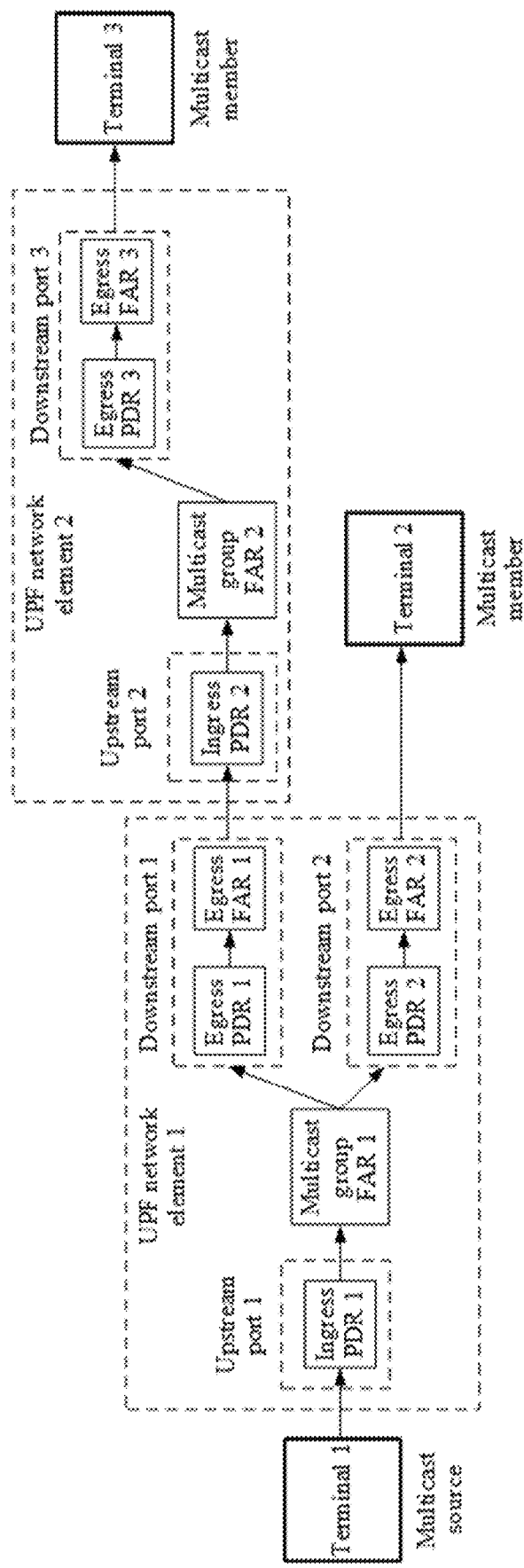
FIG. 30 is a schematic configuration diagram 2 of a UPF network element in a multicast scenario according to an embodiment of this application.

For example, assuming that a terminal 2 and a terminal 3 have joined a multicast group whose multicast source is a terminal 1, and a schematic configuration diagram of the multicast groups on the multicast forwarding tree and a UPF network element in the multicast forwarding tree is shown in FIG. 30, the information about the multicast forwarding tree that is included in the context information of the multicast group may be shown in Table 9, and includes an identifier of the multicast source, an identifier of a downstream member of the multicast source, an identifier of a downstream member of the downstream member of the multicast source, and so on.

TABLE 9

| Identifier of a multicast source | Downstream member identifier | Downstream member identifier | Downstream member identifier |
|---|---|---|---|
| Identifier of a terminal 1 | Identifier of a UPF network element 1 | Identifier of a UPF network element 2 Identifier of a terminal 2 | Identifier of a terminal 3 None |

Herein, the identifier of the multicast source may be specifically the address of the multicast source, and the identifier of the downstream member may also be specifically an IP address of the downstream member. Unified descriptions are provided herein, and details are not described below.

For related definitions of the downstream member in Table 9, refer to the descriptions of the multicast forwarding tree in the foregoing embodiments. Details are not described herein again.

Optionally, in this embodiment of this application, the context information of the multicast group may further include an upstream port identifier and a downstream port identifier that are of the multicast group on the UPF network element between the multicast source and each multicast member. For example, with reference to FIG. 30, as shown in Table 10, the context information of the multicast group may further include an upstream member identifier, an upstream port identifier, a downstream member identifier, and a downstream port identifier that correspond to the identifier of the UPF network element between the multicast source and each multicast member.

TABLE 10

| Identifier of a UPF network element | Upstream member identifier | Upstream port identifier | Downstream member identifier | Downstream port identifier |
|---|---|---|---|---|
| Identifier of a UPF network element 1 | Identifier of a terminal 1 | Identifier of an upstream port 1 | Identifier of a UPF network element 2 | Identifier of a downstream port 1 |
| | | | Identifier of a terminal 2 | Identifier of a downstream port 2 |
| Identifier of the UPF network element 2 | Identifier of the UPF network element 1 | Identifier of an upstream port 2 | Identifier of a terminal 3 | Identifier of a downstream port 3 |

S2905: Based on the context information of the multicast group, and the identifier of the UPF network element 1 and the session port identifier 11 that are carried in the 5GLAN service request message, the GMF network element creates an egress PDR and an egress FAR that are applied to a downstream port on the UPF network element 1, and updates a multicast group FAR 1 applied to the UPF network element 1. An identifier of the downstream port is the session port identifier 11. A rule used to duplicate a received multicast packet belonging to the multicast group and then send the multicast packet to the downstream port is added to the updated multicast group FAR 1.

Figure 31A:
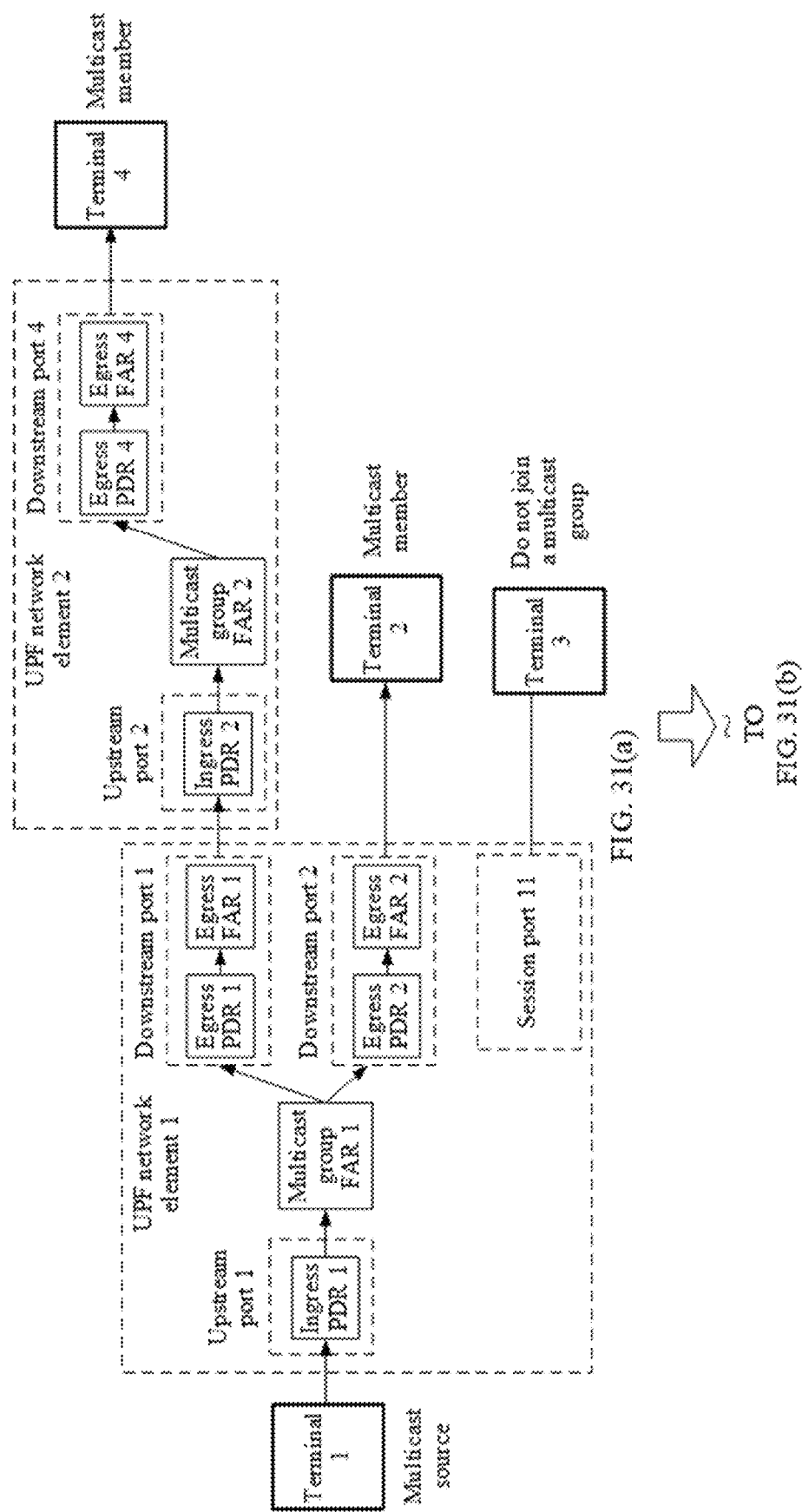
FIG. 31(a) and FIG. 31(b) are a schematic configuration diagram 3 of a UPF network element in a multicast scenario according to an embodiment of this application.
Figure 31B:
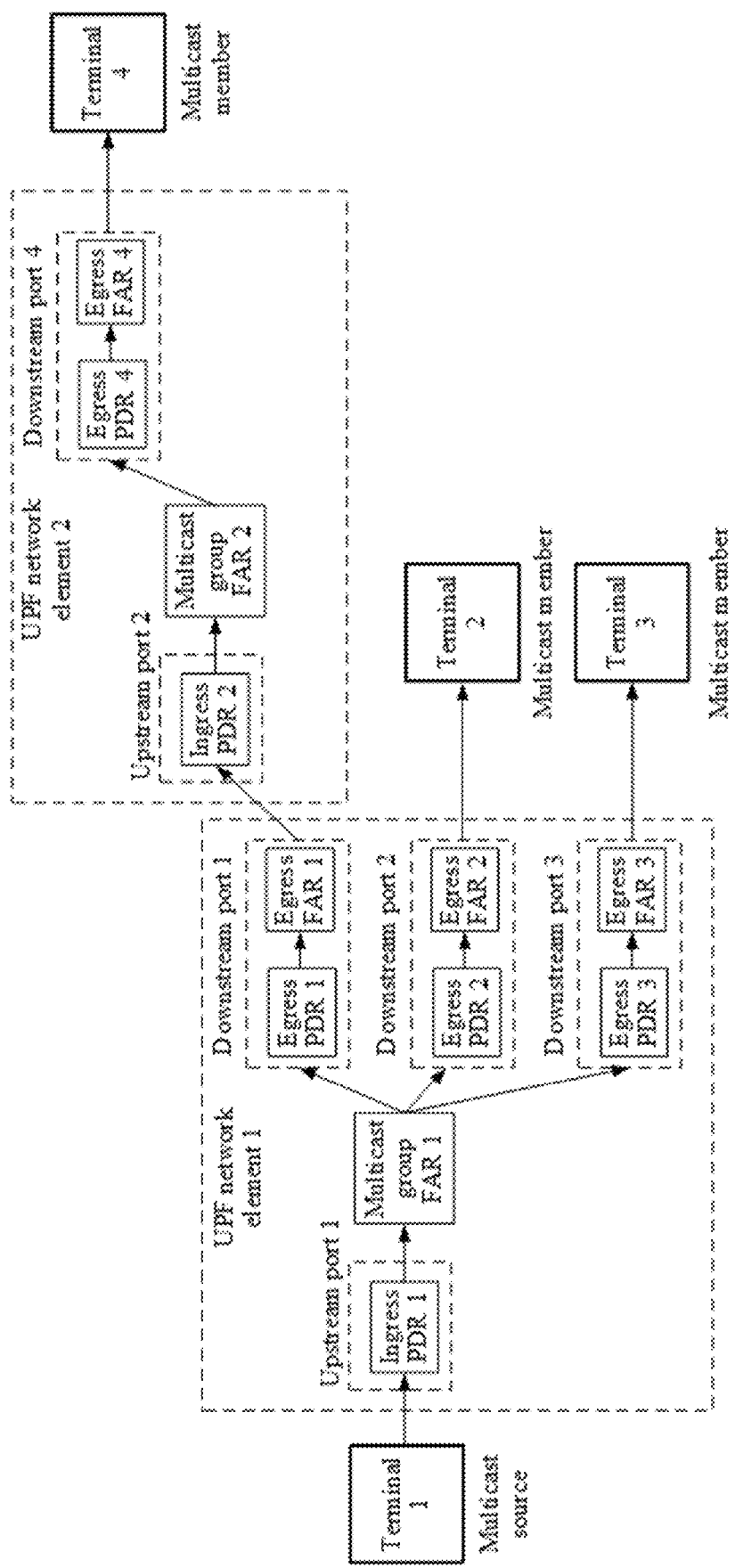

For example, assuming that the first terminal is the terminal 3, before the first terminal joins the multicast group, a schematic configuration diagram of the multicast group may be shown in FIG. 31(a). The terminal 3 in FIG. 31(a) does not join the multicast group. Therefore, only a session port 11 on the UPF network element 1 accessed by the terminal 3 after the terminal 3 establishes a PDU session is simply shown. For a specific PDU session establishment procedure, refer to the embodiment shown in FIG. 12A, FIG. 12B, and FIG. 12C. Details are not described herein again. In this case, assuming that a downstream port corresponding to the session port identifier 11 is a downstream port 3, after the first terminal joins the multicast group, and a subsequent configuration procedure in steps S2906 to S2908 is complete, a schematic configuration diagram of the multicast group may be shown in FIG. 31(b). To be specific, an egress PDR 3 and an egress FAR 3 are configured on the downstream port 3 corresponding to the session port identifier 11 on the UPF network element 1, and the rule used to duplicate the received multicast packet belonging to the multicast group and then send the multicast packet to the downstream port 3 is added to the updated multicast group FAR 1.

Optionally, in this embodiment of this application, if the UPF network element accessed by the multicast source and the UPF network element 1 are different UPF network elements, the GMF network element further needs to perform the following operations:

The GMF network element determines whether the UPF network element 1 has an upstream port corresponding to the multicast group, and if the UPF network element 1 does not have the upstream port corresponding to the multicast group, creates an ingress PDR applied to the upstream port on the UPF network element 1. An identifier of the upstream port is a tunnel endpoint identifier that is on a side of the UPF network element and that is of a tunnel between the UPF network element 1 and an upstream UPF network element of the UPF network element 1.

In addition, the GMF network element sequentially traverses upstream UPF network elements of the UPF network element 1 based on the context information of the multicast group until a target UPF network element is found, where the target UPF network element is a UPF network element that has the upstream port corresponding to the multicast group or a UPF network element accessed by a multicast source.

Further, if the target UPF network element is the UPF network element that has the upstream port corresponding to the multicast group, for any UPF network element between the target UPF network element and the UPF network element 1, the GMF network element creates an ingress PDR applied to an upstream port on each UPF network element, creates an egress PDR and an egress FAR that are applied to a downstream port on each UPF network element, and creates a multicast group FAR applied to each UPF network element; and for the target UPF network element, the GMF network element creates an egress PDR and an egress FAR that are applied to a downstream port on the target UPF network element, and updates a multicast group FAR applied to the target UPF network element. The created or updated multicast group FAR includes a rule used to duplicate a received multicast packet belonging to the multicast group and then send the multicast packet to the downstream port on the UPF network element.

Alternatively, if the target UPF network element is the UPF network element accessed by the multicast source, for the target UPF network element and any UPF network element between the target UPF network element and the UPF network element 1, the GMF network element creates an ingress PDR applied to an upstream port on each UPF network element, creates an egress PDR and an egress FAR that are applied to a downstream port on each UPF network element, and creates a multicast group FAR applied to each UPF network element. The created multicast group FAR includes a rule used to duplicate a received multicast packet belonging to the multicast group and then send the multicast packet to the downstream port on the UPF network element.

If the upstream port or the downstream port is a tunnel endpoint, a corresponding port identifier is a tunnel endpoint identifier. If the upstream port is a session port, namely, an upstream port on the target UPF network element in a scenario in which the target UPF network element is the UPF network element accessed by the multicast source, a corresponding port identifier is a session port identifier corresponding to a session port created on the target UPF network element when the multicast source establishes a PDU session. Unified descriptions are provided herein, and details are not described below.

Figure 32A:
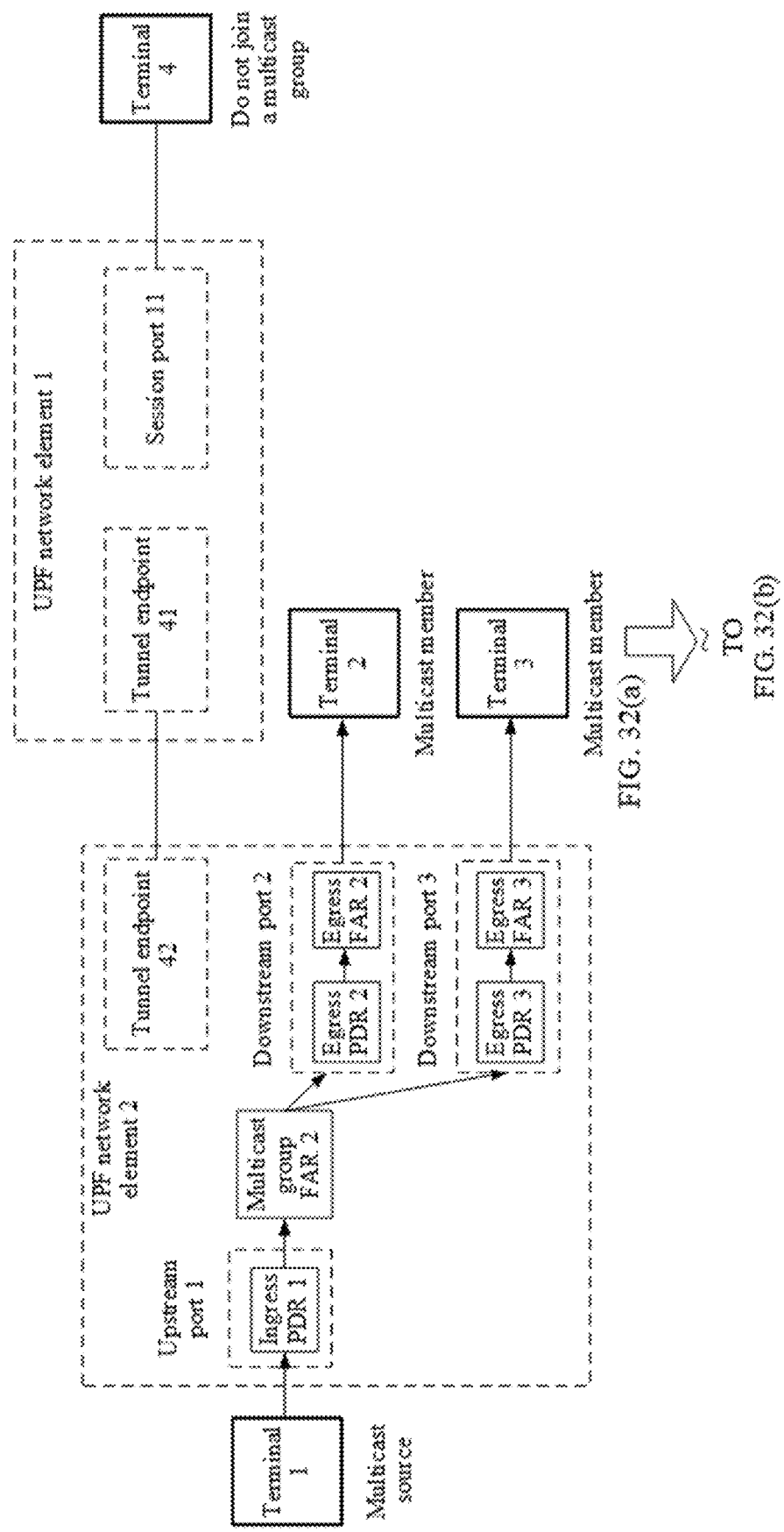
FIG. 32(a) and FIG. 32(b) are a schematic configuration diagram 4 of a UPF network element in a multicast scenario according to an embodiment of this application.
Figure 32B:
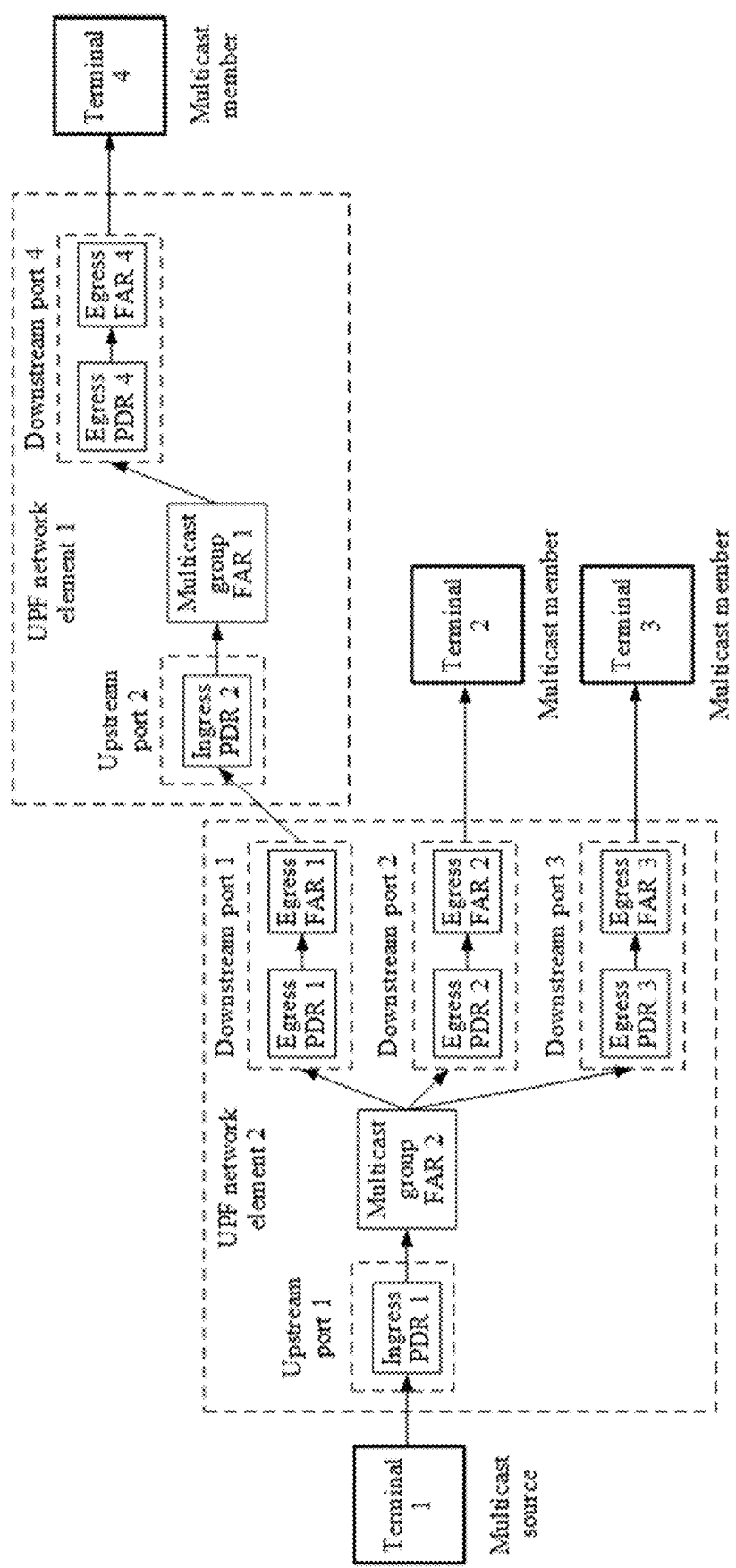

For example, assuming that the first terminal is the terminal 4, before the first terminal joins the multicast group, a schematic configuration diagram of the multicast group may be shown in FIG. 32(*a*). The terminal 4 in FIG. 32(*a*) does not join the multicast group. Therefore, only a session port 11 and a tunnel endpoint 41 that are on the UPF network element 1 accessed by the terminal 4 after the terminal 4 establishes a PDU session, and a tunnel endpoint 42 on the UPF network element 2 connected to the UPF network element 1 after the terminal 4 establishes the PDU session are simply shown. For a specific PDU session establishment procedure, refer to the embodiment shown in FIG. 12A, FIG. 12B, and FIG. 12C. Details are not described herein again. In this case, assuming that a downstream port corresponding to the session port identifier 11 is a downstream port 4, after the first terminal joins the multicast group, and a subsequent configuration procedure in steps S2906 to S2908 is complete, a schematic configuration diagram of the multicast group may be shown in FIG. 32(*b*). To be specific, an egress PDR 4 and an egress FAR 4 are configured on the session port 11 (namely, the downstream port 4 in FIG. 32(*b*)) corresponding to the session port identifier 11 on the UPF network element 1, an ingress PDR 2 is configured on the tunnel endpoint 41 on the UPF network element 1, and the rule used to duplicate the received multicast packet belonging to the multicast group and then send the multicast packet to the downstream port 4 is added to an updated multicast group FAR 1. In addition, an egress PDR 1 and an egress FAR 1 are configured on the tunnel endpoint 42 (namely, a downstream port 1 in FIG. 32(*b*)) on the UPF network element 2, and the rule used to duplicate the received multicast packet belonging to the multicast group and then send the multicast packet to the downstream port 1 is added to an updated multicast group FAR 2.

Figure 33A:
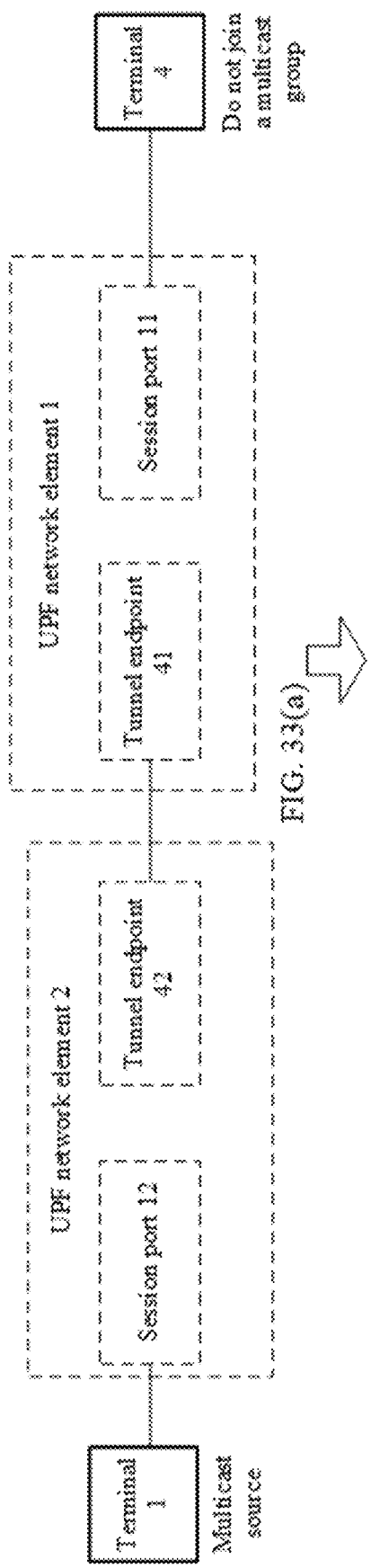
FIG. 33(a) and FIG. 33(b) are a schematic configuration diagram 5 of a UPF network element in a multicast scenario according to an embodiment of this application.
Figure 33B:
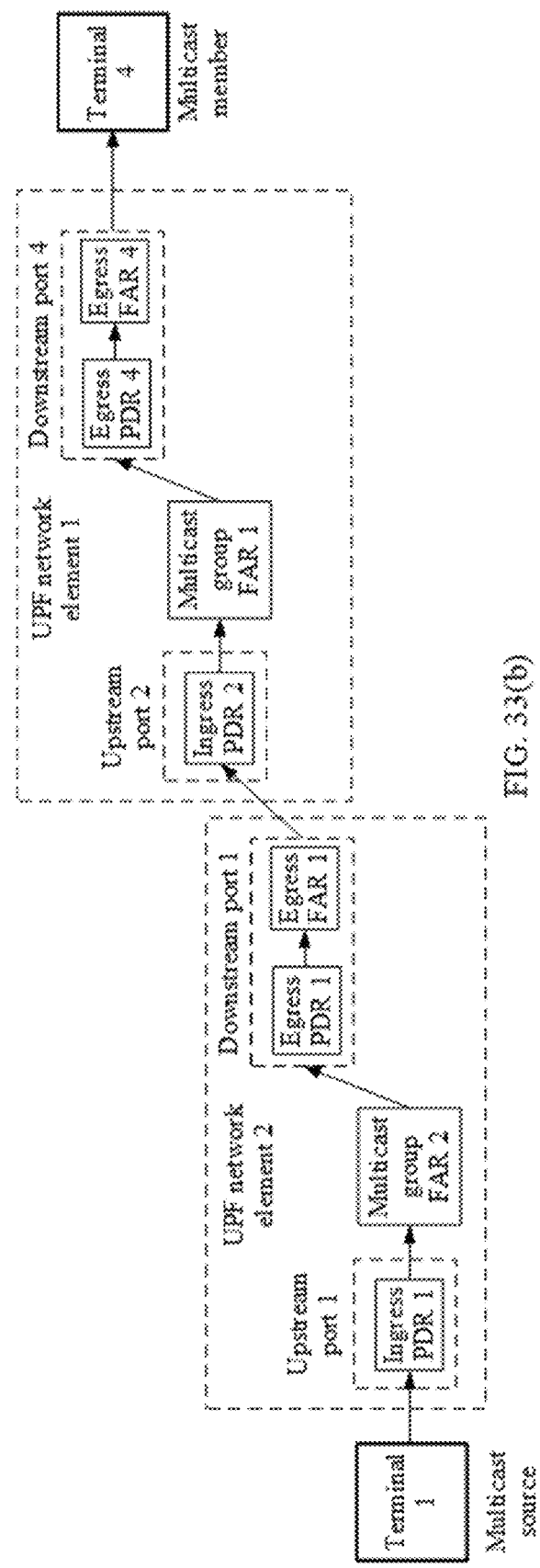

Alternatively, for example, assuming that the first terminal is the terminal 4, before the first terminal joins the multicast group, a schematic configuration diagram of the multicast group may be shown in FIG. 33(*a*). The terminal 4 in FIG. 33(*a*) does not join the multicast group. Therefore, only a session port 11 and a tunnel endpoint 41 that are on the UPF network element 1 accessed by the terminal 4 after the terminal 4 establishes a PDU session, and a tunnel endpoint 42 and a session port 12 that are on the UPF network element 2 connected to the UPF network element 1 after the terminal 4 establishes the PDU session are simply shown. For a specific PDU session establishment procedure, refer to the embodiment shown in FIG. 12A, FIG. 12B, and FIG. 12C. Details are not described herein again. In this case, assuming that a downstream port corresponding to the session port identifier 11 is a downstream port 4, after the first terminal joins the multicast group, and a subsequent configuration procedure in steps S2906 to S2908 is complete, a schematic configuration diagram of the multicast group may be shown in FIG. 33(*b*). To be specific, an egress PDR 4 and an egress FAR 4 are configured on the session port 11 (namely, the downstream port 4 in FIG. 33(*b*)) corresponding to the session port identifier 11 on the UPF network element 1, an ingress PDR 2 is configured on the tunnel endpoint 41 (namely, an upstream port 2 in FIG. 33(*b*)) on the UPF network element 1, and the rule used to duplicate the received multicast packet belonging to the multicast group and then send the multicast packet to the downstream port 4 is added to an updated multicast group FAR 1. In addition, an egress PDR 1 and an egress FAR 1 are configured on the tunnel endpoint 42 (namely, a downstream port 1 in FIG. 33(*b*)) on the UPF network element 2, an ingress PDR 1 is configured on the session port 12 (namely, an upstream port 1 in FIG. 33(*b*)) on the UPF network element 2, and the rule used to duplicate the received multicast packet belonging to the multicast group and then send the multicast packet to the downstream port 1 is added to an updated multicast group FAR 2.

It should be noted that, it can be learned from the foregoing prerequisites that in the group communications method provided in this embodiment of this application, descriptions are provided by using an example in which the multicast member is the terminal member that belongs to the 5GLAN group and that has accessed the network in the foregoing broadcast scenario. Therefore, during establishment of the multicast group, a tunnel between UPF network elements does not need to be established. Certainly, the multicast member in this embodiment of this application may not be limited to the terminal member that belongs to the 5GLAN group and that has accessed the network in the foregoing broadcast scenario. In this case, when a terminal member in the multicast group changes (for example, when a multicast member joins the multicast group in this embodiment, when a multicast member leaves the multicast group in the following embodiment, or when a multicast member in the multicast group moves in the following embodiment), a tunnel between UPF network elements may need to be established, and a tunnel endpoint on a corresponding UPF network element may need to be created; or a tunnel between UPF network elements needs to be deleted, and a tunnel endpoint on a corresponding user plane network element needs to be deleted. For a specific implementation, refer to the related descriptions in the foregoing broadcast scenario. This scenario is not described in detail in this embodiment of this application.

S2906: The GMF network element sends a 5GLAN service response message to the SMF network element. Correspondingly, the SMF network element receives the 5GLAN service response message from the GMF network element.

The 5GLAN service response message carries an identifier of the UPF network element 1, an identifier that is of a downstream port and that corresponds to the identifier of the UPF network element 1, an egress PDR and an egress FAR that are applied to the downstream port on the UPF network element 1, and an updated multicast group FAR 1 applied to the UPF network element 1.

Optionally, in this embodiment of this application, if the UPF network element accessed by the multicast source and the UPF network element 1 are different UPF network elements, and the target UPF network element is the UPF network element that has the upstream port corresponding to the multicast group, the 5GLAN service response message may further carry an identifier of an upstream port and that corresponds to the identifier of the UPF network element 1, an ingress PDR applied to the upstream port on the UPF network element 1, and an identifier of each UPF network element between the UPF network element 1 and the target UPF network element; an identifier that is of a downstream port and that corresponds to the identifier of the corresponding UPF network element, an egress PDR and an egress FAR that are applied to the downstream port, an identifier of an upstream port, an ingress PDR applied to the upstream port, and an updated multicast group FAR applied to the UPF network element; and an identifier of the target UPF network element, an identifier that is of a downstream port and that corresponds to the identifier of the target UPF network element, an egress PDR and an egress FAR that are applied to the downstream port, and an updated multicast group FAR applied to the target UPF network element.

Alternatively, optionally, in this embodiment of this application, if the UPF network element accessed by the multicast source and the UPF network element 1 are different UPF network elements, and the target UPF network element is the UPF network element accessed by the multicast source, the 5GLAN service response message may further carry an identifier that is of an upstream port and that corresponds to the identifier of the UPF network element 1, an ingress PDR applied to the upstream port on the UPF network element 1, an identifier of each UPF network element between the UPF network element 1 and the target UPF network element, and an identifier of the target UPF network element; and an identifier that is of a downstream port and that corresponds to the identifier of the corresponding UPF network element, an egress PDR and an egress FAR that are applied to the downstream port, an identifier of an upstream port, an ingress PDR applied to the upstream port, and a created or updated multicast group FAR applied to the UPF network element.

S2907: The SMF network element sends an N4 session modification request message to the UPF network element 1 based on the identifier of the UPF network element 1. Correspondingly, the UPF network element 1 receives the N4 session modification request message from the SMF network element.

The N4 session modification request message includes an identifier that is of a downstream port and that corresponds to the identifier of the UPF network element 1, an egress PDR and an egress FAR that are applied to the downstream port on the UPF network element 1, and an updated multicast group FAR 1 applied to the UPF network element 1.

S2908: The UPF network element 1 configures the egress PDR and the egress FAR on the downstream port on the UPF network element 1 based on the identifier of the downstream port and the egress PDR and the egress FAR that are applied to the downstream port on the UPF network element 1; and the UPF network element 1 updates, based on the updated multicast group FAR 1, the multicast group FAR 1 applied to the UPF network element 1.

S2909: The UPF network element 1 sends an N4 session modification response message to the SMF network element. Correspondingly, the SMF network element receives the N4 session modification response message from the UPF network element 1.

The N4 session modification response message is used to notify that N4 session modification and rule installation are complete.

Optionally, in this embodiment of this application, if the UPF network element accessed by the multicast source and the UPF network element 1 are different UPF network elements, the N4 session modification request message further includes an identifier that is of an upstream port and that corresponds to the identifier of the UPF network element 1, and an ingress PDR applied to the upstream port on the UPF network element 1. Correspondingly, the UPF network element 1 may further configure the ingress PDR on the upstream port on the UPF network element 1 based on the identifier of the upstream port and the ingress PDR applied to the upstream port on the UPF network element 1.

Optionally, in this embodiment of this application, if the UPF network element accessed by the multicast source and the UPF network element 1 are different UPF network elements, and the target UPF network element is the UPF network element that has the upstream port corresponding to the multicast group, the SMF network element further needs to send, to a corresponding UPF network element based on an identifier of each UPF network element between the UPF network element 1 and the target UPF network element, an identifier of a corresponding downstream port, an egress PDR and an egress FAR that are applied to the downstream port, an identifier of an upstream port, an ingress PDR applied to the upstream port, and an updated multicast group FAR applied to the UPF network element. In this way, each UPF network element can configure the egress PDR and the egress FAR on the downstream port on the UPF network element based on the identifier of the downstream port and the egress PDR and the egress FAR that are applied to the downstream port; each UPF network element can configure the ingress PDR on the upstream port on the UPF network element based on the identifier of the upstream port and the ingress PDR applied to the upstream port; and each UPF network element can update, based on the updated multicast group FAR, the multicast group FAR applied to the UPF network element.

In addition, the SMF network element needs to send, to the target UPF network element, an identifier that is of a downstream port and that corresponds to the identifier of the target UPF network element, an egress PDR and an egress FAR that are applied to the downstream port, and an updated multicast group FAR applied to the target UPF network element. In this way, the target UPF network element can configure the egress PDR and the egress FAR on the downstream port on the target UPF network element based on the identifier of the downstream port and the egress PDR and the egress FAR that are applied to the downstream port; and the target UPF network element can update, based on the updated multicast group FAR, the multicast group FAR applied to the target UPF network element.

Optionally, in this embodiment of this application, if the UPF network element accessed by the multicast source and the UPF network element 1 are different UPF network elements, and the target UPF network element is the UPF network element accessed by the multicast source, the SMF network element needs to send, to a corresponding UPF network element based on an identifier of each UPF network element between the UPF network element 1 and the target UPF network element and an identifier of the target UPF network element, an identifier that is of a downstream port and that corresponds to the identifier of the corresponding UPF network element, an egress PDR and an egress FAR that are applied to the downstream port, an identifier of an upstream port, an ingress PDR applied to the upstream port, and a created or updated multicast group FAR applied to the UPF network element. In this way, each UPF network element can configure the egress PDR and the egress FAR on the downstream port on the UPF network element based on the identifier of the downstream port and the egress PDR and the egress FAR that are applied to the downstream port; each UPF network element can configure the ingress PDR on the upstream port on the UPF network element based on the identifier of the upstream port and the ingress PDR applied to the upstream port; and each UPF network element can update, based on the updated multicast group FAR, the multicast group FAR applied to the UPF network element.

According to the group communications method, when a multicast member joins the multicast group, only a multicast group FAR on an associated UPF network element needs to be adjusted (updated or created), and an ingress PDR, an egress PDR, and an egress FAR that are on the associated UPF network element and that correspond to the multicast member need to be adjusted (created) or an egress PDR and an egress FAR that are on the associated UPF network element and that correspond to the multicast member need to be adjusted (created), but an ingress PDR, an egress PDR, and an egress FAR that correspond to another multicast member in the multicast group remain unchanged. Therefore, when there are a relatively large number of multicast members in the multicast group, a problem that configuration workload caused by a change in a quantity of multicast members is greatly increased can be avoided, and the configuration workload caused by the change in the quantity of multicast members can be greatly reduced.

The actions of the GMF network element, the SMF network element, or the UPF network element 1 in steps S2901 to S2909 may be performed by the processor 1101 in the communications device 1100 shown in FIG. 11 by invoking the application program code stored in the memory 1103. This is not limited in this embodiment.

Optionally, scenarios in which the group communications system shown in FIG. 8 is applied to the 5G network shown in FIG. 9; the group management function network element is a GMF network element, the session management network element is an SMF network element (for example, the first session management network element is an SMF 1 network element, and the second session management network element is an SMF 2 network element), and the user plane network element is a UPF network element (for example, the first user plane network element is a UPF network element 1, and the second user plane network element is a UPF network element 2); and the multicast member leaves the multicast group are used as examples. In this case, in the scenario in which the multicast member leaves the multicast group, there may be the following two cases (for example, a to-be-leaved multicast member is a first terminal).

Case 3: A UPF network element (assumed to be the UPF network element 3) originally accessed by the first terminal has another multicast member or a multicast source in the multicast group.

Step 1: Modify a multicast group FAR 3 on the UPF network element 3, and delete a rule pointing to a downstream port of the multicast member.

Step 2: Delete an egress PDR and an egress FAR that are on the downstream port of the multicast member on the UPF network element 3.

Case 4: A UPF network element (assumed to be the UPF network element 3) originally accessed by the first terminal has no other multicast member or no multicast source in the multicast group.

Step 1: Delete a multicast group FAR 3 on the UPF network element 3, and delete an egress PDR and an egress FAR that are on a downstream port of the multicast member on the UPF network element 3.

Step 2: Delete an ingress PDR on an upstream port of the multicast member on the UPF network element 3.

Step 3: Modify a multicast group FAR on an upstream UPF network element of the UPF network element 3, and delete a rule pointing to a downstream port associated with the multicast member; and delete an egress PDR and an egress FAR that are on the downstream port associated with the multicast member on the upstream UPF network element of the UPF network element 3.

Step 4: If the upstream UPF network element of the UPF network element 3 has no other multicast member or no multicast source in the multicast group, cyclically perform steps similar to step 2 and step 3 (a difference lies in that UPF network elements are different), until an upstream UPF network element has another multicast member or a multicast source in the multicast group or until a multicast source accesses a UPF network element (which may be considered as a target UPF network element). If the target UPF network element has another multicast member in the multicast group, the target UPF network element ends the process after performing a step similar to step 3 (a difference lies in that the UPF network elements are different). Alternatively, if the target UPF network element is the UPF network element accessed by the multicast source, the UPF network element further needs to end the process after performing steps similar to step 2 and step 3 (a difference lies in that the UPF network elements are different).

Figure 34A:
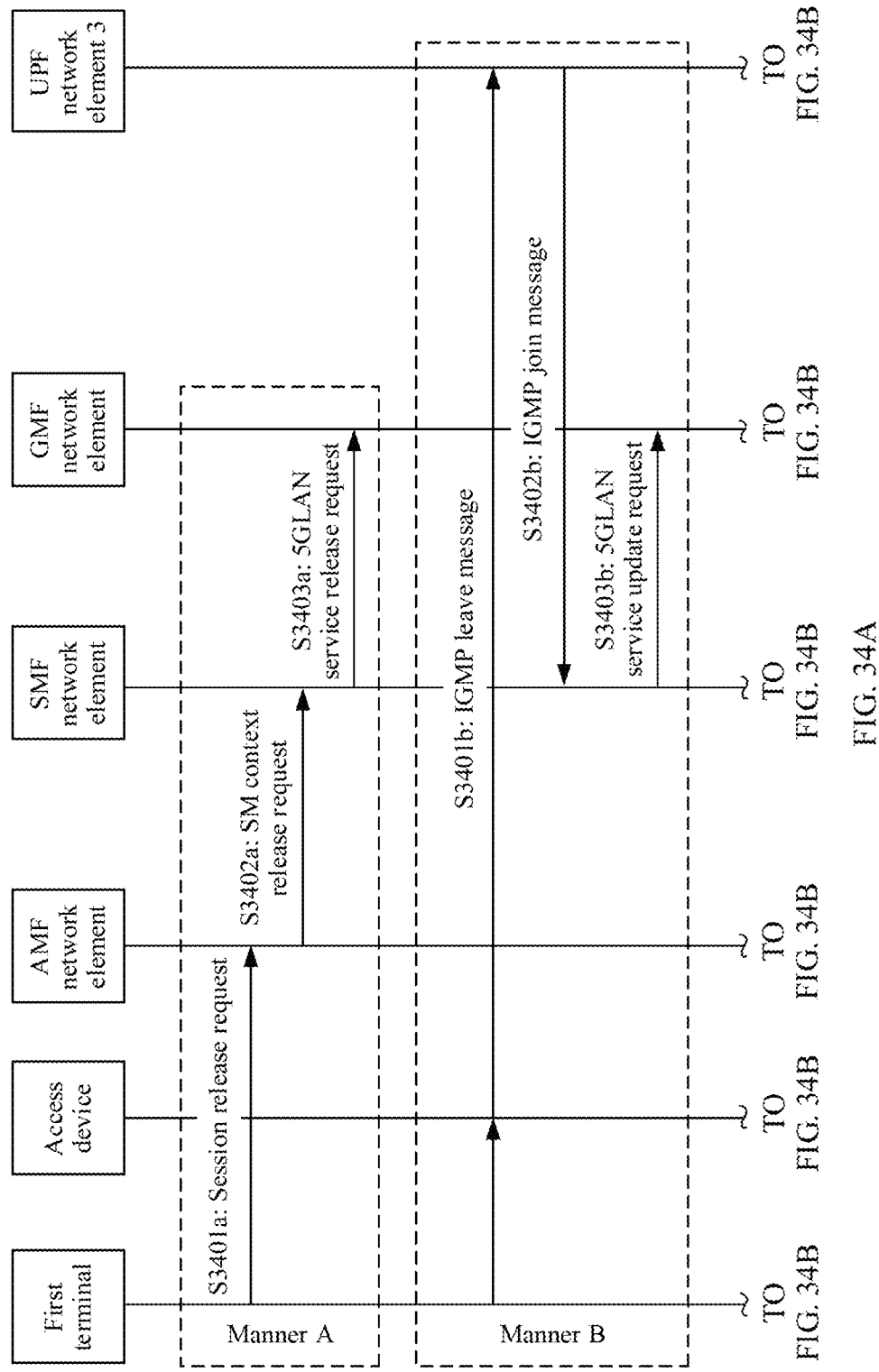
FIG. 34A and FIG. 34B are a schematic flowchart 5 of a group communications method according to an embodiment of this application.
Figure 34B:
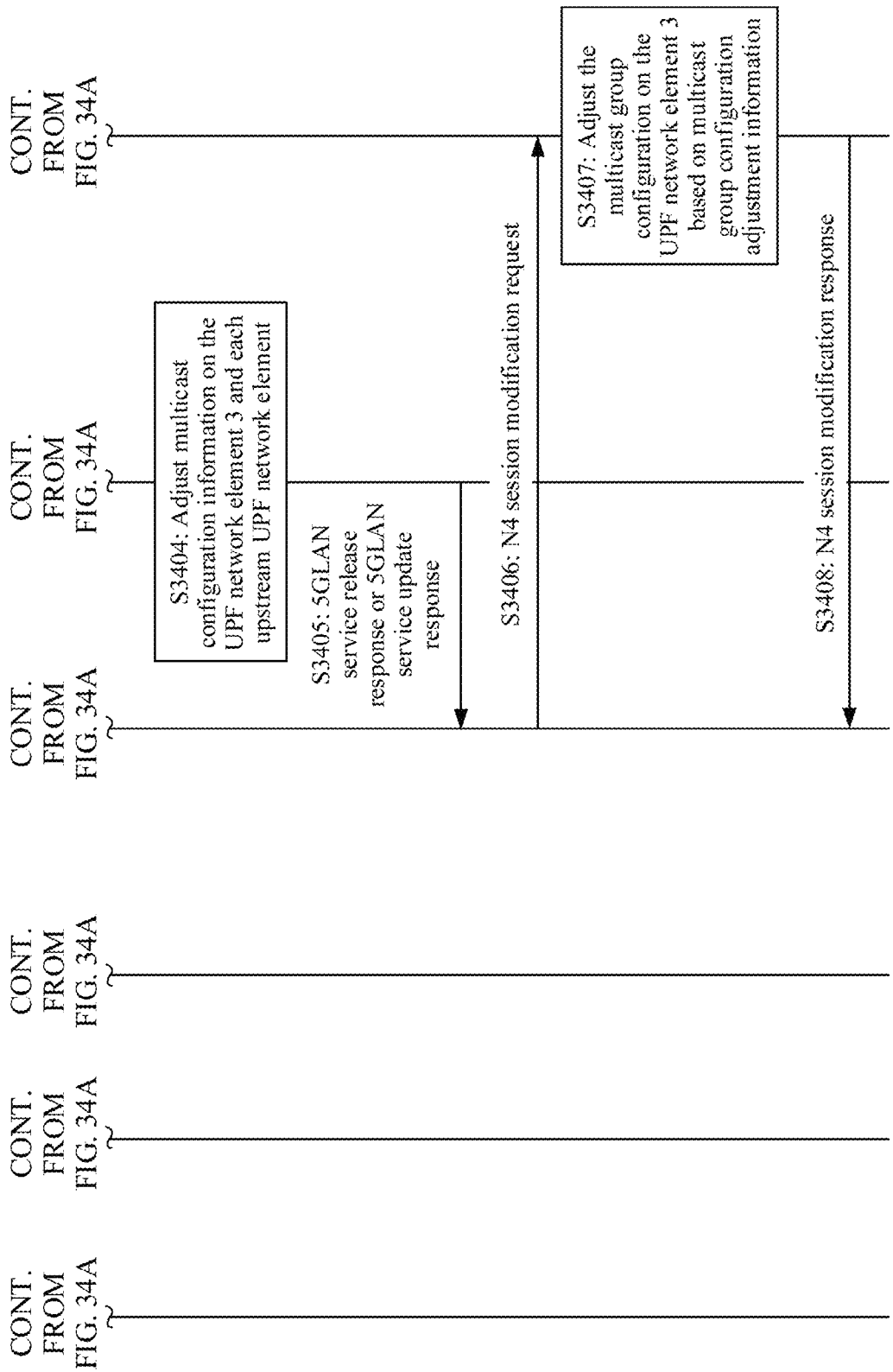

The following provides a group communications method provided in an embodiment of this application in a scenario in which a multicast member leaves a multicast group. As shown in FIG. 34A and FIG. 34B, the group communications method includes the following steps.

Prerequisites: A first terminal has accessed the UPF network element 3, and a configuration for a multicast group that the first terminal joins is created on the UPF network element 3 and includes a multicast group FAR and a related rule group. For an establishment method, refer to the embodiment shown in FIG. 29. Details are not described herein again. A configuration for a multicast group that the first terminal joins may also be created on the UPF network element 2 and includes a multicast group FAR and a related rule group. For an establishment method, refer to the embodiment shown in FIG. 29. The UPF network element 3 is connected to the UPF network element 2.

The first terminal leaves the multicast group in two manners. In one manner, the first terminal initiates a session release procedure. In the other manner, the first terminal explicitly initiates an IGMP leave message to announce that the first terminal leaves the multicast group.

The manner in which the first terminal initiates the session release procedure includes steps S3401*a* to S3403*a*.

S3401*a*: A first terminal sends a session release request to an AMF network element. Correspondingly, the AMF network element receives the session release request from the first terminal.

S3402*a*: The AMF network element sends an SM context update request to an SMF network element. Correspondingly, the SMF network element receives the SM context update request from the AMF network element.

Optionally, the SM context update request may alternatively be replaced with a PDU session update request. This is not specifically limited in this embodiment of this application.

For specific implementation of steps S3401*a* and 53402*a*, refer to an existing implementation. Details are not described herein.

S3403*a*: If the SMF network element determines that the first terminal initiates multicast group communication, the SMF network element sends a 5GLAN service update request to a GMF network element. Correspondingly, the GMF network element receives the 5GLAN service update request from the SMF network element.

The 5GLAN service update request is used to request the GMF network element to update forwarding information of the multicast group.

Alternatively, the manner in which the first terminal explicitly initiates the IGMP leave message to announce that the first terminal leaves the multicast group includes steps S3401*b* to S3403*b*.

S3401*b*: A first terminal sends an IGMP leave message to a UPF network element 3 by using an access device. Correspondingly, the UPF network element 3 receives the IGMP leave message from the first terminal.

The IGMP leave message includes an address of the multicast group.

It should be noted that in this embodiment of this application, the first terminal sends the IGMP leave message to the UPF network element 3 only as a multicast member, but a multicast source or a member that is not in the multicast group does not send the IGMP leave message to the UPF network element 3. Unified descriptions are provided herein, and details are not described below.

For a manner in which the first terminal obtains the address of the multicast group, refer to an existing implementation. Details are not described herein.

S3402*b*: The UPF network element 3 identifies the IGMP leave message, and further sends the IGMP leave message to a connected SMF network element. Correspondingly, the SMF network element receives the IGMP leave message from the UPF network element 3.

In this embodiment of this application, the IGMP leave message may be carried in an N4 interface message sent by the UPF network element 3 to the SMF network element and sent to the SMF network element. This is not specifically limited in this embodiment of this application.

S3403*b*: The SMF network element identifies the IGMP leave message, finds, by using a context that is of the first terminal and that is stored on the SMF network element, that the first terminal has previously joined multicast communication, and therefore learns that the first terminal is about to leave the joined multicast group, and further sends a 5GLAN service update request to a GMF network element. Correspondingly, the GMF network element receives the 5GLAN service update request from the SMF network element.

The 5GLAN service update request carries the IGMP leave message and an identifier of the first terminal.

Optionally, the 5GLAN service update request may carry an identifier of the UPF network element 3 and a session port identifier 13.

Based on steps S3401*a* to S3403*a* or steps S3401*b* to S3403*b*, the GMF network element may learn that the first terminal is about to leave the multicast group in which the first terminal is located, and may continue to perform the following steps.

S3404: The GMF network element adjusts multicast forwarding rules on the UPF network element 3 and each upstream UPF network element based on context information that is of the multicast group and that is stored on the GMF network element. An adjustment method is similar to the foregoing descriptions in this procedure, and is not described herein again.

For a manner of determining a corresponding upstream port or downstream port, refer to the embodiment shown in FIG. 29. Details are not described herein again.

S3405: Corresponding to the procedure in Manner A, the GMF network element sends a 5GLAN service release response to the SMF network element. Correspondingly, the SMF network element receives the 5GLAN service release response from the GMF network element. Alternatively, corresponding to the procedure in Manner B, the GMF network element sends a 5GLAN service update response to the SMF network element. Correspondingly, the SMF network element receives the 5GLAN service update response from the GMF network element.

The 5GLAN service release response or the 5GLAN service update response includes an identifier of a UPF network element on which multicast group configuration information needs to be adjusted, and multicast group configuration adjustment information corresponding to the identifier of the corresponding UPF network element. For example, when the first terminal leaves the multicast group through the session release procedure, and an ingress PDR on an upstream port on a UPF network element needs to be deleted, the multicast group configuration adjustment information includes an identifier of the upstream port, and is used to delete the upstream port and the ingress PDR on the upstream port. Alternatively, when an egress PDR and an egress FAR that are on a downstream port on a UPF network element need to be deleted, the multicast group configuration adjustment information includes an identifier of the downstream port, and is used to delete the downstream port and the ingress PDR on the downstream port. Alternatively, when a multicast group FAR on a UPF network element needs to be deleted, the multicast group configuration adjustment information includes an identifier of the multicast group FAR. Alternatively, when a multicast group FAR on a UPF network element needs to be updated, the multicast group configuration adjustment information includes an updated multicast group FAR.

Optionally, in this embodiment of this application, when the upstream port or the downstream port is deleted, optionally, a rule group that is on the upstream port or the downstream port and that is created in a PDU session establishment process also needs to be deleted. Unified descriptions are provided herein, and details are not described below.

Alternatively, for example, when the first terminal leaves the multicast group by using the IGMP leave message, and an ingress PDR on an upstream port on a UPF network element needs to be deleted, the multicast group configuration adjustment information includes an identifier of the upstream port and an identifier of the ingress PDR applied to the upstream port. Alternatively, when an egress PDR and an egress FAR that are on a downstream port on a UPF network element need to be deleted, the multicast group configuration adjustment information includes an identifier of the downstream port and an identifier of the egress PDR applied to the downstream port, and optionally, may carry an identifier of the egress FAR indicated by the egress PDR. Alternatively, when a multicast group FAR on a UPF network element needs to be deleted, the multicast group configuration adjustment information includes an identifier of the multicast group FAR. Alternatively, when a multicast group FAR on a UPF network element needs to be updated, the multicast group configuration adjustment information includes an updated multicast group FAR.

S3406: The SMF network element sends, to the corresponding UPF network element based on the identifier of the UPF network element on which the multicast group configuration information needs to be adjusted and the multicast group configuration adjustment information corresponding to the identifier of the corresponding UPF network element, the multicast group configuration adjustment information corresponding to the identifier of the UPF network element. Descriptions are provided herein by using an example in which the SMF network element communicates with the UPF network element 3. In this case, the SMF network element sends an N4 session modification request to the UPF network element 3 based on the identifier of the UPF network element 3. Correspondingly, the UPF network element 3 receives the N4 session modification request from the SMF network element.

The N4 session modification request includes the multicast group configuration adjustment information corresponding to the identifier of the UPF network element 3. For example, when the first terminal leaves the multicast group through the session release procedure, the multicast group configuration adjustment information corresponding to the identifier of the UPF network element 3 may include, for example, an identifier that is of a downstream port and that corresponds to the identifier of the UPF network element 3. Optionally, when the UPF network element 3 has another multicast member or a multicast source in the multicast group, the multicast group configuration adjustment information corresponding to the identifier of the UPF network element 3 may further include, for example, an updated multicast group FAR 3 applied to the UPF network element 3. Alternatively, optionally, when the UPF network element 3 has no other multicast member or no multicast source in the multicast group, the multicast group configuration adjustment information corresponding to the identifier of the UPF network element 3 may further include, for example, an identifier of a multicast group FAR 3 applied to the UPF network element 3 and an identifier that is of an upstream port and that corresponds to the identifier of the UPF network element 3.

Alternatively, for example, when the first terminal leaves the multicast group by using the IGMP leave message, the multicast group configuration adjustment information corresponding to the identifier of the UPF network element 3 may include, for example, an identifier that is of a downstream port and that corresponds to the identifier of the UPF network element 3 and an identifier of an egress PDR applied to the downstream port on the UPF network element 3, and optionally, includes an identifier of an egress FAR indicated by the egress PDR. Optionally, when the UPF network element 3 has another multicast member or a multicast source in the multicast group, the multicast group configuration adjustment information corresponding to the identifier of the UPF network element 3 may further include, for example, an updated multicast group FAR 3 applied to the UPF network element 3. Alternatively, optionally, when the UPF network element 3 has no other multicast member or no multicast source in the multicast group, the multicast group configuration adjustment information corresponding to the identifier of the UPF network element 3 may further include, for example, an identifier of a multicast group FAR 3 applied to the UPF network element 3, an identifier that is of an upstream port and that corresponds to the identifier of the UPF network element 3, and an identifier of an ingress PDR applied to the upstream port on the UPF network element 3.

S3407: The UPF network element 3 adjusts the multicast group configuration on the UPF network element 3 based on the multicast group configuration adjustment information.

For example, when the first terminal leaves the multicast group by using the IGMP leave message, the UPF network element 3 may delete, based on the identifier of the downstream port and the identifier of the egress PDR applied to the downstream port, the egress PDR corresponding to the identifier of the egress PDR applied to the downstream port on the UPF network element 3 and the egress FAR indicated by the egress PDR.

Alternatively, for example, when the first terminal leaves the multicast group through the session release procedure, the UPF network element 3 may delete the downstream port and the egress PDR and the egress FAR that are on the downstream port based on the identifier of the downstream port.

Optionally, when the UPF network element 3 has another multicast member or a multicast source in the multicast group, the UPF network element 3 updates, based on the updated multicast group FAR 3 applied to the UPF network element 3, the multicast group FAR 3 applied to the UPF network element 3.

Alternatively, optionally, when the UPF network element 3 has no other multicast member or no multicast source in the multicast group, the UPF network element 3 deletes, based on the identifier of the multicast group FAR 3 applied to the UPF network element 3, the multicast group FAR 3 applied to the UPF network element 3. When the first terminal leaves the multicast group by using the IGMP leave message, the UPF network element 3 deletes, based on the identifier of the upstream port and the identifier of the ingress PDR applied to the upstream port, the ingress PDR corresponding to the identifier of the ingress PDR applied to the upstream port on the UPF network element 3. When the first terminal leaves the multicast group through the session release procedure, the UPF network element 3 deletes the upstream port and the ingress PDR on the upstream port based on the identifier of the upstream port.

S3408: The UPF network element 3 sends an N4 session modification response message to the SMF network element. Correspondingly, the SMF network element receives the N4 session modification response message from the UPF network element 3.

The N4 session modification response message is used to notify that configuration update is complete.

It should be noted that in steps S3406 to S3408, descriptions are provided by using the multicast group configuration update procedure on the UPF network element 3 as an example. For a multicast group configuration update procedure on another UPF network element on which the multicast group configuration information needs to be adjusted, refer to steps S3406 to S3408. Details are not described herein again.

Figure 35A:
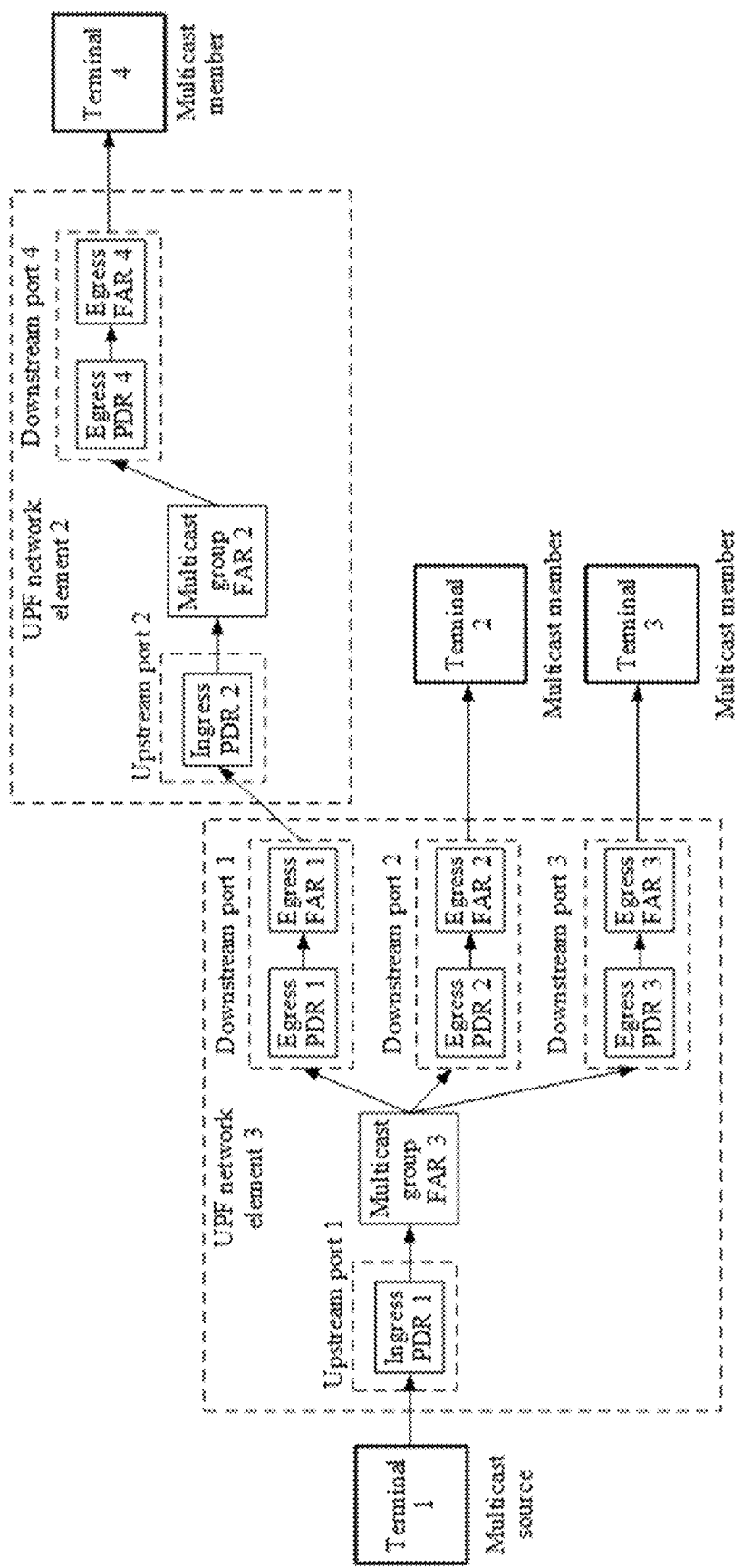
FIG. 35(a) and FIG. 35(b) are a schematic configuration diagram 6 of a UPF network element in a multicast scenario according to an embodiment of this application.
Figure 35B:
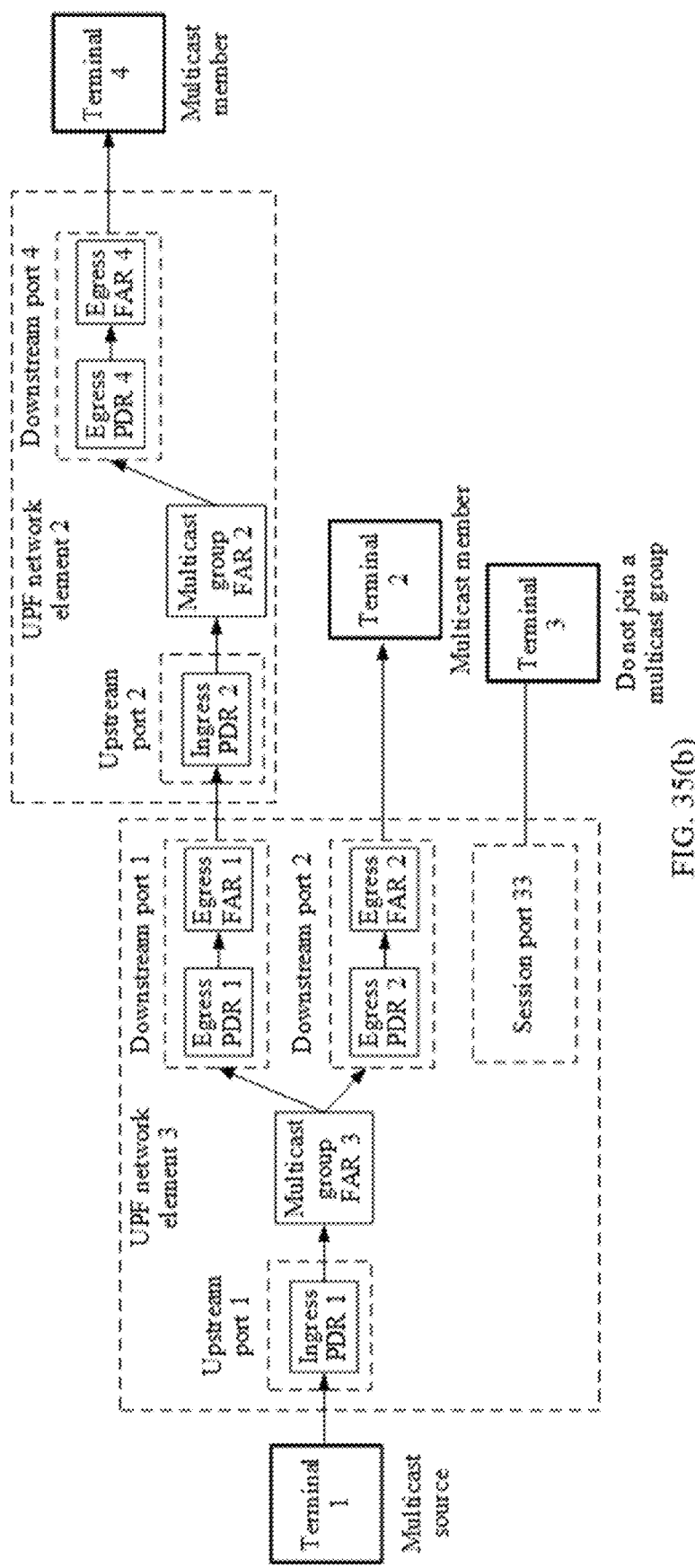

For example, assuming that the first terminal is the terminal 3, before the first terminal leaves the multicast group, a schematic configuration diagram of the multicast group may be shown in FIG. 35(*a*). In this case, based on the foregoing procedure, assuming that a downstream port 3 corresponds to a session port 33, after the first terminal leaves the multicast group, a schematic configuration diagram of the multicast group may be shown in FIG. 35(*b*). It can be learned that an egress PDR 3 and an egress FAR 3 that are on the downstream port 3 shown in FIG. 35(*a*) are deleted, and a rule used to duplicate a received multicast packet belonging to the multicast group and then send the multicast packet to the downstream port 3 (namely, the session port 33) is deleted from the updated multicast group FAR 3. It should be noted that the terminal 3 in FIG. 35(*b*) does not join the multicast group. Therefore, only a session port 33 on the UPF network element 3 accessed by the terminal 3 after the terminal 3 establishes a PDU session is simply shown. For a specific PDU session establishment procedure, refer to the embodiment shown in FIG. 12A, FIG. 12B, and FIG. 12C. Details are not described herein again.

Figure 36A:
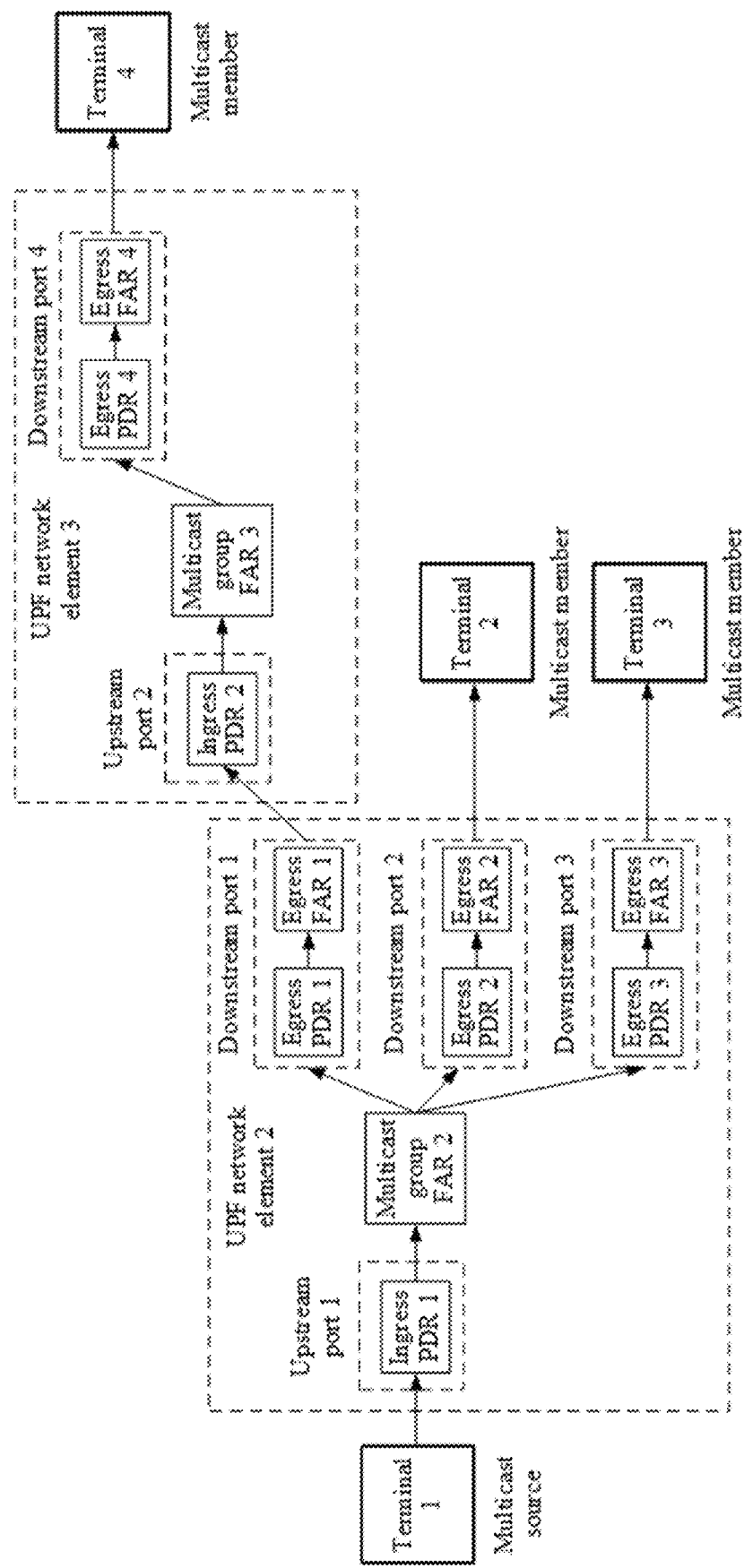

Alternatively, for example, assuming that the first terminal is the terminal 4, before the first terminal leaves the multicast group, a schematic configuration diagram of the multicast group may be shown in FIG. 36(*a*). In this case, based on the foregoing procedure, assuming that a downstream port 4 corresponds to a session port 43, after the first terminal leaves the multicast group, a schematic configuration diagram of the multicast group may be shown in FIG. 36(*b*). It can be learned that an egress PDR 4 and an egress FAR 4 that are on the downstream port 4 on the UPF network element 3 shown in FIG. 36(*a*) are deleted; and an ingress PDR 2 on an upstream port 2 on the UPF network element 3 shown in FIG. 36(*a*) is deleted. An egress PDR 1 and an egress FAR 1 that are on a downstream port 1 on the UPF network element 2 shown in FIG. 36(*a*) are deleted. In addition, the multicast group FAR 3 applied to the UPF network element 3 is deleted, and a rule used to duplicate a received multicast packet belonging to the multicast group and then send the multicast packet to the downstream port 1 is deleted from the updated multicast group FAR 2 applied to the UPF network element 2. It should be noted that the terminal 4 in FIG. 36(*b*) does not join the multicast group. Therefore, only a session port 43 and a tunnel endpoint 41 that are on the UPF network element 3 accessed by the terminal 4 after the terminal 4 establishes a PDU session, and a tunnel endpoint 42 on the UPF network element 2 connected to the UPF network element 1 after the terminal 4 establishes the PDU session are simply shown. For a specific PDU session establishment procedure, refer to the embodiment shown in FIG. 12A, FIG. 12B, and FIG. 12C. Details are not described herein again.

Figures 37A, 37B:
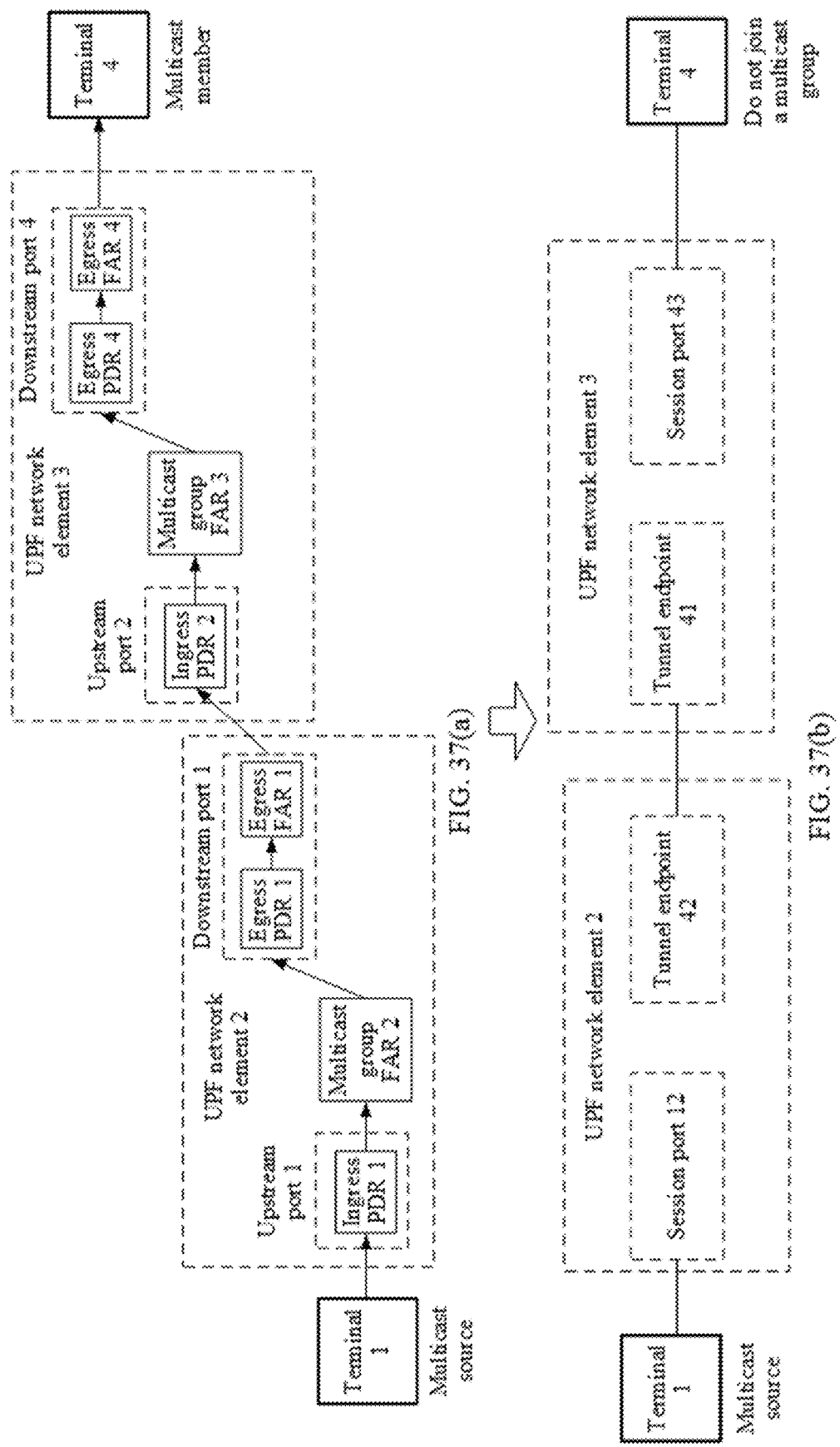
FIG. 37(a) and FIG. 37(b) are a schematic configuration diagram 8 of a UPF network element in a multicast scenario according to an embodiment of this application.

Alternatively, for example, assuming that the first terminal is the terminal 4, before the first terminal joins the multicast group, a schematic configuration diagram of the multicast group may be shown in FIG. 37(*a*). In this case, based on the foregoing procedure, assuming that a downstream port 4 corresponds to a session port 43, after the first terminal leaves the multicast group, a schematic configuration diagram of the multicast group may be shown in FIG. 37(*b*). It can be learned that an egress PDR 4 and an egress FAR 4 that are on the downstream port 4 on the UPF network element 3 shown in FIG. 37(*a*) are deleted; and an ingress PDR 2 on an upstream port 2 on the UPF network element 3 shown in FIG. 37(*a*) is deleted. An egress PDR 1 and an egress FAR 1 that are on a downstream port 1 on the UPF network element 2 shown in FIG. 37(*a*) are deleted; and an ingress PDR 1 on an upstream port 1 on the UPF network element 2 shown in FIG. 37(*a*) is deleted. In addition, a multicast group FAR 3 applied to the UPF network element 3 is deleted, and a multicast group FAR 2 applied to the UPF network element 2 is deleted. It should be noted that the terminal 4 in FIG. 37(*b*) does not join the multicast group. Therefore, only a session port 43 and a tunnel endpoint 41 that are on the UPF network element 3 accessed by the terminal 4 after the terminal 4 establishes a PDU session, and a tunnel endpoint 42 and a session port 12 that are on the UPF network element 2 connected to the UPF network element 1 after the terminal 4 establishes the PDU session are simply shown. For a specific PDU session establishment procedure, refer to the embodiment shown in FIG. 12A, FIG. 12B, and FIG. 12C. Details are not described herein again.

According to the group communications method, when a multicast member leaves the multicast group, only a multicast group FAR on an associated UPF network element needs to be adjusted (updated or created), and an ingress PDR, an egress PDR, and an egress FAR that are on the associated UPF network element and that correspond to the multicast member need to be adjusted (created) or an egress PDR and an egress FAR that are on the associated UPF network element and that correspond to the multicast member need to be adjusted (created), but an ingress PDR, an egress PDR, and an egress FAR that correspond to another multicast member in the multicast group remain unchanged. Therefore, when there are a relatively large number of multicast members in the multicast group, a problem that configuration workload caused by a change in a quantity of multicast members is greatly increased can be avoided, and the configuration workload caused by the change in the quantity of multicast members can be greatly reduced.

The actions of the GMF network element, the SMF network element, or the UPF network element 3 in steps S3401 to S3408 may be performed by the processor 1101 in the communications device 1100 shown in FIG. 11 by invoking the application program code stored in the memory 1103. This is not limited in this embodiment.

Optionally, scenarios in which the group communications system shown in FIG. 8 is applied to the 5G network shown in FIG. 9; the group management function network element is a GMF network element, the session management network element is an SMF network element (for example, the first session management network element is an SMF 1 network element, and the second session management network element is an SMF 2 network element), and the user plane network element is a UPF network element (for example, the first user plane network element is a UPF network element 1, and the second user plane network element is a UPF network element 2); and the multicast member moves are used as examples. In this case, in the scenario in which the multicast member moves, there may be the following cases (for example, a to-be-leaved multicast member is a first terminal, a UPF network element originally accessed by the first terminal is a UPF network element 3, and a newly selected UPF network element is a UPF network element 1).

Case 1: A UPF network element (assumed to be the UPF network element 1) newly selected by the first terminal has another multicast member or a multicast source in the multicast group.

Step 1: Modify a multicast group FAR 1 on the UPF network element 1, and add a rule pointing to a downstream port of the multicast member.

Step 2: Configure an egress PDR and an egress FAR that are applied to the downstream port of the multicast member on the UPF network element 1.

Case 2: A UPF network element (assumed to be the UPF network element 1) newly selected by the first terminal has no other multicast member or no multicast source in the multicast group.

Step 1: Configure a multicast group FAR 1 applied to the UPF network element 1, and configure an egress PDR and an egress FAR that are applied to a downstream port of the multicast member on the UPF network element 1, where the multicast group FAR 1 includes a rule pointing to the downstream port of the multicast member.

Step 2: Configure an ingress PDR applied to an upstream port of the multicast member on the UPF network element 1.

Step 3: Update a multicast group FAR on an upstream UPF network element of the UPF network element 1, and add a rule pointing to a downstream port associated with the multicast member; and configure an egress PDR and an egress FAR that are applied to the downstream port associated with the multicast member on the upstream UPF network element of the UPF network element 1.

Step 4: If the upstream UPF network element of the UPF network element 1 has no other multicast member or no multicast source in the multicast group, cyclically perform steps similar to step 2 and step 3 (a difference lies in that UPF network elements are different), until an upstream UPF network element has another multicast member or a multicast source in the multicast group or until a multicast source accesses a UPF network element (which may be considered as a target UPF network element). If the target UPF network element has another multicast member in the multicast group, the target UPF network element ends the process after performing a step similar to step 3 (a difference lies in that the UPF network elements are different). Alternatively, if the target UPF network element is the UPF network element accessed by the multicast source, the UPF network element further needs to end the process after performing steps similar to step 2 and step 3 (a difference lies in that the UPF network elements are different).

Case 3: A UPF network element (assumed to be the UPF network element 3) originally accessed by the first terminal has another multicast member or a multicast source in the multicast group.

Step 1: Modify a multicast group FAR 3 on the UPF network element 3, and delete a rule pointing to a downstream port of the multicast member.

Step 2: Delete an egress PDR and an egress FAR that are on the downstream port of the multicast member on the UPF network element 3.

Case 4: A UPF network element (assumed to be the UPF network element 3) originally accessed by the first terminal has no other multicast member or no multicast source in the multicast group.

Step 1: Delete a multicast group FAR 3 on the UPF network element 3, and delete an egress PDR and an egress FAR that are on a downstream port of the multicast member on the UPF network element 3.

Step 2: Delete an ingress PDR on an upstream port of the multicast member on the UPF network element 3.

Step 3: Modify a multicast group FAR on an upstream UPF network element of the UPF network element 3, and delete a rule pointing to a downstream port associated with the multicast member; and delete an egress PDR and an egress FAR that are on the downstream port associated with the multicast member on the upstream UPF network element of the UPF network element 3.

Step 4: If the upstream UPF network element of the UPF network element 3 has no other multicast member or no multicast source in the multicast group, cyclically perform steps similar to step 2 and step 3 (a difference lies in that UPF network elements are different), until an upstream UPF network element has another multicast member or a multicast source in the multicast group or until a multicast source accesses a UPF network element (which may be considered as a target UPF network element). If the target UPF network element has another multicast member in the multicast group, the target UPF network element ends the process after performing a step similar to step 3 (a difference lies in that the UPF network elements are different). Alternatively, if the target UPF network element is the UPF network element accessed by the multicast source, the UPF network element further needs to end the process after performing steps similar to step 2 and step 3 (a difference lies in that the UPF network elements are different).

In this embodiment of this application, in the scenario in which the multicast member moves, Case 1 and Case 3 may be included, Case 1 and Case 4 may be included, Case 2 and Case 3 may be included, or Case 2 and Case 4 may be included. For related implementations of Case 1 and Case 2, refer to the embodiment shown in FIG. 29. For related implementations of Case 3 and Case 4, refer to the embodiment shown in FIG. 34A and FIG. 34B. A difference lies in different signaling procedures of interaction between network elements, and the like. Details are not described herein again.

In addition, the signaling procedure of interaction between the corresponding network elements in the scenario in which the multicast member moves is similar to the signaling procedure of interaction between the corresponding network elements in the scenario in which the terminal member that belongs to the 5GLAN group and that has accessed the network moves in the broadcast scenario. For related descriptions, refer to the embodiment shown in FIG. 16. Details are not described herein again.

According to the group communications method, when a multicast member in the multicast group moves, only a multicast group FAR on an associated UPF network element needs to be adjusted (created, updated, or deleted), and an ingress PDR, an egress PDR, and an egress FAR that are on the associated UPF network element and that correspond to the multicast member need to be adjusted (created, updated, or deleted) or an egress PDR and an egress FAR that are on the associated UPF network element and that correspond to the multicast member need to be adjusted (created, updated, or deleted), but an ingress PDR, an egress PDR, and an egress FAR that correspond to another multicast member in the multicast group remain unchanged. Therefore, when there are a relatively large number of multicast members in the multicast group, a problem that configuration workload caused by a change in a quantity of multicast members is greatly increased can be avoided, and the configuration workload caused by the change in the quantity of multicast members can be greatly reduced.

FIG. 29 to FIG. 37(a) and FIG. 37(b) separately provide examples of corresponding group communications methods when a terminal member in the multicast group changes (for example, a terminal member joins a multicast group, a terminal member leaves a multicast group, or a terminal member moves in a multicast group) in a multicast scenario, and descriptions are provided mainly by using a control plane configuration as an example. The following describes how a user plane network element forwards a group multicast packet.

A manner in which the user plane network element forwards the group multicast packet is similar to the manner in which the user plane network element forwards the group broadcast packet. A difference lies in that an ingress PDR in a broadcast scenario is used to identify a broadcast packet belonging to a LAN group, and an ingress PDR in a multicast scenario is used to identify a multicast packet belonging to a multicast group. For a manner of identifying the multicast packet, refer to the foregoing descriptions of the multicast packet. Details are not described herein again.

It should be noted that in the foregoing multicast scenario, descriptions are provided by using an example in which the multicast member is adjusted. Certainly, this embodiment of this application may also be applied to a scenario in which a multicast source moves. This is not specifically limited in this embodiment of this application.

In addition, in a possible implementation, in the scenario in which the multicast source moves, for example, the moving multicast source is a first terminal, a UPF network element originally accessed by the first terminal is a UPF network element 3, the first terminal corresponds to a session port 3 on the UPF network element 3, a newly selected UPF network element is a UPF network element 1, and the first terminal corresponds to a session port 1 on the UPF network element 1. In this case, after determining that the first terminal that moves is the multicast source, a GMF network element may request an SMF network element to establish a tunnel between the UPF network element 1 and the UPF network element 3. After obtaining a tunnel identifier, the GMF network element may generate forwarding rules, namely, a PDR 1 and an FAR 1, that are applied to an ingress of the session port 1 on the UPF network element 1. The PDR 1 is used to determine that a packet sent by the first terminal belongs to the multicast group, and the FAR 1 is used to forward the multicast packet to a tunnel endpoint connected to the UPF network element 3. In addition, the GMF network element generates a rule, namely, a PDR 3, which is applied to an ingress of a tunnel endpoint on the UPF network element 3. The PDR 3 is used to identify a received packet belonging to the multicast group, and the PDR 3 is used to set an FAR ID to a multicast FAR on the UPF network element 3.

Figure 38:
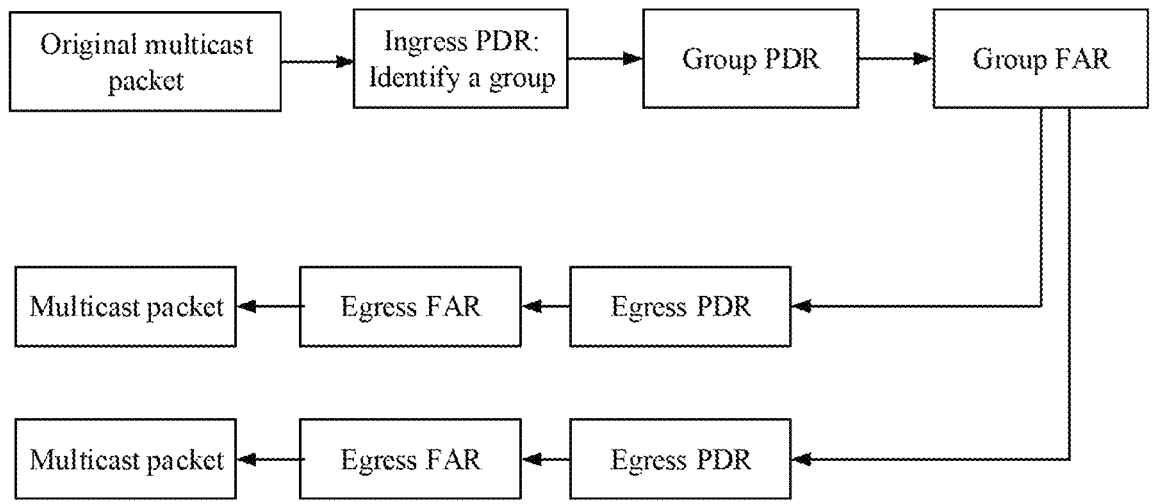
FIG. 38 is a schematic diagram 2 of a conceptual architecture of a group communications method according to an embodiment of this application.

In addition, it should be noted that in all the embodiments of this application, descriptions are provided by using an example in which an ingress PDR is used to identify a broadcast packet or a multicast packet that belongs to a group. Optionally, in this embodiment of this application, a function of the ingress PDR may alternatively be split. For example, as shown in FIG. 38, only a group is identified at an ingress (for example, which may be the ingress PDR), and after the identification, the group is delivered to a specified module for processing. For example, unicast identification, multicast identification, and broadcast identification in a group is implemented by using a group PDR of the group, and packet forwarding is implemented by using a group FAR. This is not specifically limited in this embodiment of this application.

The foregoing mainly describes the solutions provided in the embodiments of this application from a perspective of interaction between the network elements. It may be understood that to implement the foregoing functions, the group management function network element, the user plane network element, or the session management network element includes corresponding hardware structures and/or software modules for performing the functions. A person skilled in the art should be easily aware that units and algorithm steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that such an implementation goes beyond the scope of this application.

In the embodiments of this application, the group management function network element, the user plane network element, or the session management network element may be divided into functional modules based on the foregoing method examples. For example, functional modules corresponding to the functions may be obtained through division, or two or more functions may be integrated into one processing module. The integrated module may be implemented in a form of hardware, or may be implemented in a form of a software functional module. It should be noted that, in the embodiments of this application, division into the modules is an example and is merely logical function division, and may be other division in an actual implementation.

Figure 39:
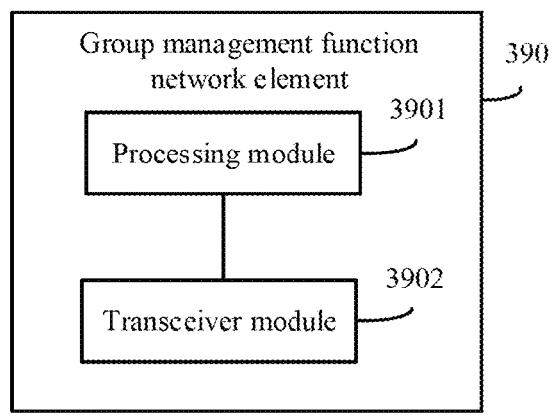
FIG. 39 is a schematic structural diagram of a group management function network element according to an embodiment of this application.

For example, when functional modules are obtained through division in an integrated manner, FIG. 39 is a schematic structural diagram of a group management function network element 390. The group management function network element 390 includes a transceiver module 3902 and a processing module 3901. The processing module 3901 is configured to: when a first terminal initiates access to a local area network group, obtain an identifier of a first user plane network element to be accessed by the first terminal, context information of the local area network group, and a first session port identifier, where the context information includes an identifier list of user plane network elements accessed by a terminal that has currently accessed the local area network group in a terminal member list corresponding to the local area network group, and the first session port identifier is an identifier of a first session port that is on the first user plane network element and that is used by the first terminal for access. The processing module 3901 is further configured to: create, for the local area network group, a rule group applied to the first session port, and create or update, by the group management function network element for the local area network group based on the context information, a local area network group FAR applied to the first user plane network element, where the rule group includes an ingress PDR, an egress PDR, and an egress FAR; the egress PDR includes an identifier of the egress FAR, and the ingress PDR includes an identifier of the local area network group FAR; the ingress PDR is used to identify a broadcast packet belonging to the local area network group, and the local area network group FAR is used to duplicate the broadcast packet and then forward the broadcast packet to a specified egress; and the egress PDR is used to identify a type of the broadcast packet, and the egress FAR is used to perform outer header creation and transport level marking on the broadcast packet and then send the broadcast packet through a corresponding port. The transceiver module 3902 is configured to send a first message to a session management network element, where the first message is used to configure the rule group on the first session port on the first user plane network element, and configure or update the local area network group FAR on the first user plane network element.

All related content of the steps in the foregoing method embodiments may be cited in function descriptions of corresponding functional modules. Details are not described herein again.

In this embodiment, the group management function network element 390 is presented in a form of functional modules obtained through division in an integrated manner. The "module" herein may be a specific ASIC, a circuit, a processor that executes one or more software or firmware programs, and a memory, an integrated logic circuit, and/or another component that can provide the foregoing functions. In a simple embodiment, a person skilled in the art may figure out that the group management function network element 390 may be in the form shown in FIG. 11.

For example, the processor 1101 in FIG. 11 may invoke the computer execution instructions stored in the memory 1103, so that the group management function network element 390 performs the group communications method in the foregoing method embodiments.

Specifically, functions/implementation processes of the transceiver module 3902 and the processing module 3901 in FIG. 39 may be implemented by the processor 1101 in FIG. 11 by invoking the computer execution instructions stored in the memory 1103. Alternatively, a function/an implementation process of the processing module 3901 in FIG. 39 may be implemented by the processor 1101 in FIG. 11 by invoking the computer execution instructions stored in the memory 1103, and a function/an implementation process of the transceiver module 3902 in FIG. 39 may be implemented by the communications interface 1104 in FIG. 11.

The group management function network element 390 provided in this embodiment may perform the foregoing group communications method. Therefore, for a technical effect that can be obtained by the group management function network element 390, refer to the foregoing method embodiments. Details are not described herein again.

Optionally, an embodiment of this application further provides an apparatus (for example, the apparatus may be a chip system). The apparatus includes a processor, configured to support a group management function network element in implementing the foregoing group communications method, for example, creating, for the local area network group, the rule group applied to the first session port. In a possible design, the apparatus further includes a memory. The memory is configured to store program instructions and data that are necessary for the group management function network element. Certainly, the memory may alternatively not be in the apparatus. When the apparatus is the chip system, the apparatus may include a chip, or may include a chip and another discrete component. This is not specifically limited in this embodiment of this application.

Figure 40:
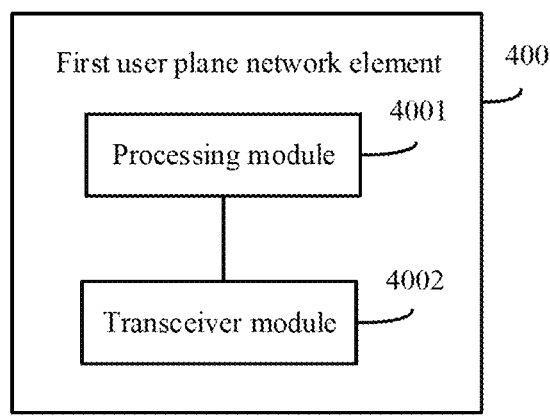
FIG. 40 is a schematic structural diagram of a first user plane network element according to an embodiment of this application.

Alternatively, for example, when functional modules are obtained through division in an integrated manner, FIG. 40 is a schematic structural diagram of a first user plane network element 400. The first user plane network element 400 includes a transceiver module 4002 and a processing module 4001. The transceiver module 4002 is configured to: when a first terminal initiates access to a local area network group, receive a first message from a session management network element, where the first message includes a first session port identifier, a rule group applied to a first session port corresponding to the first session port identifier, and a created or updated local area network group FAR applied to the first user plane network element; the first session port identifier is an identifier of the first session port that is on the first user plane network element and that is used by the first terminal for access; the rule group includes an ingress PDR, an egress PDR, and an egress FAR; the egress PDR includes an identifier of the egress FAR, and the ingress PDR includes an identifier of the local area network group FAR; the ingress PDR is used to identify a broadcast packet belonging to the local area network group, and the local area network group FAR is used to duplicate the broadcast packet and then forward the broadcast packet to a specified egress; and the egress PDR is used to identify a type of the broadcast packet, and the egress FAR is used to perform outer header creation and transport level marking on the broadcast packet and then send the broadcast packet through a corresponding port. The processing module 4001 is configured to: create the first session port based on the first session port identifier, and configure the rule group on the first session port. The processing module 4001 is configured to: create the local area network group FAR on the first user plane network element based on the created local area network group FAR applied to the first user plane network element; or update, by the first user plane network element, the local area network group FAR on the first user plane network element based on the updated local area network group FAR applied to the first user plane network element.

All related content of the steps in the foregoing method embodiments may be cited in function descriptions of corresponding functional modules. Details are not described herein again.

In this embodiment, the first user plane network element 400 is presented in a form of functional modules obtained through division in an integrated manner. The "module" herein may be a specific ASIC, a circuit, a processor that executes one or more software or firmware programs, and a memory, an integrated logic circuit, and/or another component that can provide the foregoing functions. In a simple embodiment, a person skilled in the art may figure out that the first user plane network element 400 may be in the form shown in FIG. 11.

For example, the processor 1101 in FIG. 11 may invoke the computer execution instructions stored in the memory 1103, so that the first user plane network element 400 performs the group communications method in the foregoing method embodiments.

Specifically, functions/implementation processes of the transceiver module 4002 and the processing module 4001 in FIG. 40 may be implemented by the processor 1101 in FIG. 11 by invoking the computer execution instructions stored in the memory 1103. Alternatively, a function/an implementation process of the processing module 4001 in FIG. 40 may be implemented by the processor 1101 in FIG. 11 by invoking the computer execution instructions stored in the memory 1103, and a function/an implementation process of the transceiver module 4002 in FIG. 40 may be implemented by the communications interface 1104 in FIG. 11.

The first user plane network element 400 provided in this embodiment may perform the foregoing group communications method. Therefore, for a technical effect that can be obtained by the first user plane network element 400, refer to the foregoing method embodiments. Details are not described herein again.

Optionally, an embodiment of this application further provides an apparatus (for example, the apparatus may be a chip system). The apparatus includes a processor, configured to support a first user plane network element in implementing the foregoing group communications method, for example, creating the first session port based on the first session port identifier, and configuring the rule group on the first session port. In a possible design, the apparatus further includes a memory. The memory is configured to store program instructions and data that are necessary for the first user plane network element. Certainly, the memory may alternatively not be in the apparatus. When the apparatus is the chip system, the apparatus may include a chip, or may include a chip and another discrete component. This is not specifically limited in this embodiment of this application.

Figure 41:
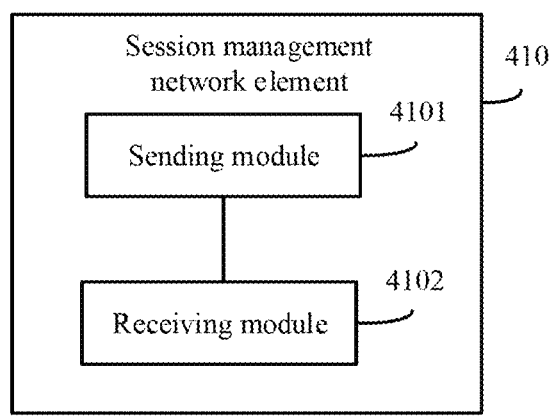
FIG. 41 is a schematic structural diagram of a session management network element according to an embodiment of this application.

Alternatively, for example, if functional modules are obtained through division in an integrated manner, FIG. 41 is a schematic structural diagram of a session management network element 410. The session management network element 410 includes a receiving module 4102 and a sending module 4101. The receiving module 4102 is configured to: when a first terminal initiates access to a local area network group, receive a first message from a group management function network element, where the first message includes an identifier of a first user plane network element, a first session port identifier corresponding to the identifier of the first user plane network element, a rule group applied to a first session port corresponding to the first session port identifier, and a created or updated local area network group FAR applied to the first user plane network element; the first session port is a session port that is on the first user plane network element and that is used by the first terminal for access; the rule group includes an ingress PDR, an egress PDR, and an egress FAR; the egress PDR includes an identifier of the egress FAR, and the ingress PDR includes an identifier of the local area network group FAR; the ingress PDR is used to identify a broadcast packet belonging to the local area network group, and the local area network group FAR is used to duplicate the broadcast packet and then forward the broadcast packet to a specified egress; and the egress PDR is used to identify a type of the broadcast packet, and the egress FAR is used to perform outer header creation and transport level marking on the broadcast packet and then send the broadcast packet through a corresponding port. The sending module 4101 is configured to send a second message to the first user plane network element based on the identifier of the first user plane network element, where the second message includes the first session port identifier, the rule group on the first session port, and the created or updated local area network group FAR applied to the first user plane network element.

All related content of the steps in the foregoing method embodiments may be cited in function descriptions of corresponding functional modules. Details are not described herein again.

In this embodiment, the session management network element 410 is presented in a form of functional modules obtained through division in an integrated manner. The "module" herein may be a specific ASIC, a circuit, a processor that executes one or more software or firmware programs, and a memory, an integrated logic circuit, and/or another component that can provide the foregoing functions. In a simple embodiment, a person skilled in the art may figure out that the session management network element 410 may be in the form shown in FIG. 11.

For example, the processor 1101 in FIG. 11 may invoke the computer execution instructions stored in the memory 1103, so that the session management network element 410 performs the group communications method in the foregoing method embodiments.

Specifically, functions/implementation processes of the receiving module 4102 and the sending module 4101 in FIG. 41 may be implemented by the processor 1101 in FIG. 11 by invoking the computer execution instructions stored in the memory 1103. Alternatively, functions/implementation processes of the receiving module 4102 and the sending module 4101 in FIG. 41 may be implemented by the communications interface 1104 in FIG. 11.

The session management network element 410 provided in this embodiment may perform the foregoing group communications method. Therefore, for a technical effect that can be obtained by the session management network element 410, refer to the foregoing method embodiments. Details are not described herein again.

Optionally, an embodiment of this application further provides an apparatus (for example, the apparatus may be a chip system). The apparatus includes a processor, configured to support a session management network element in implementing the foregoing group communications method, for example, determining the first user plane network element based on the identifier of the first user plane network element. In a possible design, the apparatus further includes a memory. The memory is configured to store program instructions and data that are necessary for the session management network element. Certainly, the memory may alternatively not be in the apparatus. When the apparatus is the chip system, the apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer readable storage medium, or may be transmitted from one computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the scope of this application. Correspondingly, the specification and the accompanying drawings are merely example descriptions in this application defined by the appended claims, and are intended to cover any of or all modifications, variations, combinations, or equivalents within the scope of this application. It is clear that a person skilled in the art can make various modifications and variations to this application without departing from the spirit and scope of this application. This application is intended to cover these modifications and variations of this application, provided that they fall within the scope of protection defined by the following claims and their equivalent technologies in this application.

What is claimed is:

1. A group communications method comprising:
in response to a first terminal initiating access to a local area network group, obtaining, by a group management function network element, an identifier of a first user plane network element to be accessed by the first terminal, context information of the local area network group, and a first session port identifier, wherein the context information comprises an identifier list of user plane network elements accessed by a terminal that has currently accessed the local area network group in a terminal member list corresponding to the local area network group, and the first session port identifier is an identifier of a first session port that is on the first user plane network element and that is used by the first terminal for access;
creating, by the group management function network element for the local area network group, a rule group applied to the first session port, and creating or updating, by the group management function network element for the local area network group based on the context information, a local area network group forwarding action rule (FAR) applied to the first user plane network element, wherein the rule group comprises an ingress packet detection rule (PDR), an egress PDR, and an egress FAR; the egress PDR comprises an identifier of the egress FAR, and the ingress PDR comprises an identifier of the local area network group FAR; the ingress PDR is used to identify a broadcast packet belonging to the local area network group, and the local area network group FAR is used to duplicate the broadcast packet and then forward the broadcast packet to a specified egress; and the egress PDR is used to identify a type of the broadcast packet, and the egress FAR is used to perform outer header creation and transport level marking on the broadcast packet and then send the broadcast packet through a corresponding port; and
sending, by the group management function network element, a first message to a session management network element, wherein the first message is used to configure the rule group on the first session port, and configure or update the local area network group FAR on the first user plane network element.

2. The method according to claim 1, further comprising:
in response to the identifier list comprising an identifier of a second user plane network element, and the identifier of the first user plane network element is-being not in the identifier list, obtaining, by the group management function network element, a first tunnel endpoint identifier and a second tunnel endpoint identifier, wherein the first tunnel endpoint identifier is an identifier of a first tunnel endpoint of a first tunnel on the first user plane network element, the second tunnel endpoint identifier is an identifier of a second tunnel endpoint of the first tunnel on the second user plane network element, and the first tunnel is a tunnel between the first user plane network element and the second user plane network element; and
creating, by the group management function network element for the local area network group, a rule group applied to the first tunnel endpoint, creating, by the group management function network element for the local area network group, a rule group applied to the second tunnel endpoint, and updating, by the group management function network element, a local area network group FAR applied to the second user plane network element, wherein
correspondingly, the first message is further used to configure the rule group on the first tunnel endpoint, configure the rule group on the second tunnel endpoint, and update the local area network group FAR on the second user plane network element.

3. The method according to claim 1, further comprising
in response to the first terminal being updated from accessing the first user plane network element to accessing a third user plane network element in the local area network group, obtaining, by the group management function network element, a third session port identifier, wherein the third session port identifier is an identifier of a third session port that is on the third user plane network element and that is used by the first terminal for access;
creating, by the group management function network element for the local area network group, a rule group applied to the third session port, and creating or updating, by the group management function network element based on the context information, a local area network group FAR applied to the third user plane network element; and sending, by the group management function network element, a third message to the session management network element, wherein the third message is used to configure the rule group on the third session port, configure or update the local area network group FAR on the third user plane network element, delete the rule group on the first session port, and delete or update the local area network group FAR applied to the first user plane network element; and an updated local area network group FAR applied to the first user plane network element is obtained by the group management function network element by updating, based on the context information, the local area network group FAR applied to the first user plane network element.

4. The method according to claim 3, further comprising:
in response to the identifier list comprising an identifier of a fourth user plane network element, and no terminal other than the first terminal in the terminal member list corresponding to the local area network group accessing the first user plane network element, updating, by the group management function network element, a local area network group FAR applied to the fourth user plane network element, wherein
correspondingly, the third message is further used to delete a second tunnel between the first user plane network element and the fourth user plane network element, delete a rule group on a third tunnel endpoint on the first user plane network element, delete the rule group on a fourth tunnel endpoint on the fourth user plane network element, and update the local area network group FAR applied to the fourth user plane network element; and the third tunnel endpoint is a tunnel endpoint of the second tunnel on the first user plane network element, and the fourth tunnel endpoint is a tunnel endpoint of the second tunnel on the fourth user plane network element.

5. The method according to claim 3, further comprising:
in response to the identifier list comprising the identifier of the fourth user plane network element, and an identifier of the third user plane network element being not in the identifier list, obtaining, by the group management function network element, a fifth tunnel endpoint identifier and a sixth tunnel endpoint identifier, wherein the fifth tunnel endpoint identifier is an identifier of a fifth tunnel endpoint of a third tunnel on the third user plane network element, the sixth tunnel endpoint identifier is an identifier of a sixth tunnel endpoint of the third tunnel on the fourth user plane network element, and the third tunnel is a tunnel between the third user plane network element and the fourth user plane network element; and
creating, by the group management function network element for the local area network group, a rule group applied to the fifth tunnel endpoint, creating, by the group management function network element for the local area network group, a rule group applied to the sixth tunnel endpoint, and updating, by the group management function network element, the local area network group FAR applied to the fourth user plane network element, wherein
correspondingly, the third message is further used to configure the rule group on the fifth tunnel endpoint, configure the rule group on the sixth tunnel endpoint, and update the local area network group FAR on the fourth user plane network element.

6. The method according to claim 1, further comprising:
in response to the first terminal being about to leave the local area network group, sending, by the group management function network element, a fifth message to the session management network element, wherein the fifth message is used to delete the rule group applied to the first session port, and delete or update the local area network group FAR applied to the first user plane network element; and an updated local area network group FAR applied to the first user plane network element is obtained by the group management function network element by updating, based on the context information, the local area network group FAR applied to the first user plane network element.

7. The method according to claim 6, further comprising:
in response to the identifier list comprising an identifier of a fifth user plane network element, and no terminal other than the first terminal in the terminal member list corresponding to the local area network group accessing the first user plane network element, updating, by the group management function network element, a local area network group FAR applied to the fifth user plane network element, wherein
correspondingly, the fifth message is further used to delete a fourth tunnel between the first user plane network element and the fifth user plane network element, delete a rule group on a seventh tunnel endpoint on the first user plane network element, delete a rule group on an eighth tunnel endpoint on the fifth user plane network element, and update the local area network group FAR applied to the fifth user plane network element; and the seventh tunnel endpoint is a tunnel endpoint of the fourth tunnel on the first user plane network element, and the eighth tunnel endpoint is a tunnel endpoint of the fourth tunnel on the fifth user plane network element.

8. A group management function network element comprising:
at least one processor; and
a memory coupled to the at least one processor and configured to store program instructions which, when executed by the at least one processor, cause the group management function network element to:
in response to a first terminal initiating access to a local area network group, obtain an identifier of a first user plane network element to be accessed by the first terminal, context information of the local area network group, and a first session port identifier, wherein the context information comprises an identifier list of user plane network elements accessed by a terminal that has currently accessed the local area network group in a terminal member list corresponding to the local area network group, and the first session port identifier is an identifier of a first session port that is on the first user plane network element and that is used by the first terminal for access;
create, for the local area network group, a rule group applied to the first session port, and create or update, for the local area network group based on the context information, a local area network group forwarding action rule (FAR) applied to the first user plane network element, wherein the rule group comprises an ingress packet detection rule (PDR), an egress PDR, and an egress FAR; the egress PDR comprises an identifier of the egress FAR, and the ingress PDR comprises an identifier of the local area network group FAR; the ingress PDR is used to identify a broadcast packet belonging to the local area network group, and the local area network group FAR is used to duplicate the broadcast packet and then forward the broadcast packet to a specified egress; and the egress PDR is used to identify a type of the broadcast packet, and the egress FAR is used to perform outer header creation and transport level marking on the broadcast packet and then send the broadcast packet through a corresponding port; and send a first message to a session management network element, wherein the first message is used to configure the rule group on the first session port on the first user plane network element, and configure or update the local area network group FAR on the first user plane network element.

9. The group management function network element according to claim 8, wherein the program instructions further cause the group management function network element to:

in response to the identifier list comprising an identifier of a second user plane network element, and the identifier of the first user plane network element is-being not in the identifier list, obtain a first tunnel endpoint identifier and a second tunnel endpoint identifier, wherein the first tunnel endpoint identifier is an identifier of a first tunnel endpoint of a first tunnel on the first user plane network element, the second tunnel endpoint identifier is an identifier of a second tunnel endpoint of the first tunnel on the second user plane network element, and the first tunnel is a tunnel between the first user plane network element and the second user plane network element; and create, for the local area network group, the rule group applied to the first tunnel endpoint, create, for the local area network group, the rule group applied to the second tunnel endpoint, and update, by the group management function network element, the local area network group FAR applied to the second user plane network element, wherein correspondingly, the first message is further used to configure the rule group on the first tunnel endpoint, configure the rule group on the second tunnel endpoint, and update the local area network group FAR on the second user plane network element.

10. The group management function network element according to claim 8, wherein the program instructions further cause the group management function network element to:

in response to the first terminal is-being updated from accessing the first user plane network element to accessing a third user plane network element in the local area network group, obtain a third session port identifier, wherein the third session port identifier is an identifier of a third session port that is on the third user plane network element and that is used by the first terminal for access;

create, for the local area network group, a rule group applied to the third session port, and create or update, by the group management function network element based on the context information, the local area network group FAR applied to the third user plane network element; and send a third message to the session management network element, wherein the third message is used to configure the rule group on the third session port, configure or update the local area network group FAR on the third user plane network element, delete the rule group on the first session port, and delete or update the local area network group FAR applied to the first user plane network element; and an updated local area network group FAR applied to the first user plane network element is obtained by the group management function network element by updating, based on the context information, the local area network group FAR applied to the first user plane network element.

11. The group management function network element according to claim 10, wherein the program instructions further cause the group management function network element to:

in response to the identifier list comprising an identifier of a fourth user plane network element, and no terminal other than the first terminal in the terminal member list corresponding to the local area network group accessing the first user plane network element, update the local area network group FAR applied to the fourth user plane network element, wherein correspondingly, the third message is further used to delete a second tunnel between the first user plane network element and the fourth user plane network element, delete the rule group on a third tunnel endpoint on the first user plane network element, delete the rule group on a fourth tunnel endpoint on the fourth user plane network element, and update the local area network group FAR applied to the fourth user plane network element; and the third tunnel endpoint is a tunnel endpoint of the second tunnel on the first user plane network element, and the fourth tunnel endpoint is a tunnel endpoint of the second tunnel on the fourth user plane network element.

12. The group management function network element according to claim 10, wherein the program instructions further cause the group management function network element to:

in response to the identifier list comprising the identifier of the fourth user plane network element, and an identifier of the third user plane network element is not in the identifier list, obtain a fifth tunnel endpoint identifier and a sixth tunnel endpoint identifier, wherein the fifth tunnel endpoint identifier is an identifier of a fifth tunnel endpoint of a third tunnel on the third user plane network element, the sixth tunnel endpoint identifier is an identifier of a sixth tunnel endpoint of the third tunnel on the fourth user plane network element, and the third tunnel is a tunnel between the third user plane network element and the fourth user plane network element; and create, for the local area network group, the rule group applied to the fifth tunnel endpoint, create, for the local area network group, the rule group applied to the sixth tunnel endpoint, and update, by the group management function network element, the local area network group FAR applied to the fourth user plane network element, wherein correspondingly, the third message is further used to configure the rule group on the fifth tunnel endpoint, configure the rule group on the sixth tunnel endpoint, and update the local area network group FAR on the fourth user plane network element.

13. The group management function network element according to claim 8, wherein the program instructions further cause the group management function network element to:

in response to the first terminal being about to leave the local area network group, send a fifth message to the session management network element, wherein the fifth message is used to delete the rule group applied to the first session port, and delete or update the local area network group FAR applied to the first user plane network element; and an updated local area network group FAR applied to the first user plane network element is obtained by the group management function network element by updating, based on the context information, the local area network group FAR applied to the first user plane network element.

14. The group management function network element according to claim 13, wherein the program instructions further cause the group management function network element to:
in response to the identifier list comprising an identifier of a fifth user plane network element, and no terminal other than the first terminal in the terminal member list corresponding to the local area network group accessing the first user plane network element, update the local area network group FAR applied to the fifth user plane network element, wherein
correspondingly, the fifth message is further used to delete a fourth tunnel between the first user plane network element and the fifth user plane network element, delete the rule group on a seventh tunnel endpoint on the first user plane network element, delete the rule group on an eighth tunnel endpoint on the fifth user plane network element, and update the local area network group FAR applied to the fifth user plane network element; and the seventh tunnel endpoint is a tunnel endpoint of the fourth tunnel on the first user plane network element, and the eighth tunnel endpoint is a tunnel endpoint of the fourth tunnel on the fifth user plane network element.

15. A group communications system, comprising a group management function network element and a session management network element, wherein
the group management function network element is configured to:
in response to a first terminal initiating access to a local area network group, obtain an identifier of a first user plane network element to be accessed by the first terminal, context information of the local area network group, and a first session port identifier, wherein the context information comprises an identifier list of user plane network elements accessed by a terminal that has currently accessed the local area network group in a terminal member list corresponding to the local area network group, and the first session port identifier is an identifier of a first session port that is on the first user plane network element and that is used by the first terminal for access;
create, for the local area network group, a rule group applied to the first session port, and create or update, for the local area network group based on the context information, a local area network group forwarding action rule (FAR) applied to the first user plane network element, wherein the rule group comprises an ingress packet detection rule (PDR), an egress PDR, and an egress FAR; the egress PDR comprises an identifier of the egress FAR, and the ingress PDR comprises an identifier of the local area network group FAR; the ingress PDR is used to identify a broadcast packet belonging to the local area network group, and the local area network group FAR is used to duplicate the broadcast packet and then forward the broadcast packet to a specified egress; and the egress PDR is used to identify a type of the broadcast packet, and the egress FAR is used to perform outer header creation and transport level marking on the broadcast packet and then send the broadcast packet through a corresponding port; and
send a first message to the session management network element, wherein the first message wherein the first message comprises an identifier of a first user plane network element, the first session port identifier, the rule group applied to the first session port, and the local area network group FAR applied to the first user plane network element; and
the session management network element is configured to:
receive the first message from the group management function network element;
send a second message to the first user plane network element based on the identifier of the first user plane network element, wherein the second message comprises the first session port identifier, the rule group on the first session port, and the local area network group FAR applied to the first user plane network element.

16. The group communications system according to claim 15, further comprising the first user plane network element; wherein the first user plane network element is configured to:
receive the second message from the session management network element;
create the first session port based on the first session port identifier, and configure the rule group on the first session port; and
create or update the local area network group FAR on the first user plane network element based on the local area network group FAR applied to the first user plane network element.

17. The group communications system according to claim 15, wherein in response to the first terminal being updated from accessing the first user plane network element to accessing a third user plane network element in the local area network group, the group management function network element is further configured to:
obtain a third session port identifier, wherein the third session port identifier is an identifier of a third session port that is on the third user plane network element and that is used by the first terminal for access;
create, for the local area network group, a rule group applied to the third session port, and create or update, based on the context information, a local area network group FAR applied to the third user plane network element; and
send a third message to the session management network element, wherein the third message comprises the identifier of the first user plane network element, the first session port identifier, an identifier of the local area network group FAR applied to the first user plane network element, an identifier of the third user plane network element, the third session port identifier, the rule group applied to the third session port and the local area network group FAR applied to the third user plane network element;
wherein the session management network element is further configured to:
receive the third message from the group management function network element, send a fourth message to the first user plane network element based on the identifier of the first user plane network element, wherein the fourth message comprises the first session port identifier and the identifier of the local area network group FAR applied to the first user plane network element; and send a fifth message to the third user plane network element based on the identifier of the third user plane network element, wherein the fifth message comprises the third session port identifier, the rule group on the third session port, and the local area network group FAR applied to the third user plane network element.

18. The group communications system according to claim 17, wherein the first user plane network element is further configured to;

receive the fourth message from the session management network element;

delete, based on the first session port identifier, the first session port and the rule group applied to the first session port; and delete, based on the identifier of the local area network group FAR applied to the first user plane network element, the local area network group FAR on the first user plane network element.

19. The group communications system according to claim 15, wherein the group management function network element is further configured to:

in response to the first terminal being about to leave the local area network group, send a sixth message to the session management network element, wherein the sixth message is used to delete the rule group applied to the first session port, and delete the local area network group FAR applied to the first user plane network element.

20. The group communications system according to claim 19, wherein the session management network element is further configured to:

receive the sixth message from the group management function network element;

send a seventh message to the first user plane network element based on the identifier of the first user plane network element, wherein the seventh message comprises the first session port identifier and the identifier of the local area network group FAR applied to the first user plane network element.

* * * * *

UNITED STATES PATENT AND TRADEMARK OFFICE
CERTIFICATE OF CORRECTION

PATENT NO. : 11,653,180 B2
APPLICATION NO. : 17/324928
DATED : May 16, 2023
INVENTOR(S) : Xu et al.

Page 1 of 1

It is certified that error appears in the above-identified patent and that said Letters Patent is hereby corrected as shown below:

In the Claims

Claim 2: Column 84, Line 29: "of the first user plane network element is-being not in" should read -- of the first user plane network element being not in --.

Claim 9: Column 87, Line 24: "of the first user plane network element is-being not in" should read -- of the first user plane network element being not in --.

Claim 10: Column 87, Line 51: "in response to the first terminal is-being updated from" should read -- in response to the first terminal being updated from --.

Signed and Sealed this
Twenty-second Day of August, 2023

Katherine Kelly Vidal
*Director of the United States Patent and Trademark Office*